United States Patent
Yanai et al.

(10) Patent No.: US 10,061,106 B2
(45) Date of Patent: Aug. 28, 2018

(54) ZOOM LENS AND IMAGE PICKUP APPARATUS USING THE SAME

(71) Applicant: OLYMPUS CORPORATION, Hachioji-shi, Tokyo (JP)

(72) Inventors: Tetsuya Yanai, Akiruno (JP); Toyoki Kon, Kokubunji (JP); Daichi Murakami, Hino (JP); Yuki Kubota, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/340,434

(22) Filed: Nov. 1, 2016

(65) Prior Publication Data
US 2017/0123193 A1 May 4, 2017

(30) Foreign Application Priority Data

Nov. 4, 2015 (JP) ................... 2015-216717
Nov. 4, 2015 (JP) ................... 2015-216718
Nov. 4, 2015 (JP) ................... 2015-216720

(51) Int. Cl.
G02B 9/60 (2006.01)
G02B 15/173 (2006.01)
G02B 15/20 (2006.01)
G02B 5/00 (2006.01)
G02B 27/00 (2006.01)

(52) U.S. Cl.
CPC ........... *G02B 15/173* (2013.01); *G02B 5/005* (2013.01); *G02B 15/20* (2013.01); *G02B 27/0025* (2013.01)

(58) Field of Classification Search
CPC .. G02B 15/173; G02B 27/0025; G02B 15/20; G02B 5/005
See application file for complete search history.

(56) References Cited

U.S. PATENT DOCUMENTS

| | | | |
|---|---|---|---|
| 5,847,882 A | * | 12/1998 | Nakayama ........... G02B 15/173 359/676 |
| 6,094,312 A | | 7/2000 | Nakayama |
| 7,177,092 B2 | | 2/2007 | Satori et al. |
| 7,830,612 B2 | | 11/2010 | Hagiwara |

FOREIGN PATENT DOCUMENTS

| | | |
|---|---|---|
| JP | 08190051 A | 7/1996 |
| JP | 2003255228 A | 9/2003 |
| JP | 2009282398 A | 12/2009 |

\* cited by examiner

*Primary Examiner* — Joseph P Martinez
(74) *Attorney, Agent, or Firm* — Holtz, Holtz & Volek PC

(57) ABSTRACT

A zoom lens includes, in order from the object side, a first lens unit having a positive focal length, a second lens unit having a negative focal length, a third lens unit having a positive focal length, a fourth lens unit having a negative focal length, and a fifth lens unit having a positive focal length, wherein following Conditional Expressions (1) and (2) are satisfied:

$$0.3 \leq D34W/D45W \leq 1 \quad (1), \text{ and}$$

$$0.2 \leq (D34W/D45W)/(D34T/D45T) \leq 0.6 \quad (2).$$

62 Claims, 46 Drawing Sheets

FIG.22A
SA
FNO 4.079
-0.20　0.20
(mm)

FIG.22E
SA
FNO 4.081
d LINE
g LINE
C LINE
-0.20　0.20
(mm)

FIG.22I
SA
FNO 4.078
-0.20　0.20
(mm)

SA
FNO 4.073

-0.20  0.20
(mm)

AS
ω 41.52

-0.20  0.20
(mm)

DT
ω 41.52

-10.00  10.00
(%)

CC
ω 41.52

-0.02  0.02
(mm)

SA
FNO 4.069

-0.20  0.20
(mm)

AS
ω 16.85

-0.20  0.20
(mm)

DT
ω 16.85

-10.00  10.00
(%)

CC
ω 16.85

-0.02  0.02
(mm)

SA
FNO 4.070

-0.20  0.20
(mm)

AS
ω 6.05

-0.20  0.20
(mm)

DT
ω 6.05

-10.00  10.00
(%)

CC
ω 6.05

-0.02  0.02
(mm)

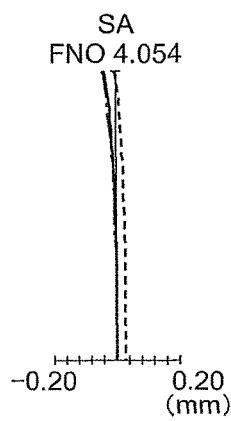
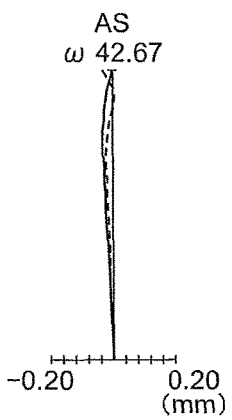
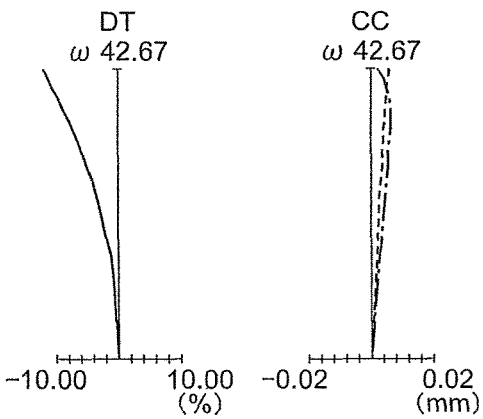
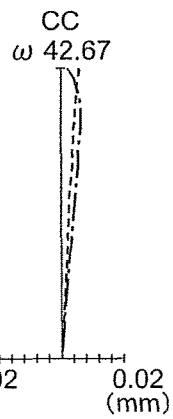
FIG.24A SA FNO 4.054
FIG.24B AS ω 42.67
FIG.24C DT ω 42.67
FIG.24D CC ω 42.67
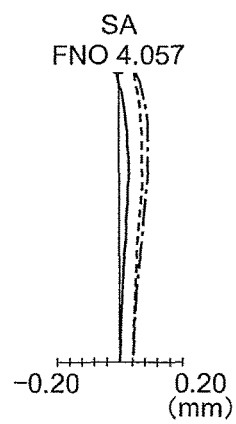
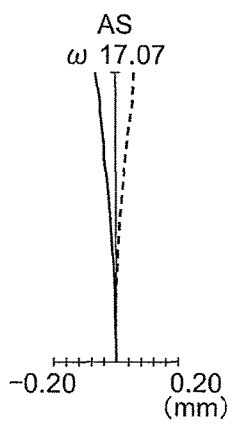
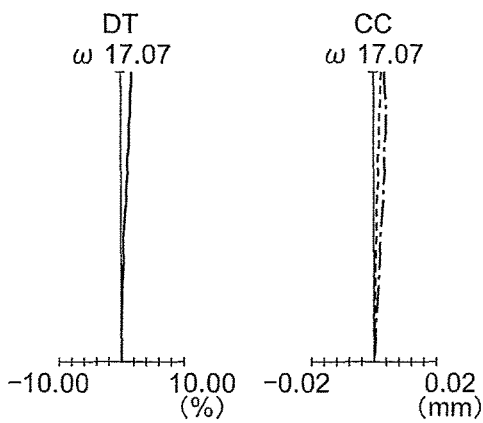
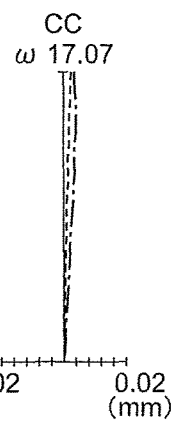
FIG.24E SA FNO 4.057
FIG.24F AS ω 17.07
FIG.24G DT ω 17.07
FIG.24H CC ω 17.07
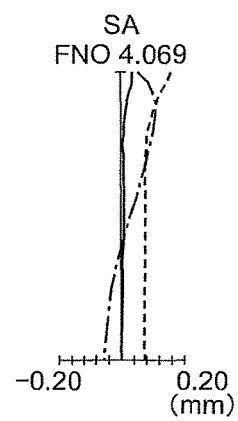
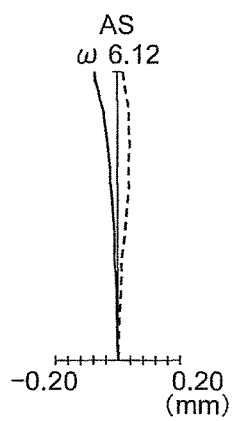
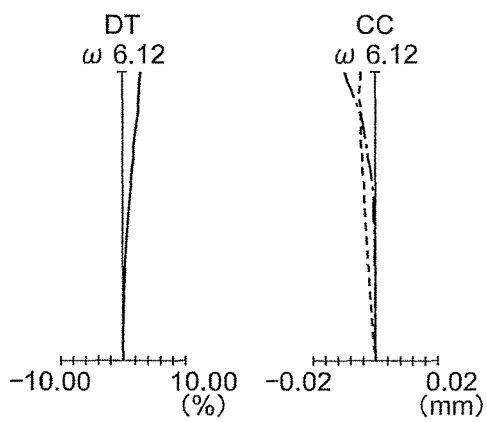
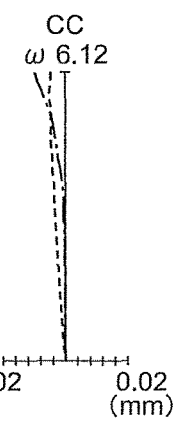
FIG.24I SA FNO 4.069
FIG.24J AS ω 6.12
FIG.24K DT ω 6.12
FIG.24L CC ω 6.12

SA
FNO 4.081

AS
ω 42.07

DT
ω 42.07

CC
ω 42.07

SA
FNO 4.080

AS
ω 17.18

DT
ω 17.18

CC
ω 17.18

SA
FNO 4.078

AS
ω 6.14

DT
ω 6.14

CC
ω 6.14

SA
FNO 4.080

-0.20   0.20
(mm)

AS
ω 41.97

-0.20   0.20
(mm)

DT
ω 41.97

-10.00   10.00
(%)

CC
ω 41.97

-0.02   0.02
(mm)

SA
FNO 4.078

-0.20   0.20
(mm)

AS
ω 19.11

-0.20   0.20
(mm)

DT
ω 19.11

-10.00   10.00
(%)

CC
ω 19.11

-0.02   0.02
(mm)

SA
FNO 4.078

-0.20   0.20
(mm)

AS
ω 7.65

-0.20   0.20
(mm)

DT
ω 7.65

-10.00   10.00
(%)

CC
ω 7.65

-0.02   0.02
(mm)

SA
FNO 4.047

-0.20   0.20
(mm)

AS
ω 41.20

-0.20   0.20
(mm)

DT
ω 41.20

-10.00   10.00
(%)

CC
ω 41.20

-0.02   0.02
(mm)

SA
FNO 4.069

-0.20   0.20
(mm)

AS
ω 17.06

-0.20   0.20
(mm)

DT
ω 17.06

-10.00   10.00
(%)

CC
ω 17.06

-0.02   0.02
(mm)

SA
FNO 4.061

-0.20   0.20
(mm)

AS
ω 6.11

-0.20   0.20
(mm)

DT
ω 6.11

-10.00   10.00
(%)

CC
ω 6.11

-0.02   0.02
(mm)

SA
FNO 4.073

-0.20  0.20
(mm)

AS
ω 41.73

-0.20  0.20
(mm)

DT
ω 41.73

-10.00  10.00
(%)

CC
ω 41.73

-0.02  0.02
(mm)

SA
FNO 4.086

-0.20  0.20
(mm)

AS
ω 16.87

-0.20  0.20
(mm)

DT
ω 16.87

-10.00  10.00
(%)

CC
ω 16.87

-0.02  0.02
(mm)

SA
FNO 4.074

-0.20  0.20
(mm)

AS
ω 6.05

-0.20  0.20
(mm)

DT
ω 6.05

-10.00  10.00
(%)

CC
ω 6.05

-0.02  0.02
(mm)

SA
FNO 4.080
-0.20  0.20
(mm)

AS
ω 41.55
-0.20  0.20
(mm)

DT
ω 41.55
-10.00  10.00
(%)

CC
ω 41.55
-0.02  0.02
(mm)

SA
FNO 4.087
-0.20  0.20
(mm)

AS
ω 16.89
-0.20  0.20
(mm)

DT
ω 16.89
-10.00  10.00
(%)

CC
ω 16.89
-0.02  0.02
(mm)

SA
FNO 4.085
-0.20  0.20
(mm)

AS
ω 6.07
-0.20  0.20
(mm)

DT
ω 6.07
-10.00  10.00
(%)

CC
ω 6.07
-0.02  0.02
(mm)

SA
FNO 4.075

-0.20　　0.20
(mm)

AS
ω 41.72

-0.20　　0.20
(mm)

DT
ω 41.72

-10.00　　10.00
(%)

CC
ω 41.72

-0.02　　0.02
(mm)

SA
FNO 4.074

-0.20　　0.20
(mm)

AS
ω 16.87

-0.20　　0.20
(mm)

DT
ω 16.87

-10.00　　10.00
(%)

CC
ω 16.87

-0.02　　0.02
(mm)

SA
FNO 4.073

-0.20　　0.20
(mm)

AS
ω 6.05

-0.20　　0.20
(mm)

DT
ω 6.05

-10.00　　10.00
(%)

CC
ω 6.05

-0.02　　0.02
(mm)

SA
FNO 4.072
-0.20    0.20
    (mm)

AS
ω 41.71
-0.20    0.20
    (mm)

DT
ω 41.71
-10.00   10.00
     (%)

CC
ω 41.71
-0.02    0.02
    (mm)

SA
FNO 4.087
-0.20    0.20
    (mm)

AS
ω 16.87
-0.20    0.20
    (mm)

DT
ω 16.87
-10.00   10.00
     (%)

CC
ω 16.87
-0.02    0.02
    (mm)

SA
FNO 4.086
-0.20    0.20
    (mm)

AS
ω 6.05
-0.20    0.20
    (mm)

DT
ω 6.05
-10.00   10.00
     (%)

CC
ω 6.05
-0.02    0.02
    (mm)

SA
FNO 4.083

-0.20    0.20
        (mm)

AS
ω 41.74

-0.20    0.20
        (mm)

DT
ω 41.74

-10.00   10.00
         (%)

CC
ω 41.74

-0.02    0.02
        (mm)

SA
FNO 4.070

-0.20    0.20
        (mm)

AS
ω 16.87

-0.20    0.20
        (mm)

DT
ω 16.87

-10.00   10.00
         (%)

CC
ω 16.87

-0.02    0.02
        (mm)

SA
FNO 4.081

-0.20    0.20
        (mm)

AS
ω 6.05

-0.20    0.20
        (mm)

DT
ω 6.05

-10.00   10.00
         (%)

CC
ω 6.05

-0.02    0.02
        (mm)

SA
FNO 4.085
-0.20  0.20
(mm)

AS
ω 41.30
-0.20  0.20
(mm)

DT
ω 41.30
-10.00  10.00
(%)

CC
ω 41.30
-0.02  0.02
(mm)

SA
FNO 4.081
-0.20  0.20
(mm)

AS
ω 16.98
-0.20  0.20
(mm)

DT
ω 16.98
-10.00  10.00
(%)

CC
ω 16.98
-0.02  0.02
(mm)

SA
FNO 4.073
-0.20  0.20
(mm)

AS
ω 6.09
-0.20  0.20
(mm)

DT
ω 6.09
-10.00  10.00
(%)

CC
ω 6.09
-0.02  0.02
(mm)

SA
FNO 4.079
-0.20  0.20
(mm)

AS
ω 41.52
-0.20  0.20
(mm)

DT
ω 41.52
-10.00  10.00
(%)

CC
ω 41.52
-0.02  0.02
(mm)

SA
FNO 4.074
-0.20  0.20
(mm)

AS
ω 16.86
-0.20  0.20
(mm)

DT
ω 16.86
-10.00  10.00
(%)

CC
ω 16.86
-0.02  0.02
(mm)

SA
FNO 4.077
-0.20  0.20
(mm)

AS
ω 6.05
-0.20  0.20
(mm)

DT
ω 6.05
-10.00  10.00
(%)

CC
ω 6.05
-0.02  0.02
(mm)

SA
FNO 4.082

-0.20   0.20
       (mm)

AS
ω 41.51

-0.20   0.20
       (mm)

DT
ω 41.51

-10.00   10.00
         (%)

CC
ω 41.51

-0.02   0.02
       (mm)

SA
FNO 4.084

-0.20   0.20
       (mm)

AS
ω 16.87

-0.20   0.20
       (mm)

DT
ω 16.87

-10.00   10.00
         (%)

CC
ω 16.87

-0.02   0.02
       (mm)

SA
FNO 4.088

-0.20   0.20
       (mm)

AS
ω 6.07

-0.20   0.20
       (mm)

DT
ω 6.07

-10.00   10.00
         (%)

CC
ω 6.07

-0.02   0.02
       (mm)

SA
FNO 4.080
-0.20  0.20
(mm)

AS
ω 41.49
-0.20  0.20
(mm)

DT
ω 41.49
-10.00  10.00
(%)

CC
ω 41.49
-0.02  0.02
(mm)

SA
FNO 4.079
-0.20  0.20
(mm)

AS
ω 16.86
-0.20  0.20
(mm)

DT
ω 16.86
-10.00  10.00
(%)

CC
ω 16.86
-0.02  0.02
(mm)

SA
FNO 4.077
-0.20  0.20
(mm)

AS
ω 6.07
-0.20  0.20
(mm)

DT
ω 6.07
-10.00  10.00
(%)

CC
ω 6.07
-0.02  0.02
(mm)

SA
FNO 4.078
-0.20   0.20
(mm)

AS
ω 41.50
-0.20   0.20
(mm)

DT
ω 41.50
-10.00   10.00
(%)

CC
ω 41.50
-0.02   0.02
(mm)

SA
FNO 4.078
-0.20   0.20
(mm)

AS
ω 16.86
-0.20   0.20
(mm)

DT
ω 16.86
-10.00   10.00
(%)

CC
ω 16.86
-0.02   0.02
(mm)

SA
FNO 4.081
-0.20   0.20
(mm)

AS
ω 6.07
-0.20   0.20
(mm)

DT
ω 6.07
-10.00   10.00
(%)

CC
ω 6.07
-0.02   0.02
(mm)

SA
FNO 4.074
-0.20  0.20
(mm)

AS
ω 41.50
-0.20  0.20
(mm)

DT
ω 41.50
-10.00  10.00
(%)

CC
ω 41.50
-0.02  0.02
(mm)

SA
FNO 4.077
-0.20  0.20
(mm)

AS
ω 16.88
-0.20  0.20
(mm)

DT
ω 16.88
-10.00  10.00
(%)

CC
ω 16.88
-0.02  0.02
(mm)

SA
FNO 4.083
-0.20  0.20
(mm)

AS
ω 6.07
-0.20  0.20
(mm)

DT
ω 6.07
-10.00  10.00
(%)

CC
ω 6.07
-0.02  0.02
(mm)

SA
FNO 4.083
-0.20  0.20
(mm)

AS
ω 41.49
-0.20  0.20
(mm)

DT
ω 41.49
-10.00  10.00
(%)

CC
ω 41.49
-0.02  0.02
(mm)

SA
FNO 4.075
-0.20  0.20
(mm)

AS
ω 16.90
-0.20  0.20
(mm)

DT
ω 16.90
-10.00  10.00
(%)

CC
ω 16.90
-0.02  0.02
(mm)

SA
FNO 4.079
-0.20  0.20
(mm)

AS
ω 6.08
-0.20  0.20
(mm)

DT
ω 6.08
-10.00  10.00
(%)

CC
ω 6.08
-0.02  0.02
(mm)

SA
FNO 4.078

AS
ω 41.50

DT
ω 41.50

CC
ω 41.50

SA
FNO 4.076

AS
ω 16.84

DT
ω 16.84

CC
ω 16.84

SA
FNO 4.069

AS
ω 6.05

DT
ω 6.05

CC
ω 6.05

SA
FNO 4.061

-0.20  0.20
(mm)

AS
ω 41.77

-0.20  0.20
(mm)

DT
ω 41.77

-10.00  10.00
(%)

CC
ω 41.77

-0.02  0.02
(mm)

SA
FNO 4.026

-0.20  0.20
(mm)

AS
ω 16.87

-0.20  0.20
(mm)

DT
ω 16.87

-10.00  10.00
(%)

CC
ω 16.87

-0.02  0.02
(mm)

SA
FNO 4.049

-0.20  0.20
(mm)

AS
ω 6.06

-0.20  0.20
(mm)

DT
ω 6.06

-10.00  10.00
(%)

CC
ω 6.06

-0.02  0.02
(mm)

SA
FNO 4.090

-0.20　　0.20
　　(mm)

AS
ω 41.81

-0.20　　0.20
　　(mm)

DT
ω 41.81

-10.00　　10.00
　　(%)

CC
ω 41.81

-0.02　　0.02
　　(mm)

SA
FNO 4.075

-0.20　　0.20
　　(mm)

AS
ω 16.91

-0.20　　0.20
　　(mm)

DT
ω 16.91

-10.00　　10.00
　　(%)

CC
ω 16.91

-0.02　　0.02
　　(mm)

SA
FNO 4.077

-0.20　　0.20
　　(mm)

AS
ω 6.06

-0.20　　0.20
　　(mm)

DT
ω 6.06

-10.00　　10.00
　　(%)

CC
ω 6.06

-0.02　　0.02
　　(mm)

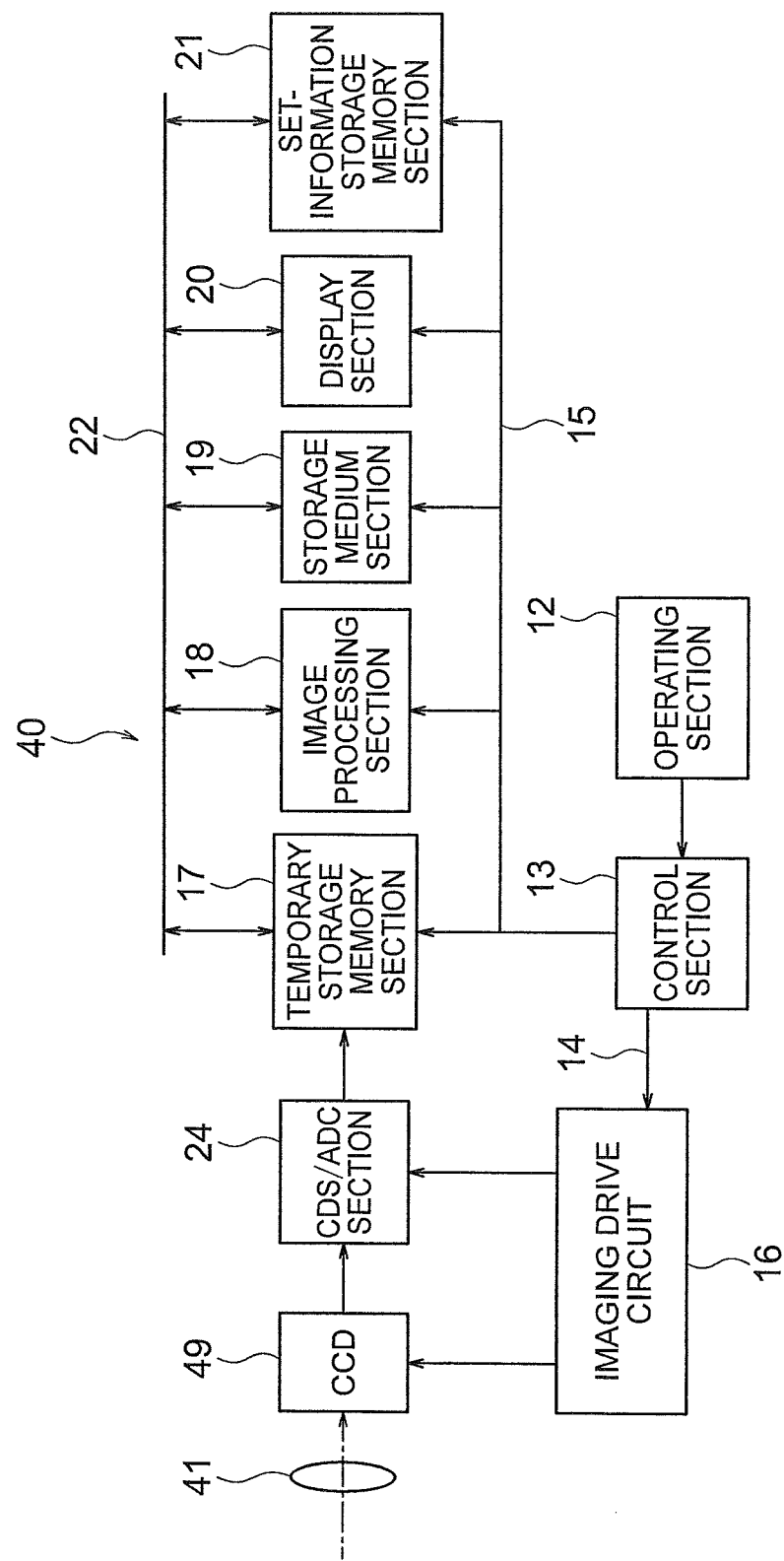

ZOOM LENS AND IMAGE PICKUP APPARATUS USING THE SAME

CROSS-REFERENCE TO RELATED APPLICATION

The present application is based upon and claims the benefit of priority from the prior Japanese Patent Application Nos. 2015-216717 filed on Nov. 4, 2015, 2015-216718 filed on Nov. 4, 2015 and 2015-216720 filed on Nov. 4, 2015; the entire contents of which are incorporated herein by reference.

BACKGROUND OF THE INVENTION

Field of the Invention

The present invention relates to a zoom lens and an image pickup apparatus using the same.

Description of the Related Art

In cameras including electronic image pickup element, such as digital cameras, reduction in size, weight, and costs have been advancing. For further reduction in size, weight, and costs, size reduction of bodies and size reduction of optical systems are additionally required.

Moreover, for example, there are two photographic needs for optical systems. The first photographic need is a need of taking a photo of a large building or a need of taking a ceremonial photo against a vast background. The second photographic need is a need of taking photos ranging from a wide view to a close up with a single photographic lens.

In order to satisfy the first photographic need, it is necessary to increase the angle of view of the optical system. In order to satisfy the second photographic need, it is necessary to increase the zoom ratio of the optical system. As the optical systems that satisfy the two photographic needs include, for example, a zoom lens having a half angle of view of 40 degrees or more and a zoom ratio of six times or more is available. The zoom lens having such specifications is usable in various photography scenes and therefore can be said to be an easy-to-use zoom lens.

In Japanese Patent Application Laid-open Nos. 2003-255228, 2009-282398, and H8-190051, zoom lenses including five lens units are disclosed. These zoom lenses include, in order from an object side, a first lens unit having a positive refractive power, a second lens unit having a negative refractive power, a third lens unit having a positive refractive power, a fourth lens unit having a negative refractive power, and a fifth lens unit having a positive refractive power.

SUMMARY OF THE INVENTION

A zoom lens of the present invention comprises:
in order from an object side,
a first lens unit having a positive focal length;
a second lens unit having a negative focal length;
a third lens unit having a positive focal length;
a fourth lens unit having a negative focal length; and
a fifth lens unit having a positive focal length,
wherein
at a time of zooming from a wide angle end to a telephoto end, air spaces between lens units change, and
following Conditional Expressions (1) and (2) are satisfied:

$$0.3 \leq D34W/D45W \leq 1 \quad (1), \text{ and}$$

$$0.2 \leq (D34W/D45W)/(D34T/D45T) \leq 0.6 \quad (2),$$

where, $D34W$ is an air space on an optical axis between the third lens unit and the fourth lens unit at the wide angle end;
$D45W$ is an air space on the optical axis between the fourth lens unit and the fifth lens unit at the wide angle end;
$D34T$ is an air space on the optical axis between the third lens unit and the fourth lens unit at the telephoto end; and
$D45T$ is an air space on the optical axis between the fourth lens unit and the fifth lens unit at the telephoto end.

Another zoom lens of the present invention comprises:
in order from an object side,
a first lens unit having a positive focal length;
a second lens unit having a negative focal length;
a third lens unit having a positive focal length;
a fourth lens unit having a negative focal length; and
a fifth lens unit having a positive focal length, wherein
at a time of zooming from a wide angle end to a telephoto end, air spaces between lens units change, and
the third lens unit includes a first positive lens component, a second positive lens component, a first negative lens component, and a third positive lens component, in order from the object side.

Another zoom lens of the present invention comprises:
in order from an object side,
a first lens unit having a positive focal length;
a second lens unit having a negative focal length;
a third lens unit having a positive focal length;
a fourth lens unit having a negative focal length; and
a fifth lens unit having a positive focal length, wherein
at a time of zooming from a wide angle end to a telephoto end, air spaces between lens units change,
the third lens unit includes a positive lens component, a positive lens component, a negative lens component, and a positive lens component, in order from the object side,
the negative lens component in the third lens unit is a cemented lens component including a negative lens element and a positive lens element in order from the object side,
the cemented lens component is a meniscus-shaped lens having a convex surface directed toward the object side,
a lens unit positioned closest to an image includes an arrangement in which a negative lens element and a positive lens element are disposed in order from the object side, and
a lens unit disposed second from the image side with an airspace interposed includes an arrangement in which a negative lens element and a positive lens element are disposed in order.

An image pickup apparatus of the present invention comprises:
the aforementioned zoom lens; and
an image pickup element which converts an image formed by the zoom lens to an electrical signal.

BRIEF DESCRIPTION OF THE DRAWINGS

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams of the zoom lens according to Example 1 at the time of focusing on an infinite object;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams of the zoom lens according to Example 3 at the time of focusing on an infinite object;

FIG. 46 is a structural block diagram showing an internal circuit of main components of the image pickup apparatus.

DETAILED DESCRIPTION OF THE PREFERRED EMBODIMENTS

Figure 1A:
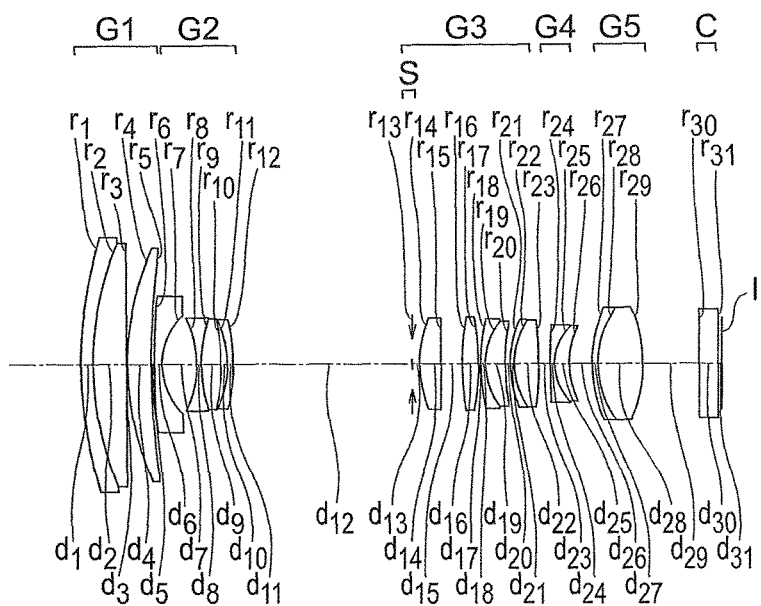
FIG. 1A, FIG. 1B, and FIG. 1C are lens cross-sectional views of a zoom lens according to Example 1 at a time of focusing on an infinite object.
Figure 1B:
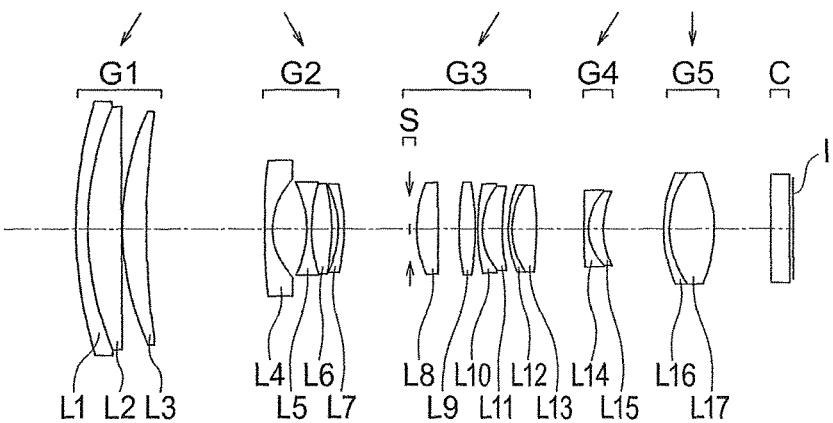
Figure 1C:
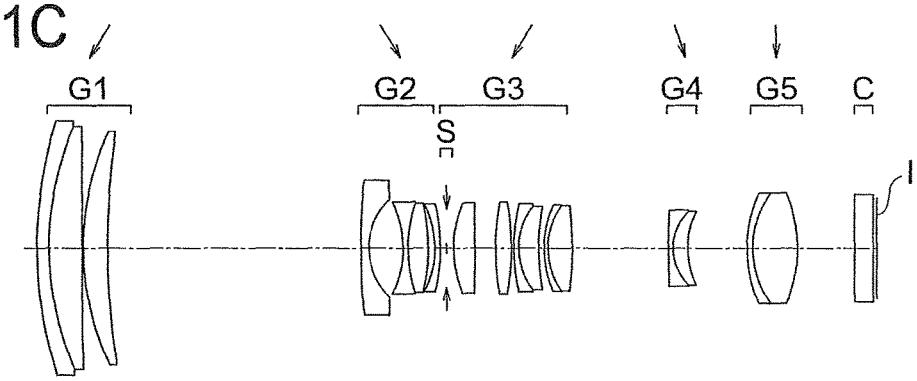
Figure 2A:
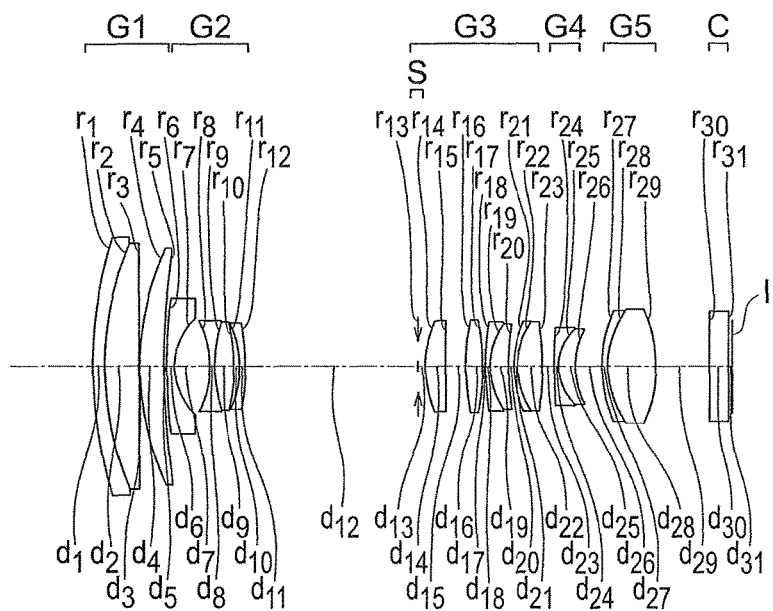
FIG. 2A, FIG. 2B, and FIG. 2C are lens cross-sectional views of a zoom lens according to Example 2 at the time of focusing on an infinite object.
Figure 2B:
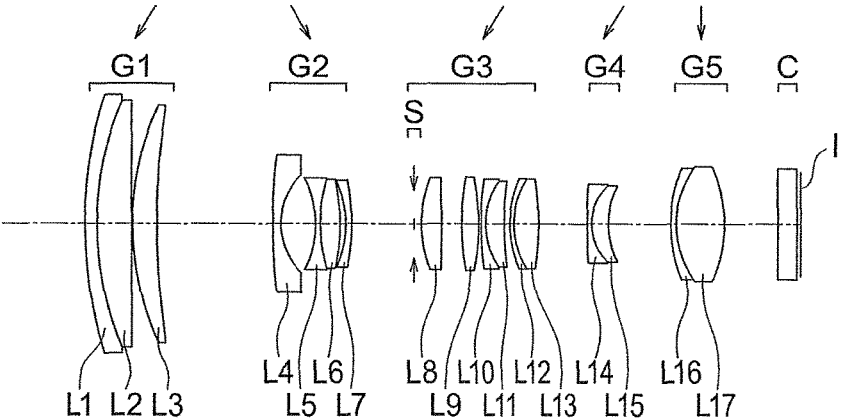
Figure 2C:
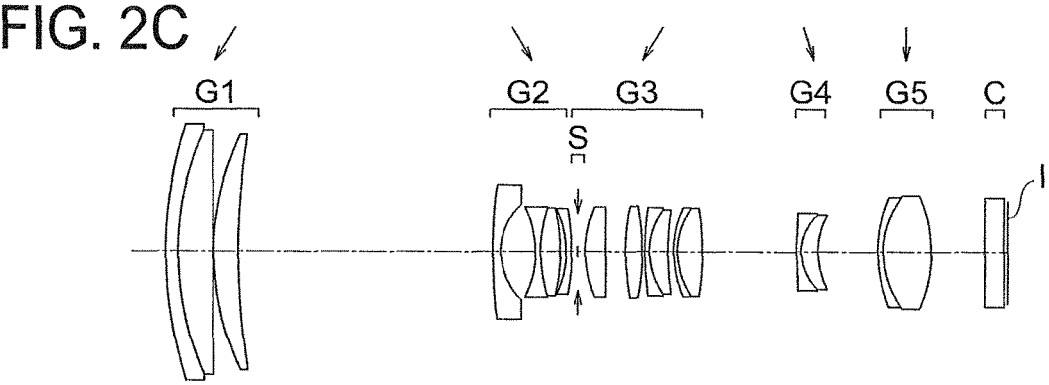
Figure 3A:
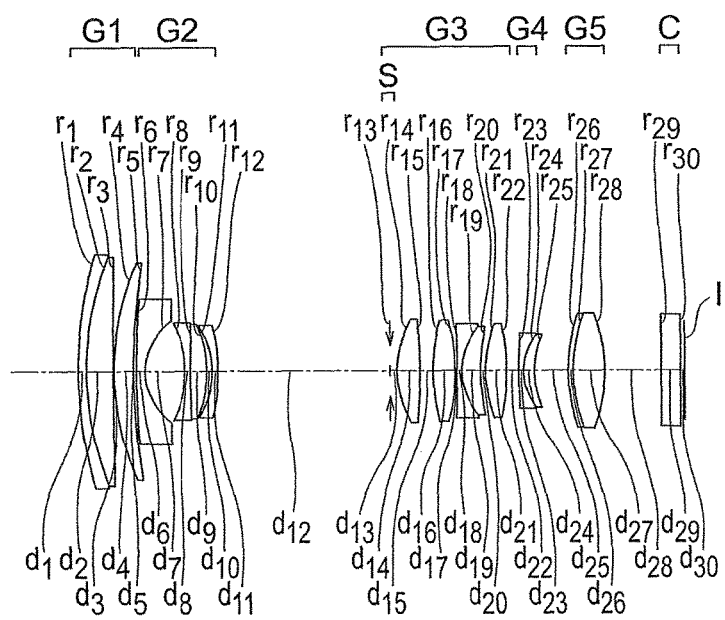
FIG. 3A, FIG. 3B, and FIG. 3C are lens cross-sectional views of a zoom lens according to Example 3 at the time of focusing on an infinite object.
Figure 3B:
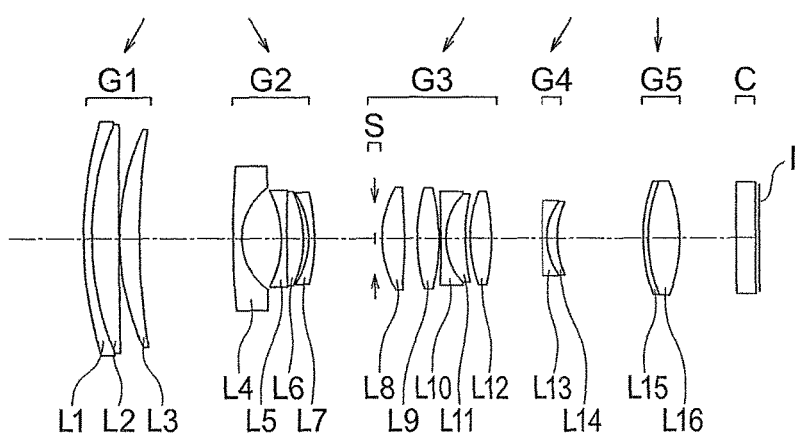
Figure 3C:
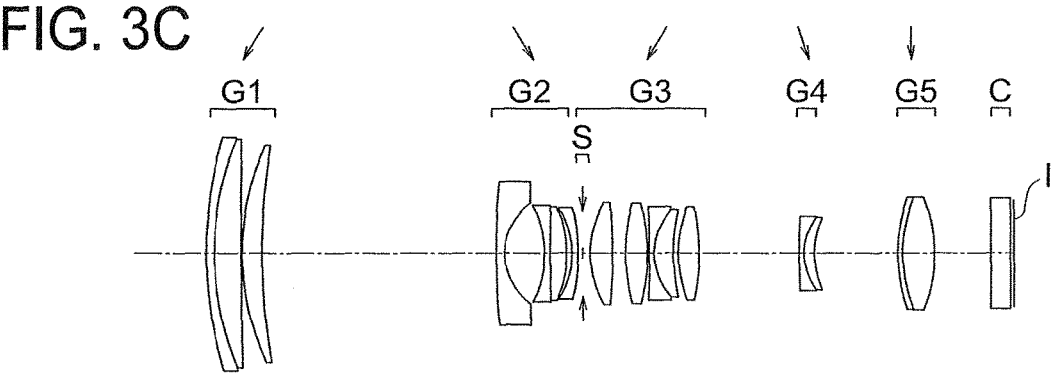
Figure 4A:
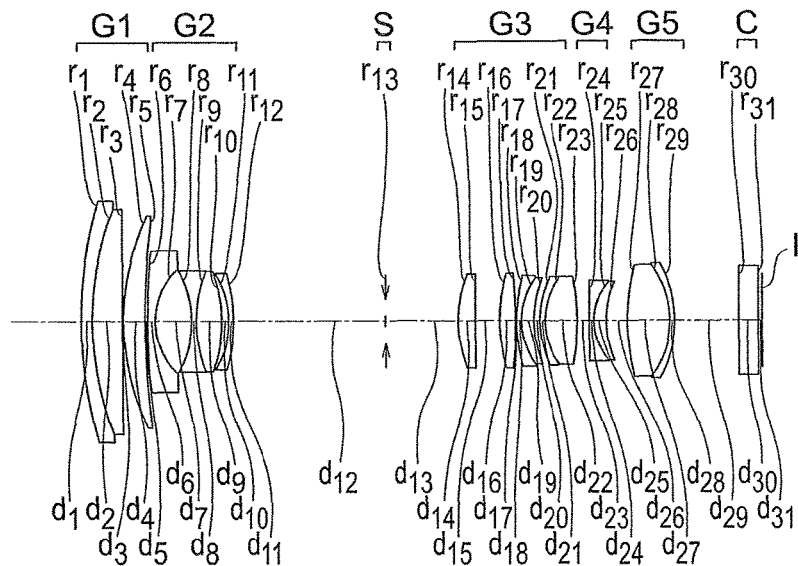
FIG. 4A, FIG. 4B, and FIG. 4C are lens cross-sectional views of a zoom lens according to Example 4 at the time of focusing on an infinite object.
Figure 4B:
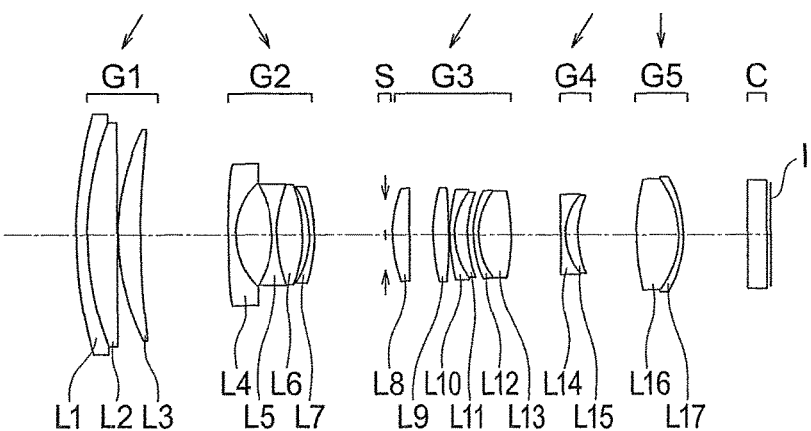
Figure 4C:
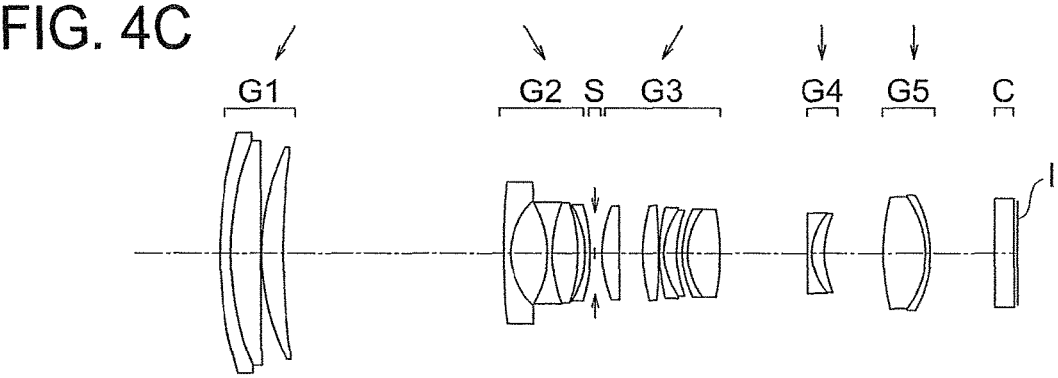
Figure 5A:
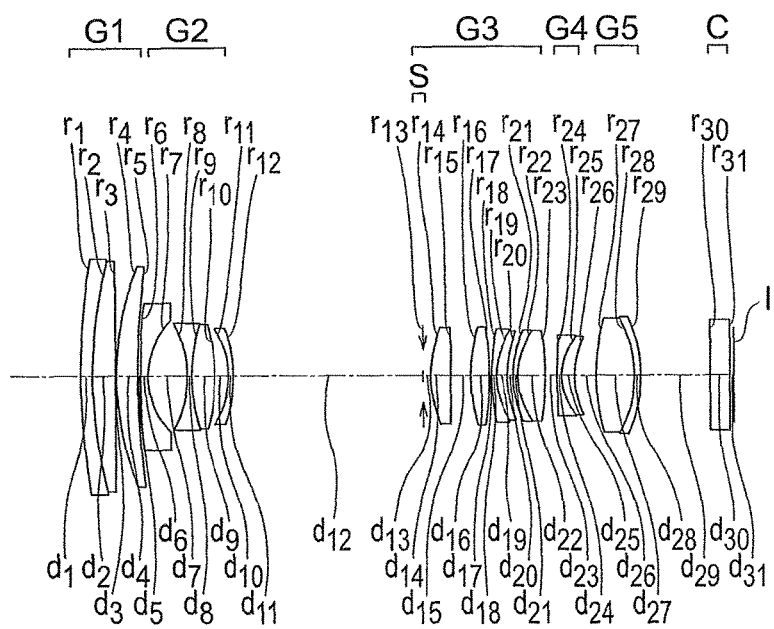
FIG. 5A, FIG. 5B, and FIG. 5C are lens cross-sectional views of a zoom lens according to Example 5 at the time of focusing on an infinite object.
Figure 5B:
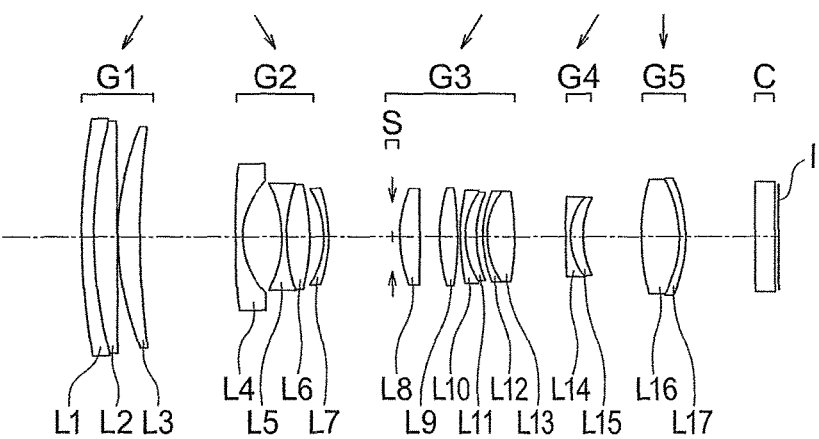
Figure 5C:
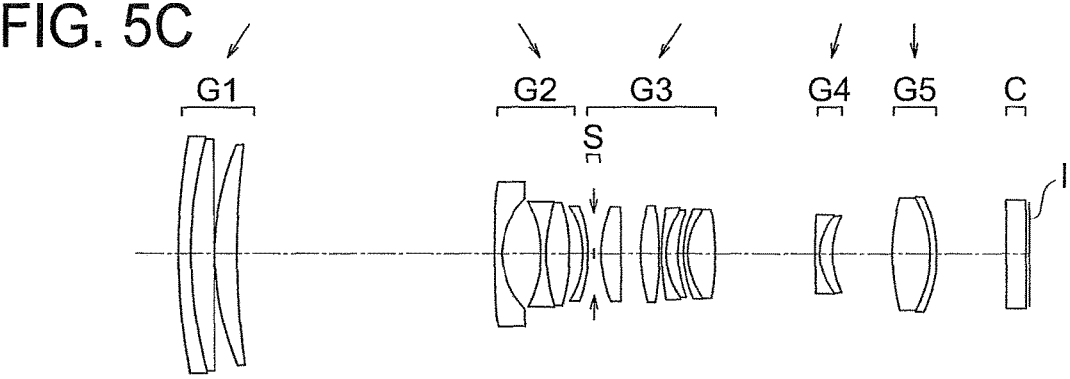
Figure 6A:
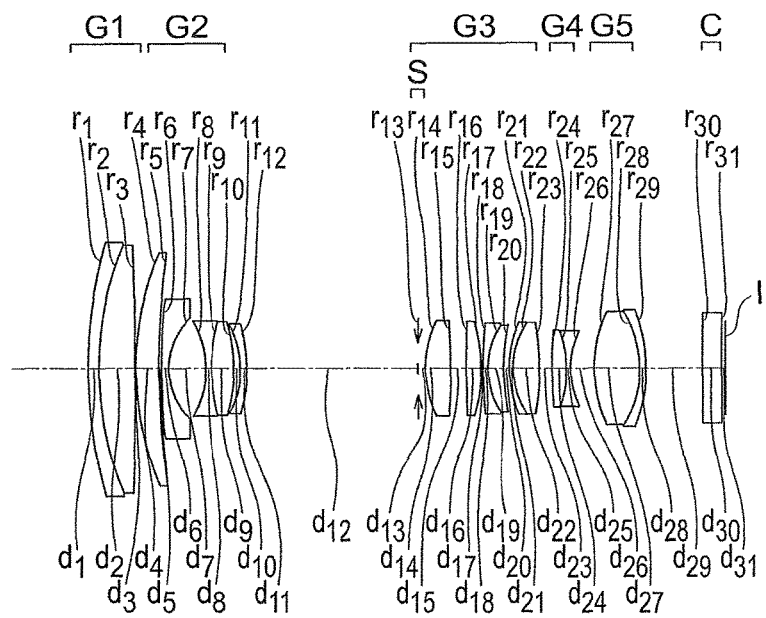
FIG. 6A, FIG. 6B, and FIG. 6C are lens cross-sectional views of a zoom lens according to Example 6 at the time of focusing on an infinite object.
Figure 6B:
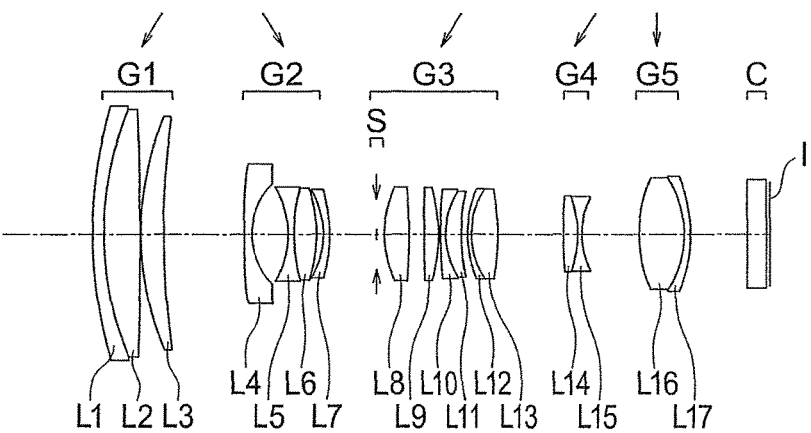
Figure 6C:
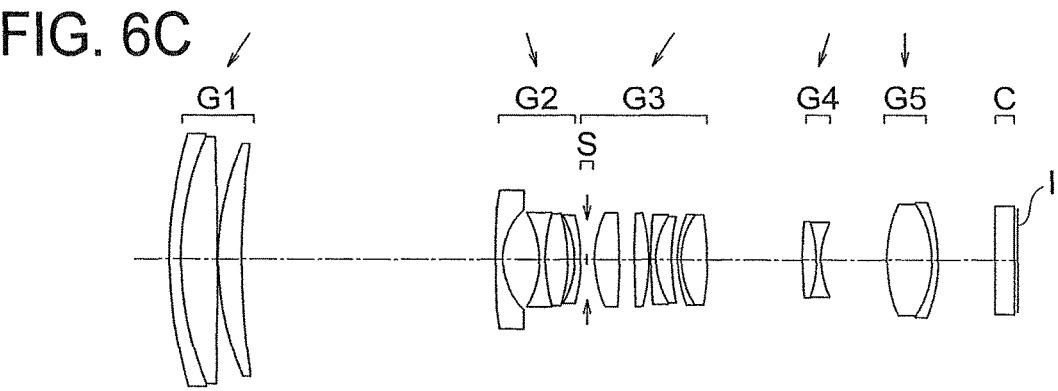
Figure 7A:
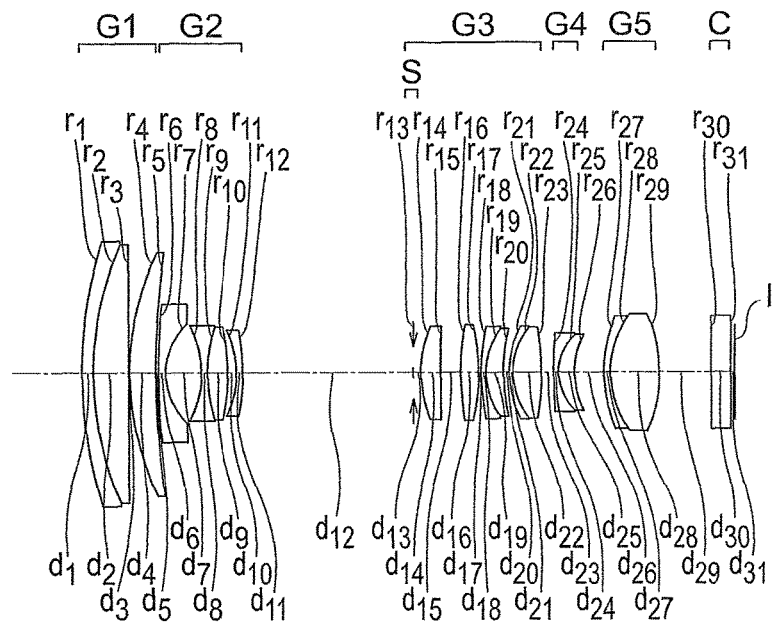
FIG. 7A, FIG. 7B, and FIG. 7C are lens cross-sectional views of a zoom lens according to Example 7 at the time of focusing on an infinite object.
Figure 7B:
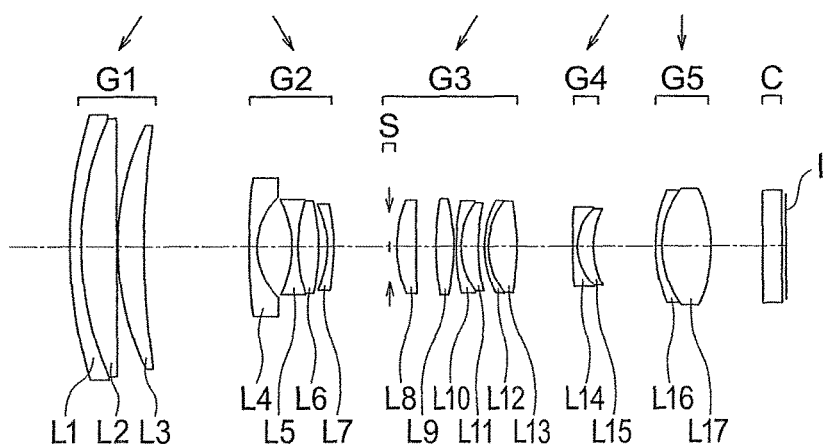
Figure 7C:
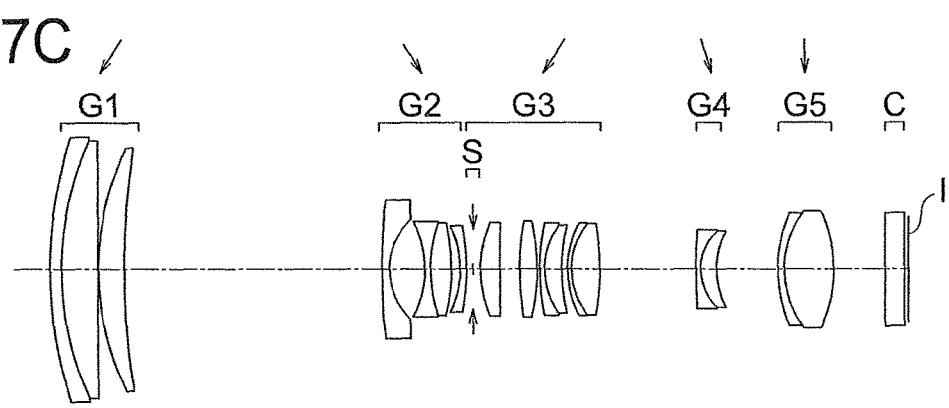
Figure 8A:
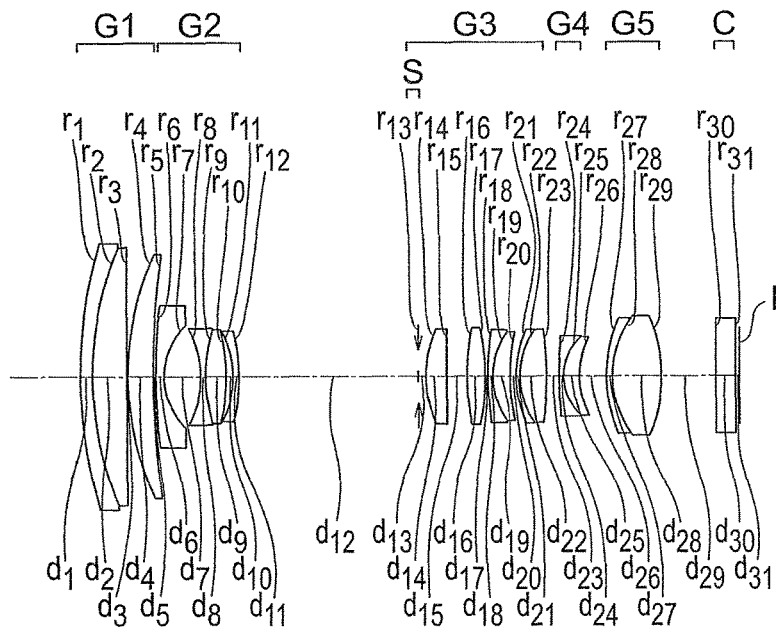
FIG. 8A, FIG. 8B, and FIG. 8C are lens cross-sectional views of a zoom lens according to Example 8 at the time of focusing on an infinite object.
Figure 8B:
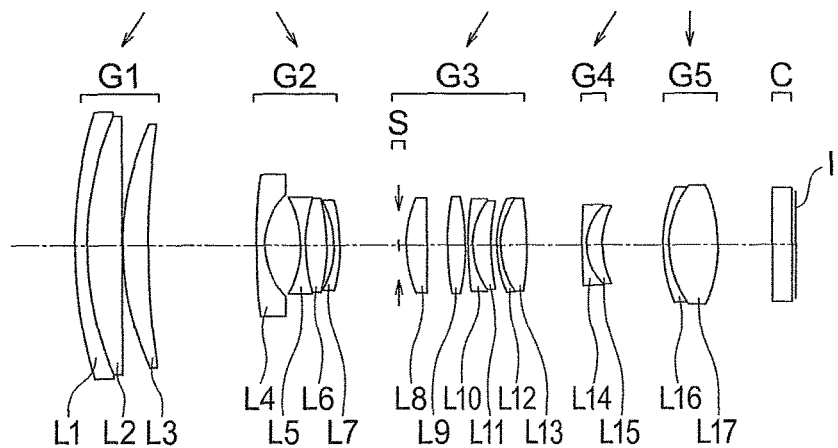
Figure 8C:
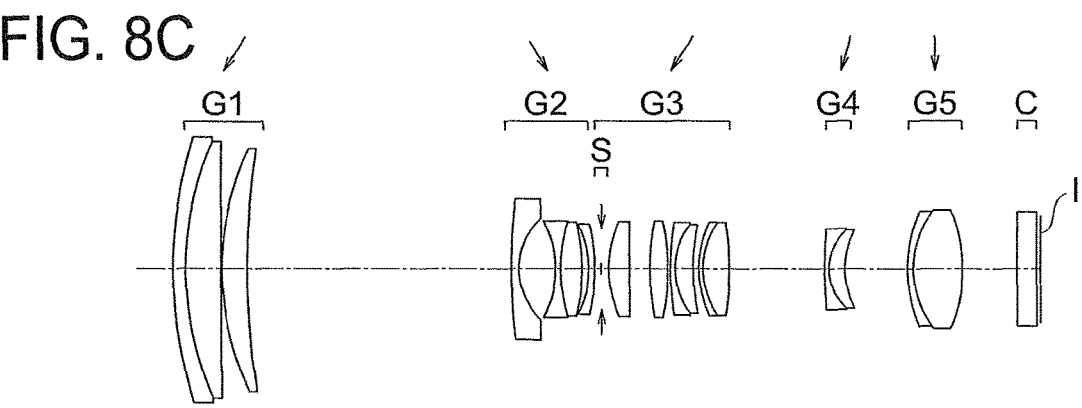
Figure 9A:
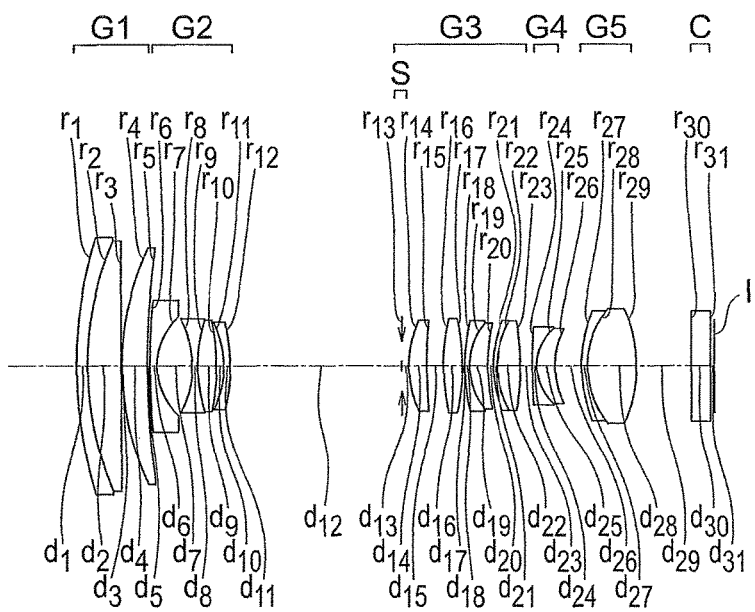
FIG. 9A, FIG. 9B, and FIG. 9C are lens cross-sectional views of a zoom lens according to Example 9 at the time of focusing on an infinite object.
Figure 9B:
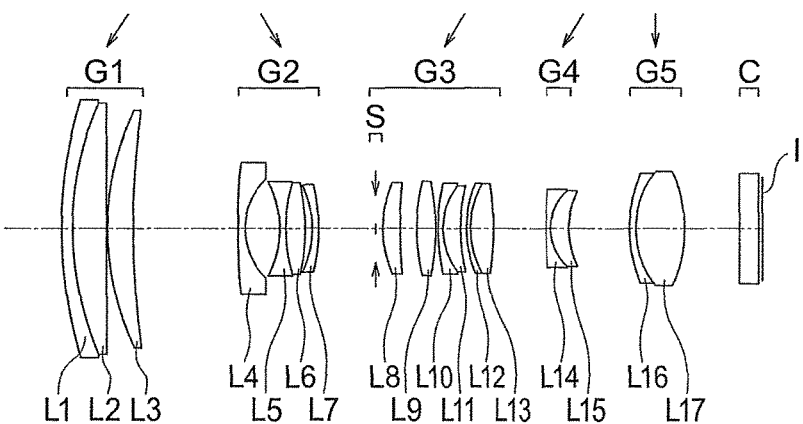
Figure 9C:
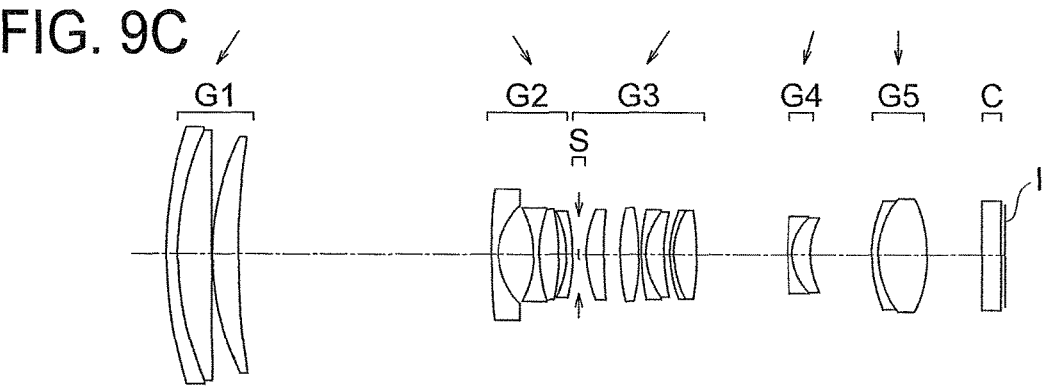
Figure 10A:
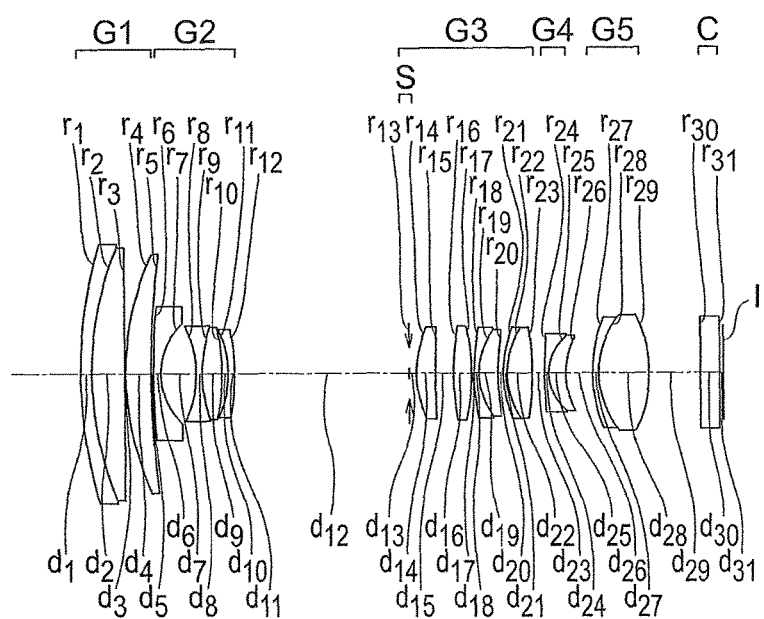
FIG. 10A, FIG. 10B, and FIG. 10O are lens cross-sectional views of a zoom lens according to Example 10 at the time of focusing on an infinite object.
Figure 10B:
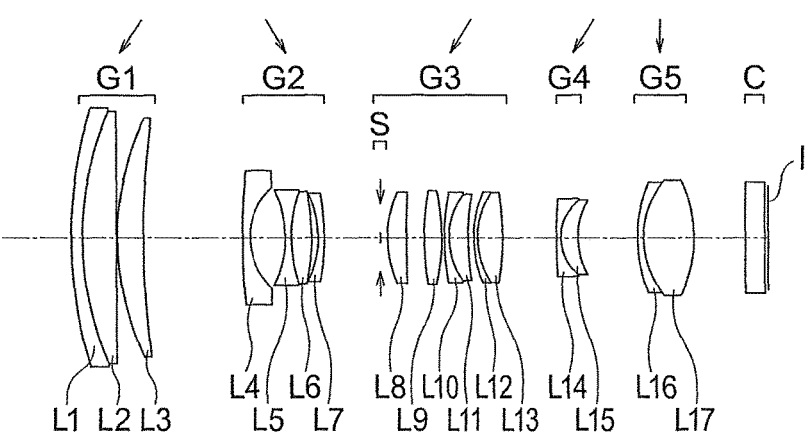
Figure 10C:
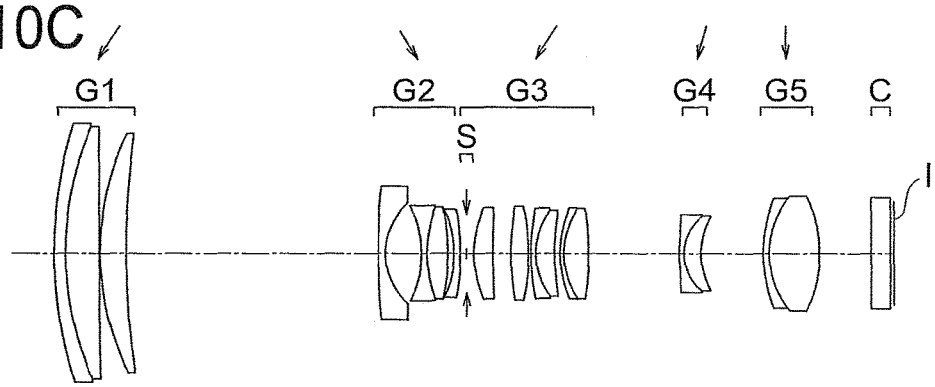
Figure 11A:
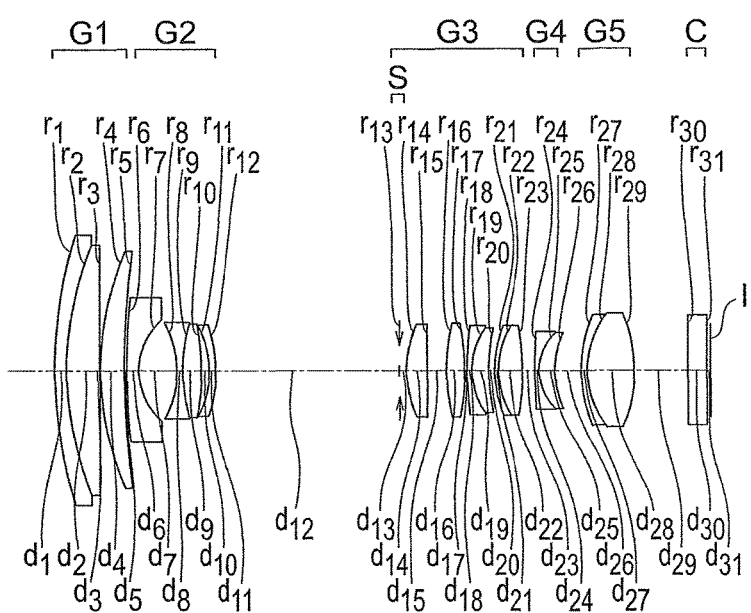
FIG. 11A, FIG. 11B, and FIG. 11C are lens cross-sectional views of a zoom lens according to Example 11 at the time of focusing on an infinite object.
Figure 11B:
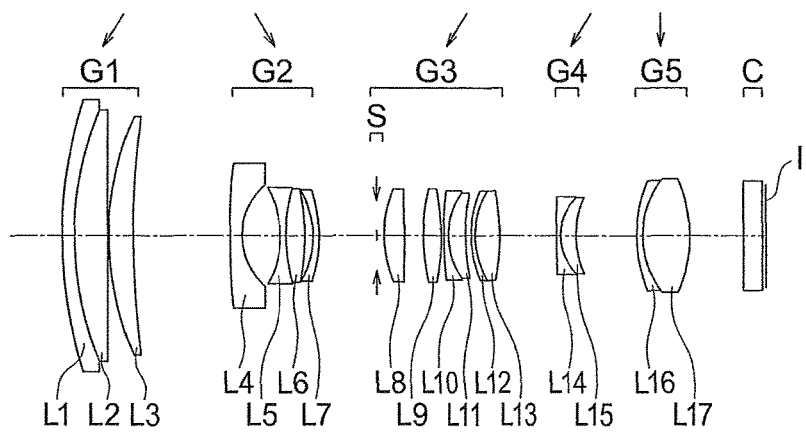
Figure 11C:
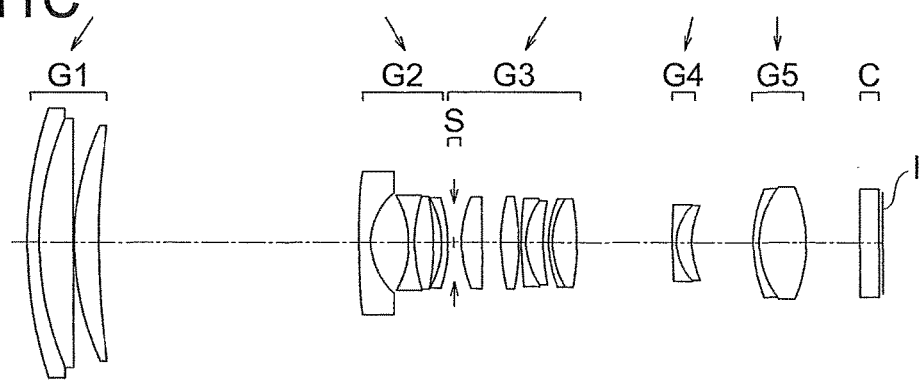
Figure 12A:
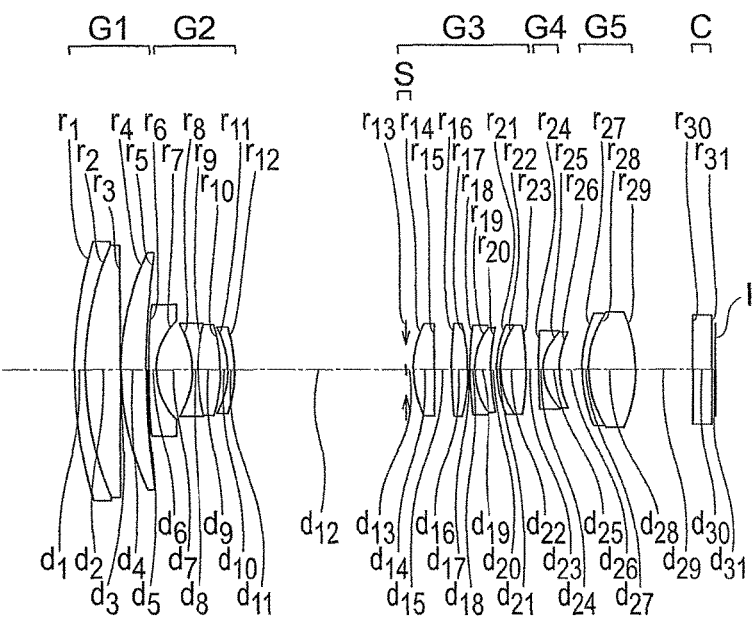
FIG. 12A, FIG. 12B, and FIG. 12C are lens cross-sectional views of a zoom lens according to Example 12 at the time of focusing on an infinite object.
Figure 12B:
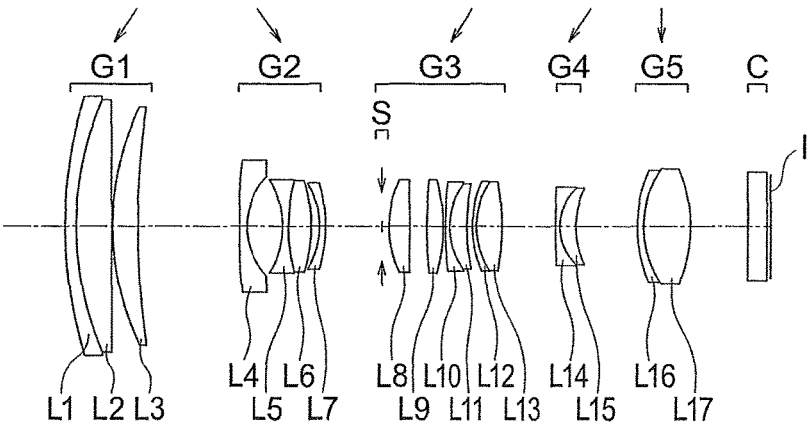
Figure 12C:
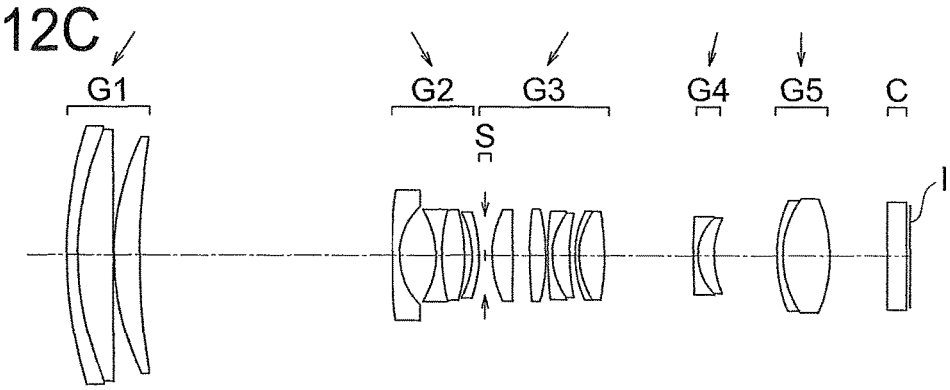
Figure 13A:
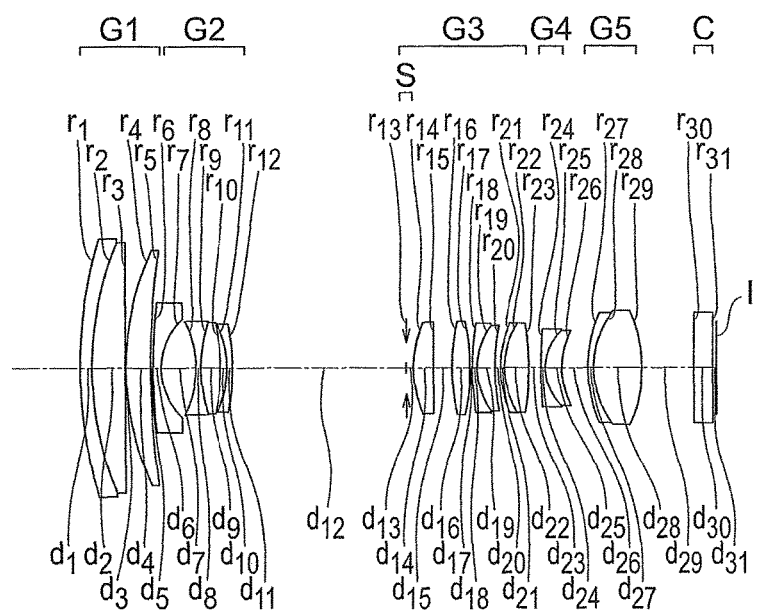
FIG. 13A, FIG. 13B, and FIG. 13C are lens cross-sectional views of a zoom lens according to Example 13 at the time of focusing on an infinite object.
Figure 13B:
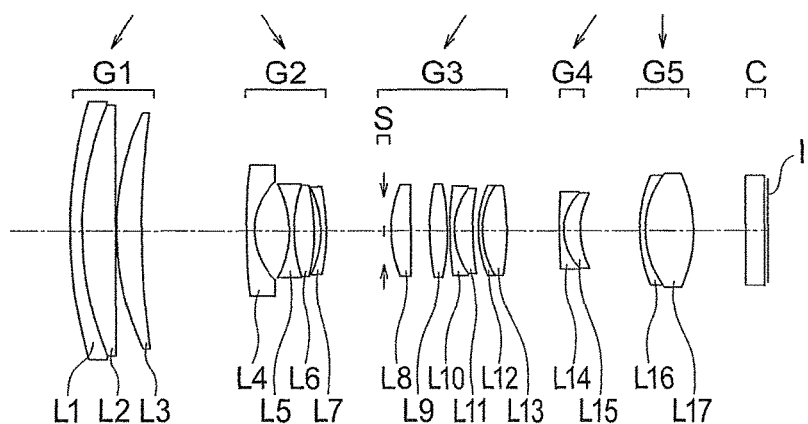
Figure 13C:
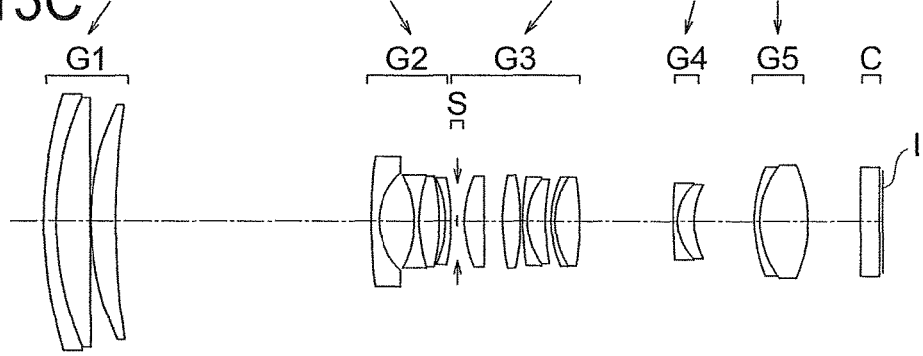
Figure 14A:
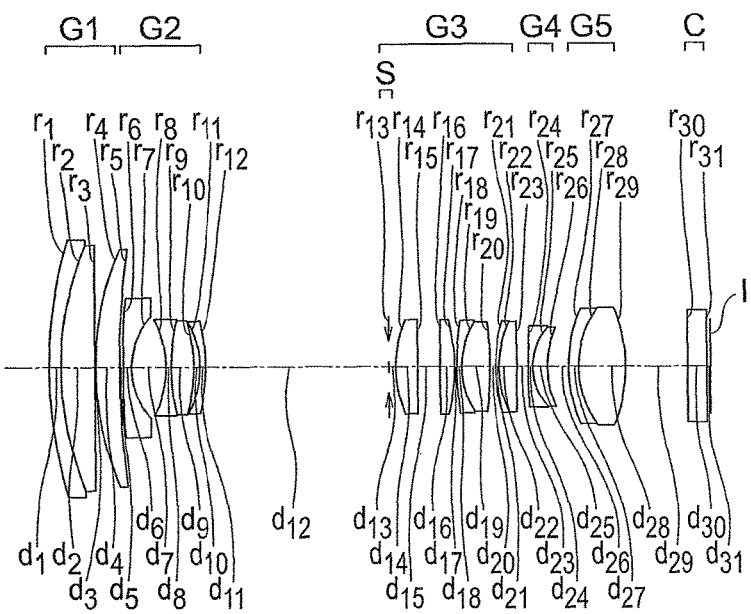
FIG. 14A, FIG. 14B, and FIG. 14C are lens cross-sectional views of a zoom lens according to Example 14 at the time of focusing on an infinite object.
Figure 14B:
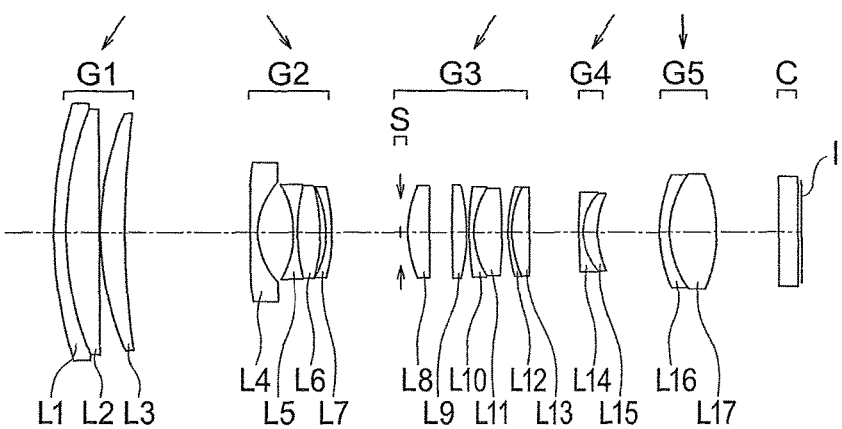
Figure 14C:
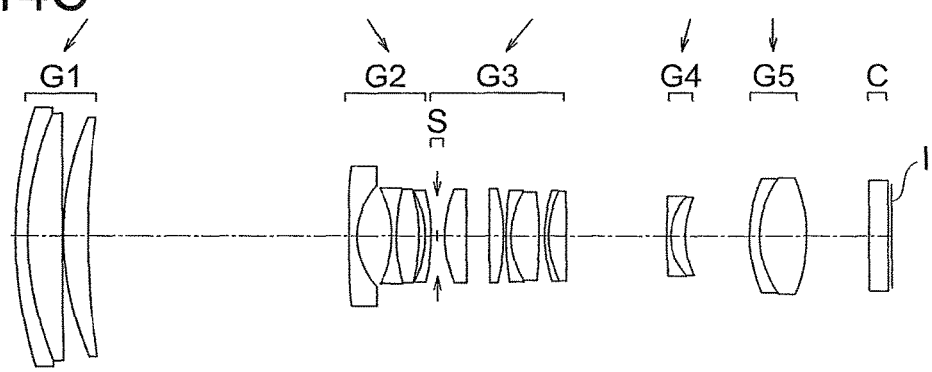
Figure 15A:
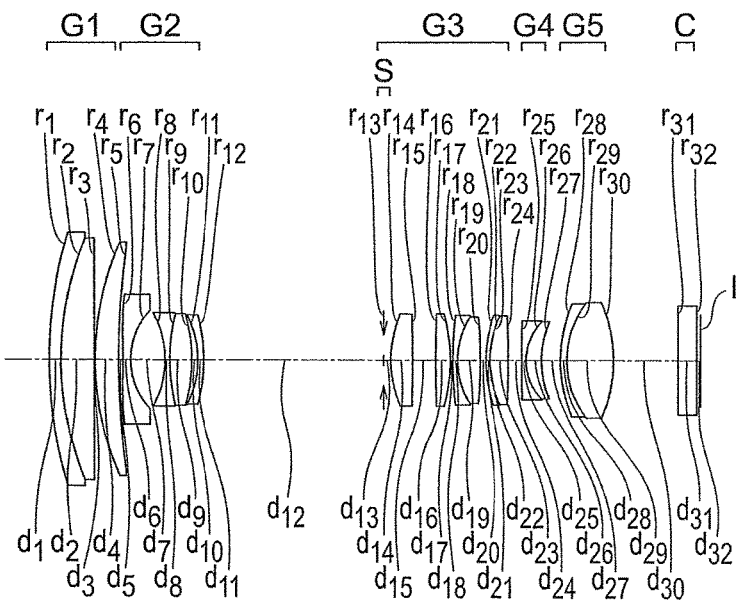
FIG. 15A, FIG. 15B, and FIG. 15C are lens cross-sectional views of a zoom lens according to Example 15 at the time of focusing on an infinite object.
Figure 15B:
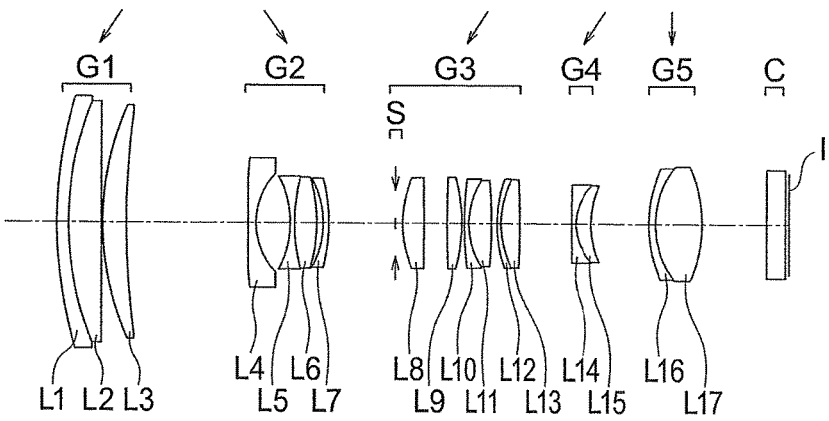
Figure 15C:
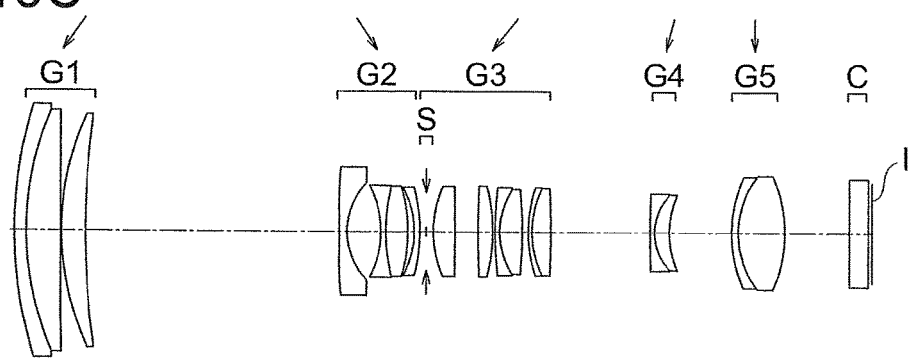
Figure 16A:
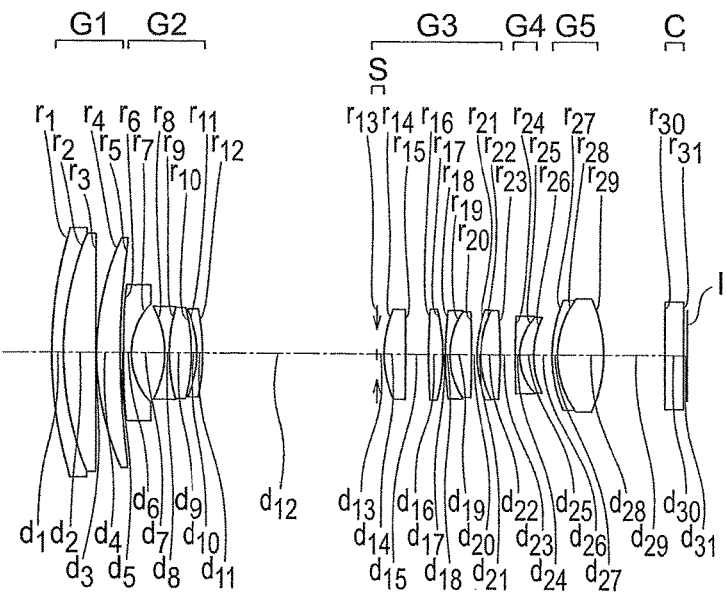
FIG. 16A, FIG. 16B, and FIG. 16C are lens cross-sectional views of a zoom lens according to Example 16 at the time of focusing on an infinite object.
Figure 16B:
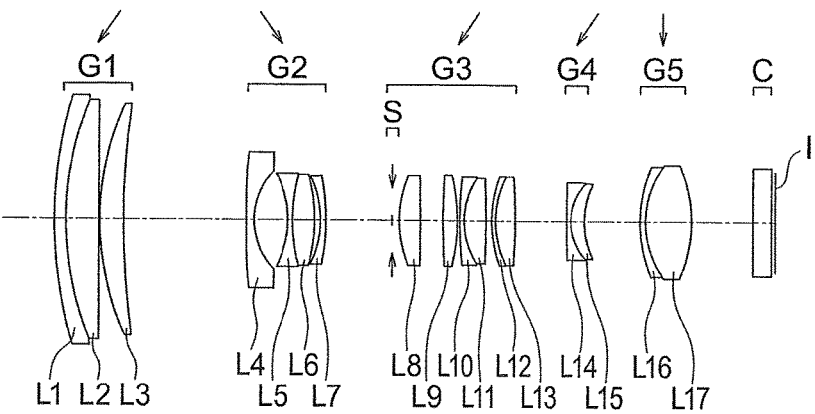
Figure 16C:
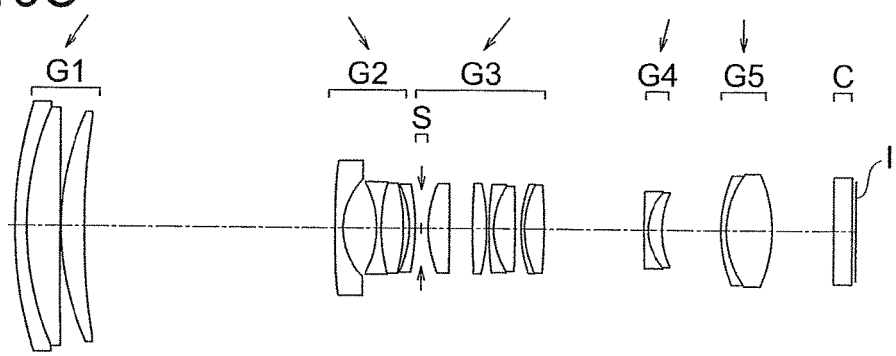
Figure 17A:
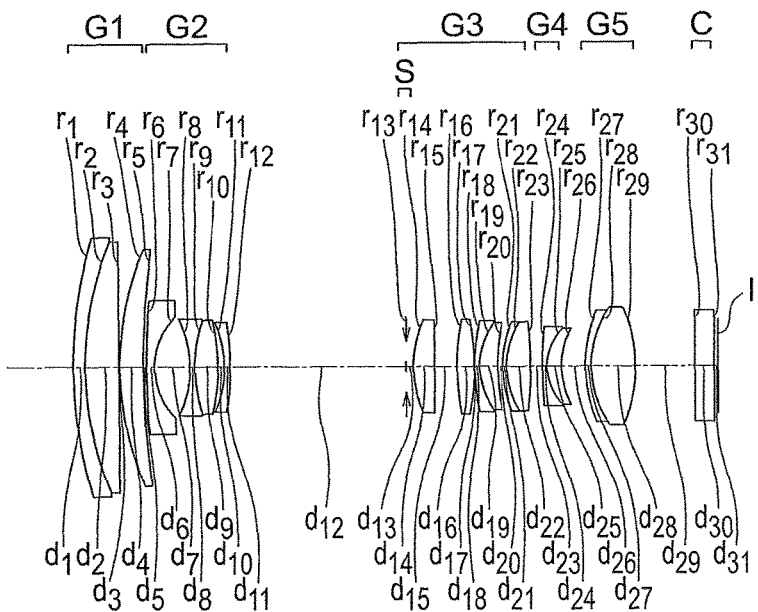
FIG. 17A, FIG. 17B, and FIG. 17C are lens cross-sectional views of a zoom lens according to Example 17 at the time of focusing on an infinite object.
Figure 17B:
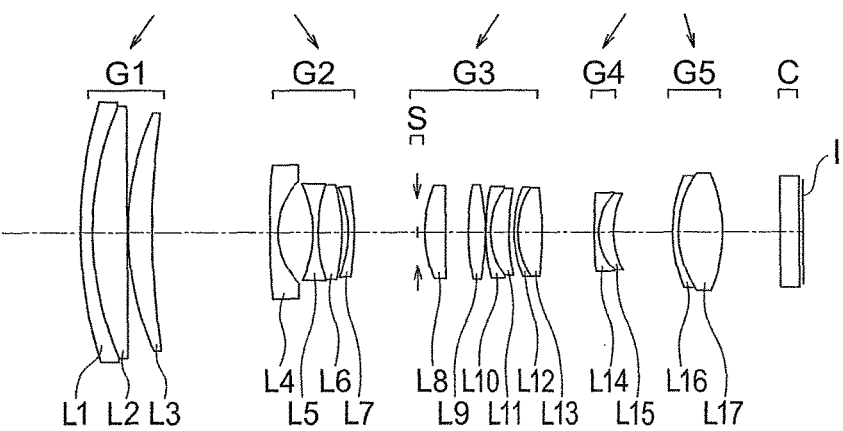
Figure 17C:
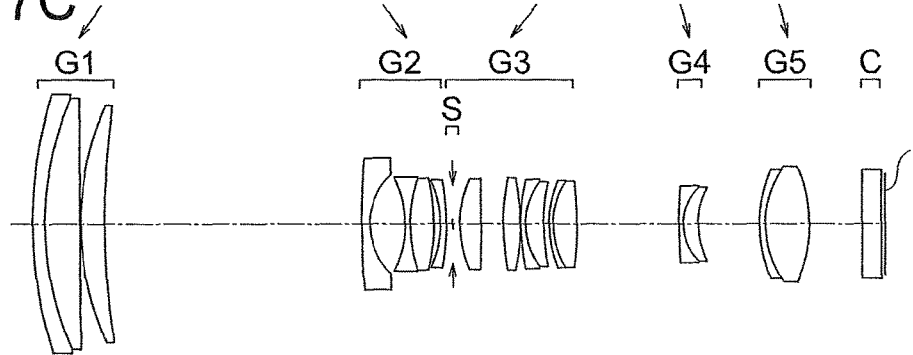
Figure 18A:
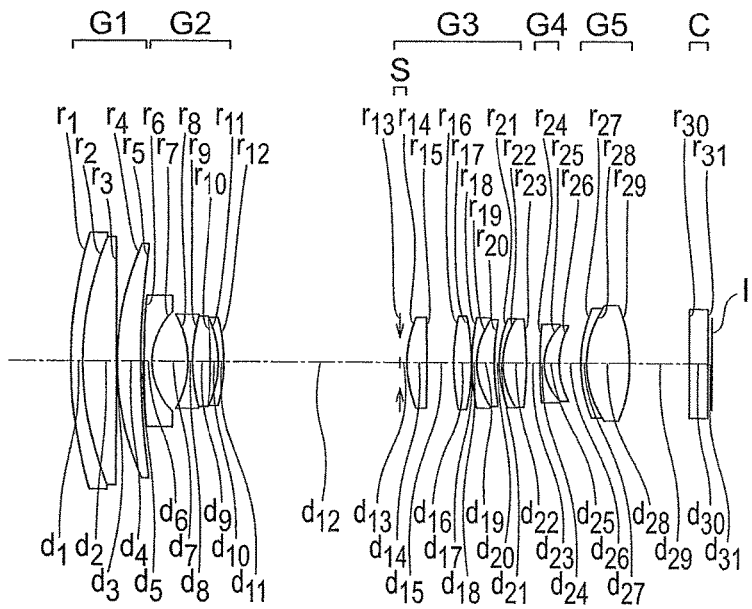
FIG. 18A, FIG. 18B, and FIG. 18C are lens cross-sectional views of a zoom lens according to Example 18 at the time of focusing on an infinite object.
Figure 18B:
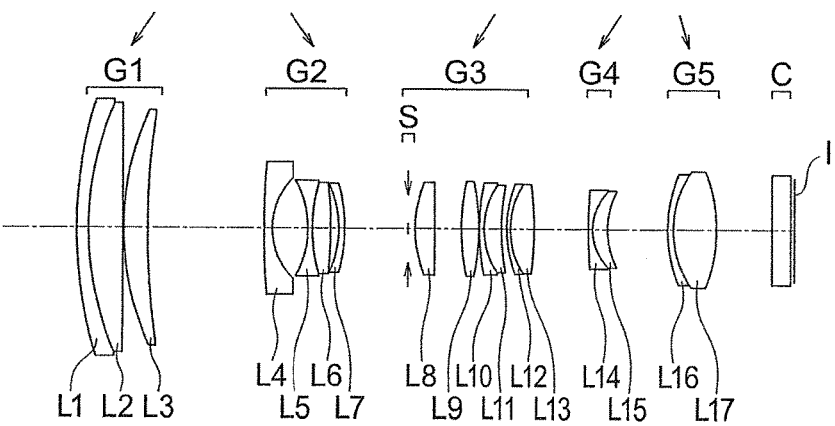
Figure 18C:
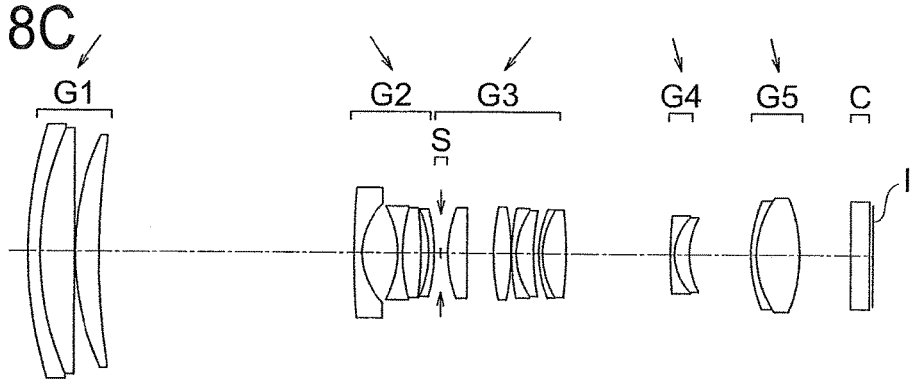
Figure 19A:
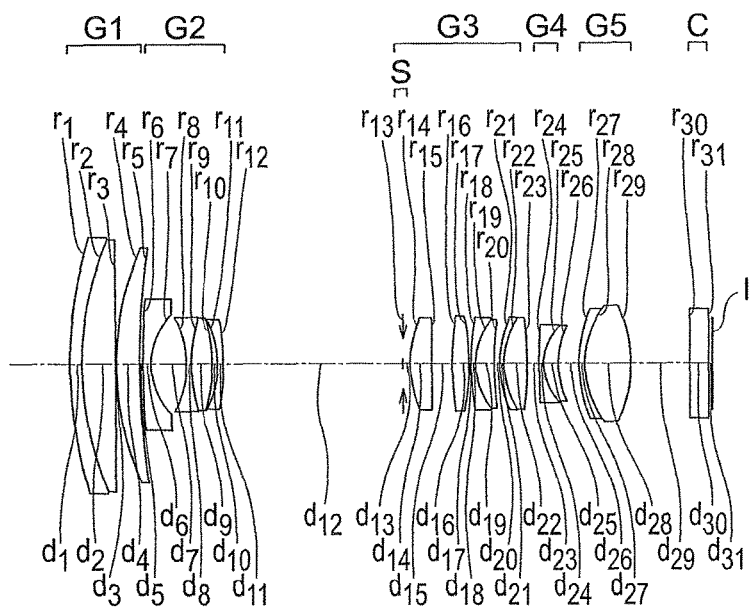
FIG. 19A, FIG. 19B, and FIG. 19C are lens cross-sectional views of a zoom lens according to Example 19 at the time of focusing on an infinite object.
Figure 19B:
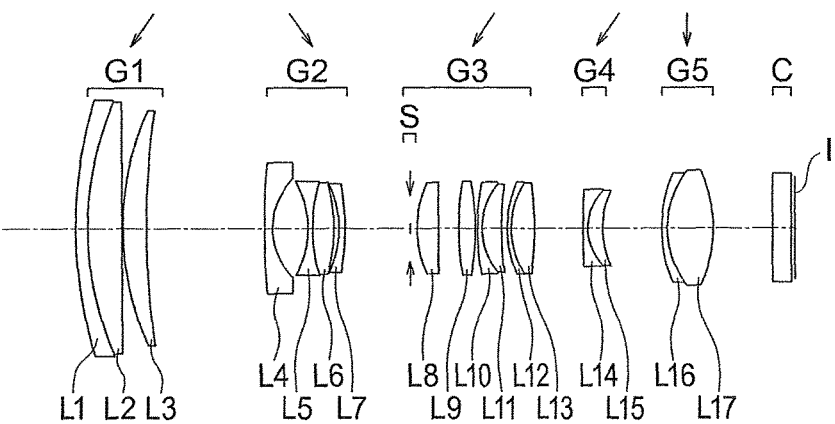
Figure 19C:
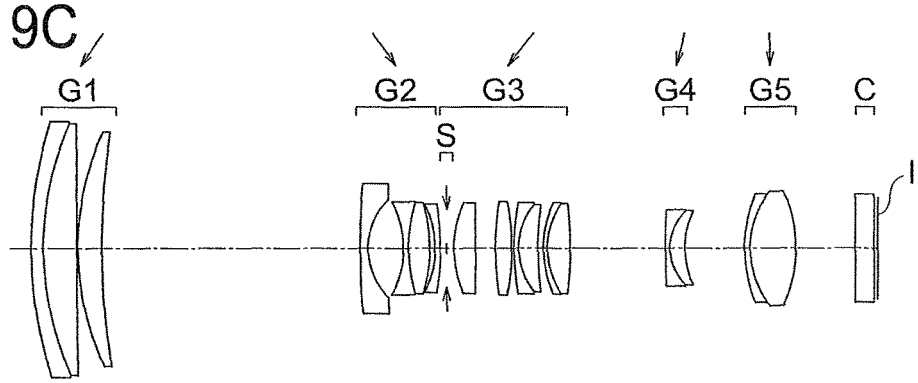
Figure 20A:
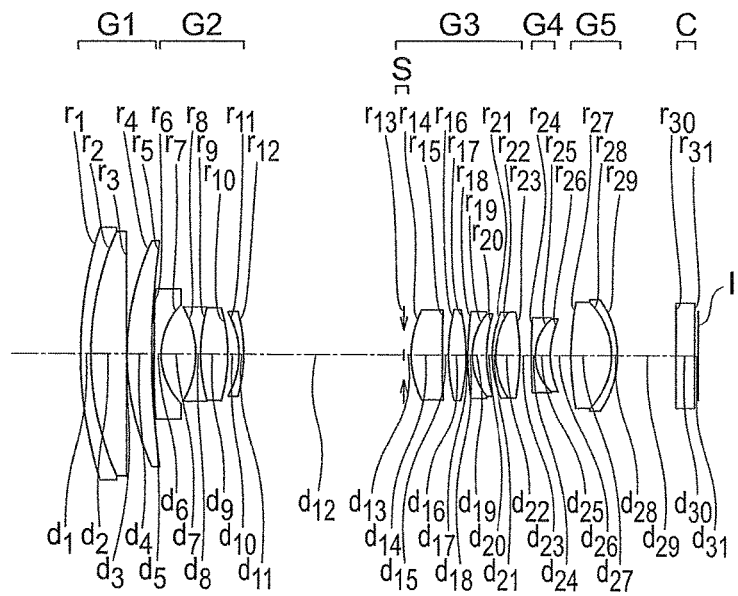
FIG. 20A, FIG. 20B, and FIG. 20C are lens cross-sectional views of a zoom lens according to Example 20 at the time of focusing on an infinite object.
Figure 20B:
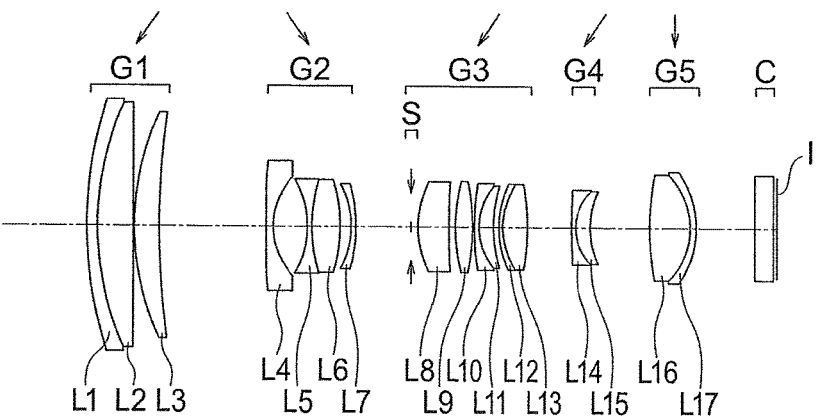
Figure 20C:
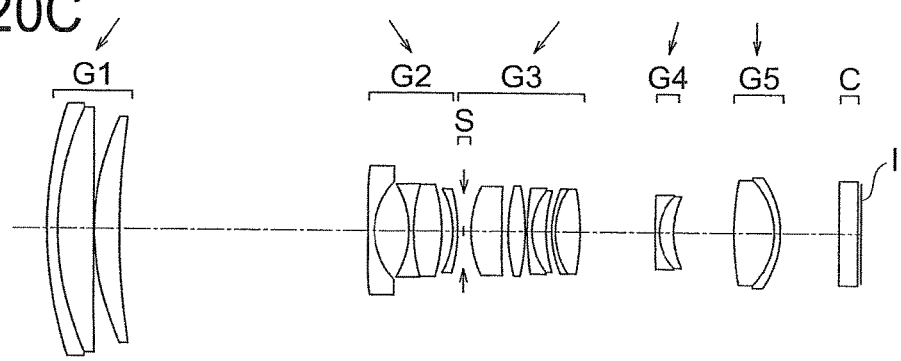
Figure 21A:
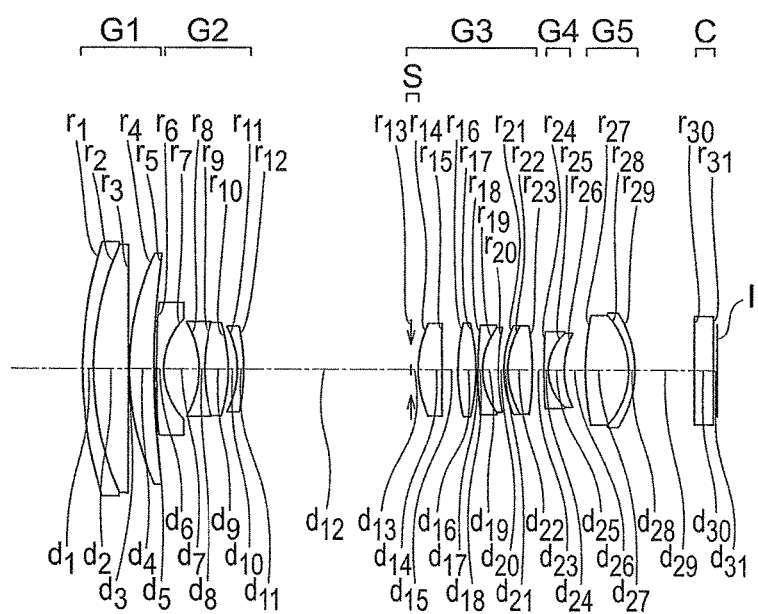
FIG. 21A, FIG. 21B, and FIG. 21C are lens cross-sectional views of a zoom lens according to Example 21 at the time of focusing on an infinite object.
Figure 21B:
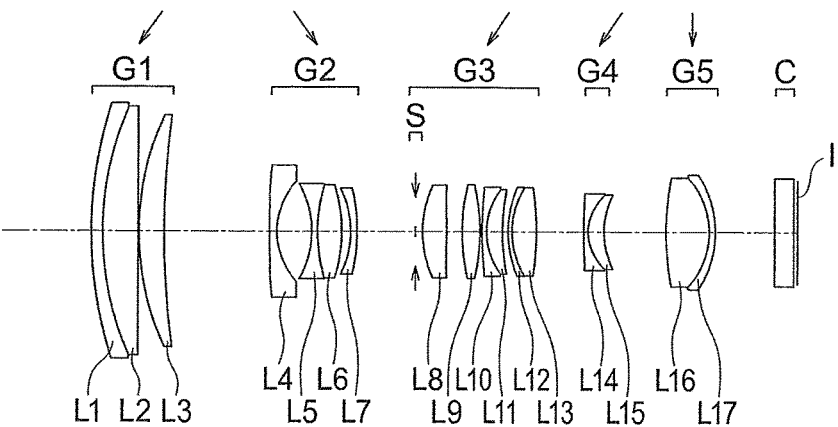
Figure 21C:
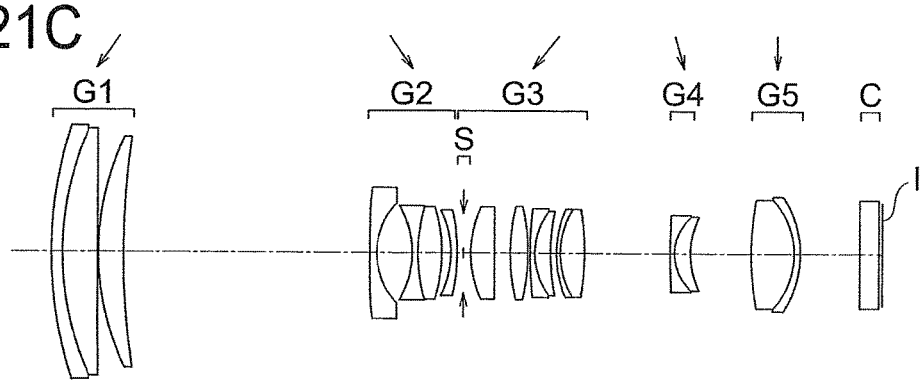
Figure 23A:
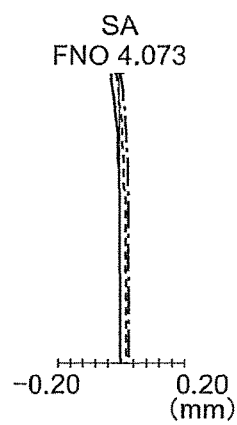
FIG. 23A, FIG. 23B, FIG. 23C, FIG. 23D, FIG. 23E, FIG. 23F, FIG. 23G, FIG. 23H, FIG. 23I, FIG. 23J, FIG. 23K, and FIG. 23L are aberration diagrams of the zoom lens according to Example 2 at the time of focusing on an infinite object.
Figure 23B:
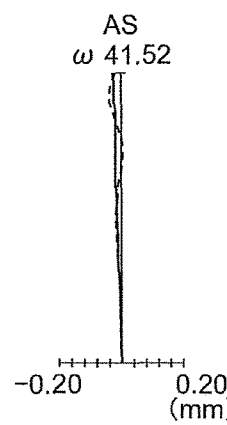
Figure 23C:
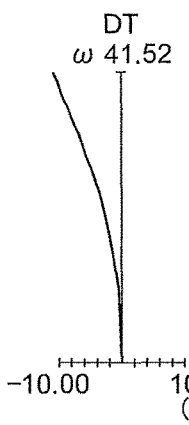
Figure 23D:
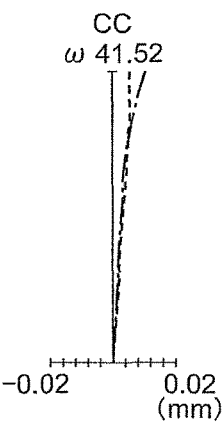
Figure 23E:
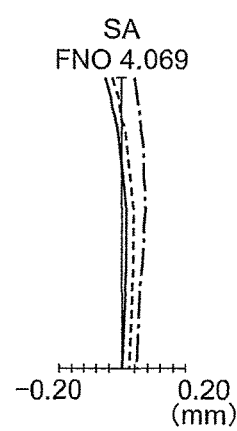
Figure 23F:
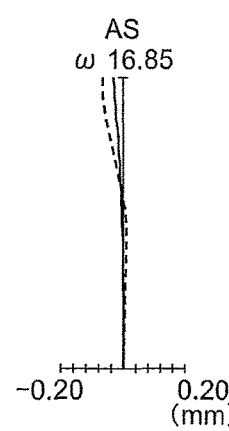
Figure 23G:
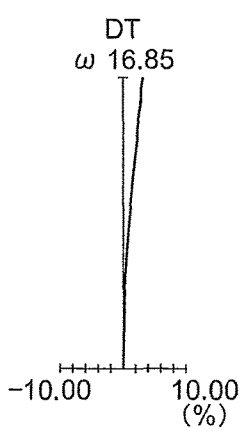
Figure 23H:
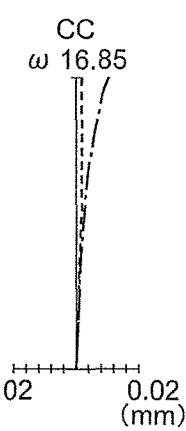
Figure 23I:
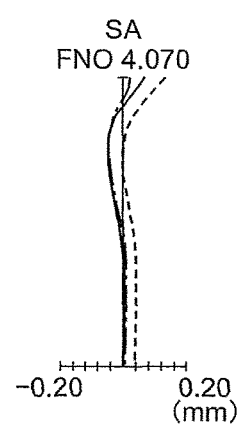
Figure 23J:
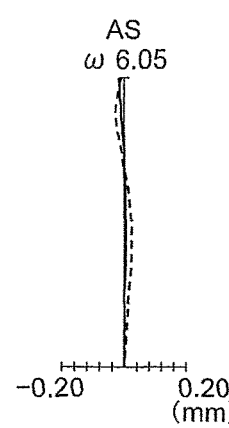
Figure 23K:
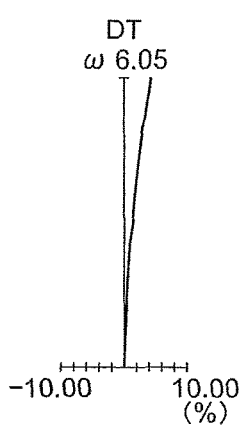
Figure 23L:
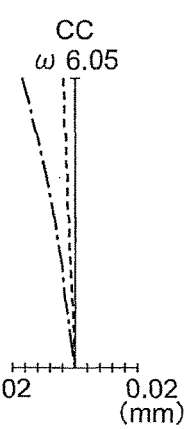
Figure 25A:
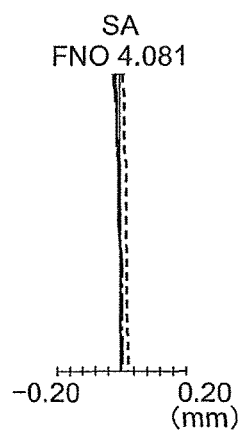
FIG. 25A, FIG. 25B, FIG. 25C, FIG. 25D, FIG. 25E, FIG. 25F, FIG. 25G, FIG. 25H, FIG. 25I, FIG. 25J, FIG. 25K, and FIG. 25L are aberration diagrams of the zoom lens according to Example 4 at the time of focusing on an infinite object.
Figure 25B:
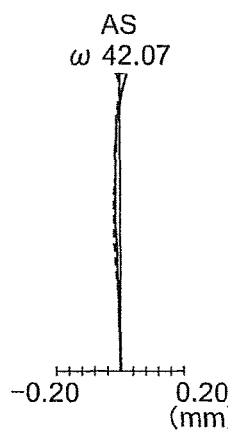
Figure 25C:
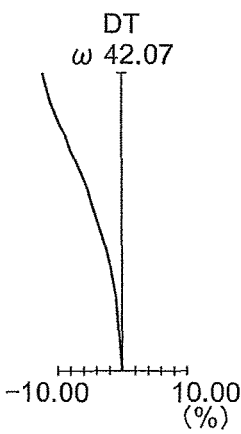
Figure 25D:
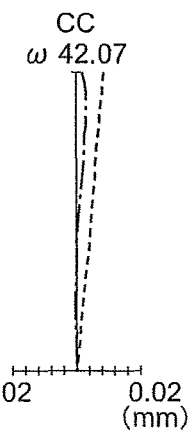
Figure 25E:
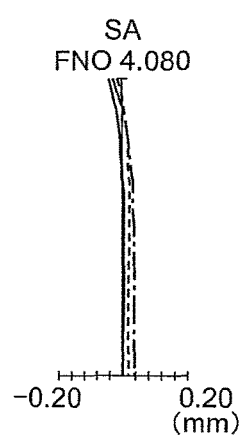
Figure 25F:
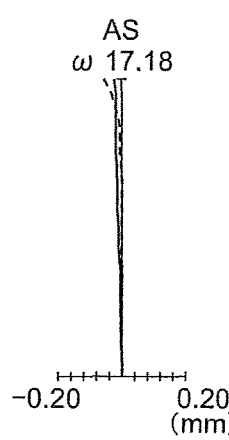
Figure 25G:
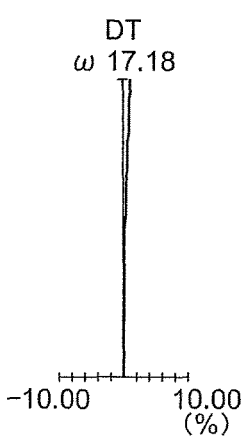
Figure 25H:
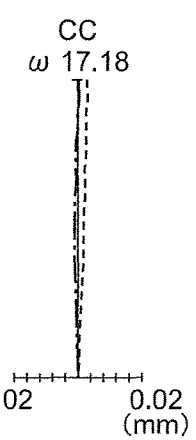
Figure 25I:
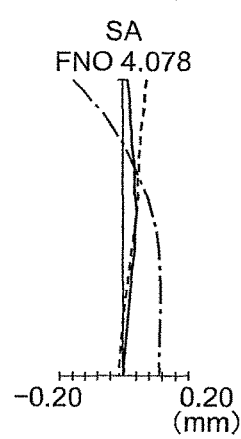
Figure 25J:
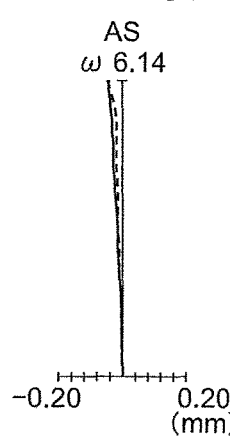
Figure 25K:
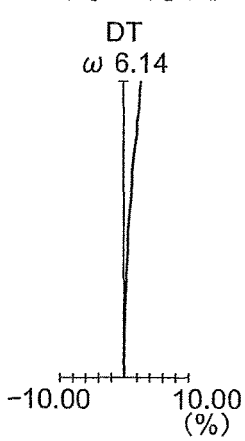
Figure 25L:
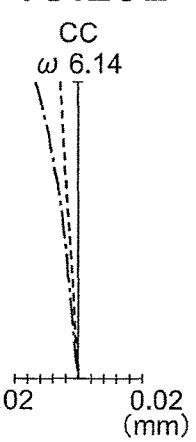
Figure 26A:
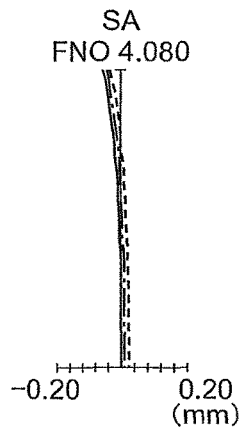
FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams of the zoom lens according to Example 5 at the time of focusing on an infinite object.
Figure 26B:
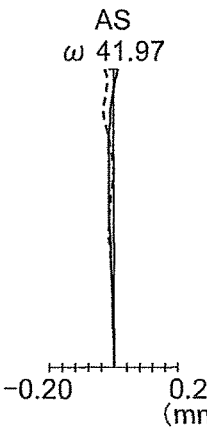
Figure 26C:
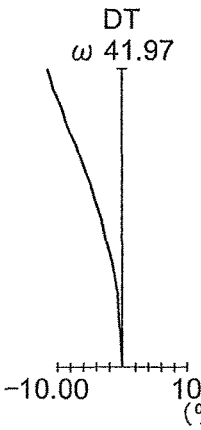
Figure 26D:
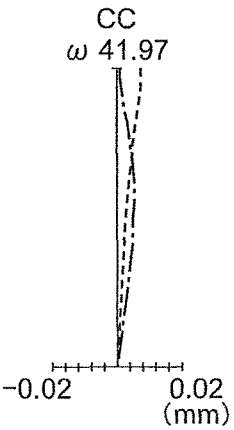
Figure 26E:
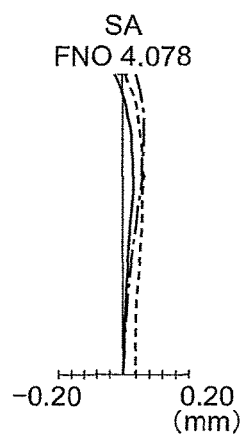
Figure 26F:
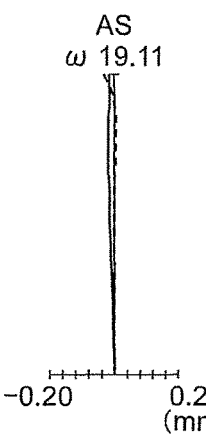
Figure 26G:
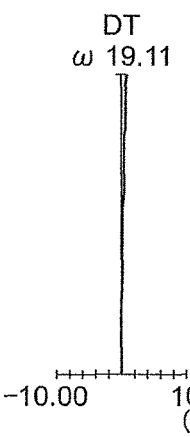
Figure 26H:
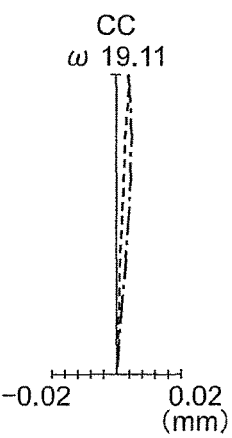
Figure 26I:
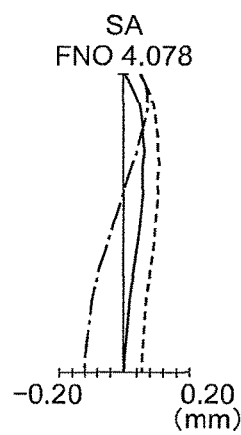
Figure 26J:
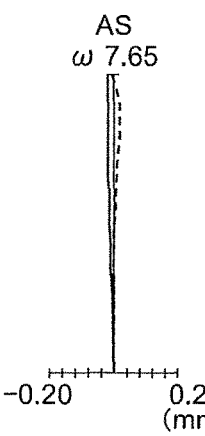
Figure 26K:
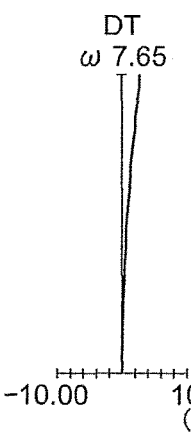
Figure 26L:
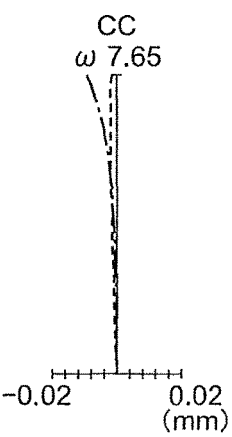
Figure 27A:
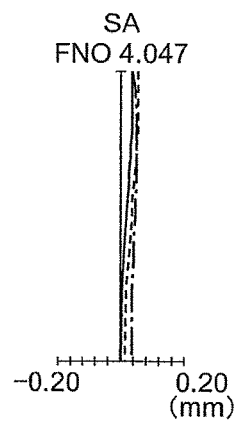
FIG. 27A, FIG. 27B, FIG. 27C, FIG. 27D, FIG. 27E, FIG. 27F, FIG. 27G, FIG. 27H, FIG. 27I, FIG. 27J, FIG. 27K, and FIG. 27L are aberration diagrams of the zoom lens according to Example 6 at the time of focusing on an infinite object.
Figure 27B:
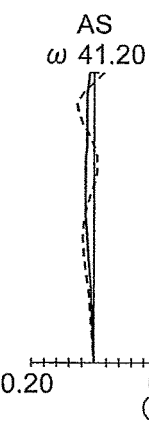
Figure 27C:
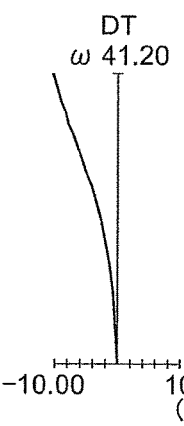
Figure 27D:
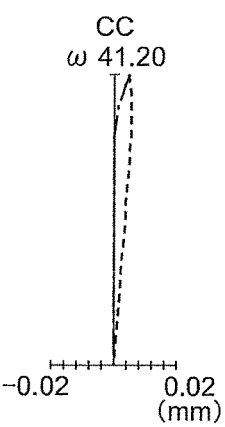
Figure 27E:
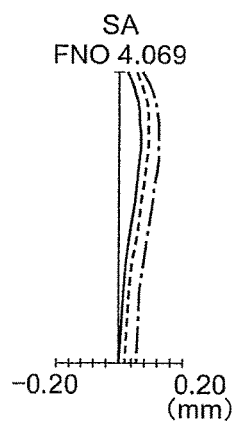
Figure 27F:
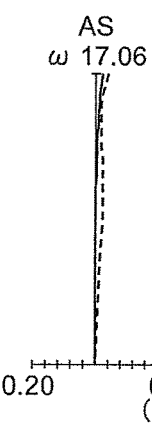
Figure 27G:
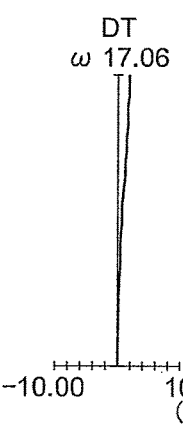
Figure 27H:
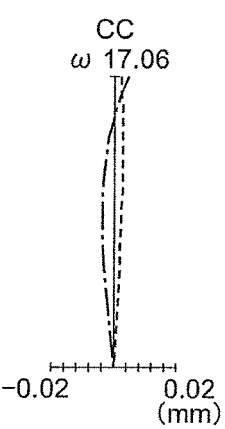
Figure 27I:
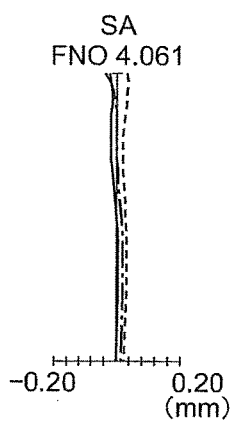
Figure 27J:
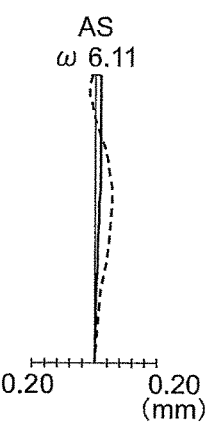
Figure 27K:
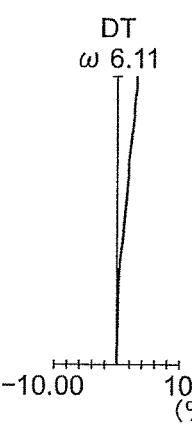
Figure 27L:
Figure 28A:
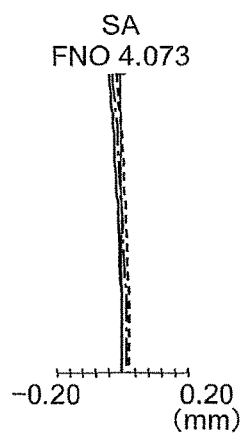
FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams of the zoom lens according to Example 7 at the time of focusing on an infinite object.
Figure 28B:
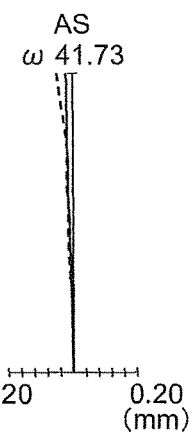
Figure 28C:
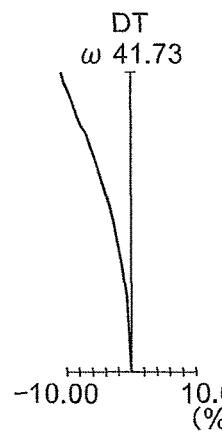
Figure 28D:
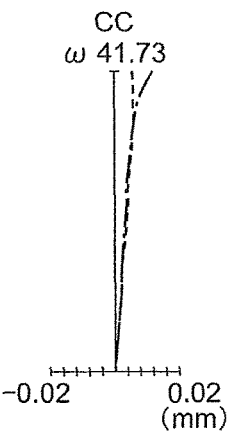
Figure 28E:
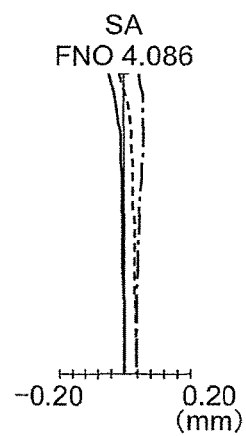
Figure 28F:
Figure 28G:
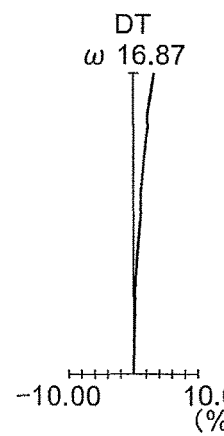
Figure 28H:
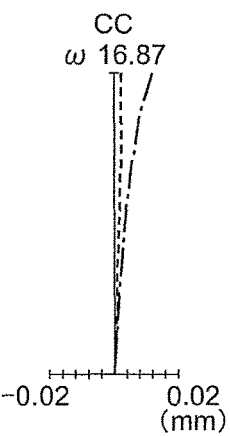
Figure 28I:
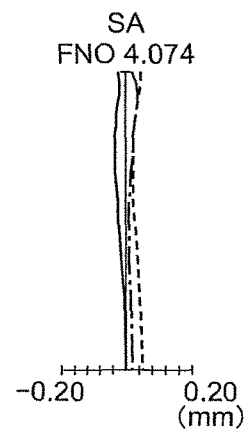
Figure 28J:
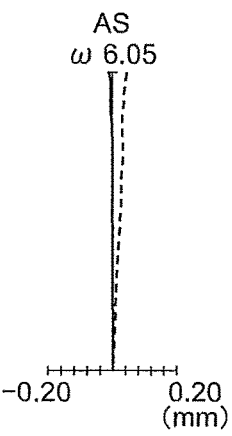
Figure 28K:
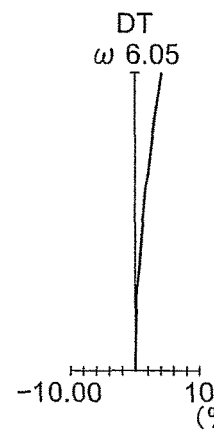
Figure 28L:
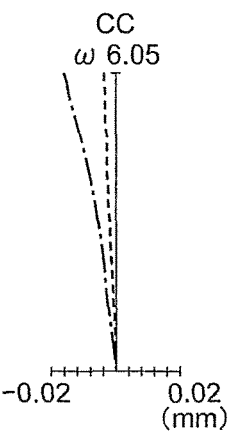
Figure 29A:
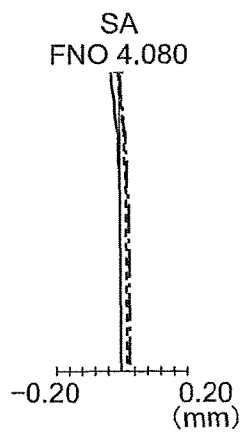
FIG. 29A, FIG. 29B, FIG. 29C, FIG. 29D, FIG. 29E, FIG. 29F, FIG. 29G, FIG. 29H, FIG. 29I, FIG. 29J, FIG. 29K, and FIG. 29L are aberration diagrams of the zoom lens according to Example 8 at the time of focusing on an infinite object.
Figure 29B:
Figure 29C:
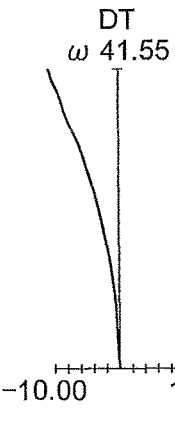
Figure 29D:
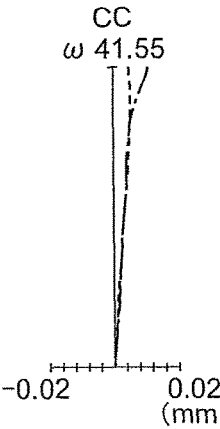
Figure 29E:
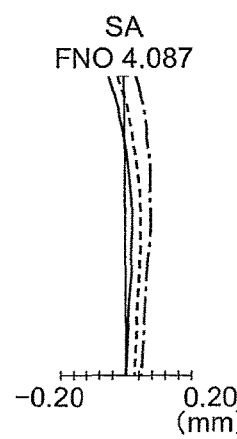
Figure 29F:
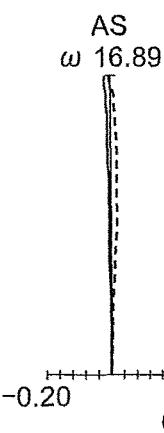
Figure 29G:
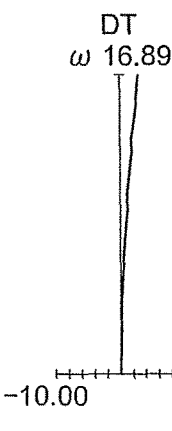
Figure 29H:
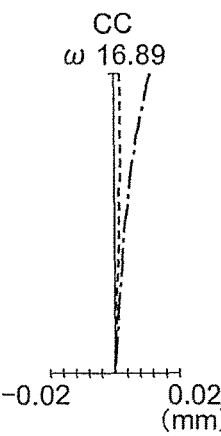
Figure 29I:
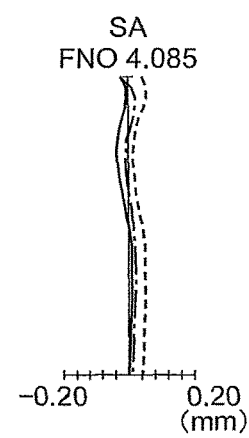
Figure 29J:
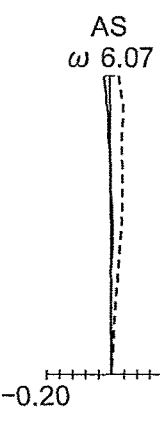
Figure 29K:
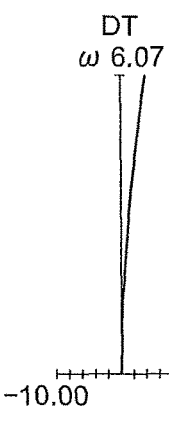
Figure 29L:
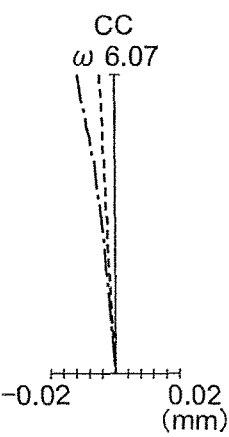
Figure 30A:
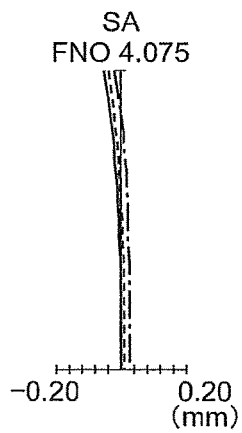
FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L are aberration diagrams of the zoom lens according to Example 9 at the time of focusing on an infinite object.
Figure 30B:
Figure 30C:
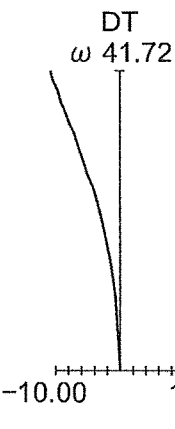
Figure 30D:
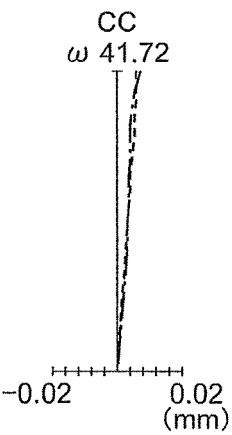
Figure 30E:
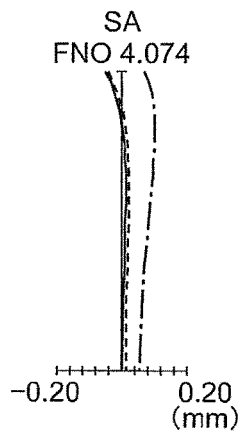
Figure 30F:
Figure 30G:
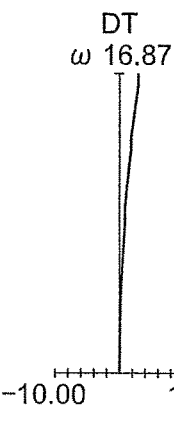
Figure 30H:
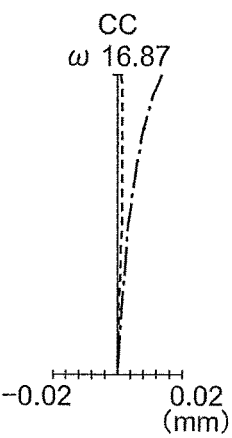
Figure 30I:
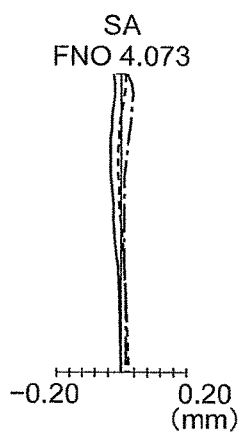
Figure 30J:
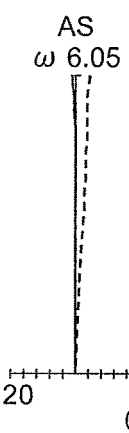
Figure 30K:
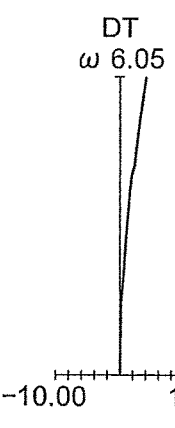
Figure 30L:
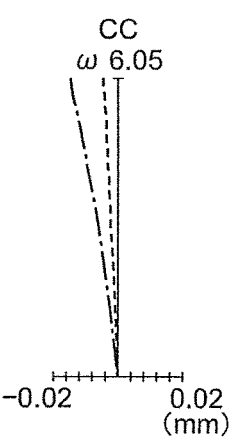
Figure 31A:
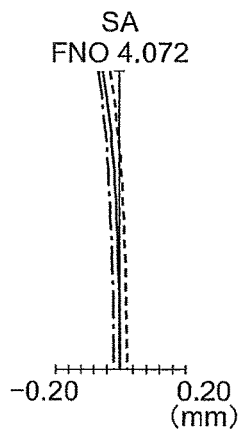
FIG. 31A, FIG. 31B, FIG. 31C, FIG. 31D, FIG. 31E, FIG. 31F, FIG. 31G, FIG. 31H, FIG. 31I, FIG. 31J, FIG. 31K, and FIG. 31L are aberration diagrams of the zoom lens according to Example 10 at the time of focusing on an infinite object.
Figure 31B:
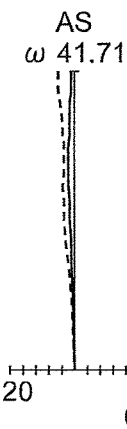
Figure 31C:
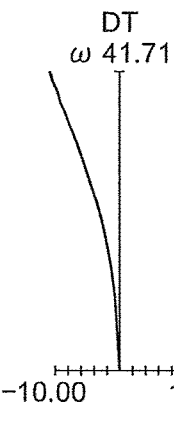
Figure 31D:
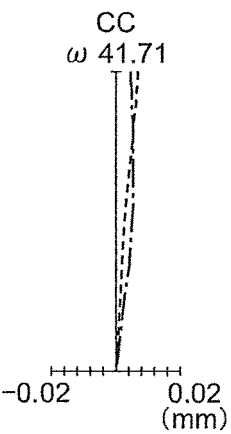
Figure 31E:
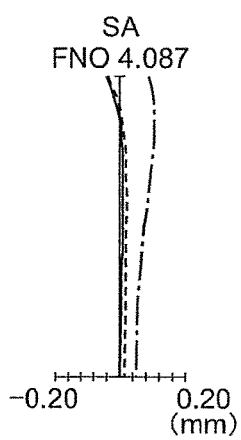
Figure 31F:
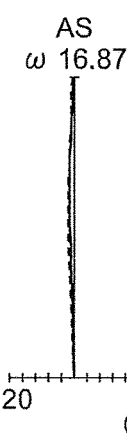
Figure 31G:
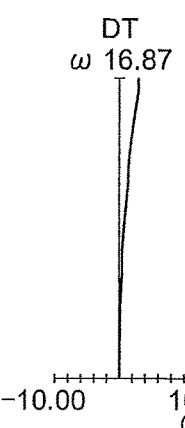
Figure 31H:
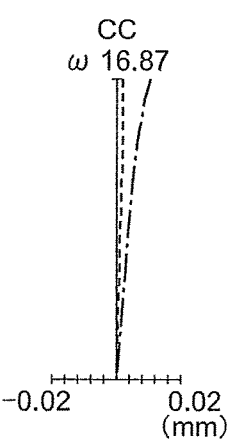
Figure 31I:
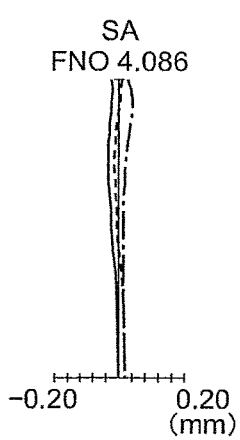
Figure 31J:
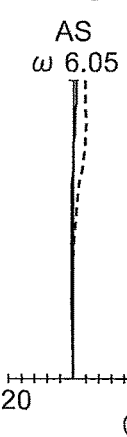
Figure 31K:
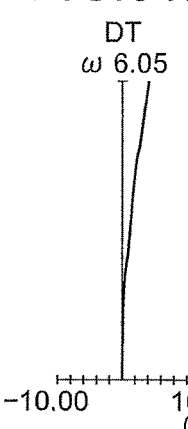
Figure 31L:
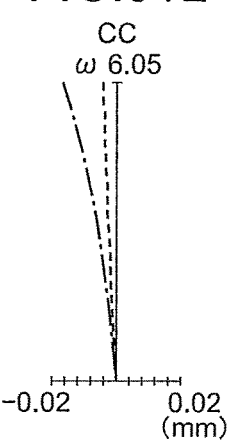
Figure 32A:
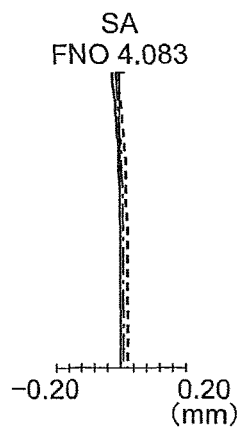
FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L are aberration diagrams of the zoom lens according to Example 11 at the time of focusing on an infinite object.
Figure 32B:
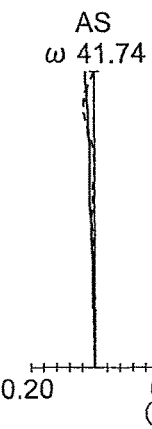
Figure 32C:
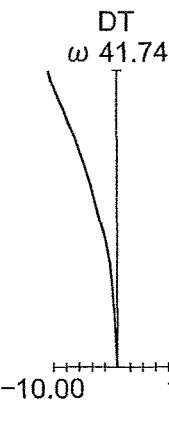
Figure 32D:
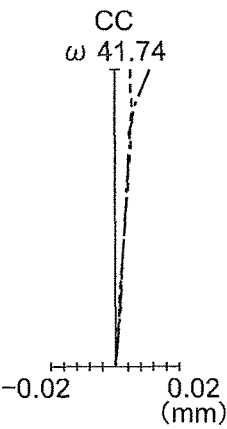
Figure 32E:
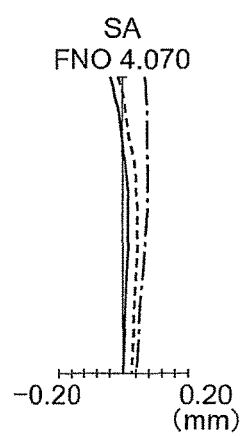
Figure 32F:
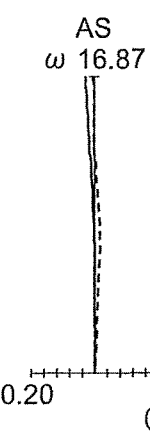
Figure 32G:
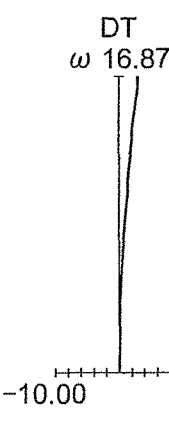
Figure 32H:
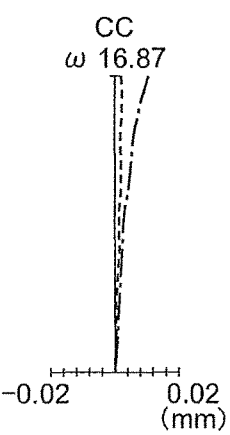
Figure 32I:
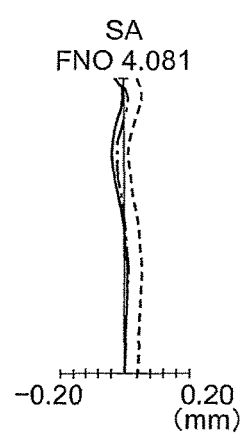
Figure 32J:
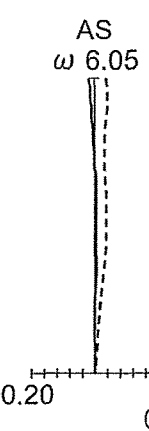
Figure 32K:
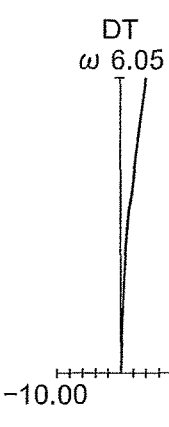
Figure 32L:
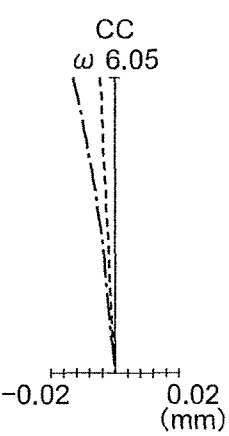
Figure 33A:
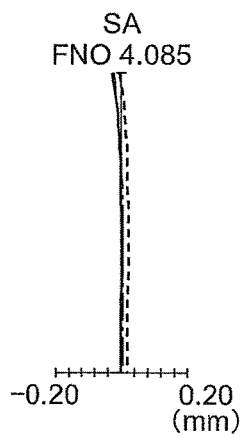
FIG. 33A, FIG. 33B, FIG. 33C, FIG. 33D, FIG. 33E, FIG. 33F, FIG. 33G, FIG. 33H, FIG. 33I, FIG. 33J, FIG. 33K, and FIG. 33L are aberration diagrams of the zoom lens according to Example 12 at the time of focusing on an infinite object.
Figure 33B:
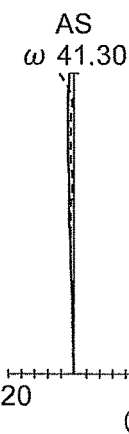
Figure 33C:
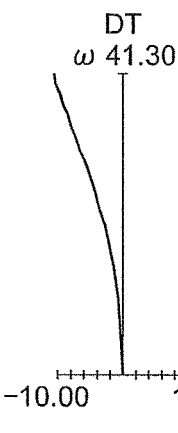
Figure 33D:
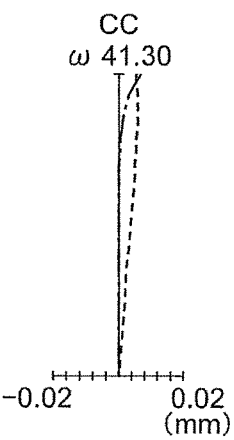
Figure 33E:
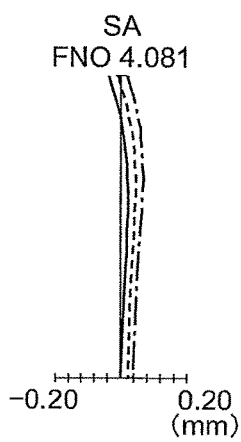
Figure 33F:
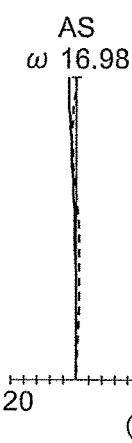
Figure 33G:
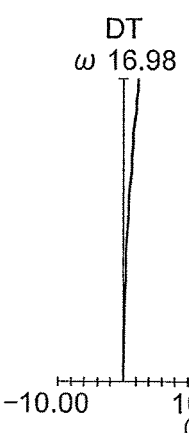
Figure 33H:
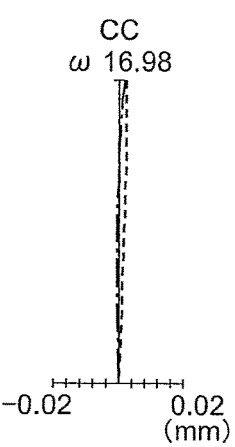
Figure 33I:
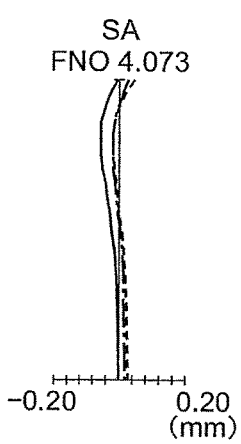
Figure 33J:
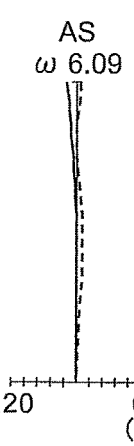
Figure 33K:
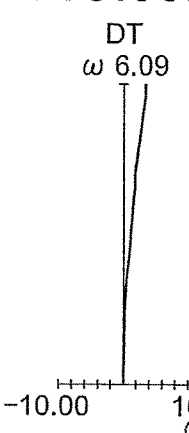
Figure 33L:
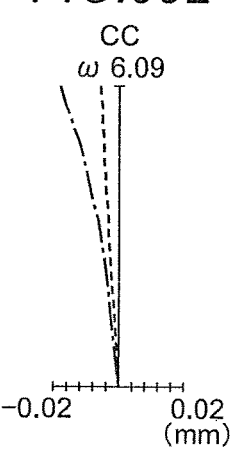
Figure 34A:
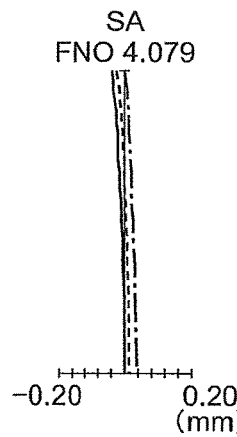
FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L are aberration diagrams of the zoom lens according to Example 13 at the time of focusing on an infinite object.
Figure 34B:
Figure 34C:
Figure 34D:
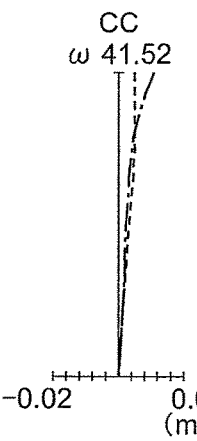
Figure 34E:
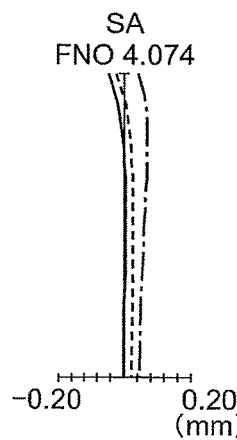
Figure 34F:
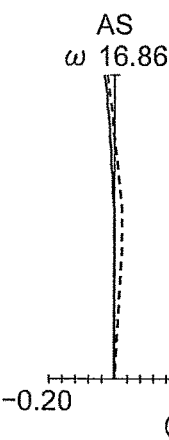
Figure 34G:
Figure 34H:
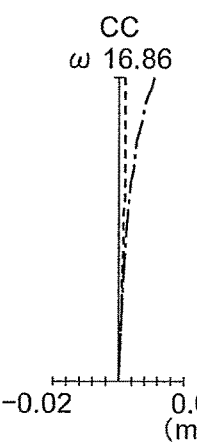
Figure 34I:
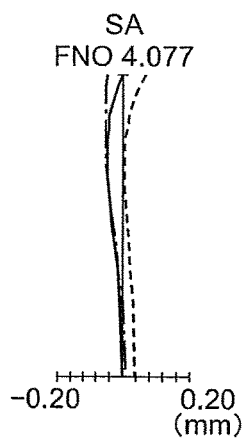
Figure 34J:
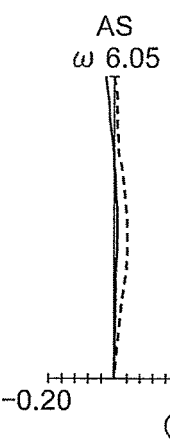
Figure 34K:
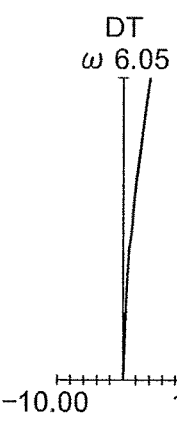
Figure 34L:
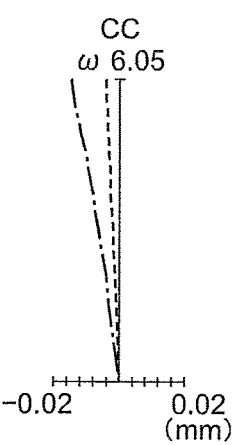
Figure 35A:
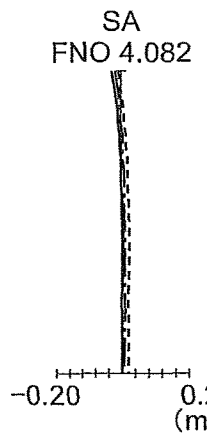
FIG. 35A, FIG. 35B, FIG. 35C, FIG. 35D, FIG. 35E, FIG. 35F, FIG. 35G, FIG. 35H, FIG. 35I, FIG. 35J, FIG. 35K, and FIG. 35L are aberration diagrams of the zoom lens according to Example 14 at the time of focusing on an infinite object.
Figure 35B:
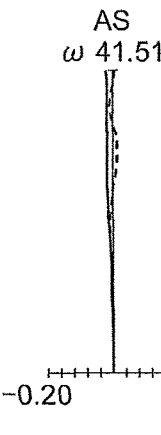
Figure 35C:
Figure 35D:
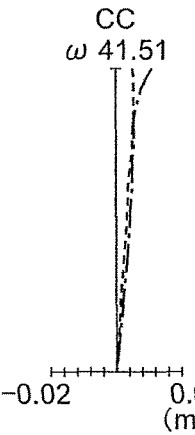
Figure 35E:
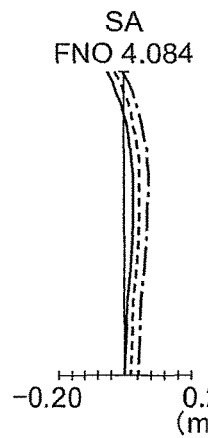
Figure 35F:
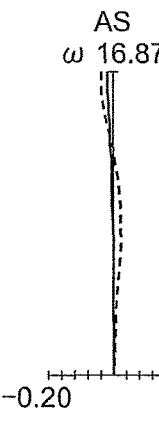
Figure 35G:
Figure 35H:
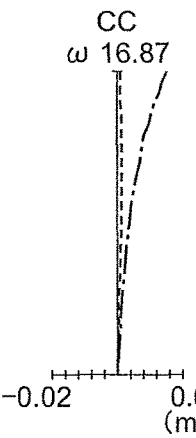
Figure 35I:
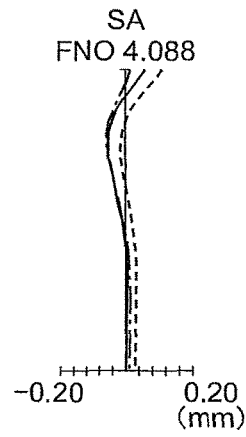
Figure 35J:
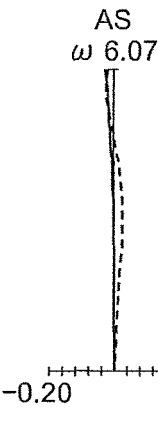
Figure 35K:
Figure 35L:
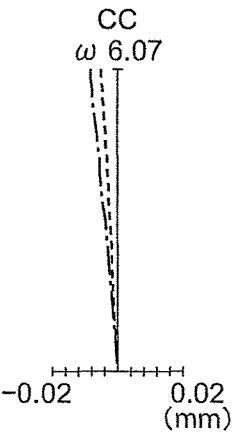
Figure 36A:
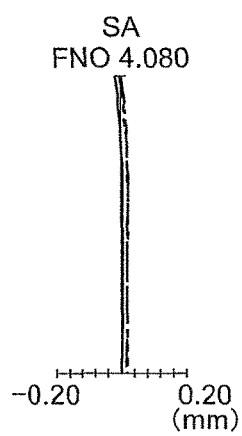
FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L are aberration diagrams of the zoom lens according to Example 15 at the time of focusing on an infinite object.
Figure 36B:
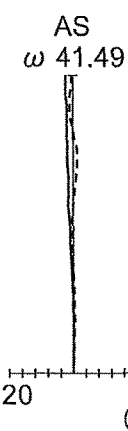
Figure 36C:
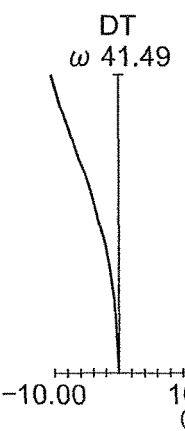
Figure 36D:
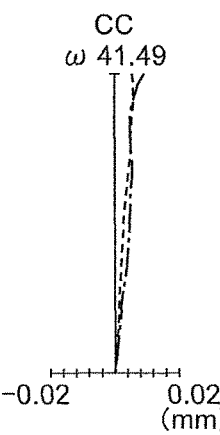
Figure 36E:
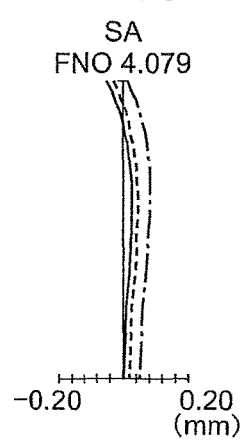
Figure 36F:
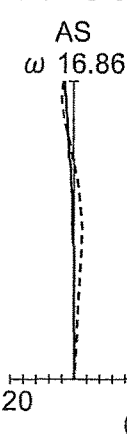
Figure 36G:
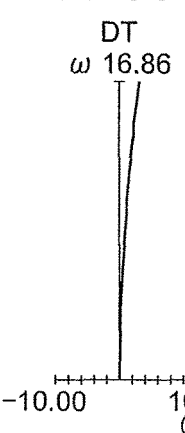
Figure 36H:
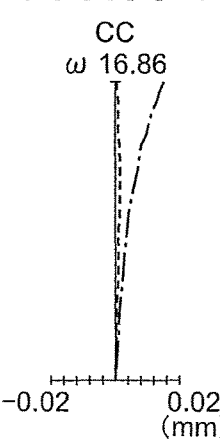
Figure 36I:
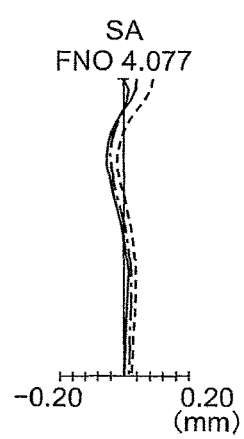
Figure 36J:
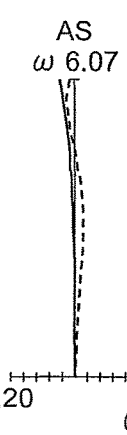
Figure 36K:
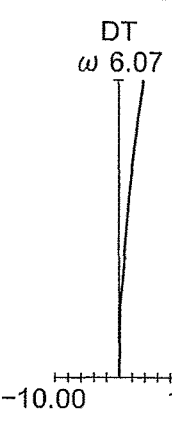
Figure 36L:
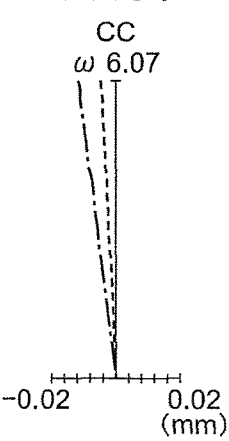
Figure 37A:
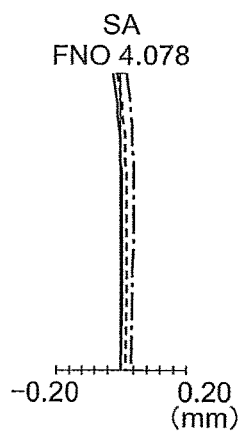
FIG. 37A, FIG. 37B, FIG. 37C, FIG. 37D, FIG. 37E, FIG. 37F, FIG. 37G, FIG. 37H, FIG. 37I, FIG. 37J, FIG. 37K, and FIG. 37L are aberration diagrams of the zoom lens according to Example 16 at the time of focusing on an infinite object.
Figure 37B:
Figure 37C:
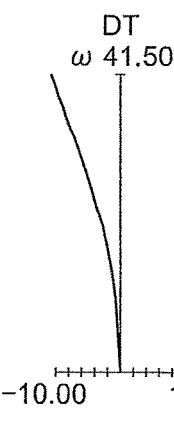
Figure 37D:
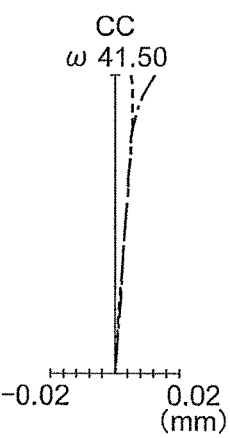
Figure 37E:
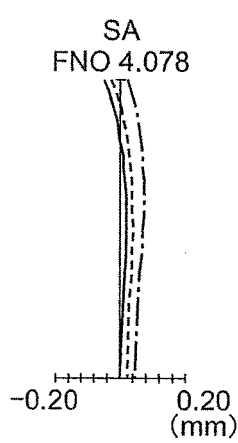
Figure 37F:
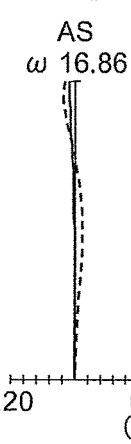
Figure 37G:
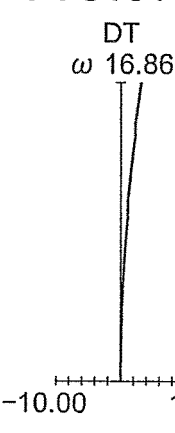
Figure 37H:
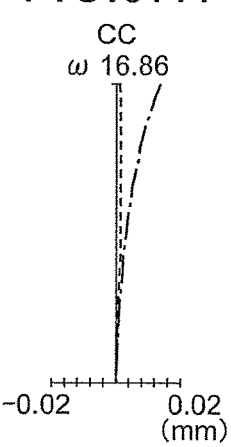
Figure 37I:
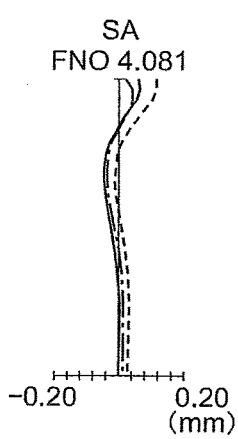
Figure 37J:
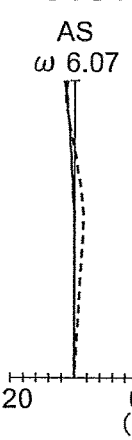
Figure 37K:
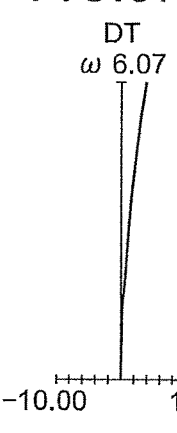
Figure 37L:
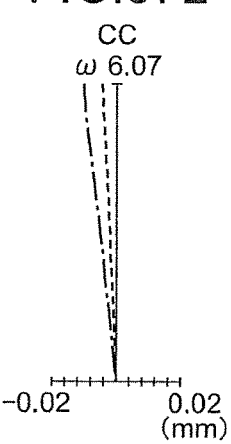
Figure 38A:
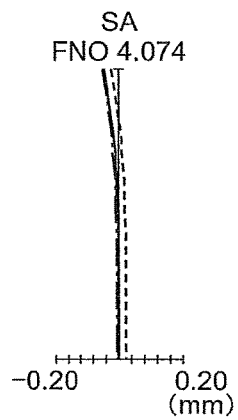
FIG. 38A, FIG. 38B, FIG. 38C, FIG. 38D, FIG. 38E, FIG. 38F, FIG. 38G, FIG. 38H, FIG. 38I, FIG. 38J, FIG. 38K, and FIG. 38L are aberration diagrams of the zoom lens according to Example 17 at the time of focusing on an infinite object.
Figure 38B:
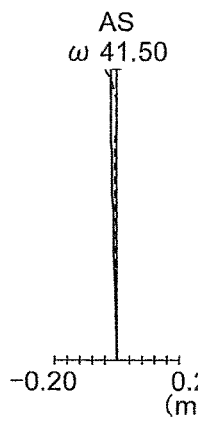
Figure 38C:
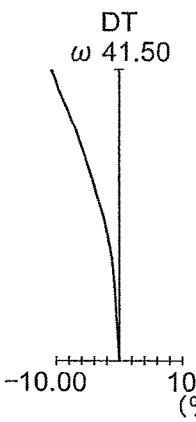
Figure 38D:
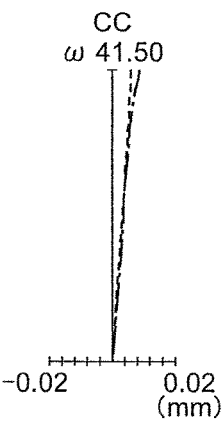
Figure 38E:
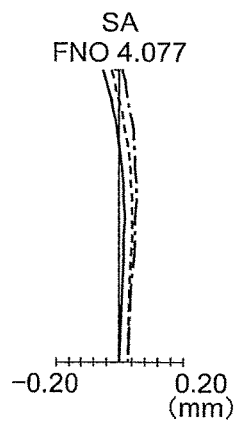
Figure 38F:
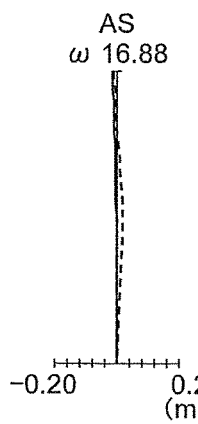
Figure 38G:
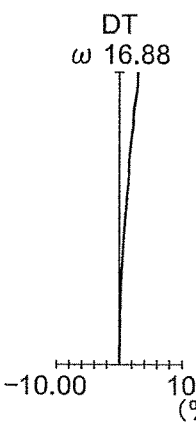
Figure 38H:
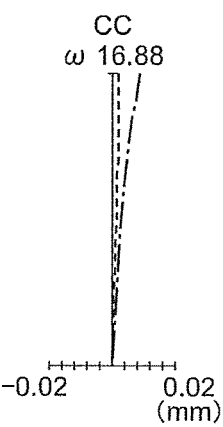
Figure 38I:
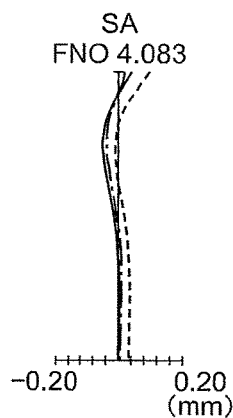
Figure 38J:
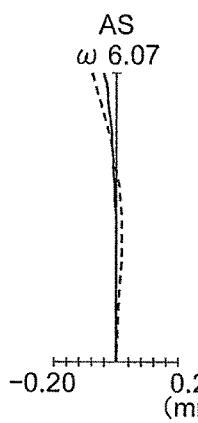
Figure 38K:
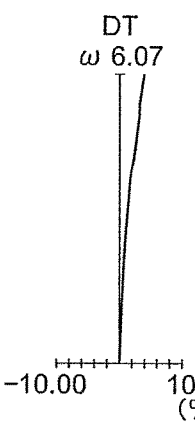
Figure 38L:
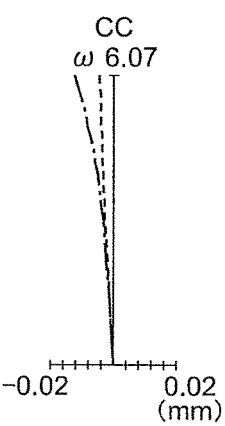
Figure 39A:
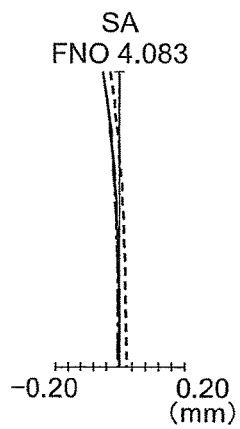
FIG. 39A, FIG. 39B, FIG. 39C, FIG. 39D, FIG. 39E, FIG. 39F, FIG. 39G, FIG. 39H, FIG. 39I, FIG. 39J, FIG. 39K, and FIG. 39L are aberration diagrams of the zoom lens according to Example 18 at the time of focusing on an infinite object.
Figure 39B:
Figure 39C:
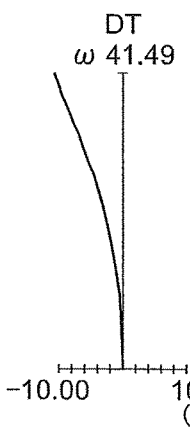
Figure 39D:
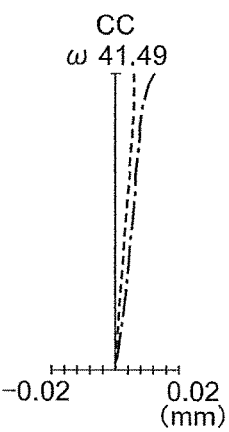
Figure 39E:
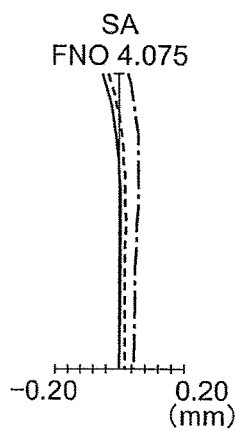
Figure 39F:
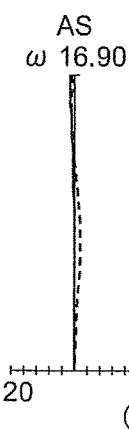
Figure 39G:
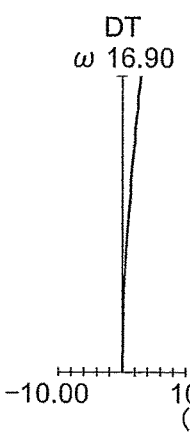
Figure 39H:
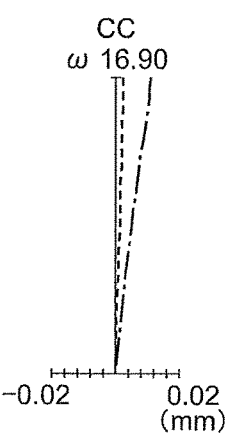
Figure 39I:
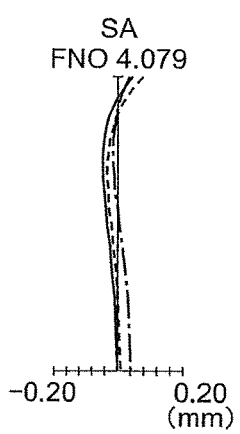
Figure 39J:
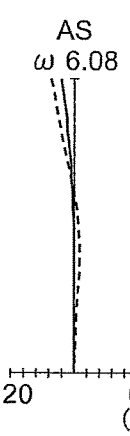
Figure 39K:
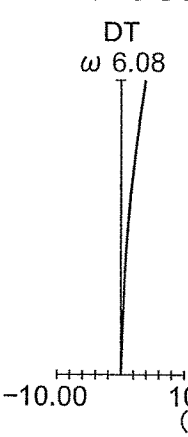
Figure 39L:
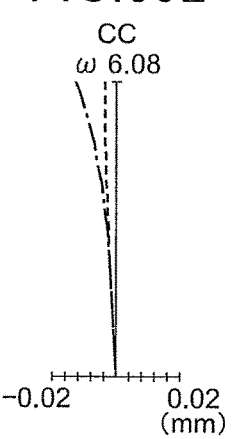
Figure 40A:
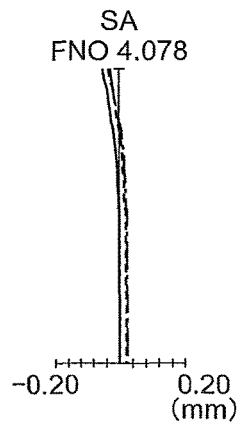
FIG. 40A, FIG. 40B, FIG. 40C, FIG. 40D, FIG. 40E, FIG. 40F, FIG. 40G, FIG. 40H, FIG. 40I, FIG. 40J, FIG. 40K, and FIG. 40L are aberration diagrams of the zoom lens according to Example 19 at the time of focusing on an infinite object.
Figure 40B:
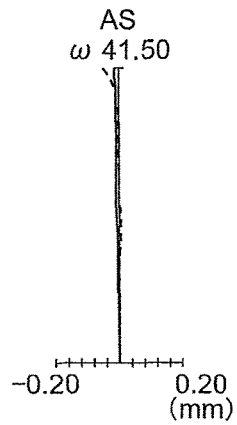
Figure 40C:
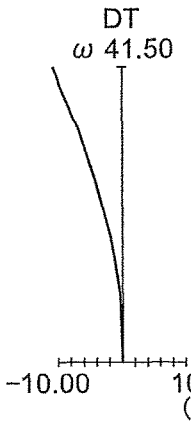
Figure 40D:
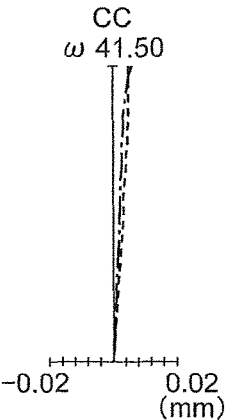
Figure 40E:
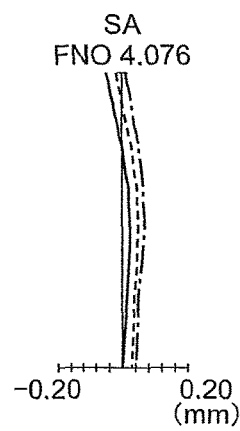
Figure 40F:
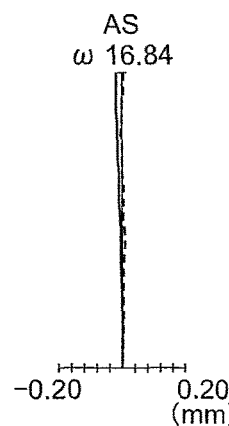
Figure 40G:
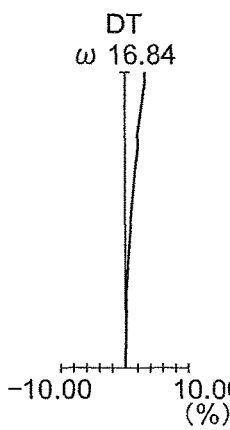
Figure 40H:
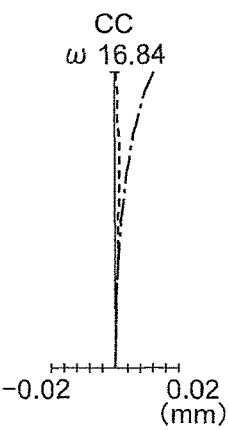
Figure 40I:
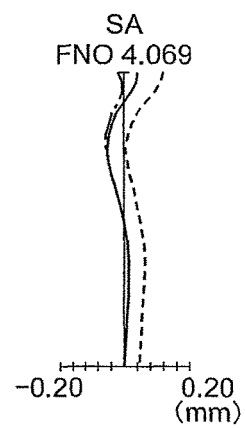
Figure 40J:
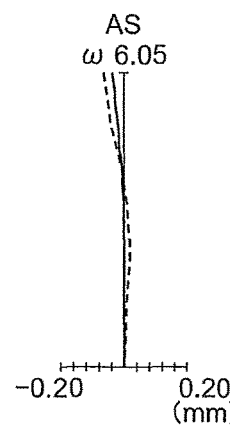
Figure 40K:
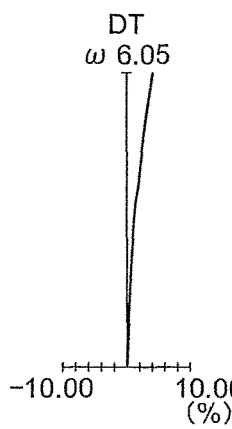
Figure 40L:
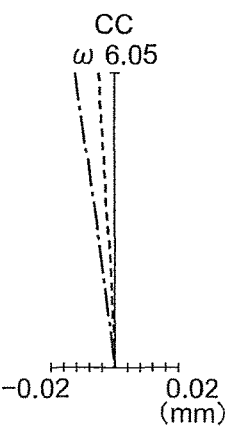
Figure 41A:
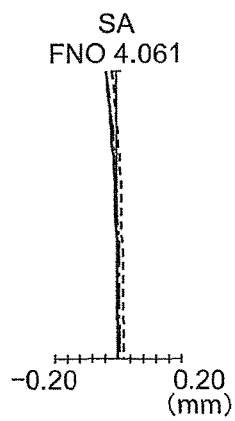
FIG. 41A, FIG. 41B, FIG. 41C, FIG. 41D, FIG. 41E, FIG. 41F, FIG. 41G, FIG. 41H, FIG. 41I, FIG. 41J, FIG. 41K, and FIG. 41L are aberration diagrams of the zoom lens according to Example 20 at the time of focusing on an infinite object.
Figure 41B:
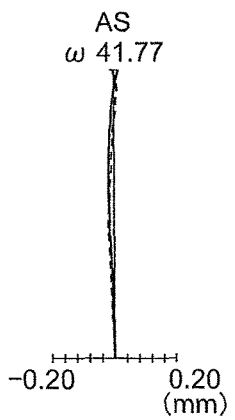
Figure 41C:
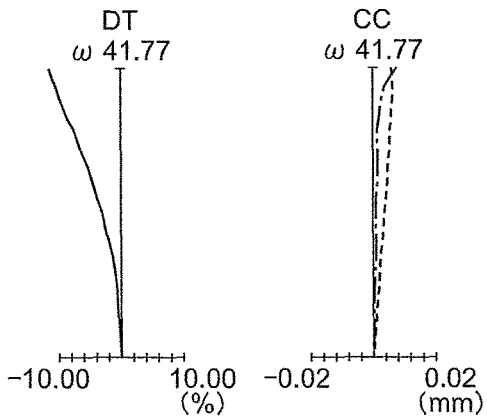
Figure 41D:
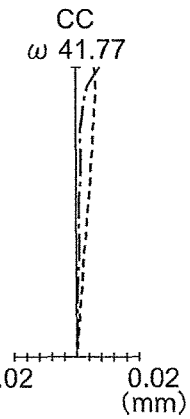
Figure 41E:
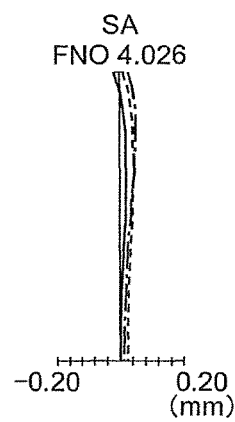
Figure 41F:
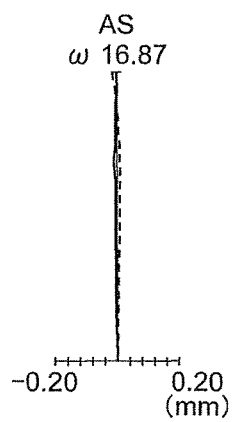
Figure 41G:
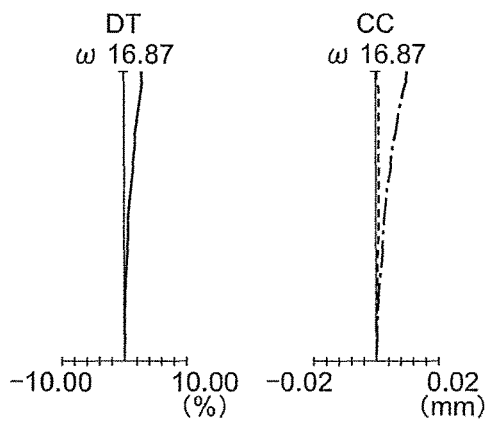
Figure 41H:
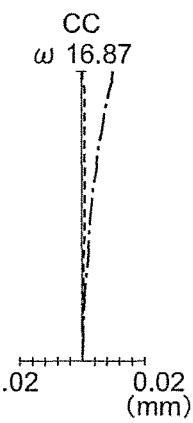
Figure 41I:
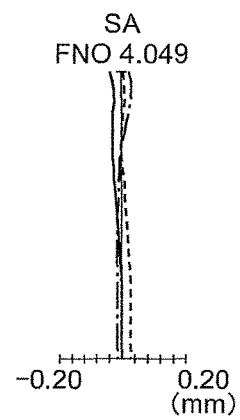
Figure 41J:
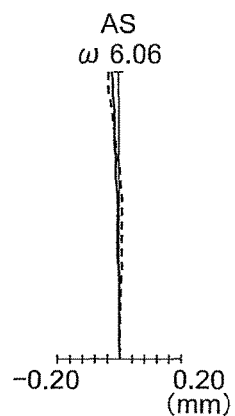
Figure 41K:
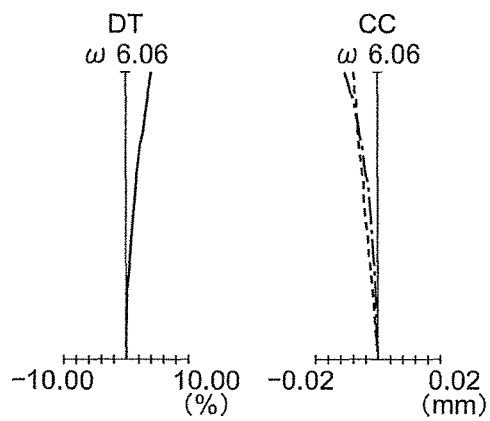
Figure 41L:
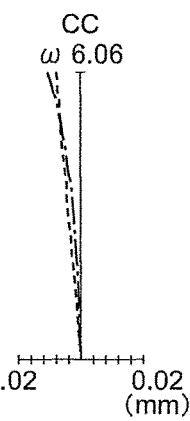
Figure 42A:
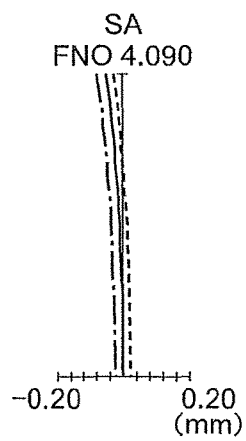
FIG. 42A, FIG. 42B, FIG. 42C, FIG. 42D, FIG. 42E, FIG. 42F, FIG. 42G, FIG. 42H, FIG. 42I, FIG. 42J, FIG. 42K, and FIG. 42L are aberration diagrams of the zoom lens according to Example 21 at the time of focusing on an infinite object.
Figure 42B:
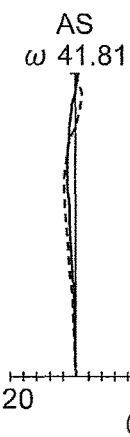
Figure 42C:
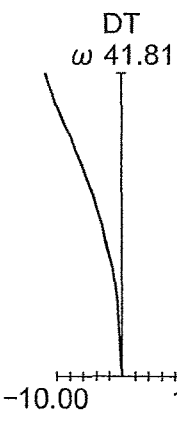
Figure 42D:
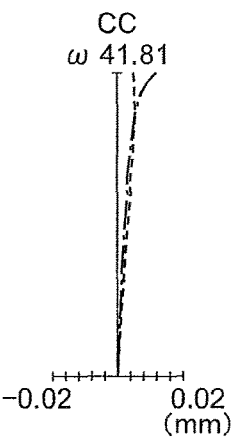
Figure 42E:
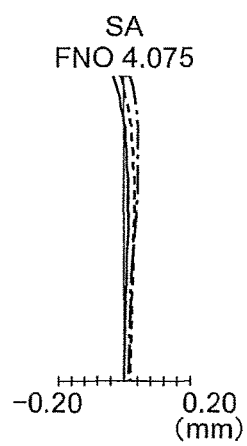
Figure 42F:
Figure 42G:
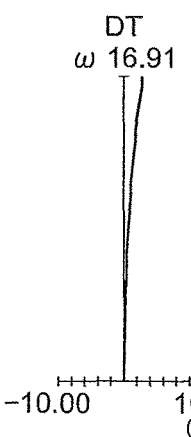
Figure 42H:
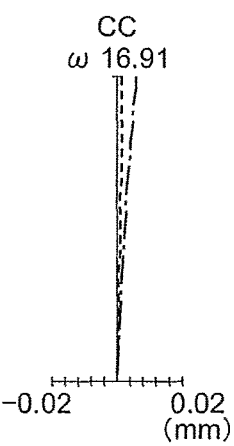
Figure 42I:
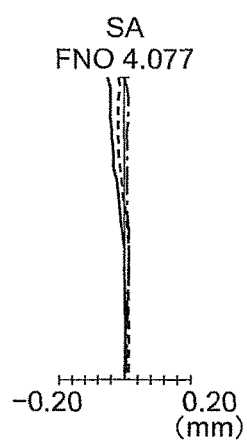
Figure 42J:
Figure 42K:
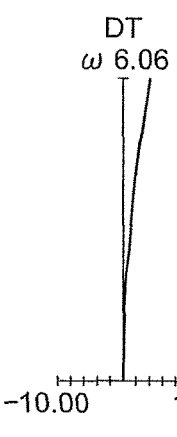
Figure 42L:
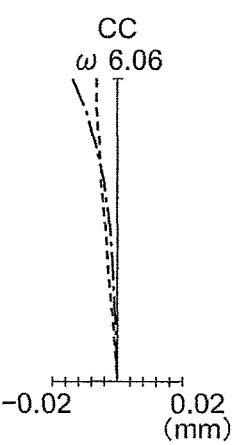

Prior to a description of examples, the operation effects of embodiments according to an aspect of the present invention will be described. When the operation effects of the present embodiment are described, specific examples will be illustrated. However, as is the case with the examples described later, the illustrated aspects are only a few of the aspects included in the present invention, and the aspects include a number of variations. Therefore, the present invention is not limited to the illustrated aspects.

A zoom lens of a first embodiment includes, in order from an object side, a first lens unit having a positive focal length, a second lens unit having a negative focal length, a third lens unit having a positive focal length, a fourth lens unit having a negative focal length, and a fifth lens unit having a positive focal length, wherein following Conditional Expressions (1) and (2) are satisfied:

$$0.3 \leq D34W/D45W \leq 1 \quad (1), \text{ and}$$

$$0.2 \leq (D34W/D45W)/(D34T/D45T) \leq 0.6 \quad (2),$$

where

D34W is an air space on an optical axis between the third lens unit and the fourth lens unit at a wide angle end;

D45W is an air space on the optical axis between the fourth lens unit and the fifth lens unit at the wide angle end;

D34T is an air space on the optical axis between the third lens unit and the fourth lens unit at a telephoto end; and D45T is an air space on the optical axis between the fourth lens unit and the fifth lens unit at the telephoto end.

In the zoom lens of the present embodiment, arrangement of refractive powers are made such that a positive refractive power, a negative refractive power, a positive refractive power, a negative refractive power, and a positive refractive power, from the object side. As a result, the arrangement of refractive powers is asymmetric between the object side and the image side with the third lens unit at the center.

Because of the inclusion of such an arrangement, it is possible to ensure a wide angle of view at the wide angle end, to ensure a large zoom ratio, and to ensure a small F-number at the telephoto end. For example, it is possible to ensure an angle of view of 80 degrees or more at the wide angle end and to ensure a zoom ratio of five times or more.

Furthermore, because of the inclusion of such an arrangement, it is possible to achieve shortening an overall length of the optical system and making a diameter of the optical system small and, in addition, it is possible to correct various aberrations favorably, in particular, off-axis aberration at the wide angle end and axial aberration at the telephoto end, over the entire zoom range.

Moreover, the diameter of the first lens unit is largest in the optical system. Since the fourth lens unit has a negative focal length and the fifth lens unit has a positive focal length as described above, a magnifying optical system can be configured with the fourth lens unit and the fifth lens unit. Thus, it is possible to reduce the diameter of the first lens unit. As a result, size reduction of the optical system as a whole can be achieved.

Then, in the zoom lens of the present embodiment, Conditional Expressions (1) and (2) are satisfied.

Conditional Expression (1) represents a ratio between an air space of a front side of the fourth lens unit and an air space of a back side of the fourth lens unit, at the wide angle end. By satisfying Conditional Expression (1), it is possible to obtain a high-performance zoom lens having a wide angle of view.

By making so as not to exceed an upper limit value of Conditional Expression (1), it is possible to reduce various aberrations at the wide angle end. As a result, it is possible to obtain a high-performance zoom lens.

By making so as not to fall below a lower limit value of Conditional Expression (1), it is possible to prevent an increase of the effects of production errors. Therefore, it becomes possible to produce a zoom lens having high imaging performance. Furthermore, since it is possible to prevent reduction of the angle of view at the wide angle end, it is possible to obtain a zoom lens having a wide angle of view, for example, an angle of view of 80 degrees or more.

Conditional Expression (2) represents a relation between two ratios. One ratio is the ratio between the air space of the front side of the fourth lens unit and the air space of the back side of the fourth lens unit, at the wide angle end. Other ratio is a ratio between an air space of a front side of the fourth lens unit and an air space of a back side of the fourth lens unit, at the telephoto end. By satisfying Conditional Expression (2), it is possible to obtain a compact and high-performance zoom lens.

By making so as not to exceed an upper limit value of Conditional Expression (2), it is possible to increase proportion of load of zooming effect in the fourth lens unit. Thus, it is possible to reduce proportion of load of zooming effect in the lens units other than the fourth lens unit (hereinafter referred to as "the other lens units"). As a result, since aberration variation at the time of zooming is reduced, it is possible to obtain a high-performance zoom lens.

By making so as not to fall below a lower limit value of Conditional Expression (2), it is possible to reduce the proportion of load of zooming effect in the fourth lens unit. As a result, it is possible to ensure a small F-number at the telephoto end while suppressing occurrence of various aberrations and small-sizing of the optical system.

If the proportion of load of zooming effect in the fourth lens unit excessively increases, a change in magnification becomes large in the lens unit as a whole positioned closer to the image side than the aperture stop. In this case, a larger aperture diameter is required in order to ensure a small F-number at the telephoto end. However, if the aperture diameter is made large, correction of various aberrations becomes difficult. When various aberrations are attempted to be corrected favorably, the overall length and the size of the optical system become large.

Therefore, it is preferable to reduce the proportion of load of zooming effect in the fourth lens unit. By doing so, it is possible to reduce the aperture diameter when a small F-number is ensured at the telephoto end. In other words, since the lens diameter can be reduced, it is possible to achieve small-sizing of the optical system while suppressing occurrence of various aberrations.

Furthermore, since the diameter of the fifth lens unit can be reduced, it is possible to achieve small-sizing of the optical system.

In the zoom lens of the present embodiment, it is preferable that an air space between the first lens unit and the second lens unit widens, an air space between the second lens unit and the third lens unit narrows, an air space between the third lens unit and the fourth lens unit widens, and an air space between the fourth lens unit and the fifth lens unit widens, at the time of zooming from the wide angle end to the telephoto end.

By doing so, since it is possible to perform zooming without reducing the magnification in each lens unit, high zooming efficiency can be obtained.

In the zoom lens of the present embodiment, it is preferable that following Conditional Expression (3) is satisfied:

$$0.7 \leq D34T/D45T \leq 2 \quad (3),$$

where,

D34T is the air space on the optical axis between the third lens unit and the fourth lens unit at the telephoto end; and D45T is the air space on the optical axis between the fourth lens unit and the fifth lens unit at the telephoto end.

Conditional Expression (3) represents the ratio between the air space of the front side of the fourth lens unit and the air space of the back side of the fourth lens unit at the telephoto end. By satisfying Conditional Expression (3), it is possible to obtain a compact and high-performance zoom lens.

By making so as not to exceed an upper limit value of Conditional Expression (3), it is possible to reduce the proportion of load of zooming effect in the fourth lens unit. The technical meaning of reducing the proportion of load of zooming effect in the fourth lens unit is the same as the technical meaning described in Conditional Expression (2), and a description thereof is omitted here.

By making so as not to fall below a lower limit value of Conditional Expression (3), it is possible to increase the proportion of load of zooming effect in the fourth lens unit. Thus, it is possible to reduce the proportion of load of zooming effect in the other lens units. As a result, since aberration variation at the time of zooming is reduced, it is possible to obtain a high-performance zoom lens.

In the zoom lens of the present embodiment, it is preferable that following Conditional Expression (4) is satisfied:

$$0.1 \leq (\beta 4T/\beta 4W)/(fT/fW) \leq 0.2 \quad (4),$$

where, $\beta 4W$ is a lateral magnification of the fourth lens unit at the wide angle end;

$\beta 4T$ is a lateral magnification of the fourth lens unit at the telephoto end;

fW is a focal length of the entire zoom lens at the wide angle end; and fT is a focal length of the entire zoom lens at the telephoto end.

Conditional Expression (4) represents a ratio between a zoom ratio of the fourth lens unit and a zoom ratio of the entire zoom lens. By satisfying Conditional Expression (4), it is possible to obtain a compact and high-performance zoom lens.

By making so as not to exceed an upper limit value of Conditional Expression (4), it is possible to reduce the proportion of load of zooming effect in the fourth lens unit. The technical meaning of reducing the proportion of load of zooming effect in the fourth lens unit is the same as the technical meaning described in Conditional Expression (2), and a description thereof is omitted here.

By making so as not to fall below the lower limit value of Conditional Expression (4), it is possible to increase the proportion of load of zooming effect in the fourth lens unit. Thus, it is possible to reduce the proportion of load of zooming effect in the other lens units. If the proportion of load of zooming effect in the other lens units is made large, aberration variation at the time of zooming is increased. However, since the proportion of load of zooming effect in the other lens units can be reduced, it is possible to prevent increase of such aberration variation. As a result, it is possible to obtain a high-performance zoom lens.

In the zoom lens of the present embodiment, it is preferable that following Conditional Expression (5) is satisfied:

$$0.23 \leq (\beta 3T/\beta 3W)/(fT/fW) \leq 0.55 \quad (5),$$

where, $\beta 3W$ is a lateral magnification of the third lens unit at the wide angle end;

$\beta 3T$ is a lateral magnification of the third lens unit at the telephoto end;

fW is the focal length of the entire zoom lens at the wide angle end; and fT is the focal length of the entire zoom lens at the telephoto end.

Conditional Expression (5) represents a zoom ratio of the third lens unit to the zoom ratio of the entire zoom lens. By satisfying Conditional Expression (5), it is possible to obtain a compact zoom lens.

By making so as not to exceed an upper limit value of Conditional Expression (5), it is possible to reduce proportion of load of zooming effect in the third lens unit. Thus, it is possible to reduce the drive amount of the third lens unit at the time of zooming. Therefore, it is possible to obtain a zoom lens in which the overall length of the optical system is short.

Besides the third lens unit, the second lens unit is mainly responsible for zooming effect. By making so as not to fall below a lower limit value of Conditional Expression (5), it is possible to reduce proportion of load of zooming effect in the second lens unit. Thus, it is possible to reduce height of the off-axis light rays passing through the second lens unit at the wide angle end. As a result, it is possible to reduce the diameter of the second lens unit. Furthermore, since the diameter of the first lens unit positioned closer to the object side than the second lens unit is also reduced, it is possible to obtain a compact zoom lens.

In the zoom lens of the present embodiment, it is preferable that following Conditional Expression (6) is satisfied:

$$0.6 \leq (\beta 2W/\beta 3W)/(\beta 2T/\beta 3T) \leq 1.7 \quad (6),$$

where, $\beta 2W$ is a lateral magnification of the second lens unit at the wide angle end;

$\beta 3W$ is the lateral magnification of the third lens unit at the wide angle end;

$\beta 2T$ is a lateral magnification of the second lens unit at the telephoto end; and $\beta 3T$ is the lateral magnification of the third lens unit at the telephoto end.

Conditional Expression (6) represents a relation between a lateral magnification of the second lens unit and a lateral magnification of the third lens unit at the wide angle end and at the telephoto end. By satisfying Conditional Expression (6), it is possible to obtain a compact zoom lens.

By making so as not to exceed an upper limit value of Conditional Expression (6), it is possible to reduce the proportion of load of zooming effect in the third lens unit. Thus, it is possible to reduce the drive amount of the third lens unit at the time of zooming. Therefore, it is possible to obtain a zoom lens in which the overall length of the optical system is short.

Besides the third lens unit, the second lens unit is mainly responsible for zoom action. By making so as not to fall below a lower limit value of Conditional Expression (6), it is possible to reduce the proportion of load of zooming effect in the second lens unit. Thus, it is possible to reduce the height of off-axis light rays passing through the second lens unit at the wide angle end. As a result, it is possible to reduce the diameter of the second lens unit. Furthermore, since the diameter of the first lens unit positioned closer to the object side than the second lens unit is also reduced, it is possible to obtain a compact zoom lens.

In the zoom lens of the present embodiment, it is preferable that following Conditional Expression (7) is satisfied:

$$0.2 \leq f3G/fT \leq 0.33 \qquad (7),$$

where, f3G is a focal length of the third lens unit; and fT is the focal length of the entire zoom lens at the telephoto end.

Conditional Expression (7) represents a ratio between the focal length of the third lens unit and the focal length of the entire zoom lens system at the telephoto end. By satisfying Conditional Expression (7), it is possible to obtain a compact and high-performance zoom lens.

By making so as not to exceed an upper limit value of Conditional Expression (7), it is possible to reduce the amount of movement of the third lens unit. Therefore, it is possible to obtain a zoom lens in which the overall length of the optical system is short.

By making so as not to fall below a lower limit value of Conditional Expression (7), it is possible to correct aberration occurring in the third lens unit easily, in particular, spherical aberration. Therefore, it is possible to obtain a high-performance zoom lens.

In the zoom lens of the present embodiment, it is preferable that following Conditional Expression (8) is satisfied:

$$0.38 \leq DG3W/LW \leq 0.58 \qquad (8),$$

where,

DG3W is a distance on the optical axis from a surface closest to the object in the third lens unit to an image plane at the wide angle end; and LW is a distance on the optical axis from an object-side surface top of a lens disposed closest to the object in the first lens unit to the image plane at the wide angle end.

Conditional Expression (8) represents a ratio between the distance on the optical axis from the surface closest to the object in the third lens unit to the image plane at the wide angle end and the distance on the optical axis from the object-side surface top of the lens disposed closest to the object in the first lens unit to the image plane at the wide angle end. By satisfying Conditional Expression (8), it is possible to obtain a zoom lens compact and high-zoom. "high-zoom" means that "the zoom ratio is large".

By making so as not to exceed an upper limit value of Conditional Expression (8), it is possible to increase the amount of movement of the third lens unit at the time of zooming from the wide angle end to the telephoto end. Therefore, a high-zoom zoom lens is easily achieved. Furthermore, since off-axis aberration can be reduced in the fourth lens unit, it becomes possible to obtain a zoom lens with high imaging performance.

By making so as not to fall below a lower limit value of Conditional Expression (8), it is possible to reduce the height of the off-axis light rays passing through the second lens unit at the wide angle end. As a result, it is possible to reduce the diameter of the second lens unit. Furthermore, since the diameter of the first lens unit positioned closer to the object side than the second lens unit is also reduced, it is possible to obtain a compact zoom lens.

In a case where the aperture stop is disposed in the third lens unit, the aperture stop moves together with the third lens unit. In this case, the surface closest to the object in the third lens unit corresponds to the aperture stop. In a case where the aperture stop is not disposed in the third lens unit, the aperture stop moves alone. In this case, the surface closest to the object in the third lens unit corresponds to the object-side surface of the lens disposed closest to the object in the third lens unit. Furthermore, the case where the aperture stop is disposed in the third lens unit includes a case where the aperture stop is disposed closest to the object in the third lens unit.

It is preferable that the zoom lens of the present embodiment include a moving lens which moves in a direction vertical to the optical axis and following Conditional Expression (9) is satisfied:

$$1.2 \leq fIS/fISG \leq 3 \qquad (9),$$

where, fIS is a focal length of the moving lens; and fISG is a focal length of the lens unit including the moving lens.

A part of a lens unit is provided as moving lens and the moving lens is moved in the direction vertical to the optical axis, whereby the camera shake-preventing function can be imparted to the zoom lens.

Conditional Expression (9) represents a ratio between the focal length of the moving lens and the focal length of the lens unit including the moving lens. By satisfying Conditional Expression (9), it is possible to reduce amount of movement of the moving lens at the time of camera shake prevention and to maintain good imaging performance.

The moving lens may be a simple lens or a cemented lens. Furthermore, the number of moving lens is not limited to one.

By making so as not to exceed an upper limit value of Conditional Expression (9), it is possible to reduce the effects of eccentric aberration occurring at the time of camera shake prevention. As a result, it is possible to keep high imaging performance even at the time of camera shake prevention.

By making so as not to fall below a lower limit value of Conditional Expression (9), it is possible to reduce the amount of movement of the moving lens at the time of camera shake prevention. Therefore, it is possible to achieve small-sizing of the camera shake-preventing unit as a whole. In this way, making so as not to exceed the lower limit value of Conditional Expression (9) leads to size reduction of the optical system as a whole.

In the zoom lens of the present embodiment, it is preferable that a lens disposed in the third lens unit moves in the direction vertical to the optical axis.

The third lens unit is a lens unit in which an increase in lens diameter is most suppressed in the optical system. Thus, it is also possible to suppress an increase in lens weight. Based on this, a part of the third lens unit or all of the lenses in the third lens unit are moved in the direction vertical to the optical axis. In this way, it is advantageous that the lens unit including a lens moved in the direction vertical to the optical axis is provided as the third lens unit, in that the camera shake prevention functions.

Moreover, when a lens is moved in the direction vertical to the optical axis, the position of axial principal rays on the image plane changes. The third lens unit allows for a large amount of change in this position. Therefore, when a lens is moved in the vertical direction in order to obtain a predetermined camera shake prevention effect, it is possible to reduce the amount of movement of the lens in the third lens unit.

Based on this, the part of the third lens unit or all of the lenses in the third lens unit are moved in the direction vertical to the optical axis. As a result, it is possible to suppress an increase in diameter of the unit for preventing camera shake. In this way, it is advantageous in size reduction of the optical system as a whole that the lens unit including a lens moved in the direction vertical to the optical axis is provided as the third lens unit.

The lens moved in the direction vertical to the optical axis may be a simple lens or a cemented lens. Furthermore, the number of lenses moved is not limited to one.

In the zoom lens of the present embodiment, it is preferable that following Conditional Expression (10) is satisfied:

$$0.45 \leq DG3T/LT \leq 0.6 \tag{10},$$

where,

DG3T is a distance on the optical axis from the surface closest to the object in the third lens unit to the image plane at the telephoto end; and LT is a distance on the optical axis from the object-side surface top of the lens disposed closest to the object in the first lens unit to the image plane at the telephoto end.

Conditional Expression (10) represents a ratio between the distance on the optical axis from the surface closest to the object in the third lens unit to the image plane at the telephoto end and the distance on the optical axis from the object-side surface top of the lens disposed closest to the object in the first lens unit to the image plane at the telephoto end. By satisfying Conditional Expression (10), it is possible to correct aberration favorably in a high-zoom zoom lens having a small F-number at the telephoto end.

In order to ensure a small F-number at the telephoto end, it is desirable to reduce the diameter of the third lens unit. By making so as not to exceed an upper limit value of Conditional Expression (10), it is possible to reduce the diameter of the third lens unit. Therefore, it is possible to make small the focal length of the third lens unit while correcting aberration in the third lens unit favorably. As a result, it becomes possible to suppress an increase in overall length of the optical system.

By making so as not to fall below a lower limit value of Conditional Expression (10), it is possible to increase the proportion of load of zooming effect in the third lens unit. Thus, it is possible to reduce the proportion of load of zooming effect in the second lens unit, and therefore it is possible to keep low the height of off-axis light rays passing through the second lens unit at the wide angle end. As a result, it becomes possible to suppress an increase in diameter of the optical system as a whole.

In the zoom lens of the present embodiment, it is preferable that following Conditional Expression (11) is satisfied:

$$0.1 \leq DG5T/LT \leq 0.25 \tag{11},$$

where,

DG5T is a distance on the optical axis from an object-side surface top of the lens disposed closest to the object in the fifth lens unit to the image plane at the telephoto end; and LT is the distance on the optical axis from the object-side surface top of the lens disposed closest to the object in the first lens unit to the image plane at the telephoto end.

Conditional Expression (11) represents a ratio between the distance on the optical axis from the object-side surface top of the lens closest to the object in the fifth lens unit to the image plane at the telephoto end and the distance on the optical axis from the object-side surface top of the lens disposed closest to the object in the first lens unit to the image plane at the telephoto end. By satisfying Conditional Expression (11), it is possible to achieve alleviation of distortion at the telephoto end and small-sizing of the optical system.

By making so as not to exceed an upper limit value of Conditional Expression (11), it is possible to prevent an increase in overall length of the optical system and a resulting increase in diameter of the first lens unit. As a result, it is possible to achieve small-sizing of the optical system.

By making so as not to fall below a lower limit value of Conditional Expression (11), it is possible to correct positive distortion at the telephoto end favorably.

In the zoom lens of the present embodiment, it is preferable that following Conditional Expression (12) is satisfied:

$$0.5 \leq (RG41+RG42)/(RG41-RG42) \leq 1.7 \tag{12},$$

where,

RG41 is a radius of curvature of an object-side surface of the lens positioned closest to the object in the fourth lens unit; and RG42 is a radius of curvature of an image-side surface of the lens positioned closest to the image in the fourth lens unit.

Conditional Expression (12) is a conditional expression for the shape of the fourth lens unit as a whole. By satisfying Conditional Expression (12), it is possible to ensure high imaging performance over the entire zoom range and to obtain a zoom lens capable of achieving fast focusing.

By making so as not to exceed an upper limit value of Conditional Expression (12), it is possible to correct field curvature and chromatic aberration favorably over the entire zoom range.

By making so as not to fall below a lower limit value of Conditional Expression (12), it is possible to correct curvature of field and chromatic aberration favorably over the entire zoom range. In addition, by making so as not to fall below a lower limit value, it is possible to prevent the shape of the fourth lens unit from becoming close to a biconvex shape and to suppress an increase in volume and weight of the lens unit. It is preferable that the fourth lens unit is provided as a focusing lens unit. By making so as not to fall below the lower limit value of Conditional Expression (12), it is possible to achieve faster focusing even when focusing is performed with the fourth lens unit.

In the zoom lens of the present embodiment, it is preferable that following Conditional Expression (13) is satisfied:

$$-0.7 \leq (RG51+RG52)/(RG51-RG52) \leq 0.7 \tag{13},$$

where,

RG51 is a radius of curvature of an object-side surface of the lens positioned closest to the object in the fifth lens unit; and RG52 is a radius of curvature of an image-side surface of the lens positioned closest to the image in the fifth lens unit.

Conditional Expression (13) is a conditional expression for the shape of the fifth lens unit as a whole. By satisfying Conditional Expression (13), it is possible to correct curvature of field and chromatic aberration of magnification favorably over the entire zoom range.

In the zoom lens of the present embodiment, it is preferable that following Conditional Expression (14) is satisfied:

$$-2.5 \le fT/ExpT \le 0.3 \quad (14),$$

where, fT is the focal length of the entire zoom lens at the telephoto end; and

ExpT is an exit pupil position with respect to a paraxial imaging plane at the telephoto end.

Conditional Expression (14) is a conditional expression of a ratio between the focal length of the entire zoom lens system and the exit pupil position at the telephoto end. By satisfying Conditional Expression (14), it is possible to achieve alleviation of distortion at the telephoto end and small-sizing of the optical system.

By making so as not to exceed an upper limit value of Conditional Expression (14), it is possible to diminish a diameter increase of the lenses in the lens unit closest to the image and to achieve small-sizing of the optical system as a whole.

By making so as not to fall below a lower limit value of Conditional Expression (14), it is possible to correct positive distortion at the telephoto end favorably.

In the zoom lens of the present embodiment, it is preferable that distances between lens units change at the time of zooming.

In the zoom lens of the present embodiment, it is preferable that each lens unit is moves at the time of zooming.

It is preferable that the first lens unit moves toward the object side at the time of zooming and positioned on the object side at the telephoto end rather than the wide angle end. By doing so, it is possible to enhance zooming effect in the first lens unit and zooming effect in the second lens unit. As a result, a higher zoom in the optical system is easily achieved.

Furthermore, in the second lens unit and the lens units positioned closer to the image than the second lens unit, moving space at the time of zooming is easily secured. Therefore, it becomes possible to reduce the overall length of the optical system in the vicinity of the wide angle end.

In the zoom lens of the present embodiment, it is preferable that the first lens unit includes at least two positive lenses.

The chromatic aberration occurring in the first lens unit is enlarged in the lens units positioned closer to the image than the first lens unit. In this case, it is difficult to sufficiently ensure optical performance at the telephoto end. Therefore, it is necessary to minimize occurrence of chromatic aberration in the first lens unit.

Then, at least two positive lenses are disposed in the first lens unit. By doing so, it is possible to suppress occurrence of chromatic aberration. As a result, it is possible to achieve a high-zoom zooming. Moreover, it is also possible to improve imaging performance at the telephoto end while appropriately keeping the focal length of the first lens unit.

In the zoom lens of the present embodiment, it is preferable that the first lens unit include at least one cemented lens.

Thus, it is possible to correct chromatic aberration even more favorably.

In the zoom lens of the present embodiment, it is preferable that the second lens unit includes an arrangement including a negative lens, a negative lens, and a positive lens in order from the object side.

The second lens unit and the third lens unit are lens units responsible for zooming. In order to reduce the overall length of the optical system, it is necessary to reduce both the focal length of the second lens unit and the focal length of the third lens unit. When reduction of the focal length of the second lens unit is attempted with fewer lenses, various aberrations, in particular, curvature of field and distortion occur significantly, and, in addition, variation in chromatic aberration of magnification at the time of zooming increases. Therefore, it is difficult to ensure good imaging performance over the entire zoom range in a high-zoom zooming.

Then, in the second lens unit, a negative lens, a negative lens, and a positive lens are disposed in order from the object side. By doing so, it is possible to reduce the focal length of the second lens unit while reducing aberration occurring in each lens.

In the zoom lens of the present embodiment, it is preferable that in the second lens unit, a negative lens disposed second from the object side and s positive lens disposed third from the object side are cemented lenses.

The negative lens and the positive lens are provided as cemented lenses, whereby it is possible to correct chromatic aberration of magnification on the wide angle side favorably.

In the zoom lens of the present embodiment, it is preferable that the second lens unit include at least one aspheric lens.

By doing so, it is possible to correct aberration favorably.

In the zoom lens of the present embodiment, it is more preferable that the lens positioned closest to the object in the second lens unit has an aspheric surface.

By using an aspheric surface in the lens closest to the object, it is possible to correct off-axis aberration on the wide angle side, in particular, coma, curvature of field, and distortion effectively.

In the zoom lens of the present embodiment, it is preferable that the third lens unit include an arrangement including a positive lens, a positive lens, and a cemented lens in order from the object side and that the cemented lens include a negative lens and a positive lens in order from the object side.

The third lens unit is a main lens unit responsible for zooming. Therefore, in the third lens unit, it is necessary to minimize aberration while reducing the focal length. Then, the third lens unit includes an arrangement of a positive lens, a positive lens, and a cemented lens in order from the object side, and the cemented lens includes a negative lens and a positive lens in order from the object side. By doing so, it is possible to correct spherical aberration, coma, and longitudinal chromatic aberration favorably. As a result, high imaging performance is easily ensured over the entire zoom range.

In the zoom lens of the present embodiment, it is more preferable that the diaphragm (aperture stop) is positioned at the front or the back (on the object side or the image side) of the third lens unit.

By positioning the diaphragm at the front or the back of the third lens unit, it is possible to reduce aberration occurring in the third lens unit and it is also possible to reduce the focal length of the third lens unit. Therefore, a high-zoom zooming is easily achieved, and high imaging performance is easily ensured over the entire zoom range.

In the zoom lens of the present embodiment, it is more preferable that the third lens unit include at least one aspheric lens.

By doing so, it is possible to correct spherical aberration more, and therefore it becomes possible to increase imaging performance over the entire zoom range.

In the zoom lens of the present embodiment, it is preferable that the fourth lens unit is a focusing lens unit.

As described above, the zoom lens of the present embodiment includes an arrangement in which refractive powers are arranged in the order of a positive refractive power, a negative refractive power, a positive refractive power, a negative refractive power, and a positive refractive power, from the object side. Therefore, because of such an arrangement, the fourth lens unit can have a smaller effective aperture than the other lens units. As a result, it is possible to reduce the weight of the focusing lens unit.

Moreover, in the fourth lens unit, it is possible to suppress occurrence of axial aberration. Therefore, by using the fourth lens unit as a focus lens unit, it is possible to ensure high imaging performance even at a time of focusing on a close object.

Furthermore, in the fourth lens unit, it is possible to increase focus sensitivity. Therefore, at a time of focusing from an infinite object to a close object or at a time of focusing from the close object to the infinite object, it is possible to reduce the amount of movement of the fourth lens unit. Focus sensitivity refers to the amount of change in focus position when a certain lens unit moves on the optical axis.

In the zoom lens of the present embodiment, it is preferable that the fourth lens unit is a wobbling unit.

In the zoom lens of the present embodiment, the fifth lens unit having a positive focal length is disposed on the image side of the fourth lens unit having a negative focal length. Thus, even when the fourth lens unit is moved to perform wobbling, it is possible to reduce a change in height of off-axis principal rays incident on the fourth lens unit. As a result, it is possible to suppress magnification variation at the time of wobbling.

Then, by moving the fourth lens unit at the time of wobbling, it is possible to obtain high-quality moving images always in focus.

In the zoom lens of the present embodiment, it is preferable that the fourth lens unit include at least one negative lens and at least one positive lens.

By doing so, it is possible to minimize chromatic aberration occurring in the fourth lens unit. Furthermore, in each zoom state, it is possible to reduce variation in axial chromatic aberration from focusing on an infinite object to focusing on a close object.

In the zoom lens of the present embodiment, it is preferable that the fourth lens unit include one cemented lens including a negative lens and a positive lens.

By doing so, it is possible to achieve small-sizing of the fourth lens unit and to minimize chromatic aberration occurring in the fourth lens unit. Furthermore, in each zoom state, it is possible reduce variation in longitudinal chromatic aberration from focusing on an infinite the object to focusing on the close object.

In the zoom lens of the present embodiment, it is preferable that the fifth lens unit include at least one negative lens and at least one positive lens.

By doing so, it is possible to reduce occurrence of chromatic aberration of magnification over the entire zoom range. As a result, it is possible to achieve a high-performance zoom lens. Furthermore, because of the inclusion of a negative lens, it is possible to reduce occurrence of curvature of field over the entire zoom range. As a result, it is possible to achieve a high-performance zoom lens.

In the zoom lens of the present embodiment, it is preferable that the fifth lens unit include one cemented lens including a negative lens and a positive lens.

By doing so, it is possible to achieve small-sizing of the fifth lens unit and it is also possible to further reduce occurrence of chromatic aberration of magnification over the entire zoom range. Furthermore, since the fifth lens unit includes a negative lens, it is possible to reduce occurrence of curvature of field over the entire zoom range. As a result, it is possible to achieve a high-performance zoom lens.

In the zoom lens of the present embodiment, it is preferable that the fifth lens unit include at least one aspheric lens.

By doing so, it is possible to correct off-axis aberration more effectively.

An image pickup apparatus of the present embodiment includes the aforementioned zoom lens and an image pickup element which converts an image formed by the zoom lens to an electrical signal.

According to the image pickup apparatus of the present embodiment, it is possible to achieve photographing of a wide view and a close-up photographing of a distant at high resolution. Furthermore, it is possible to acquire a bright and stabilized image even with a dark subject.

A zoom lens of a second embodiment includes, in order from an object side, a first lens unit having a positive focal length, a second lens unit having a negative focal length, a third lens unit having a positive focal length, a fourth lens unit having a negative focal length, and a fifth lens unit having a positive focal length, and the third lens unit has an arrangement in which a first lens having a positive focal length, a second lens having a positive focal length, a third lens having a negative focal length, and a fourth lens having a positive focal length are disposed in order from the object side.

In the zoom lens of the present embodiment, arrangement of refractive powers are made such that a positive refractive power, a negative refractive power, a positive refractive power, a negative refractive power, and a positive refractive power, from the object side. As a result, the arrangement of refractive powers is asymmetric between the object side and the image side with the third lens unit at the center.

Because of the inclusion of such an arrangement, it is possible to ensure a wide angle of view at the wide angle end, to ensure a large zoom ratio, and to ensure a small F-number at the telephoto end. For example, it is possible to ensure an angle of view of 80 degrees or more at the wide angle end and to ensure a zoom ratio of five times or more.

Furthermore, because of the inclusion of such an arrangement, it is possible to achieve shortening an overall length of the optical system and making a diameter of the optical system small and, in addition, it is possible to correct various aberrations favorably, in particular, off-axis aberration at the wide angle end and axial aberration at the telephoto end, over the entire zoom range.

Moreover, the diameter of the first lens unit is largest in the optical system. Since the fourth lens unit has a negative focal length and the fifth lens unit has a positive focal length as described above, a magnifying optical system can be configured with the fourth lens unit and the fifth lens unit. Thus, it is possible to reduce the diameter of the first lens unit. As a result, size reduction of the optical system as a whole can be achieved.

Then, in the zoom lens of the present embodiment, the third lens unit has a first predetermined lens arrangement. In the first predetermined lens arrangement, four lenses are disposed in the order of a lens having a positive focal length, a lens having a positive focal length, a lens having a negative focal length, and a lens having a positive focal length, from the object side.

In a high-zoom zoom lens, when the F-number is set small even at the telephoto end, it is necessary to correct various aberrations, favorably in particular, spherical aberration, curvature of field, and chromatic aberration over the entire zoom range. In order to do so, the lens arrangement in the third lens unit is preferably set to be the first predetermined lens arrangement. "High-zoom" means that "the zoom ratio is large".

The third lens unit is a main lens unit responsible for zooming. Then, by allowing the third lens unit to have the first predetermined lens arrangement, it is possible to correct spherical aberration, curvature of field, and chromatic aberration favorably. As a result, high imaging performance is easily ensured over the entire zoom range.

In the zoom lens of the present embodiment, it is preferable that an air space between the first lens unit and the second lens unit widens, an air space between the second lens unit and the third lens unit narrows, an air space between the third lens unit and the fourth lens unit widens, and an air space between the fourth lens unit and the fifth lens unit widens, at the time of zooming from the wide angle end to the telephoto end.

By doing so, since it is possible to perform zooming without reducing the magnification in each lens unit, high zooming efficiency can be obtained.

In the zoom lens of the present embodiment, it is preferable that following Conditional Expression (4) is satisfied.

Since the technical significance of conditional expressions (4) has already been described, the description thereof is omitted.

In the zoom lens of the present embodiment, it is preferable that following Conditional Expression (A2) is satisfied:

$$45 \leq vdG3P \quad (A2),$$

where, vdG3P is a smallest Abbe number, of Abbe numbers on d-line of the positive lenses disposed in the third lens unit.

Conditional Expression (A2) is a conditional expression for the smallest Abbe number, of Abbe numbers on the d-line of the positive lenses disposed in the third lens unit. In the third lens unit, it is necessary to reduce the focal length in order to reduce the overall length of the optical system. However, when the focal length of the third lens unit is reduced, occurrence of longitudinal chromatic aberration on the telephoto end side will be an issue.

Then, by satisfying Conditional Expression (A2), it is possible to make the dispersion low (increase the Abbe number) for the lens having a positive focal length that is disposed in the third lens unit having a positive focal length. As a result, it is possible to correct longitudinal chromatic aberration favorably.

By making so as not to fall below a lower limit value of Conditional Expression (A2), it is possible to correct longitudinal chromatic aberration favorably while reducing the overall length of the optical system by reducing the focal length of the third lens unit.

In the zoom lens of the present embodiment, it is preferable that following Conditional Expression (5) is satisfied.

Since the technical significance of conditional expressions (5) has already been described, the description thereof is omitted.

In the zoom lens of the present embodiment, it is preferable that following Conditional Expression (6) is satisfied.

Since the technical significance of conditional expressions (6) has already been described, the description thereof is omitted.

In the zoom lens of the present embodiment, it is preferable that following Conditional Expression (7) is satisfied.

Since the technical significance of conditional expressions (7) has already been described, the description thereof is omitted.

In the zoom lens of the present embodiment, it is preferable that following Conditional Expression (8) is satisfied.

Since the technical significance of conditional expressions (8) has already been described, the description thereof is omitted.

In a case where the aperture stop is disposed in the third lens unit, the aperture stop moves together with the third lens unit. In this case, the surface closest to the object in the third lens unit corresponds to the aperture stop. In a case where the aperture stop is not disposed in the third lens unit, the aperture stop moves alone. In this case, the surface closest to the object in the third lens unit corresponds to the object-side surface of the lens disposed closest to the object in the third lens unit. Furthermore, the case where the aperture stop is disposed in the third lens unit includes a case where the aperture stop is disposed closest to the object in the third lens unit.

In the zoom lens of the present embodiment, it is preferable that following Conditional Expression (10) is satisfied.

Since the technical significance of conditional expressions (10) has already been described, the description thereof is omitted.

In the zoom lens of the present embodiment, it is preferable that following Conditional Expression (A8) is satisfied:

$$1.5 \leq DG3L12/DG3L23 \leq 70 \quad (A8),$$

where,

DG3L12 is a distance on the optical axis of an air space between a lens disposed first from the object side and a lens disposed second from the object side in the third lens unit; and DG3L23 is a distance on the optical axis of an air space between a lens disposed second from the object side and a lens disposed third from the object side in the third lens unit.

Conditional Expression (A8) is a conditional expression for the air space between the lenses in the third lens unit. By satisfying Conditional Expression (A8), it is possible to obtain a zoom lens having a high zoom ratio with reduced degradation in imaging performance while correcting a spherical aberration and coma favorably. As used herein, degradation in imaging performance refers to degradation in a case where decentration due to a production error occurs in the lenses in the third lens unit (hereinafter referred to as "degradation in imaging performance due to decentration").

By making so as not to exceed an upper limit value of Conditional Expression (A8), it is possible to reduce the thickness of the third lens unit. Therefore, it becomes easy to ensure sufficiently the amount of movement of the third lens unit at the time of zooming. As a result, it is possible to obtain a zoom lens having a high zoom ratio.

By making so as not to fall below a lower limit value of Conditional Expression (A8), it is possible to bend light rays gently with the first lens and the second lens from the object side. Therefore, it is possible to reduce degradation in imaging performance due to decentration while correcting spherical aberration and coma favorably.

In the zoom lens of the present embodiment, it is preferable that following Conditional Expression (A9) is satisfied:

$$0.35 \leq DG3L1F2R/DG3 \leq 0.6 \quad (A9),$$

where,

DG3L1F2R is a distance on the optical axis from an object-side surface top of a lens disposed closest to the object to an image-side surface top of the lens disposed second from the object side in the third lens unit; and DG3 is a distance on the optical axis from a surface closest to the object to a surface closest to the image in the third lens unit.

Conditional Expression (A9) represents the relation between the distance on the optical axis from the object-side surface top of the lens disposed closest to the object to the image-side surface top of the lens disposed second from the object side in the third lens unit and the distance on the optical axis from the surface closest to the object to the surface closest to the image in the third lens unit.

By satisfying Conditional Expression (A9), it is possible to obtain a zoom lens having a high zoom ratio with reduced degradation in imaging performance due to decentration while correcting spherical aberration and coma favorably.

By making so as not to exceed an upper limit value of Conditional Expression (A9), it is possible to reduce the thickness of the third lens unit. Therefore, it becomes easy to ensure sufficiently the amount of movement of the third lens unit at the time of zooming. As a result, it is possible to obtain a zoom lens having a high zoom ratio. In a case where the aperture stop is disposed closest to the object in the third lens unit and the aperture stop is moved integrally with the third lens unit, the thickness of the third lens unit is the thickness including the aperture stop.

By making so as not to fall below a lower limit value of Conditional Expression (A9), it is possible to bend light rays gently with the first lens and the second lens from the object side. Therefore, it is possible to reduce degradation in imaging performance due to decentration while correcting spherical aberration and coma favorably.

In the zoom lens of the present embodiment, it is preferable that following Conditional Expression (A10) is satisfied:

$$0.85 \leq f1G/fT \leq 1.65 \quad (A10),$$

where, f1G is a focal length of the first lens unit; and fT is the focal length of the entire zoom lens at the telephoto end.

Conditional Expression (A10) represents the ratio between the focal length of the first lens unit and the focal length of the entire zoom lens system at the telephoto end. By satisfying Conditional Expression (A10), it is possible to reduce the overall length of the optical system and to obtain a zoom lens having good imaging performance.

By making so as not to exceed an upper limit value of Conditional Expression (A10), it is possible to reduce the focal length of the first lens unit. As a result, it is possible to reduce the overall length of the optical system.

By making so as not to fall below a lower limit value of Conditional Expression (A10), the focal length of the first lens unit becomes large. In this case, since various aberrations occurring in the first lens unit are reduced, it is possible to obtain a zoom lens having good imaging performance.

In the zoom lens of the present embodiment, it is preferable that following Conditional Expression (A11) is satisfied:

$$0.2 \leq (RG21+RG22)/(RG21-RG22) \leq 1.8 \quad (A11),$$

where,

RG21 is a radius of curvature of an object-side surface of a lens positioned closest to the object in the second lens unit; and RG22 is a radius of curvature of an image-side surface of a lens positioned closest to the image in the second lens unit.

Conditional Expression (A11) is a conditional expression for the shape of the second lens unit as a whole. By satisfying Conditional Expression (A11), it is possible to obtain a high-zoom zooming with off-axis aberration at the wide angle end corrected favorably.

By making so as not to exceed an upper limit value of Conditional Expression (A11), it is possible to correct off-axis aberration at the wide angle end favorably.

By making so as not to fall below a lower limit value of Conditional Expression (A11), it is possible to dispose the first lens unit and the second lens unit closer to each other at the wide angle end. Therefore, it is possible to have a large zoom ratio in the second lens unit. As a result, a high-zoom zooming is easily achieved.

In the zoom lens of the present embodiment, it is preferable that following Conditional Expression (14) is satisfied.

Since the technical significance of conditional expressions (14) has already been described, the description thereof is omitted.

It is preferable that the zoom lens of the present embodiment include a moving lens which moves in a direction vertical to the optical axis and following Conditional Expression (9) is satisfied.

A part of a lens unit is provided as moving lens and the moving lens is moved in the direction vertical to the optical axis, whereby the camera shake-preventing function can be imparted to the zoom lens.

Since the technical significance of conditional expressions (9) has already been described, the description thereof is omitted.

The moving lens may be a simple lens or a cemented lens. Furthermore, the number of moving lens is not limited to one.

In the zoom lens of the present embodiment, it is preferable that a lens disposed in the third lens unit moves in the direction vertical to the optical axis.

The third lens unit is a lens unit in which an increase in lens diameter is most suppressed in the optical system. Thus, it is also possible to suppress an increase in lens weight. Based on this, a part of the third lens unit or all of the lenses in the third lens unit are moved in the direction vertical to the optical axis. In this way, it is advantageous that the lens unit including a lens moved in the direction vertical to the optical axis is provided as the third lens unit, in that the camera shake prevention functions.

Moreover, when a lens is moved in the direction vertical to the optical axis, the position of axial principal rays on the image plane changes. The third lens unit allows for a large amount of change in this position. Therefore, when a lens is moved in the vertical direction in order to obtain a predetermined camera shake prevention effect, it is possible to reduce the amount of movement of the lens in the third lens unit.

Based on this, the part of the third lens unit or all of the lenses in the third lens unit are moved in the direction vertical to the optical axis. As a result, it is possible to suppress an increase in diameter of the unit for preventing camera shake. In this way, it is advantageous in size reduction of the optical system as a whole that the lens unit including a lens moved in the direction vertical to the optical axis is provided as the third lens unit.

The lens moved in the direction vertical to the optical axis may be a simple lens or a cemented lens. Furthermore, the number of lenses moved is not limited to one.

In the zoom lens of the present embodiment, it is preferable that the lens positioned closest to the image in the third lens unit is a lens having a positive focal length, the lens positioned closest to the image in the third lens unit moves in the direction vertical to the optical axis, and lenses having a negative focal length are disposed in both on the object side and on the image side of the lens positioned closest to the image in the third lens unit.

By moving the lens having a positive focal length that is positioned closest to the image in the third lens unit in the direction vertical to the optical axis, it is possible to prevent camera shake. In this case, it is preferable that lenses having a negative focal length are disposed in both on the object side and on the image side of the lens positioned closest to the image.

The fourth lens unit is positioned on the image side of the third lens unit. Thus, the lens having a negative focal length that is disposed on the image side of the lens positioned closest to the image in the third lens unit is a lens positioned closest to the object in the fourth lens unit.

By doing so, it is possible to increase a change in position of the principal rays on the image plane when the lens for preventing camera shake, that is, the lens positioned closest to the image in the third lens unit is moved. Thus, it is possible to reduce the amount of movement when ensuring predetermined steps, and therefore it is possible to achieve small-sizing of the optical system as a whole. Then even when the lens is moved at the time of camera shake prevention, it is possible to suppress degradation in imaging performance. The magnitude of camera shake correction effect is expressed in steps. With a larger number of steps, camera shake can be prevented even with slower shutter speed.

Furthermore, the lens positioned closest to the image in the third lens unit is the lens positioned at the end of the lens unit. By using this lens for preventing camera shake, it is possible to simplify the camera shake-preventing unit. Therefore, using the lens positioned closest to the image in the third lens unit for preventing camera shake is also effective in size reduction of the lens as a whole.

In the zoom lens of the present embodiment, it is preferable that a predetermined lens disposed in the third lens unit moves in the direction vertical to the optical axis and following Conditional Expression (A14) is satisfied:

$$0.04 \le ((1-\beta ISW) \times \beta RW))/fW \le 0.15 \quad (A14),$$

where, $\beta ISW$ is a lateral magnification at the wide angle end of the predetermined lens;

$\beta RW$ is a lateral magnification at the wide angle end of all of the lens units positioned closer to the image than the predetermined lens; and fW is the focal length of the entire zoom lens at the wide angle end.

Conditional Expression (A14) indicates the relation of the lateral magnification at the wide angle end of the predetermined lens, the lateral magnification at the wide angle end of all of the lens units positioned closer to the image than the predetermined lens, and the focal length of the entire zoom lens system at the wide angle end. By satisfying Conditional Expression (A14), it is possible to obtain a compact zoom lens with good imaging performance and having the camera shake-preventing function.

By making so as not to exceed an upper limit value of Conditional Expression (A14), it is possible to reduce the lateral magnification of the lens for preventing camera shake, that is, the lens unit as a whole positioned closer to the image side than the predetermined lens. Therefore, satisfactory correction of various aberrations is facilitated. As a result, it is possible to obtain a zoom lens with good imaging performance.

By making so as not to fall below a lower limit value of Conditional Expression (A14), the position of the principal rays on the image plane changes significantly at the time of camera shake prevention, that is, when the predetermined lens is moved in the direction vertical to the optical axis. Therefore, the camera shake-preventing function corresponding to the predetermined steps can be achieved with a small amount of movement. Thus, it is possible to achieve small-sizing of the camera shake-preventing unit. In this way, making so as not to fall below the lower limit value of Conditional Expression (A14) leads to a smaller diameter of the lens.

The predetermined lens may be a simple lens or a cemented lens. Furthermore, the number of predetermined lenses is not limited to one.

In the zoom lens of the present embodiment, it is preferable that a lens disposed in the third lens unit moves in the direction vertical to the optical axis and following Conditional Expression (A15) is satisfied:

$$-3 \le fG3R2/fG3R1 \le -0.5 \quad (A15),$$

where, fG3R1 is a focal length of a lens disposed closest to the image in the third lens unit; and fG3R2 is a focal length of a lens second from the image side in the third lens unit.

Conditional Expression (A15) represents a relation in focal length between two lenses disposed on the image side in the third lens unit. By satisfying Conditional Expression (A15), it is possible to reduce the diameter of the lens and to prevent degradation in the prevention performance at the time of camera shake prevention when camera shake prevention is performed with the lens disposed closest to the image in the third lens unit.

By making so as not to exceed an upper limit value of Conditional Expression (A15), the position of the principal rays on the image plane changes significantly at the time of camera shake prevention, that is, when the lens is moved in the direction vertical to the optical axis. Therefore, the camera shake-preventing function corresponding to predetermined steps can be achieved with a small amount of movement. Thus, it is possible to achieve small-sizing of the camera shake-preventing unit. In this way, making so as not to exceed the upper limit value of Conditional Expression (A15) leads to a smaller diameter of the lens.

By making so as not to fall below a lower limit value of Conditional Expression (A15), it is possible to prevent an increase in aberration in the lens moved in the direction vertical to the optical axis at the time of camera shake prevention. Thus, it is possible to correct spherical aberration and image plane tilt favorably at the time of camera shake prevention. As a result, it is possible to prevent degradation in imaging performance at the time of camera shake prevention.

The lens moved in the direction vertical to the optical axis may be a simple lens or a cemented lens. Furthermore, the number of lenses moved is not limited to one.

In the zoom lens of the present embodiment, it is preferable that distances between lens units change at the time of zooming.

In the zoom lens of the present embodiment, it is preferable that each lens unit is moves at the time of zooming.

It is preferable that the first lens unit moves toward the object side at the time of zooming and positioned on the object side at the telephoto end rather than the wide angle end. By doing so, it is possible to enhance zooming effect in the first lens unit and zooming effect in the second lens unit. As a result, a higher zoom in the optical system is easily achieved.

Furthermore, in the second lens unit and the lens units positioned closer to the image than the second lens unit, moving space at the time of zooming is easily secured. Therefore, it becomes possible to reduce the overall length of the optical system in the vicinity of the wide angle end.

In the zoom lens of the present embodiment, it is preferable that the first lens unit includes at least two positive lenses.

The chromatic aberration occurring in the first lens unit is enlarged in the lens units positioned closer to the image than the first lens unit. In this case, it is difficult to sufficiently ensure optical performance at the telephoto end. Therefore, it is necessary to minimize occurrence of chromatic aberration in the first lens unit.

Then, at least two positive lenses are disposed in the first lens unit. By doing so, it is possible to suppress occurrence of chromatic aberration. As a result, it is possible to achieve a high-zoom zooming. Moreover, it is also possible to improve imaging performance at the telephoto end while appropriately keeping the focal length of the first lens unit.

In the zoom lens of the present embodiment, it is preferable that the first lens unit include at least one cemented lens.

Thus, it is possible to correct chromatic aberration even more favorably.

In the zoom lens of the present embodiment, it is preferable that the second lens unit includes an arrangement including a negative lens, a negative lens, and a positive lens in order from the object side.

The second lens unit and the third lens unit are lens units responsible for zooming. In order to reduce the overall length of the optical system, it is necessary to reduce both the focal length of the second lens unit and the focal length of the third lens unit. When reduction of the focal length of the second lens unit is attempted with fewer lenses, various aberrations, in particular, curvature of field and distortion occur significantly, and, in addition, variation in chromatic aberration of magnification at the time of zooming increases. Therefore, it is difficult to ensure good imaging performance over the entire zoom range in a high-zoom zooming.

Then, in the second lens unit, a negative lens, a negative lens, and a positive lens are disposed in order from the object side. By doing so, it is possible to reduce the focal length of the second lens unit while reducing aberration occurring in each lens.

In the zoom lens of the present embodiment, it is preferable that in the second lens unit, a negative lens disposed second from the object side and s positive lens disposed third from the object side are cemented lenses.

The negative lens and the positive lens are provided as cemented lenses, whereby it is possible to correct chromatic aberration of magnification on the wide angle side favorably.

In the zoom lens of the present embodiment, it is preferable that the second lens unit include at least one aspheric lens.

By doing so, it is possible to correct aberration favorably.

In the zoom lens of the present embodiment, it is more preferable that the lens positioned closest to the object in the second lens unit has an aspheric surface.

By using an aspheric surface in the lens closest to the object, it is possible to correct off-axis aberration on the wide angle side, in particular, coma, curvature of field, and distortion effectively.

In the zoom lens of the present embodiment, it is preferable that the lens having a negative focal length in the first predetermined lens arrangement is a lens included in the cemented lens.

By doing so, it is possible to correct chromatic aberration favorably.

In the zoom lens of the present embodiment, it is preferable that the cemented lens is composed of a lens having a negative focal length and a lens having a positive focal length in order from the object side.

By composing the cemented lens with a lens having a negative focal length and a lens having a positive focal length in order from the object side, it becomes possible to correct chromatic aberration and curvature of field even more favorably.

In the zoom lens of the present embodiment, it is preferable that the third lens unit include an arrangement including a positive lens, a positive lens, and a cemented lens in order from the object side and that the cemented lens include a negative lens and a positive lens in order from the object side.

The third lens unit is a main lens unit responsible for zooming. Therefore, in the third lens unit, it is necessary to minimize aberration while reducing the focal length. Then, the third lens unit includes an arrangement of a positive lens, a positive lens, and a cemented lens in order from the object side, and the cemented lens includes a negative lens and a positive lens in order from the object side. By doing so, it is possible to correct spherical aberration, coma, and longitudinal chromatic aberration favorably. As a result, high imaging performance is easily ensured over the entire zoom range.

In the zoom lens of the present embodiment, it is more preferable that the diaphragm (aperture stop) is positioned at the front or the back (on the object side or the image side) of the third lens unit.

By positioning the diaphragm at the front or the back of the third lens unit, it is possible to reduce aberration occurring in the third lens unit and it is also possible to reduce the focal length of the third lens unit. Therefore, a high-zoom zooming is easily achieved, and high imaging performance is easily ensured over the entire zoom range.

In the zoom lens of the present embodiment, it is more preferable that the third lens unit include at least one aspheric lens.

By doing so, it is possible to correct spherical aberration more, and therefore it becomes possible to increase imaging performance over the entire zoom range.

In the zoom lens of the present embodiment, it is preferable that the lens used for preventing camera shake is the lens positioned closest to the object or the lens closest to the image in the third lens unit.

By using the lens positioned at the end of the lens unit for preventing camera shake, it is possible to simplify the camera shake-preventing unit.

In the zoom lens of the present embodiment, it is preferable that the lens used for preventing camera shake have at least one cemented lens, or at least one lens having a positive focal length and at least one lens having a negative focal length.

Chromatic aberration occurs by moving the lens. Then, in this manner, it is possible to prevent image quality degradation due to the effect of occurrence of chromatic aberration even when the lens is moved.

In the zoom lens of the present embodiment, it is preferable that the lens used for preventing camera shake is a cemented lens having a positive focal length.

Chromatic aberration occurs by moving the lens. Then, by providing the lens moved as a cemented lens, it is possible to prevent image quality degradation due to the effect of occurrence of chromatic aberration even when the lens is moved.

In the zoom lens of the present embodiment, it is preferable that a lens unit as a whole function as a camera shake-preventing lens unit.

In this case, since a variety of aberrations are successfully corrected in the lens unit, it is possible to enhance imaging performance when camera shake prevention is performed.

In the zoom lens of the present embodiment, it is preferable that the fourth lens unit is a focusing lens unit.

As described above, the zoom lens of the present embodiment includes an arrangement in which refractive powers are arranged in the order of a positive refractive power, a negative refractive power, a positive refractive power, a negative refractive power, and a positive refractive power, from the object side. Therefore, because of such an arrangement, the fourth lens unit can have a smaller effective aperture than the other lens units. As a result, it is possible to reduce the weight of the focusing lens unit.

Moreover, in the fourth lens unit, it is possible to suppress occurrence of axial aberration. Therefore, by using the fourth lens unit as a focus lens unit, it is possible to ensure high imaging performance even at a time of focusing on a close object.

Furthermore, in the fourth lens unit, it is possible to increase focus sensitivity. Therefore, at a time of focusing from an infinite object to a close object or at a time of focusing from the close object to the infinite object, it is possible to reduce the amount of movement of the fourth lens unit. Focus sensitivity refers to the amount of change in focus position when a certain lens unit moves on the optical axis.

In the zoom lens of the present embodiment, it is preferable that the fourth lens unit is a wobbling unit.

In the zoom lens of the present embodiment, the fifth lens unit having a positive focal length is disposed on the image side of the fourth lens unit having a negative focal length. Thus, even when the fourth lens unit is moved to perform wobbling, it is possible to reduce a change in height of off-axis principal rays incident on the fourth lens unit. As a result, it is possible to suppress magnification variation at the time of wobbling.

Then, by moving the fourth lens unit at the time of wobbling, it is possible to obtain high-quality moving images always in focus.

In the zoom lens of the present embodiment, it is preferable that the fourth lens unit include at least one negative lens and at least one positive lens.

By doing so, it is possible to minimize chromatic aberration occurring in the fourth lens unit. Furthermore, in each zoom state, it is possible to reduce variation in axial chromatic aberration from focusing on an infinite object to focusing on a close object.

In the zoom lens of the present embodiment, it is preferable that the fourth lens unit include one cemented lens including a negative lens and a positive lens.

By doing so, it is possible to achieve small-sizing of the fourth lens unit and to minimize chromatic aberration occurring in the fourth lens unit. Furthermore, in each zoom state, it is possible reduce variation in longitudinal chromatic aberration from focusing on an infinite the object to focusing on the close object.

In the zoom lens of the present embodiment, it is preferable that the fifth lens unit include at least one negative lens and at least one positive lens.

By doing so, it is possible to reduce occurrence of chromatic aberration of magnification over the entire zoom range. As a result, it is possible to achieve a high-performance zoom lens. Furthermore, because of the inclusion of a negative lens, it is possible to reduce occurrence of curvature of field over the entire zoom range. As a result, it is possible to achieve a high-performance zoom lens.

In the zoom lens of the present embodiment, it is preferable that the fifth lens unit include one cemented lens including a negative lens and a positive lens.

By doing so, it is possible to achieve small-sizing of the fifth lens unit and it is also possible to further reduce occurrence of chromatic aberration of magnification over the entire zoom range. Furthermore, since the fifth lens unit includes a negative lens, it is possible to reduce occurrence of curvature of field over the entire zoom range. As a result, it is possible to achieve a high-performance zoom lens.

In the zoom lens of the present embodiment, it is preferable that the fifth lens unit include at least one aspheric lens.

By doing so, it is possible to correct off-axis aberration more effectively.

An image pickup apparatus of the present embodiment includes the aforementioned zoom lens and an image pickup element which converts an image formed by the zoom lens to an electrical signal.

According to the image pickup apparatus of the present embodiment, it is possible to achieve photographing of a wide view and a close-up photographing of a distant at high resolution. Furthermore, it is possible to acquire a bright and stabilized image even with a dark subject.

A zoom lens of a third embodiment includes, in order from the object side, a first lens unit having a positive focal length, a second lens unit having a negative focal length, a third lens unit having a positive focal length, a fourth lens unit having a negative focal length, and a fifth lens unit having a positive focal length, and the third lens unit includes an arrangement in which a lens having a positive focal length, a lens having a positive focal length, and a lens having a negative focal length are disposed in order from the object side, and the lens having a negative focal length in the third lens unit is a cemented lens including a lens having a negative focal length and a lens having a positive focal length in order from the object side, and the cemented lens is a meniscus-shaped lens having a convex surface directed toward the object side, and a lens unit positioned closest to the image includes an arrangement in which a lens having a negative focal length and a lens having a positive focal length are disposed in order from the object side or an arrangement in which a cemented lens including a lens having a negative focal length and a lens having a positive focal length cemented together in order from the object side is disposed, and a lens unit disposed second from the image side with an air space interposed includes an arrangement in which a lens having a negative focal length and a lens having a positive focal length are disposed in order from the object side or an arrangement in which a cemented lens including a lens having a negative focal length and a lens having a positive focal length cemented together in order from the object side is disposed.

In the zoom lens of the present embodiment, arrangement of refractive powers are made such that a positive refractive power, a negative refractive power, a positive refractive power, a negative refractive power, and a positive refractive power, from the object side. As a result, the arrangement of refractive powers is asymmetric between the object side and the image side with the third lens unit at the center.

Because of the inclusion of such an arrangement, it is possible to ensure a wide angle of view at the wide angle end, to ensure a large zoom ratio, and to ensure a small F-number at the telephoto end. For example, it is possible to ensure an angle of view of 80 degrees or more at the wide angle end and to ensure a zoom ratio of five times or more.

Furthermore, because of the inclusion of such an arrangement, it is possible to achieve shortening an overall length of the optical system and making a diameter of the optical system small and, in addition, it is possible to correct various aberrations favorably, in particular, off-axis aberration at the wide angle end and axial aberration at the telephoto end, over the entire zoom range.

Moreover, the diameter of the first lens unit is largest in the optical system. Since the fourth lens unit has a negative focal length and the fifth lens unit has a positive focal length as described above, a magnifying optical system can be configured with the fourth lens unit and the fifth lens unit. Thus, it is possible to reduce the diameter of the first lens unit. As a result, size reduction of the optical system as a whole can be achieved.

Then, in the zoom lens of the present embodiment, the third lens unit has an arrangement in which a lens having a positive focal length, a lens having a positive focal length, and a lens having a negative focal length are disposed in order from the object side, and the lens having a negative focal length in the third lens unit is a cemented lens including a lens having a negative focal length and a lens having a positive focal length in order from the object side, and the cemented lens is a meniscus-shaped lens having a convex surface directed toward the object side, and a lens unit positioned closest to the image includes an arrangement in which a lens having a negative focal length and a lens having a positive focal length are disposed in order from the object side or an arrangement in which a cemented lens including a lens having a negative focal length and a lens having a positive focal length cemented together in order from the object side is disposed, and a lens unit disposed second from the image side with an air space interposed includes an arrangement in which a lens having a negative focal length and a lens having a positive focal length are disposed in order from the object side or an arrangement in which a cemented lens including a lens having a negative focal length and a lens having a positive focal length cemented together in order from the object side is disposed.

The third lens unit has a second predetermined lens arrangement. In the second predetermined lens arrangement, three lenses are disposed in the order of a lens having a positive focal length, a lens having a positive focal length, and a lens having a negative focal length, from the object side. By allowing the third lens unit to have the second predetermined lens arrangement, it is possible to moderate the bending of light rays at the lens surface. As a result, it is possible to obtain a zoom lens in which various aberrations are corrected favorably.

In the second predetermined lens arrangement, two lenses are disposed in the order of a lens having a positive focal length and a lens having a positive focal length, from the object side. Because of the inclusion of such a lens arrangement, it is possible to bend light rays gently while the principal point of the optical system as a whole is positioned closer to the object. Thus, it is possible to suppress occurrence of various aberrations.

The lens having a negative focal length in the second predetermined lens arrangement is a cemented lens including a lens having a negative focal length and a lens having a positive focal length in order from the object side. Thus, it is possible to correct chromatic aberration occurring in the two lenses having a positive focal length favorably. As a result, a zoom lens with good imaging performance can be obtained.

Furthermore, a lens having a negative focal length and a lens having a positive focal length are cemented in order from the object side to form the cemented lens, whereby it is possible to moderate the bending of light rays due to the lens having a negative focal length. Therefore, occurrence of various aberrations is suppressed.

Furthermore, the cemented lens is a meniscus-shaped lens, whereby it is possible to moderate the bending of light rays due to the lens having a negative focal length. Therefore, it is possible to suppress an increase in diameter of the lens positioned closer to the image side than the cemented lens. As a result, it becomes possible to achieve small-sizing of the optical system and to perform satisfactory aberration correction.

A lens unit positioned closest to the image and a lens unit disposed second from the image side with an air space interposed include an arrangement (I) or (II) below.

(I) An arrangement in which a lens having a negative focal length and a lens having a positive focal length are disposed in order from the object side.

(II) An arrangement in which a cemented lens including a lens having a negative focal length and a lens having a positive focal length cemented together in order from the object side is disposed.

Because of the inclusion of such an arrangement, it is possible to correct chromatic aberration of magnification at the wide angle end favorably. As a result, it is possible to obtain a zoom lens with good imaging performance.

In the arrangement (I) or (II), two lenses are disposed in the order of a lens having a negative focal length and a lens having a positive focal length, from the object side. By disposing two lenses in this manner, it is possible to gently refract light rays. Therefore, it is possible to reduce occurrence of various aberrations over the entire zoom range.

In the zoom lens of the present embodiment, it is preferable that an air space between the first lens unit and the second lens unit widens, an air space between the second lens unit and the third lens unit narrows, an air space between the third lens unit and the fourth lens unit widens, and an air space between the fourth lens unit and the fifth lens unit widens, at the time of zooming from the wide angle end to the telephoto end.

By doing so, since it is possible to perform zooming without reducing the magnification in each lens unit, high zooming efficiency can be obtained.

In the zoom lens of the present embodiment, it is preferable that the third lens unit includes a predetermined lens or a cemented lens, the predetermined lens includes a lens having a negative focal length and a lens having a positive focal length in order from the object side, and the predetermined lens or the cemented lens moves in the direction vertical to the optical axis.

By doing so, it is possible to improve the optical performance at the time of camera shake prevention.

When the lens is moved in the vertical direction to prevent camera shake, curvature of field or chromatic aberration occurs. In order to ensure favorable optical performance at the time of camera shake prevention, it is necessary to reduce curvature of field or chromatic aberration occurring at the time of camera shake prevention.

In order to reduce chromatic aberration occurring at the time of camera shake prevention, at least one lens having a positive focal length and at least one lens having a negative focal length may be disposed in the lens unit performing camera shake prevention, or a cemented lens including a lens having a positive focal length and a lens having a negative focal length cemented together may be disposed in the lens unit.

On the other hand, in order to reduce curvature of field occurring at the time of camera shake prevention, of a lens having a positive focal length and a lens having a negative focal length, the lens having a negative focal length may be disposed on the object side. By doing so, it is possible to gently bend light rays passing through the lens unit even at the time of camera shake prevention. As a result, it is possible to improve imaging performance at the time of camera shake prevention.

In the zoom lens of the present embodiment, it is preferable that following Conditional Expression (B1) is satisfied:

$$0.3 \leq (\beta 4T/\beta 4W)/(\beta 2T/\beta 2W) \leq 0.55 \quad (B1),$$

where, $\beta 2W$ is the lateral magnification of the second lens unit at the wide angle end;

$\beta 2T$ is the lateral magnification of the second lens unit at the telephoto end;

$\beta 4W$ is the lateral magnification of the fourth lens unit at the wide angle end; and $\beta 4T$ is the lateral magnification of the fourth lens unit at the telephoto end.

Conditional Expression (B1) represents the relation of proportion of load between zooming effect of the second lens unit and zooming effect of the fourth lens unit. By satisfying Conditional Expression (B1), it is possible to obtain a zoom lens in which various aberrations are corrected favorably.

By making so as not to exceed an upper limit value of Conditional Expression (B1), it is possible to prevent an increase in the proportion of load of zooming effect in the fourth lens unit. As a result, it is possible to suppress various aberrations in the fourth lens unit favorably.

By making so as not to fall below a lower limit value of Conditional Expression (B1), it is possible to prevent an increase in the proportion of load of zooming effect in the second lens unit. As a result, it is possible to suppress various aberrations in the second lens unit favorably.

In the zoom lens of the present embodiment, it is preferable that following Conditional Expression (B2) is satisfied:

$$0.25 \leq (\beta 4T/\beta 4W)/(\beta 3T/\beta 3W) \leq 0.5 \quad (B2),$$

where, $\beta 3W$ is the lateral magnification of the third lens unit at the wide angle end;

$\beta 3T$ is the lateral magnification of the third lens unit at the telephoto end;

$\beta 4W$ is the lateral magnification of the fourth lens unit at the wide angle end; and $\beta 4T$ is the lateral magnification of the fourth lens unit at the telephoto end.

Conditional Expression (B2) represents the relation of proportion of load between zooming effect of the third lens unit and zooming effect of the fourth lens unit. By satisfying Conditional Expression (B2), it is possible to obtain a zoom lens in which various aberrations are corrected favorably.

By making so as not to exceed an upper limit value of Conditional Expression (B2), it is possible to prevent an increase in the proportion of load of zooming effect in the fourth lens unit. As a result, it is possible to suppress various aberrations in the fourth lens unit favorably.

By making so as not to fall below a lower limit value of Conditional Expression (B2), it is possible to prevent an increase in the proportion of load of zooming effect in the third lens unit. As a result, it is possible to suppress various aberrations in the third lens unit favorably.

In the zoom lens of the present embodiment, it is preferable that at least one lens having a positive focal length and at least one lens having a negative focal length are disposed in the fourth lens unit, and following Conditional Expressions (B3) and (B4) are satisfied:

$$\nu dG4P \leq 45 \quad (B3), \text{ and}$$

$$0 \leq \nu dG4N - \nu dG4P \quad (B4),$$

where, $\nu dG4P$ is Abbe number on the d-line of the lens having a positive focal length disposed in the fourth lens unit; if there are a plurality of lenses having a positive focal length, $\nu dG4P$ is a smallest Abbe number; and $\nu dG4N$ is Abbe number on the d-line of the lens having a negative focal length that is disposed in the fourth lens unit; if there are a plurality of lenses having a negative focal length, $\nu dG4N$ is a smallest Abbe number.

Conditional Expressions (B3) and (B4) are conditional expressions for the Abbe number of the lens disposed in the fourth lens unit. The fourth lens unit has a negative focal length as a whole. Therefore, for correction of chromatic aberration, it is desirable to use a glass material having a large Abbe number as the glass material of the lens having a negative focal length and to use a glass material having a small Abbe number for the lens having a positive focal length. By satisfying Conditional Expressions (B3) and (B4), it is possible to obtain a zoom lens in which chromatic aberration is corrected favorably.

In the zoom lens of the present embodiment, it is preferable that following Conditional Expression (B5) is satisfied:

$$-10 \leq (RG4PF+RG4PR)/(RG4PF-RG4PR) \leq -1 \quad (B5),$$

where,

RG4PF is a radius of curvature of an object-side surface of the lens having a positive focal length in the fourth lens unit; and RG4PR is a radius of curvature of an image-side surface of the lens having a positive focal length in the fourth lens unit.

Conditional Expression (B5) is a conditional expression for the shape of the lens having a positive focal length that is disposed in the fourth lens unit. By satisfying Conditional Expression (B5), it is possible to obtain an easy-to-produce zoom lens in which chromatic aberration is corrected favorably.

By making so as not to exceed an upper limit value of Conditional Expression (B5), it is possible to obtain a zoom lens in which chromatic aberration is corrected favorably.

By making so as not to fall below a lower limit value of Conditional Expression (B5), it is possible to allows the lens having a positive focal length in the fourth lens unit to be formed into a shape that ensures good workability, that is, an easy-to-produce lens shape.

In the zoom lens of the present embodiment, it is preferable that following Conditional Expression (B6) is satisfied:

$$-2.5 \leq f4G/fW \leq -1.6 \quad (B6),$$

where, f4G is a focal length of the fourth lens unit; and fW is the focal length of the entire zoom lens system at the wide angle end.

Conditional Expression (B6) represents the relation between the focal length of the fourth lens unit and the focal length of the entire zoom lens system at the wide angle end. By satisfying Conditional Expression (B6), it is possible to obtain a compact zoom lens in which various aberrations at the wide angle end are corrected favorably.

In the zoom lens of the present embodiment, it is preferable that following Conditional Expression (B7) is satisfied:

$$0.2 \leq DG4W/LW \leq 0.4 \tag{B7}$$

where,

DG4W is a distance on the optical axis from an image-side surface top of a lens having a negative focal length that is disposed closest to the object in the fourth lens unit to the image plane at the wide angle end; and LW is the distance on the optical axis from the object-side surface top of the lens disposed closest to the object in the first lens unit to the image plane at the wide angle end.

Conditional Expression (B7) represents the relation between the distance on the optical axis from the image-side surface top of the lens having a negative focal length that is disposed closest to the object in the fourth lens unit to the image plane at the wide angle end and the distance on the optical axis from the object-side surface top of the lens disposed closest to the object in the first lens unit to the image plane at the wide angle end. By satisfying Conditional Expression (B7), it is possible to obtain a compact zoom lens.

By making so as not to exceed the upper limit value of Conditional Expression (B7), it is possible to reduce the overall length of the optical system at the wide angle end. As a result, it is possible to achieve small-sizing of the optical system.

By making so as not to fall below the lower limit value of Conditional Expression (B7), it is possible to reduce the height of off-axis light rays passing through the second lens unit at the wide angle end. Thus, the diameter of the first lens unit positioned closer to the object side than the second lens unit is reduced. As a result, it is possible to obtain a compact zoom lens.

In the zoom lens of the present embodiment, it is preferable that following Conditional Expression (4) is satisfied.

Since the technical significance of conditional expressions (4) has already been described, the description thereof is omitted.

In the zoom lens of the present embodiment, it is preferable that following Conditional Expression (12) is satisfied Since the technical significance of conditional expressions (12) has already been described, the description thereof is omitted.

In the zoom lens of the present embodiment, it is preferable that following Conditional Expression (13) is satisfied.

Since the technical significance of conditional expressions (13) has already been described, the description thereof is omitted.

In the zoom lens of the present embodiment, it is preferable that following Conditional Expression (5) is satisfied.

Since the technical significance of conditional expressions (5) has already been described, the description thereof is omitted.

In the zoom lens of the present embodiment, it is preferable that following Conditional Expression (7) is satisfied.

Since the technical significance of conditional expressions (7) has already been described, the description thereof is omitted.

In the zoom lens of the present embodiment, it is preferable that following Conditional Expression (6) is satisfied.

Since the technical significance of conditional expressions (6) has already been described, the description thereof is omitted.

In the zoom lens of the present embodiment, it is preferable that following Conditional Expression (14) is satisfied.

Since the technical significance of conditional expressions (14) has already been described, the description thereof is omitted.

It is preferable that the zoom lens of the present embodiment include a moving lens which moves in a direction vertical to the optical axis and following Conditional Expression (9) is satisfied.

A part of a lens unit is provided as moving lens and the moving lens is moved in the direction vertical to the optical axis, whereby the camera shake-preventing function can be imparted to the zoom lens.

Since the technical significance of conditional expressions (9) has already been described, the description thereof is omitted.

The moving lens may be a simple lens or a cemented lens. Furthermore, the number of moving lens is not limited to one.

In the zoom lens of the present embodiment, it is preferable that a lens disposed in the third lens unit moves in the direction vertical to the optical axis.

The third lens unit is a lens unit in which an increase in lens diameter is most suppressed in the optical system. Thus, it is also possible to suppress an increase in lens weight. Based on this, a part of the third lens unit or all of the lenses in the third lens unit are moved in the direction vertical to the optical axis. In this way, it is advantageous that the lens unit including a lens moved in the direction vertical to the optical axis is provided as the third lens unit, in that the camera shake prevention functions.

Moreover, when a lens is moved in the direction vertical to the optical axis, the position of axial principal rays on the image plane changes. The third lens unit allows for a large amount of change in this position. Therefore, when a lens is moved in the vertical direction in order to obtain a predetermined camera shake prevention effect, it is possible to reduce the amount of movement of the lens in the third lens unit.

Based on this, the part of the third lens unit or all of the lenses in the third lens unit are moved in the direction vertical to the optical axis. As a result, it is possible to suppress an increase in diameter of the unit for preventing camera shake. In this way, it is advantageous in size reduction of the optical system as a whole that the lens unit including a lens moved in the direction vertical to the optical axis is provided as the third lens unit.

The lens moved in the direction vertical to the optical axis may be a simple lens or a cemented lens. Furthermore, the number of lenses moved is not limited to one.

In the zoom lens of the present embodiment, it is preferable that distances between lens units change at the time of zooming.

In the zoom lens of the present embodiment, it is preferable that each lens unit is moves at the time of zooming.

It is preferable that the first lens unit moves toward the object side at the time of zooming and positioned on the object side at the telephoto end rather than the wide angle end. By doing so, it is possible to enhance zooming effect in the first lens unit and zooming effect in the second lens unit. As a result, a higher zoom in the optical system is easily achieved.

Furthermore, in the second lens unit and the lens units positioned closer to the image than the second lens unit, moving space at the time of zooming is easily secured. Therefore, it becomes possible to reduce the overall length of the optical system in the vicinity of the wide angle end.

In the zoom lens of the present embodiment, it is preferable that the first lens unit includes at least two positive lenses.

The chromatic aberration occurring in the first lens unit is enlarged in the lens units positioned closer to the image than the first lens unit. In this case, it is difficult to sufficiently ensure optical performance at the telephoto end. Therefore, it is necessary to minimize occurrence of chromatic aberration in the first lens unit.

Then, at least two positive lenses are disposed in the first lens unit. By doing so, it is possible to suppress occurrence of chromatic aberration. As a result, it is possible to achieve a high-zoom zooming. Moreover, it is also possible to improve imaging performance at the telephoto end while appropriately keeping the focal length of the first lens unit. "High-zoom" means that "the zoom ratio is large"

In the zoom lens of the present embodiment, it is preferable that the first lens unit include at least one cemented lens.

Thus, it is possible to correct chromatic aberration even more favorably.

In the zoom lens of the present embodiment, it is preferable that the second lens unit includes an arrangement including a negative lens, a negative lens, and a positive lens in order from the object side.

The second lens unit and the third lens unit are lens units responsible for zooming. In order to reduce the overall length of the optical system, it is necessary to reduce both the focal length of the second lens unit and the focal length of the third lens unit. When reduction of the focal length of the second lens unit is attempted with fewer lenses, various aberrations, in particular, curvature of field and distortion occur significantly, and, in addition, variation in chromatic aberration of magnification at the time of zooming increases. Therefore, it is difficult to ensure good imaging performance over the entire zoom range in a high-zoom zooming.

Then, in the second lens unit, a negative lens, a negative lens, and a positive lens are disposed in order from the object side. By doing so, it is possible to reduce the focal length of the second lens unit while reducing aberration occurring in each lens.

In the zoom lens of the present embodiment, it is preferable that in the second lens unit, a negative lens disposed second from the object side and s positive lens disposed third from the object side are cemented lenses.

The negative lens and the positive lens are provided as cemented lenses, whereby it is possible to correct chromatic aberration of magnification on the wide angle side favorably.

In the zoom lens of the present embodiment, it is preferable that the second lens unit include at least one aspheric lens.

By doing so, it is possible to correct aberration favorably.

In the zoom lens of the present embodiment, it is more preferable that the lens positioned closest to the object in the second lens unit has an aspheric surface.

By using an aspheric surface in the lens closest to the object, it is possible to correct off-axis aberration on the wide angle side, in particular, coma, curvature of field, and distortion effectively.

A lens unit disposed second from the image side with an air space interposed in the third lens unit is a lens unit having a negative focal length. Then, for the lens having a positive focal length that is disposed in this lens unit, a glass material generally having a small Abbe number, that is, large anomalous dispersion is used for chromatic aberration correction.

On the other hand, a lens unit positioned closest to the image is a lens unit having a positive focal length. Then, for the lens having a negative focal length that is disposed in this lens unit, a glass material generally having a small Abbe number, that is, large anomalous dispersion is used for chromatic aberration correction.

By doing so, it is possible to reduce chromatic aberration over the entire zoom range. However, due to the use of a glass material having large anomalous dispersion, in particular, correction of chromatic aberration on the short-wavelength side at the wide angle side is to be addressed.

Then, in both of the lens unit disposed second from the image side with an air space interposed and the lens unit positioned closest to the image, two lenses are disposed in the order of a lens having a negative focal length and a lens having a positive focal length, from the object side. In this case, in the lens unit disposed second from the image side with an air space interposed, by a glass material having large anomalous dispersion, significant chromatic aberration occurs with light rays refracted at the lens having a positive focal length that is positioned on the image side.

However, a glass material having large anomalous dispersion is also used for the lens having a negative focal length in the lens unit positioned closest to the image. Therefore, chromatic aberration occurring in the lens unit disposed second from the image side with an air space interposed can be cancelled out by the lens unit positioned closest to the image.

In this way, the above-noted lens arrangement has the effect of cancelling out chromatic aberration occurring in one lens unit with the other lens unit. Thus, in particular, it is possible to reduce chromatic aberration in short wavelengths at the wide angle end. As a result, it becomes possible to obtain a zoom lens with good performance.

In the zoom lens of the present embodiment, it is more preferable that the diaphragm (aperture stop) is positioned at the front or the back (on the object side or the image side) of the third lens unit.

By positioning the diaphragm at the front or the back of the third lens unit, it is possible to reduce aberration occurring in the third lens unit and it is also possible to reduce the focal length of the third lens unit. Therefore, a high-zoom zooming is easily achieved, and high imaging performance is easily ensured over the entire zoom range.

In the zoom lens of the present embodiment, it is more preferable that the third lens unit include at least one aspheric lens.

By doing so, it is possible to correct spherical aberration more, and therefore it becomes possible to increase imaging performance over the entire zoom range.

In the zoom lens of the present embodiment, it is preferable that the lens used for preventing camera shake is the lens positioned closest to the object or the lens closest to the image in the third lens unit.

By using the lens positioned at the end of the lens unit for preventing camera shake, it is possible to simplify the camera shake-preventing unit.

In the zoom lens of the present embodiment, it is preferable that the lens used for preventing camera shake have at least one cemented lens, or at least one lens having a positive focal length and at least one lens having a negative focal length.

Chromatic aberration occurs by moving the lens. Then, in this manner, it is possible to prevent image quality degradation due to the effect of occurrence of chromatic aberration even when the lens is moved.

In the zoom lens of the present embodiment, it is preferable that a lens unit as a whole function as a camera shake-preventing lens unit.

In this case, since a variety of aberrations are successfully corrected in the lens unit, it is possible to enhance imaging performance when camera shake prevention is performed.

In the zoom lens of the present embodiment, it is preferable that the fourth lens unit is a focusing lens unit.

As described above, the zoom lens of the present embodiment includes an arrangement in which refractive powers are arranged in the order of a positive refractive power, a negative refractive power, a positive refractive power, a negative refractive power, and a positive refractive power, from the object side. Therefore, because of such an arrangement, the fourth lens unit can have a smaller effective aperture than the other lens units. As a result, it is possible to reduce the weight of the focusing lens unit.

Moreover, in the fourth lens unit, it is possible to suppress occurrence of axial aberration. Therefore, by using the fourth lens unit as a focus lens unit, it is possible to ensure high imaging performance even at a time of focusing on a close object.

Furthermore, in the fourth lens unit, it is possible to increase focus sensitivity. Therefore, at a time of focusing from an infinite object to a close object or at a time of focusing from the close object to the infinite object, it is possible to reduce the amount of movement of the fourth lens unit. Focus sensitivity refers to the amount of change in focus position when a certain lens unit moves on the optical axis.

In the zoom lens of the present embodiment, it is preferable that the fourth lens unit is a wobbling unit.

In the zoom lens of the present embodiment, the fifth lens unit having a positive focal length is disposed on the image side of the fourth lens unit having a negative focal length. Thus, even when the fourth lens unit is moved to perform wobbling, it is possible to reduce a change in height of off-axis principal rays incident on the fourth lens unit. As a result, it is possible to suppress magnification variation at the time of wobbling.

Then, by moving the fourth lens unit at the time of wobbling, it is possible to obtain high-quality moving images always in focus.

In the zoom lens of the present embodiment, it is preferable that the fourth lens unit include at least one negative lens and at least one positive lens.

By doing so, it is possible to minimize chromatic aberration occurring in the fourth lens unit. Furthermore, in each zoom state, it is possible to reduce variation in axial chromatic aberration from focusing on an infinite object to focusing on a close object.

In the zoom lens of the present embodiment, it is preferable that the fourth lens unit include one cemented lens including a negative lens and a positive lens.

By doing so, it is possible to achieve small-sizing of the fourth lens unit and to minimize chromatic aberration occurring in the fourth lens unit. Furthermore, in each zoom state, it is possible reduce variation in longitudinal chromatic aberration from focusing on an infinite the object to focusing on the close object.

In the zoom lens of the present embodiment, it is preferable that the fifth lens unit include at least one negative lens and at least one positive lens.

By doing so, it is possible to reduce occurrence of chromatic aberration of magnification over the entire zoom range. As a result, it is possible to achieve a high-performance zoom lens. Furthermore, because of the inclusion of a negative lens, it is possible to reduce occurrence of curvature of field over the entire zoom range. As a result, it is possible to achieve a high-performance zoom lens.

In the zoom lens of the present embodiment, it is preferable that the fifth lens unit include one cemented lens including a negative lens and a positive lens.

By doing so, it is possible to achieve small-sizing of the fifth lens unit and it is also possible to further reduce occurrence of chromatic aberration of magnification over the entire zoom range. Furthermore, since the fifth lens unit includes a negative lens, it is possible to reduce occurrence of curvature of field over the entire zoom range. As a result, it is possible to achieve a high-performance zoom lens.

In the zoom lens of the present embodiment, it is preferable that the fifth lens unit include at least one aspheric lens.

By doing so, it is possible to correct off-axis aberration more effectively.

An image pickup apparatus of the present embodiment includes the aforementioned zoom lens and an image pickup element which converts an image formed by the zoom lens to an electrical signal.

According to the image pickup apparatus of the present embodiment, it is possible to achieve photographing of a wide view and a close-up photographing of a distant at high resolution. Furthermore, it is possible to acquire a bright and stabilized image even with a dark subject.

The aforementioned zoom lens and the image pickup apparatus may satisfy a plurality of arrangements simultaneously. Making such arrangement is preferable for achieving a favorable zoom lens and the image pickup apparatus. Moreover, combinations of preferable arrangements are voluntary. Furthermore, regarding each conditional expression, only an upper limit value or a lower limit value of a numerical range of a further restricted conditional expression may be restricted.

In each conditional expression, the lower limit value or the upper limit value may be changed as follows. Such changes are preferable because the effect of each conditional expression can be further ensured.

It is preferable that Conditional Expression (1) is set as follows.

The upper limit value is preferably 0.93, more preferably 0.9.

The lower limit value is preferably 0.35, more preferably 0.4.

It is preferable that Conditional Expression (2) is set as follows.

The upper limit value is preferably 0.55, more preferably 0.5.

The lower limit value is preferably 0.24, more preferably 0.28.

It is preferable that Conditional Expression (3) is set as follows.

The upper limit value is preferably 1.86, more preferably 1.74.

The lower limit value is preferably 0.8, more preferably 0.9.

It is preferable that Conditional Expression (4) is set as follows.

The upper limit value is preferably 0.19, more preferably 0.18.

The lower limit value is preferably 0.12, more preferably 0.13.

It is preferable that Conditional Expression (5) is set as follows.

The upper limit value is preferably 0.5, more preferably 0.45.

The lower limit value is preferably 0.26, more preferably 0.3.

It is preferable that Conditional Expression (6) is set as follows.

The upper limit value is preferably 1.6, more preferably 1.5.

The lower limit value is preferably 0.77, more preferably 0.85.

It is preferable that Conditional Expression (7) is set as follows.

The upper limit value is preferably 0.29, more preferably 0.26.

The lower limit value is preferably 0.21, more preferably 0.22.

It is preferable that Conditional Expression (8) is set as follows.

The upper limit value is preferably 0.55, more preferably 0.52.

The lower limit value is preferably 0.4, more preferably 0.42.

It is preferable that Conditional Expression (9) is set as follows.

The upper limit value is preferably 2.8, more preferably 2.4.

The lower limit value is preferably 1.25, more preferably 1.3.

It is preferable that Conditional Expression (10) is set as follows.

The upper limit value is preferably 0.58, more preferably 0.55.

The lower limit value is preferably 0.46, more preferably 0.48.

It is preferable that Conditional Expression (11) is set as follows.

The upper limit value is preferably 0.58, more preferably 0.55.

The lower limit value is preferably 0.12, more preferably 0.14.

It is preferable that Conditional Expression (12) is set as follows.

The upper limit value is preferably 1.6, more preferably 1.5.

The lower limit value is preferably 0.6, more preferably 0.7.

It is preferable that Conditional Expression (13) is set as follows.

The upper limit value is preferably 0.63, more preferably 0.55.

The lower limit value is preferably −0.5, more preferably −0.2.

It is preferable that Conditional Expression (14) is set as follows.

The upper limit value is preferably 0, more preferably −0.1.

The lower limit value is preferably −1.8, more preferably −0.9.

It is preferable that Conditional Expression (A2) is set as follows.

The lower limit value is preferably 53, more preferably 57.

It is preferable that Conditional Expression (A8) is set as follows.

The upper limit value is preferably 65, more preferably 60.

The lower limit value is preferably 2, more preferably 2.5.

It is preferable that Conditional Expression (A9) is set as follows.

The upper limit value is preferably 0.55, more preferably 0.5.

The lower limit value is preferably 0.38, more preferably 0.42.

It is preferable that Conditional Expression (A10) is set as follows.

The upper limit value is preferably 1.4, more preferably 1.2.

The lower limit value is preferably 0.9, more preferably 0.95.

It is preferable that Conditional Expression (A11) is set as follows.

The upper limit value is preferably 1.5, more preferably 1.1.

The lower limit value is preferably 0.3, more preferably 0.4.

It is preferable that Conditional Expression (A14) is set as follows.

The upper limit value is preferably 0.13, more preferably 0.1.

The lower limit value is preferably 0.05, more preferably 0.07.

It is preferable that Conditional Expression (A15) is set as follows.

The upper limit value is preferably −0.8, more preferably −1.0.

The lower limit value is preferably −2.7, more preferably −2.5.

It is preferable that Conditional Expression (B1) is set as follows.

The upper limit value is preferably 0.5, more preferably 0.44.

The lower limit value is preferably 0.35, more preferably 0.38.

It is preferable that Conditional Expression (B2) is set as follows.

The upper limit value is preferably 0.46, more preferably 0.44.

The lower limit value is preferably 0.3, more preferably 0.36.

It is preferable that Conditional Expression (B3) is set as follows.

The upper limit value is preferably 36, more preferably 27.

It is preferable that Conditional Expression (B5) is set as follows.

The upper limit value is preferably −2.5, more preferably −3.7.

The lower limit value is preferably −6, more preferably −5.2.

It is preferable that Conditional Expression (B6) is set as follows.

The upper limit value is preferably −1.7, more preferably −1.77.

The lower limit value is preferably −2.3, more preferably −2.1.

It is preferable that Conditional Expression (37) is set as follows.

The upper limit value is preferably 0.34, more preferably 0.3.

The lower limit value is preferably 0.22, more preferably 0.26.

Examples of zoom lenses will be described below in detail by referring to the accompanying diagrams. However, the present invention is not restricted to the examples described below.

The lens cross-sectional views will be described.

FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, FIG. 17A, FIG. 18A, FIG. 19A, FIG. 20A, and FIG. 21A are lens cross-sectional views in the wide angle end.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, FIG. 15B, FIG. 16B, FIG. 17B, FIG. 18B, FIG. 19B, FIG. 20B, and FIG. 21B are lens cross-sectional views in the intermediate focal length state.

FIG. 1C, FIG. 2C, FIG. 3C, FIG. 4C, FIG. 5C, FIG. 6C, FIG. 7C, FIG. 8C, FIG. 9C, FIG. 10C, FIG. 11C, FIG. 12C, FIG. 13C, FIG. 14C, FIG. 15C, FIG. 16C, FIG. 17C, FIG. 18C, FIG. 19C, FIG. 20C, and FIG. 21C are lens cross-sectional views in the telephoto end.

Aberration diagrams will be described. FIG. 22A, FIG. 23A, FIG. 24A, FIG. 25A, FIG. 26A, FIG. 27A, FIG. 28A, FIG. 29A, FIG. 30A, FIG. 31A, FIG. 32A, FIG. 33A, FIG. 34A, FIG. 35A, FIG. 36A, FIG. 37A, FIG. 38A, FIG. 39A, FIG. 40A, FIG. 41A, and FIG. 42A illustrate spherical aberration in the wide angle end.

FIG. 22B, FIG. 23B, FIG. 24B, FIG. 25B, FIG. 26B, FIG. 27B, FIG. 28B, FIG. 29B, FIG. 30B, FIG. 31B, FIG. 32B, FIG. 33B, FIG. 34B, FIG. 35B, FIG. 36B, FIG. 37B, FIG. 38B, FIG. 39B, FIG. 40B, FIG. 41B, and FIG. 42B illustrate astigmatism in the wide angle end.

FIG. 22C, FIG. 23C, FIG. 24C, FIG. 25C, FIG. 26C, FIG. 27C, FIG. 28C, FIG. 29C, FIG. 30C, FIG. 31C, FIG. 32C, FIG. 33C, FIG. 34C, FIG. 35C, FIG. 36C, FIG. 37C, FIG. 38C, FIG. 39C, FIG. 40C, FIG. 41C, and FIG. 42C illustrate distortion aberration in the wide angle end.

FIG. 22D, FIG. 23D, FIG. 24D, FIG. 25D, FIG. 26D, FIG. 27D, FIG. 28D, FIG. 29D, FIG. 30D, FIG. 31D, FIG. 32D, FIG. 33D, FIG. 34D, FIG. 35D, FIG. 36D, FIG. 37D, FIG. 38D, FIG. 39D, FIG. 40D, FIG. 41D, and FIG. 42D illustrate chromatic aberration of magnification in the wide angle end.

FIG. 22E, FIG. 23E, FIG. 24E, FIG. 25E, FIG. 26E, FIG. 27E, FIG. 28E, FIG. 29E, FIG. 30E, FIG. 31E, FIG. 32E, FIG. 33E, FIG. 34E, FIG. 35E, FIG. 36E, FIG. 37E, FIG. 38E, FIG. 39E, FIG. 40E, FIG. 41E, and FIG. 42E illustrate spherical aberration in the intermediate focal length state.

FIG. 22F, FIG. 23F, FIG. 24F, FIG. 25F, FIG. 26F, FIG. 27F, FIG. 28F, FIG. 29F, FIG. 30F, FIG. 31F, FIG. 32F, FIG. 33F, FIG. 34F, FIG. 35F, FIG. 36F, FIG. 37F, FIG. 38F, FIG. 39F, FIG. 40F, FIG. 41F, and FIG. 42F illustrate astigmatism in the intermediate focal length state.

FIG. 22G, FIG. 23G, FIG. 24G, FIG. 25G, FIG. 26G, FIG. 27G, FIG. 28G, FIG. 29G, FIG. 30G, FIG. 31G, FIG. 32G, FIG. 33G, FIG. 34G, FIG. 35G, FIG. 36G, FIG. 37G, FIG. 38G, FIG. 39G, FIG. 40G, FIG. 41G, and FIG. 42G illustrate distortion aberration in the intermediate focal length state.

FIG. 22H, FIG. 23H, FIG. 24H, FIG. 25H, FIG. 26H, FIG. 27H, FIG. 28H, FIG. 29H, FIG. 30H, FIG. 31H, FIG. 32H, FIG. 33H, FIG. 34H, FIG. 35H, FIG. 36H, FIG. 37H, FIG. 38H, FIG. 39H, FIG. 40H, FIG. 41H, and FIG. 42H illustrate chromatic aberration of magnification in the intermediate focal length state.

FIG. 22I, FIG. 23I, FIG. 24I, FIG. 25I, FIG. 26I, FIG. 27I, FIG. 28I, FIG. 29I, FIG. 30I, FIG. 31I, FIG. 32I, FIG. 33I, FIG. 34I, FIG. 35I, FIG. 36I, FIG. 37I, FIG. 38I, FIG. 39I, FIG. 40I, FIG. 41I, and FIG. 42I illustrate spherical aberration in the telephoto end.

FIG. 22J, FIG. 23J, FIG. 24J, FIG. 25J, FIG. 26J, FIG. 27J, FIG. 28J, FIG. 29J, FIG. 30J, FIG. 31J, FIG. 32J, FIG. 33J, FIG. 34J, FIG. 35J, FIG. 36J, FIG. 37J, FIG. 38J, FIG. 39J, FIG. 40J, FIG. 41J, and FIG. 42J illustrate astigmatism in the telephoto end.

FIG. 22K, FIG. 23K, FIG. 24K, FIG. 25K, FIG. 26K, FIG. 27K, FIG. 28K, FIG. 29K, FIG. 30K, FIG. 31K, FIG. 32K, FIG. 33K, FIG. 34K, FIG. 35K, FIG. 36K, FIG. 37K, FIG. 38K, FIG. 39K, FIG. 40K, FIG. 41K, and FIG. 42K illustrate distortion aberration in the telephoto end.

FIG. 22L, FIG. 23L, FIG. 24L, FIG. 25L, FIG. 26L, FIG. 27L, FIG. 28L, FIG. 29L, FIG. 30L, FIG. 31L, FIG. 32L, FIG. 33L, FIG. 34L, FIG. 35L, FIG. 36L, FIG. 37L, FIG. 38L, FIG. 39L, FIG. 40L, FIG. 41L, and FIG. 42L illustrate chromatic aberration of magnification in the telephoto end.

A first lens unit is denoted by G1, a second lens unit is denoted by G2, a third lens unit is denoted by G3, a fourth lens unit is denoted by G4, a fifth lens unit is denoted by G5, an aperture stop is denoted by S, and an image plane (image pickup surface) is denoted by I. Moreover, cover glass C is disposed between the fifth lens unit G5 and image plane I.

Moreover, although it is not shown in the diagrams, a parallel and flat plate that forms a low-pass filter may be disposed between the fifth lens unit G5 and the image plane I. Moreover, a wavelength region restricting coating which restricts infrared light may be applied to a surface of the parallel and flat plate. Moreover, a multilayer film for restricting wavelength region may be applied to a surface of the cover glass C. The cover glass C may be imparted an effect of a low-pass filter.

A zoom lens of Example 1 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the image-side surface of the biconvex positive lens L17.

A zoom lens of Example 2 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the image-side surface of the biconvex positive lens L17.

A zoom lens of Example 3 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a biconcave negative lens L10, a positive meniscus lens L11 having a convex surface directed toward the object side, and a biconvex positive lens L12. Here, the biconcave negative lens L10 and the positive meniscus lens L11 are cemented together.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented together.

The fifth lens unit G5 includes a negative meniscus lens L15 having a convex surface directed toward the object side and a biconvex positive lens L16. Here, the negative meniscus lens L15 and the biconvex positive lens L16 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, and the fifth lens unit G5 is fixed.

At the time of focusing from an infinite object to a close object, the fourth lens unit G4 moves toward the image side. At the time of camera shake correction, the biconvex positive lens L12 in the third lens unit G3 moves in a direction orthogonal to the optical axis. Alternatively, the lens moved at the time of camera shake correction may be the cemented lens of the biconcave negative lens L10 and the positive meniscus lens L11 in the third lens unit G3.

Aspheric surfaces are provided at, in total, nine surfaces, namely, both surfaces of the negative meniscus lens L4, both surfaces of the negative meniscus lens L7, both surfaces of the biconvex positive lens L8, both surfaces of the biconvex positive lens L12, and the image-side surface of the biconvex positive lens L16.

A zoom lens of Example 4 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a biconcave negative lens L14 and a positive meniscus lens L15 having a convex surface directed toward the object side. Here, the biconcave negative lens L14 and the positive meniscus lens L15 are cemented together.

The fifth lens unit G5 includes a biconvex positive lens L16 and a negative meniscus lens L17 having a convex surface directed toward the image side. Here, the biconvex positive lens L16 and the negative meniscus lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter stops, and the fifth lens unit G5 is fixed. The aperture stop S moves toward the object side alone.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the object-side surface of the biconvex positive lens L16.

A zoom lens of Example 5 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a biconvex positive lens L16 and a negative meniscus lens L17 having a convex surface directed toward the image side. Here, the biconvex positive lens L16 and the negative meniscus lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the object-side surface of the biconvex positive lens L16.

A zoom lens of Example 6 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a biconvex positive lens L14 and a biconcave negative lens L15. Here, the biconvex positive lens L14 and the biconcave negative lens L15 are cemented together.

The fifth lens unit G5 includes a biconvex positive lens L16 and a negative meniscus lens L17 having a convex surface directed toward the image side. Here, the biconvex positive lens L16 and the negative meniscus lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the object-side surface of the biconvex positive lens L16.

A zoom lens of Example 7 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the image-side surface of the biconvex positive lens L17.

A zoom lens of Example 8 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the image-side surface of the biconvex positive lens L17.

A zoom lens of Example 9 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a positive meniscus lens L8 having a convex surface directed toward the object side, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the positive meniscus lens L8, the image-side surface of the biconvex positive lens L13, and the image-side surface of the biconvex positive lens L17.

A zoom lens of Example 10 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a positive meniscus lens L8 having a convex surface directed toward the object side, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are also cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the positive meniscus lens L8, the image-side surface of the biconvex positive lens L13, and the image-side surface of the biconvex positive lens L17.

A zoom lens of Example 11 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the image-side surface of the biconvex positive lens L17.

A zoom lens of Example 12 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the image side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the object-side surface of the biconvex positive lens L17.

A zoom lens of Example 13 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the image-side surface of the biconvex positive lens L17.

A zoom lens of Example 14 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a biconvex positive lens L11, a negative meniscus lens L12 having a convex surface directed toward the object side, and a biconvex positive lens L13. Here, the negative meniscus lens L10 and the biconvex positive lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the biconvex positive lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the image-side surface of the biconvex positive lens L17.

A zoom lens of Example 15 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented together.

The second lens unit G2 includes a biconcave negative lens L4, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a biconvex positive lens L11, a negative meniscus lens L12 having a convex surface directed toward the object side, and a biconvex positive lens L13. Here, the negative meniscus lens L10 and the biconvex positive lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the image side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the biconvex positive lens L11 in the third lens unit G3.

Aspheric surfaces are provided at, in total, six surfaces, namely, both surfaces of the biconcave negative lens L4, both surfaces of the biconvex positive lens L8, the image-side surface of the biconvex positive lens L13, and the object-side surface of the biconvex positive lens L17.

A zoom lens of Example 16 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a biconvex positive lens L11, a negative meniscus lens L12 having a convex surface directed toward the object side, and a biconvex positive lens L13. Here, the negative meniscus lens L10 and the biconvex positive lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the image side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the biconvex positive lens L11 in the third lens unit G3.

Aspheric surfaces are provided at, in total, six surfaces, namely, both surfaces of the biconcave negative lens L4, both surfaces of the biconvex positive lens L8, the image-side surface of the biconvex positive lens L13, and the object-side surface of the biconvex positive lens L17.

A zoom lens of Example 17 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the object side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, and the fifth lens unit G5 moves toward the image side.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the image-side surface of the biconvex positive lens L17.

A zoom lens of Example 18 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the image side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, and the fifth lens unit G5 moves toward the image side.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the object-side surface of the biconvex positive lens L17.

A zoom lens of Example 19 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a negative meniscus lens L16 having a convex surface directed toward the image side and a biconvex positive lens L17. Here, the negative meniscus lens L16 and the biconvex positive lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the object-side surface of the biconvex positive lens L17.

A zoom lens of Example 20 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented together.

The second lens unit G2 includes a biconcave negative lens L4, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a positive meniscus lens L8 having a convex surface directed toward the object side, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a biconvex positive lens L16 and a negative meniscus lens L17 having a convex surface directed toward the image side. Here, the biconvex positive lens L16 and the negative meniscus lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the biconcave negative lens L4, both surfaces of the positive meniscus lens L8, the image-side surface of the biconvex positive lens L13, and the object-side surface of the biconvex positive lens L16.

A zoom lens of Example 21 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop (diaphragm) S is disposed in the third lens unit G3.

The first lens unit G1 includes a negative meniscus lens L1 having a convex surface directed toward the object side, a plano-convex positive lens L2, and a positive meniscus lens L3 having a convex surface directed toward the object side. Here, the negative meniscus lens L1 and the plano-convex positive lens L2 are cemented together.

The second lens unit G2 includes a negative meniscus lens L4 having a convex surface directed toward the object side, a biconcave negative lens L5, a biconvex positive lens L6, and a negative meniscus lens L7 having a convex surface directed toward the image side. Here, the biconcave negative lens L5 and the biconvex positive lens L6 are cemented together.

The third lens unit G3 includes an aperture stop S, a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented together. The negative meniscus lens L12 and the biconvex positive lens L13 are also cemented together.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented together.

The fifth lens unit G5 includes a biconvex positive lens L16 and a negative meniscus lens L17 having a convex surface directed toward the image side. Here, the biconvex positive lens L16 and the negative meniscus lens L17 are cemented together.

At the time of zooming from the wide angle end to the telephoto end, the first lens unit G1 moves toward the object side, the second lens unit G2 moves toward the image side, the third lens unit G3 moves toward the object side, the fourth lens unit G4 moves toward the object side and thereafter moves toward the image side, and the fifth lens unit G5 is fixed.

At the time of focusing from an infinite object to a close object, the fourth lens unit G4 moves toward the image side. At the time of camera shake correction, the cemented lens of the negative meniscus lens L12 and the biconvex positive lens L13 in the third lens unit G3 moves in a direction orthogonal to the optical axis. Alternatively, the lens moved at the time of camera shake correction may be the cemented lens of the negative meniscus lens L10 and the positive meniscus lens L11 in the third lens unit G3.

Aspheric surfaces are provided at, in total, six surfaces, namely, both surfaces of the negative meniscus lens L4, both surfaces of the biconvex positive lens L8, the image-side surface of the biconvex positive lens L13, and the object-side surface of the biconvex positive lens L16.

Numerical data of each example described above is shown below. In Surface data, r denotes radius of curvature of each lens surface, d denotes a distance between respective lens surfaces, nd denotes a refractive index of each lens for a d-line, νd denotes an Abbe number for each lens and *denotes an aspheric surface.

Further, in Zoom data, WE denotes a wide angle end, ST denotes a intermediate focal length state, TE denotes a telephoto end. Further, f denotes a focal length of the entire system, FNO. denotes an F number, ω denotes a half angle of view, IH denotes an image height, BF denotes a back focus, LTL denotes a lens total length of the optical system. Further, back focus is a unit which is expressed upon air conversion of a distance from a rearmost lens surface to a paraxial image surface. The lens total length is a distance from a frontmost lens surface to the rearmost lens surface plus back focus.

Further, in Unit focal length, each of f1, f2 . . . is a focal length of each lens unit.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12 . . . .

$$Z=(y^2/r)/[1+\{1-(1+k)(y/r)^2\}^{1/2}]+A4y^4+A6y^6+A8y^8+A10y^{10}+A12y12+\ldots$$

Further, in the aspherical surface coefficients, 'e-n' (where, n is an integral number) indicates '$10^{-n}$'. Moreover, these symbols are commonly used in the following numerical data for each example.

Example 1

Unit mm

Surface data

| Surface no. | r | d | nd | νd |
|---|---|---|---|---|
| Object plane | ∞ | ∞ | | |
| 1 | 94.387 | 2.50 | 1.85478 | 24.80 |
| 2 | 67.783 | 7.13 | 1.49700 | 81.54 |
| 3 | ∞ | 0.15 | | |
| 4 | 61.099 | 5.02 | 1.49700 | 81.54 |
| 5 | 172.659 | Variable | | |
| 6* | 231.854 | 1.65 | 1.88227 | 37.18 |
| 7* | 14.124 | 7.35 | | |
| 8 | −22.507 | 1.00 | 1.59282 | 68.62 |
| 9 | 32.319 | 4.23 | 2.00069 | 25.46 |
| 10 | −44.031 | 1.39 | | |
| 11 | −21.208 | 1.20 | 1.83481 | 42.73 |
| 12 | −40.812 | Variable | | |
| 13(Stop) | ∞ | 1.50 | | |
| 14* | 24.286 | 4.49 | 1.58253 | 59.32 |
| 15* | −700.000 | 4.37 | | |
| 16 | 56.643 | 3.37 | 1.49700 | 81.54 |
| 17 | −56.643 | 0.50 | | |
| 18 | 43.590 | 1.00 | 1.91082 | 35.25 |
| 19 | 15.142 | 4.13 | 1.49700 | 81.54 |
| 20 | 47.223 | 1.20 | | |
| 21 | 24.303 | 0.80 | 1.85478 | 24.80 |
| 22 | 16.800 | 5.10 | 1.58253 | 59.32 |
| 23* | −71.500 | Variable | | |
| 24 | 188.666 | 0.90 | 1.83481 | 42.73 |
| 25 | 11.201 | 3.10 | 1.80809 | 22.76 |
| 26 | 18.472 | Variable | | |
| 27 | 30.000 | 1.20 | 2.00100 | 29.13 |
| 28 | 20.454 | 9.46 | 1.51593 | 64.25 |
| 29* | −31.238 | 12.22 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −7.50532e−06, A6 = 1.23396e−07, A8 = −4.26522e−10,
A10 = 6.20739e−13

7th surface k = 0.000
A4 = −3.12688e−05, A6 = 6.45994e−08, A8 = −5.06358e−10,
A10 = 1.39139e−11, A12 = −1.22469e−13, A14 = 3.55245e−16

14th surface k = 0.000
A4 = −1.21943e−05, A6 = −3.40663e−08, A8 = −3.04610e−11,
A10 = 4.72594e−13

15th surface k = 0.000
A4 = 7.50787e−06, A6 = −4.91245e−08, A8 = 9.97723e−11

23th surface k = 0.000
A4 = 7.76950e−06, A6 = −7.45428e−09, A8 = −5.82084e−11

29th surface k = 0.000
A4 = 3.64978e−06, A6 = −5.98934e−08, A8 = 1.63111e−10,
A10 = −4.69751e−13

Zoom data

| | WE | ST | TE |
|---|---|---|---|
| f | 12.36 | 34.62 | 97.98 |
| FNO. | 4.08 | 4.08 | 4.08 |
| 2ω | 83.05 | 33.74 | 12.12 |
| BF(in air) | 15.67 | 15.65 | 15.69 |
| LTL(in air) | 134.09 | 150.19 | 176.02 |
| d5 | 0.72 | 25.09 | 53.60 |
| d12 | 37.65 | 13.89 | 1.30 |
| d23 | 2.44 | 10.11 | 20.20 |
| d26 | 4.87 | 12.72 | 12.50 |

Unit focal length f1 = 110.52   f2 = −14.17   f3 = 23.28   f4 = −24.12   f5 = 39.58

Example 2

Unit mm

Surface data

| Surface no. | r | d | nd | νd |
|---|---|---|---|---|
| Object plane | ∞ | ∞ | | |
| 1 | 92.076 | 2.50 | 1.85478 | 24.80 |
| 2 | 66.463 | 7.23 | 1.49700 | 81.54 |
| 3 | ∞ | 0.15 | | |
| 4 | 60.017 | 5.04 | 1.49700 | 81.54 |
| 5 | 165.389 | Variable | | |
| 6* | 150.938 | 1.65 | 1.88227 | 37.18 |
| 7* | 13.667 | 7.35 | | |
| 8 | −21.491 | 1.00 | 1.59282 | 68.62 |
| 9 | 31.144 | 4.13 | 2.00069 | 25.46 |
| 10 | −42.582 | 1.17 | | |
| 11 | −22.083 | 1.20 | 1.83481 | 42.73 |
| 12 | −49.886 | Variable | | |
| 13(Stop) | ∞ | 1.50 | | |
| 14* | 23.726 | 4.23 | 1.58253 | 59.32 |
| 15* | −416.167 | 4.15 | | |
| 16 | 52.017 | 3.48 | 1.49700 | 81.54 |
| 17 | −52.017 | 0.50 | | |
| 18 | 66.000 | 1.00 | 1.91082 | 35.25 |
| 19 | 15.750 | 3.81 | 1.49700 | 81.54 |
| 20 | 62.829 | 1.20 | | |
| 21 | 23.802 | 0.80 | 1.85478 | 24.80 |
| 22 | 17.322 | 5.17 | 1.58253 | 59.32 |
| 23* | −56.874 | Variable | | |
| 24 | 154.658 | 0.90 | 1.83481 | 42.73 |
| 25 | 11.055 | 3.48 | 1.80809 | 22.76 |
| 26 | 17.500 | Variable | | |
| 27 | 30.000 | 1.20 | 2.00100 | 29.13 |
| 28 | 20.354 | 10.00 | 1.51593 | 64.25 |
| 29* | −31.081 | 11.35 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −5.71018e−06, A6 = 8.04156e−08, A8 = −2.16056e−10,
A10 = 2.98312e−13, A12 = 5.00000e−17

7th surface k = 0.000
A4 = −2.80152e−05, A6 = 3.52486e−08, A8 = −1.99144e−09,
A10 = 5.01593e−11, A12 = −5.07690e−13, A14 = 1.99802e−15

14th surface k = 0.000
A4 = −7.30206e−06, A6 = −5.47006e−08, A8 = 8.97192e−11,
A10 = −2.64931e−13

-continued

| Unit mm |
|---|
| 15th surface | k = 0.000
A4 = 1.56126e−05, A6 = −7.25350e−08, A8 = 2.12984e−10,
A10 = −7.46710e−13
23th surface k = 0.000
A4 = 1.04497e−05, A6 = 6.73868e−09, A8 = −3.08576e−11
29th surface k = 0.000
A4 = 4.07614e−06, A6 = −7.27569e−08, A8 = 2.16624e−10,
A10 = −5.77199e−13

| Zoom data | | | |
|---|---|---|---|
|  | WE | ST | TE |
| f | 12.36 | 34.63 | 98.01 |
| FNO. | 4.07 | 4.07 | 4.07 |
| 2ω | 83.05 | 33.70 | 12.09 |
| BF(in air) | 14.79 | 14.78 | 14.83 |
| LTL(in air) | 132.16 | 148.03 | 174.29 |
| d5 | 0.64 | 24.35 | 53.29 |
| d12 | 35.84 | 12.97 | 1.30 |
| d23 | 2.44 | 10.16 | 19.66 |
| d26 | 5.59 | 12.92 | 12.37 |

| Unit focal length |
|---|
| f1 = 108.76   f2 = −13.51   f3 = 22.60   f4 = −23.36   f5 = 39.71 |

Example 3

| Unit mm | | | | |
|---|---|---|---|---|
| Surface data | | | | |
| Surface no. | r | d | nd | νd |
| Object plane | ∞ | ∞ | | |
| 1 | 85.452 | 1.70 | 1.85478 | 24.80 |
| 2 | 63.292 | 5.60 | 1.49700 | 81.61 |
| 3 | 1583.445 | 0.15 | | |
| 4 | 55.115 | 4.12 | 1.49700 | 81.61 |
| 5 | 139.913 | Variable | | |
| 6* | 200.000 | 1.80 | 1.74320 | 49.34 |
| 7* | 12.405 | 8.30 | | |
| 8 | −22.883 | 1.20 | 1.49700 | 81.61 |
| 9 | 436.314 | 3.35 | 1.85478 | 24.80 |
| 10 | −24.804 | 1.12 | | |
| 11* | −17.331 | 1.20 | 1.74320 | 49.34 |
| 12* | −44.808 | Variable | | |
| 13(Stop) | ∞ | 1.50 | | |
| 14* | 20.620 | 4.67 | 1.58313 | 59.38 |
| 15* | −86.552 | 2.65 | | |
| 16 | 40.521 | 4.55 | 1.53172 | 48.84 |
| 17 | −41.072 | 0.42 | | |
| 18 | −276.546 | 1.00 | 1.90366 | 31.32 |
| 19 | 13.736 | 3.98 | 1.49700 | 81.61 |
| 20 | 43.496 | 1.00 | | |
| 21* | 25.504 | 4.39 | 1.59201 | 67.02 |
| 22* | −44.184 | Variable | | |
| 23 | 202.501 | 1.00 | 1.88300 | 40.80 |
| 24 | 12.533 | 2.19 | 1.89286 | 20.36 |
| 25 | 18.959 | Variable | | |
| 26 | 36.422 | 1.00 | 1.92286 | 18.90 |
| 27 | 31.211 | 6.63 | 1.49700 | 81.61 |
| 28* | −31.707 | 11.87 | | |

| Unit mm | | | | |
|---|---|---|---|---|
| 29 | ∞ | 4.00 | 1.51633 | 64.14 |
| 30 | ∞ | 0.80 | | |
| Image plane | ∞ | | | |
| Aspherical surface data | | | | |

6th surface k = 0.000
k = −2.48389e−06, A6 = 1.83226e−08
7th surface k = 0.000
A4 = −2.43320e−05, A6 = −6.74192e−08, A8 = −6.41044e−10
11th surface k = 0.000
A4 = 1.45067e−05, A6 = −3.77227e−08, A8 = −7.55742e−11
12th surface k = 0.000
A4 = −2.50094e−06, A6 = −7.89587e−08
14th surface k = 0.000
A4 = −1.41408e−05, A6 = −7.04451e−09, A8 = −5.75014e−11
15th surface k = 0.000
A4 = 1.62138e−05, A6 = 1.81551e−09, A8 = 5.18941e−13
21th surface k = 0.000
A4 = −1.22725e−05
22th surface k = 0.000
A4 = 6.09082e−06
28th surface k = 0.000
A4 = 7.07861e−06, A6 = −2.35096e−08, A8 = 3.87003e−11

| Zoom data | | | |
|---|---|---|---|
|  | WE | ST | TE |
| f | 12.24 | 34.63 | 98.00 |
| FNO. | 4.05 | 4.06 | 4.07 |
| 2ω | 85.34 | 34.14 | 12.25 |
| BF(in air) | 15.32 | 15.28 | 15.31 |
| LTL(in air) | 124.55 | 139.03 | 166.57 |
| d5 | 0.60 | 19.54 | 48.81 |
| d12 | 35.55 | 12.43 | 1.00 |
| d22 | 2.50 | 10.47 | 20.67 |
| d25 | 7.06 | 17.79 | 17.26 |

| Unit focal length |
|---|
| f1 = 104.78   f2 = −13.83   f3 = 22.43   f4 = −24.06   f5 = 37.71 |

Example 4

| Unit mm | | | | |
|---|---|---|---|---|
| Surface data | | | | |
| Surface no. | r | d | nd | νd |
| Object plane | ∞ | ∞ | | |
| 1 | 93.077 | 2.25 | 1.85478 | 24.80 |
| 2 | 65.609 | 6.23 | 1.49700 | 81.54 |
| 3 | 16768.361 | 0.15 | | |

-continued

Unit mm

| | | | | |
|---|---|---|---|---|
| 4 | 51.513 | 4.53 | 1.49700 | 81.54 |
| 5 | 165.049 | Variable | | |
| 6* | 334.432 | 1.50 | 1.88202 | 37.22 |
| 7* | 15.107 | 7.60 | | |
| 8 | −21.495 | 1.00 | 1.70154 | 41.24 |
| 9 | 28.786 | 5.28 | 2.00069 | 25.46 |
| 10 | −31.185 | 1.49 | | |
| 11 | −19.293 | 1.00 | 1.88300 | 40.76 |
| 12 | −34.536 | Variable | | |
| 13(Stop) | ∞ | Variable | | |
| 14* | 26.374 | 3.56 | 1.58313 | 59.38 |
| 15* | −350.236 | 4.89 | | |
| 16 | 36.741 | 3.26 | 1.51633 | 64.14 |
| 17 | −105.872 | 0.20 | | |
| 18 | 38.172 | 1.00 | 1.91082 | 35.25 |
| 19 | 15.485 | 2.59 | 1.49700 | 81.54 |
| 20 | 25.277 | 1.20 | | |
| 21 | 21.663 | 1.10 | 1.74077 | 27.79 |
| 22 | 15.717 | 6.60 | 1.49700 | 81.54 |
| 23* | −42.684 | Variable | | |
| 24 | −594.788 | 0.90 | 1.83481 | 42.73 |
| 25 | 12.705 | 2.50 | 1.80810 | 22.76 |
| 26 | 20.412 | Variable | | |
| 27* | 48.122 | 8.77 | 1.49700 | 81.54 |
| 28 | −19.567 | 1.00 | 1.90366 | 31.32 |
| 29 | −25.046 | 13.43 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −8.32130e−06, A6 = 1.72264e−07, A8 = −6.40858e−10,
A10 = 1.00485e−12
7th surface k = 0.000
A4 = −2.54200e−05, A6 = 7.57557e−08, A8 = 9.39262e−10,
A10 = −2.85886e−12
14th surface k = 0.000
A4 = −2.77268e−06, A6 = −2.34731e−08, A8 = 1.89595e−11
15th surface k = 0.000
A4 = 1.36051e−05, A6 = −2.80361e−08, A8 = 1.68280e−11
23th surface k = 0.000
A4 = 1.36523e−05, A6 = 4.37574e−09, A8 = −1.73560e−11
27th surface k = 0.000
A4 = −1.02330e−06, A6 = 1.48818e−08

Zoom data

| | WE | ST | TE |
|---|---|---|---|
| f | 12.24 | 34.63 | 97.97 |
| FNO. | 4.08 | 4.08 | 4.08 |
| 2ω | 84.15 | 34.35 | 12.27 |
| BF(in air) | 16.88 | 16.87 | 16.83 |
| LTL(in air) | 139.55 | 142.42 | 163.82 |
| d5 | 0.60 | 18.42 | 45.75 |
| d12 | 31.47 | 14.62 | 1.00 |
| d13 | 15.00 | 1.50 | 1.50 |

-continued

Unit mm

| | | | |
|---|---|---|---|
| d23 | 2.51 | 10.33 | 18.03 |
| d26 | 4.49 | 12.09 | 12.10 |

Unit focal length f1 = 96.75  f2 = −15.22  f3 = 23.78  f4 = −23.09  f5 = 40.20

Example 5

Unit mm

Surface data

| Surface no. | r | d | nd | vd |
|---|---|---|---|---|
| Object plane | ∞ | ∞ | | |
| 1 | 138.864 | 2.50 | 1.85478 | 24.80 |
| 2 | 93.630 | 4.81 | 1.49700 | 81.54 |
| 3 | −3355.271 | 0.15 | | |
| 4 | 60.642 | 4.43 | 1.49700 | 81.54 |
| 5 | 174.982 | Variable | | |
| 6* | 547.663 | 1.50 | 1.88202 | 37.22 |
| 7* | 16.167 | 8.05 | | |
| 8 | −23.902 | 1.00 | 1.61800 | 63.40 |
| 9 | 36.492 | 4.66 | 2.00069 | 25.46 |
| 10 | −42.975 | 2.79 | | |
| 11 | −19.012 | 1.00 | 1.88300 | 40.76 |
| 12 | −30.591 | Variable | | |
| 13(Stop) | ∞ | 1.50 | | |
| 14* | 26.075 | 4.08 | 1.58313 | 59.38 |
| 15* | −282.871 | 4.00 | | |
| 16 | 35.853 | 3.75 | 1.49700 | 81.54 |
| 17 | −64.689 | 0.50 | | |
| 18 | 47.932 | 1.00 | 1.91082 | 35.25 |
| 19 | 16.686 | 2.29 | 1.49700 | 81.54 |
| 20 | 24.749 | 1.20 | | |
| 21 | 23.568 | 0.90 | 1.85478 | 24.80 |
| 22 | 16.012 | 5.57 | 1.58313 | 59.38 |
| 23* | −50.961 | Variable | | |
| 24 | 214.189 | 0.90 | 1.83481 | 42.73 |
| 25 | 12.571 | 2.64 | 1.80810 | 22.76 |
| 26 | 18.917 | Variable | | |
| 27* | 44.742 | 7.78 | 1.49700 | 81.54 |
| 28 | −24.960 | 1.30 | 1.90366 | 31.32 |
| 29 | −29.434 | 14.36 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −2.16835e−06, A6 = 1.31298e−07, A8 = −5.06743e−10,
A10 = 7.69634e−13
7th surface k = 0.000
A4 = −2.19260e−05, A6 = 6.66708e−08, A8 = 7.53277e−10,
A10 = −4.44491e−12
14th surface k = 0.000
A4 = −7.65240e−06, A6 = −1.02176e−08, A8 = 5.46368e−11
15th surface k = 0.000
A4 = 1.33574e−05, A6 = −1.83553e−08, A8 = 7.53148e−11
23th surface k = 0.000
A4 = 8.79672e−06, A6 = 5.90701e−10

-continued

Unit mm

27th surface k = 0.000
A4 = −2.95297e−07, A6 = 1.46181e−08

Zoom data

|  | WE | ST | TE |
|---|---|---|---|
| f | 12.24 | 30.98 | 78.38 |
| FNO. | 4.08 | 4.08 | 4.08 |
| 2ω | 83.95 | 38.23 | 15.30 |
| BF(in air) | 17.82 | 17.78 | 17.76 |
| LTL(in air) | 132.31 | 141.24 | 172.65 |
| d5 | 0.60 | 19.78 | 52.91 |
| d12 | 38.68 | 13.03 | 1.20 |
| d23 | 2.50 | 10.48 | 20.35 |
| d26 | 4.40 | 11.88 | 12.13 |

Unit focal length f1 = 127.08   f2 = −15.45   f3 = 23.33   f4 = −24.54   f5 = 40.36

Example 6

Unit mm

Surface data

| Surface no. | r | d | nd | vd |
|---|---|---|---|---|
| Object plane | ∞ | ∞ | | |
| 1 | 95.525 | 2.30 | 1.85478 | 24.80 |
| 2 | 68.074 | 7.55 | 1.49700 | 81.54 |
| 3 | −767.529 | 0.15 | | |
| 4 | 62.581 | 4.78 | 1.49700 | 81.54 |
| 5 | 174.408 | Variable | | |
| 6* | 243.654 | 1.50 | 1.88202 | 37.22 |
| 7* | 14.287 | 7.55 | | |
| 8 | −19.803 | 1.20 | 1.61800 | 63.40 |
| 9 | 38.059 | 4.59 | 2.00069 | 25.46 |
| 10 | −34.196 | 1.40 | | |
| 11 | −19.169 | 1.30 | 1.88300 | 40.76 |
| 12 | −34.403 | Variable | | |
| 13 (Stop) | ∞ | 1.50 | | |
| 14* | 21.814 | 5.18 | 1.58313 | 59.38 |
| 15* | −91.531 | 3.12 | | |
| 16 | 290.000 | 3.04 | 1.49700 | 81.54 |
| 17 | −36.113 | 0.40 | | |
| 18 | 116.284 | 1.00 | 1.91082 | 35.25 |
| 19 | 16.738 | 3.29 | 1.49700 | 81.54 |
| 20 | 45.083 | 1.20 | | |
| 21 | 24.279 | 0.80 | 1.85478 | 24.80 |
| 22 | 17.124 | 5.44 | 1.58313 | 59.38 |
| 23* | −49.287 | Variable | | |
| 24 | 102.058 | 2.91 | 1.80809 | 22.76 |
| 25 | −24.502 | 0.90 | 1.80610 | 40.92 |
| 26 | 17.396 | Variable | | |
| 27* | 30.000 | 9.31 | 1.49700 | 81.54 |
| 28 | −22.231 | 1.30 | 2.00100 | 29.13 |
| 29 | −33.019 | 11.87 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −1.88239e−05, A6 = 3.02782e−07, A8 = −1.26448e−09,
A10 = 2.07030e−12

-continued

Unit mm

7th surface k = 0.000
A4 = −4.82209e−05, A6 = 1.44150e−07, A8 = 2.12599e−09,
A10 = −1.43449e−11
14th surface k = 0.000
A4 = −1.44228e−05, A6 = −1.81726e−08, A8 = 4.98079e−11
15th surface k = 0.000
A4 = 1.95511e−05, A6 = −3.48201e−08, A8 = 1.12912e−10
23th surface k = 0.000
A4 = 7.96460e−06, A6 = 1.93548e−08, A8 = −3.83185e−11
27th surface k = 0.000
A4 = 1.00000e−06, A6 = 4.26086e−08, A8 = −9.41927e−11

Zoom data

|  | WE | ST | TE |
|---|---|---|---|
| f | 12.35 | 34.62 | 98.01 |
| FNO. | 4.05 | 4.07 | 4.06 |
| 2ω | 82.40 | 34.12 | 12.21 |
| BF (in air) | 15.27 | 15.24 | 15.32 |
| LTL (in air) | 130.50 | 138.78 | 174.07 |
| d5 | 0.60 | 16.72 | 52.69 |
| d12 | 35.40 | 9.82 | 1.30 |
| d23 | 2.54 | 13.52 | 19.51 |
| d26 | 4.98 | 11.77 | 13.56 |

Unit focal length f1 = 106.10   f2 = −14.02   f3 = 23.37   f4 = −26.62   f5 = 42.56

Example 7

Unit mm

Surface data

| Surface no. | r | d | nd | vd |
|---|---|---|---|---|
| Object plane | ∞ | ∞ | | |
| 1 | 92.330 | 2.30 | 1.85478 | 24.80 |
| 2 | 66.183 | 7.33 | 1.49700 | 81.54 |
| 3 | ∞ | 0.15 | | |
| 4 | 58.624 | 5.27 | 1.49700 | 81.54 |
| 5 | 170.722 | Variable | | |
| 6* | 199.597 | 1.50 | 1.88202 | 37.22 |
| 7* | 13.743 | 7.30 | | |
| 8 | −21.554 | 1.20 | 1.59282 | 68.62 |
| 9 | 30.689 | 4.24 | 2.00069 | 25.46 |
| 10 | −41.517 | 1.78 | | |
| 11 | −20.439 | 1.30 | 1.83481 | 42.73 |
| 12 | −45.367 | Variable | | |
| 13 (Stop) | ∞ | 1.50 | | |
| 14* | 24.022 | 4.00 | 1.58313 | 59.38 |
| 15* | −5000.000 | 4.02 | | |
| 16 | 59.547 | 3.62 | 1.49700 | 81.54 |
| 17 | −43.776 | 0.50 | | |
| 18 | 46.990 | 1.00 | 1.91082 | 35.25 |
| 19 | 15.619 | 3.51 | 1.49700 | 81.54 |
| 20 | 40.630 | 1.20 | | |
| 21 | 20.659 | 0.80 | 1.85478 | 24.80 |
| 22 | 15.352 | 5.79 | 1.51633 | 64.06 |
| 23* | −48.459 | Variable | | |
| 24 | 142.418 | 0.90 | 1.83481 | 42.73 |
| 25 | 10.808 | 3.25 | 1.80809 | 22.76 |

-continued

| Unit mm | | | | |
|---|---|---|---|---|
| 26 | 17.500 | Variable | | |
| 27 | 30.000 | 1.30 | 2.00100 | 29.13 |
| 28 | 19.978 | 10.08 | 1.51633 | 64.14 |
| 29* | −30.675 | 10.84 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −1.77339e−06, A6 = 7.59356e−08, A8 = −2.74484e−10,
A10 = 4.67371e−13
7th surface k = 0.000
A4 = −2.40353e−05, A6 = −2.17379e−08, A8 = 4.85237e−10,
A10 = −3.05745e−12
14th surface k = 0.000
A4 = −7.74508e−06, A6 = −3.08062e−08, A8 = −3.85797e−10
15th surface k = 0.000
A4 = 1.67327e−05, A6 = −3.37654e−08, A8 = −4.42299e−10
23th surface k = 0.000
A4 = 1.24090e−05, A6 = 4.13154e−09, A8 = 2.08033e−11
29th surface k = 0.000
A4 = 8.38521e−07, A6 = −4.73583e−08, A8 = 6.37866e−11,
A10 = −3.10086e−13

Zoom data

| | WE | ST | TE |
|---|---|---|---|
| f | 12.28 | 34.63 | 98.00 |
| FNO. | 4.07 | 4.09 | 4.07 |
| 2ω | 83.45 | 33.74 | 12.10 |
| BF (in air) | 14.30 | 14.28 | 14.30 |
| LTL (in air) | 132.17 | 145.12 | 174.08 |
| d5 | 0.60 | 21.63 | 52.68 |
| d12 | 34.88 | 11.37 | 1.30 |
| d23 | 2.51 | 11.36 | 19.52 |
| d26 | 6.02 | 12.62 | 12.43 |

Unit focal length f1 = 106.03  f2 = −13.12  f3 = 22.52  f4 = −23.60  f5 = 39.97

Example 8

| Unit mm | | | | |
|---|---|---|---|---|
| Surface data | | | | |
| Surface no. | r | d | nd | vd |
| Object plane | ∞ | ∞ | | |
| 1 | 94.644 | 2.50 | 1.85478 | 24.80 |
| 2 | 68.036 | 7.05 | 1.49700 | 81.54 |
| 3 | ∞ | 0.15 | | |
| 4 | 60.062 | 5.10 | 1.49700 | 81.54 |
| 5 | 173.633 | Variable | | |
| 6* | 202.797 | 1.65 | 1.88202 | 37.22 |
| 7* | 14.079 | 7.40 | | |
| 8 | −20.580 | 1.00 | 1.59282 | 68.62 |

-continued

| Unit mm | | | | |
|---|---|---|---|---|
| 9 | 34.497 | 4.23 | 2.00069 | 25.46 |
| 10 | −39.610 | 1.41 | | |
| 11 | −19.623 | 1.20 | 1.83481 | 42.73 |
| 12 | −37.436 | Variable | | |
| 13 (Stop) | ∞ | 1.50 | | |
| 14* | 23.558 | 4.21 | 1.58313 | 59.38 |
| 15* | −297.671 | 4.10 | | |
| 16 | 55.026 | 3.62 | 1.49700 | 81.54 |
| 17 | −45.245 | 0.50 | | |
| 18 | 64.615 | 1.00 | 1.91082 | 35.25 |
| 19 | 15.638 | 3.58 | 1.49700 | 81.54 |
| 20 | 45.000 | 1.20 | | |
| 21 | 23.579 | 0.80 | 1.85478 | 24.80 |
| 22 | 17.001 | 5.30 | 1.58313 | 59.38 |
| 23* | −55.002 | Variable | | |
| 24 | 135.353 | 0.90 | 1.83481 | 42.73 |
| 25 | 11.000 | 3.15 | 1.80809 | 22.76 |
| 26 | 17.566 | Variable | | |
| 27 | 30.000 | 1.20 | 2.00100 | 29.13 |
| 28 | 20.204 | 9.95 | 1.51633 | 64.14 |
| 29* | −31.360 | 11.12 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −7.61514e−06, A6 = 1.72618e−07, A8 = −7.73140e−10,
A10 = 1.40082e−12
7th surface k = 0.000
A4 = −3.27699e−05, A6 = 1.47073e−07, A8 = −2.57495e−09,
A10 = 6.05980e−11, A12 = −5.97956e−13, A14 = 1.88456e−15
14th surface k = 0.000
A4 = −7.00824e−06, A6 = −1.80540e−08, A8 = −1.23124e−10,
A10 = 4.63732e−13
15th surface k = 0.000
A4 = 1.88380e−05, A6 = −3.00983e−08, A8 = −3.56964e−11
23th surface k = 0.000
A4 = 9.95603e−06, A6 = −8.71075e−09, A8 = 2.57174e−10,
A10 = −1.23011e−12
29th surface k = 0.000
A4 = 1.00890e−06, A6 = −6.12315e−08, A8 = 1.92293e−10,
A10 = −6.86329e−13

Zoom data

| | WE | ST | TE |
|---|---|---|---|
| f | 12.36 | 34.63 | 98.00 |
| FNO. | 4.08 | 4.09 | 4.08 |
| 2ω | 83.11 | 33.79 | 12.14 |
| BF (in air) | 14.56 | 14.54 | 14.57 |
| LTL (in air) | 132.06 | 144.57 | 174.08 |
| d5 | 0.63 | 22.06 | 53.63 |
| d12 | 36.14 | 11.89 | 1.30 |

-continued

| Unit mm | | | |
|---|---|---|---|
| d23 | 2.51 | 11.14 | 19.27 |
| d26 | 5.52 | 12.24 | 12.61 |

Unit focal length f1 = 108.72   f2 = −13.76   f3 = 22.80   f4 = −23.91   f5 = 40.12

Example 9

| Unit mm | | | |
|---|---|---|---|
| Surface data | | | |
| Surface no. | r | d | nd | vd |
| Object plane | ∞ | ∞ | | |
| 1 | 94.862 | 2.30 | 1.85478 | 24.80 |
| 2 | 67.725 | 7.14 | 1.49700 | 81.54 |
| 3 | ∞ | 0.15 | | |
| 4 | 59.563 | 5.29 | 1.49700 | 81.54 |
| 5 | 178.829 | Variable | | |
| 6* | 277.602 | 1.50 | 1.85135 | 40.10 |
| 7* | 13.987 | 7.35 | | |
| 8 | −21.989 | 1.20 | 1.59282 | 68.62 |
| 9 | 32.063 | 4.03 | 2.00069 | 25.46 |
| 10 | −47.556 | 1.55 | | |
| 11 | −20.983 | 1.30 | 1.83481 | 42.73 |
| 12 | −39.971 | Variable | | |
| 13 (Stop) | ∞ | 1.50 | | |
| 14* | 22.814 | 3.69 | 1.58313 | 59.38 |
| 15* | 132.921 | 3.41 | | |
| 16 | 42.076 | 3.94 | 1.49700 | 81.54 |
| 17 | −47.024 | 0.50 | | |
| 18 | 44.313 | 1.00 | 1.91082 | 35.25 |
| 19 | 14.663 | 3.76 | 1.49700 | 81.54 |
| 20 | 39.990 | 1.20 | | |
| 21 | 25.520 | 0.80 | 1.85478 | 24.80 |
| 22 | 19.002 | 4.79 | 1.59201 | 67.02 |
| 23* | −56.434 | Variable | | |
| 24 | 121.261 | 0.90 | 1.83481 | 42.73 |
| 25 | 10.763 | 3.78 | 1.80809 | 22.76 |
| 26 | 17.840 | Variable | | |
| 27 | 30.000 | 1.30 | 2.00100 | 29.13 |
| 28 | 19.143 | 10.34 | 1.51633 | 64.14 |
| 29* | −30.227 | 11.61 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = 1.57456e−06, A6 = 7.02732e−08, A8 = −2.65285e−10,
A10 = 4.29620e−13
7th surface k = 0.000
A4 = −1.96584e−05, A6 = 1.15738e−08, A8 = 3.66175e−10,
A10 = −8.43569e−13
14th surface k = 0.000
A4 = −9.11595e−06, A6 = −3.53021e−08, A8 = −3.79037e−10
15th surface k = 0.000
A4 = 1.58570e−05, A6 = −4.11512e−08, A8 = −4.06231e−10
23th surface k = 0.000
A4 = 9.20006e−06, A6 = −6.86593e−10

-continued

| Unit mm |
|---|
| 29th surface | k = 0.000
A4 = −2.51883e−07, A6 = −4.61441e−08, A8 = 5.59859e−11,
A10 = −4.61977e−13

| Zoom data | | | |
|---|---|---|---|
| | WE | ST | TE |
| f | 12.28 | 34.62 | 98.00 |
| FNO. | 4.07 | 4.07 | 4.07 |
| 2ω | 83.44 | 33.75 | 12.10 |
| BF (in air) | 15.06 | 15.03 | 15.06 |
| LTL (in air) | 132.16 | 145.32 | 174.07 |
| d5 | 0.60 | 22.15 | 53.23 |
| d12 | 35.79 | 11.86 | 1.30 |
| d23 | 2.51 | 10.97 | 19.04 |
| d26 | 5.48 | 12.59 | 12.73 |

Unit focal length f1 = 107.50   f2 = −13.69   f3 = 22.60   f4 = −24.80   f5 = 41.14

Example 10

| Unit mm | | | |
|---|---|---|---|
| Surface data | | | |
| Surface no. | r | d | nd | vd |
| Object plane | ∞ | ∞ | | |
| 1 | 94.903 | 2.30 | 1.85478 | 24.80 |
| 2 | 67.906 | 7.01 | 1.49700 | 81.54 |
| 3 | ∞ | 0.15 | | |
| 4 | 59.377 | 5.29 | 1.49700 | 81.54 |
| 5 | 180.701 | Variable | | |
| 6* | 266.105 | 1.50 | 1.85135 | 40.10 |
| 7* | 14.041 | 7.40 | | |
| 8 | −23.048 | 1.20 | 1.59282 | 68.62 |
| 9 | 29.447 | 4.20 | 2.00069 | 25.46 |
| 10 | −47.325 | 1.31 | | |
| 11 | −21.940 | 1.30 | 1.83481 | 42.73 |
| 12 | −50.649 | Variable | | |
| 13 (Stop) | ∞ | 1.50 | | |
| 14* | 22.959 | 3.91 | 1.58313 | 59.38 |
| 15* | 355.464 | 3.67 | | |
| 16 | 56.909 | 3.67 | 1.49700 | 81.54 |
| 17 | −46.024 | 0.50 | | |
| 18 | 50.779 | 1.00 | 1.91082 | 35.25 |
| 19 | 15.223 | 3.88 | 1.49700 | 81.54 |
| 20 | 54.561 | 1.20 | | |
| 21 | 24.498 | 0.80 | 1.85478 | 24.80 |
| 22 | 17.421 | 5.13 | 1.59201 | 67.02 |
| 23* | −56.759 | Variable | | |
| 24 | 119.978 | 0.90 | 1.80400 | 46.57 |
| 25 | 10.171 | 3.48 | 1.80809 | 22.76 |
| 26 | 16.076 | Variable | | |
| 27 | 30.000 | 1.30 | 2.00100 | 29.13 |
| 28 | 19.033 | 10.44 | 1.51633 | 64.14 |
| 29* | −29.578 | 10.82 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = 4.11148e−06, A6 = 3.99766e−08, A8 = −1.70384e−10,
A10 = 3.05186e−13

-continued

| Unit mm |
|---|

7th surface k = 0.000
A4 = −1.44023e−05, A6 = −1.63674e−08, A8 = 4.86033e−10,
A10 = −2.82106e−12

14th surface k = 0.000
A4 = −9.56972e−06, A6 = −3.09123e−08, A8 = −3.27923e−10

15th surface k = 0.000
A4 = 1.51315e−05, A6 = −3.70823e−08, A8 = −3.59209e−10

23th surface k = 0.000
A4 = 8.87338e−06, A6 = −1.90718e−10

29th surface k = 0.000
A4 = −3.51851e−06, A6 = −2.18767e−08, A8 = −1.07188e−10,
A10 = −1.48622e−13

| Zoom data | | | |
|---|---|---|---|
| | WE | ST | TE |
| f | 12.28 | 34.62 | 97.99 |
| FNO. | 4.07 | 4.09 | 4.09 |
| 2ω | 83.43 | 33.75 | 12.11 |
| BF (in air) | 14.28 | 14.23 | 14.27 |
| LTL (in air) | 132.13 | 143.18 | 172.65 |
| d5 | 0.60 | 20.93 | 52.49 |
| d12 | 36.06 | 11.53 | 1.30 |
| d23 | 2.50 | 11.10 | 18.71 |
| d26 | 5.65 | 12.35 | 12.85 |

| Unit focal length | | | | |
|---|---|---|---|---|
| f1 = 106.76 | f2 = −13.56 | f3 = 22.39 | f4 = −23.64 | f5 = 40.79 |

Example 11

| Unit mm | | | | |
|---|---|---|---|---|
| Surface data | | | | |
| Surface no. | r | d | nd | vd |
| Object plane | ∞ | ∞ | | |
| 1 | 97.776 | 2.50 | 1.85478 | 24.80 |
| 2 | 70.393 | 7.00 | 1.49700 | 81.54 |
| 3 | ∞ | 0.15 | | |
| 4 | 62.473 | 5.07 | 1.49700 | 81.54 |
| 5 | 182.546 | Variable | | |
| 6* | 233.595 | 2.50 | 1.80610 | 40.92 |
| 7* | 13.697 | 8.10 | | |
| 8 | −21.099 | 1.20 | 1.59282 | 68.62 |
| 9 | 35.528 | 3.92 | 2.00069 | 25.46 |
| 10 | −51.395 | 1.69 | | |
| 11 | −20.079 | 1.30 | 1.83481 | 42.73 |
| 12 | −31.621 | Variable | | |
| 13 (Stop) | ∞ | 1.50 | | |
| 14* | 24.177 | 4.32 | 1.58313 | 59.38 |
| 15* | −202.531 | 3.92 | | |
| 16 | 43.364 | 3.76 | 1.49700 | 81.54 |
| 17 | −53.186 | 0.50 | | |
| 18 | 85.412 | 1.00 | 1.91082 | 35.25 |
| 19 | 15.740 | 3.55 | 1.49700 | 81.54 |
| 20 | 45.000 | 1.20 | | |
| 21 | 25.562 | 0.80 | 1.85478 | 24.80 |
| 22 | 18.554 | 5.14 | 1.58313 | 59.38 |
| 23* | −47.600 | Variable | | |

-continued

| Unit mm | | | | |
|---|---|---|---|---|
| 24 | 171.263 | 0.90 | 1.83481 | 42.73 |
| 25 | 11.122 | 3.31 | 1.80809 | 22.76 |
| 26 | 19.000 | Variable | | |
| 27 | 30.000 | 1.30 | 2.00100 | 29.13 |
| 28 | 19.782 | 9.85 | 1.51633 | 64.14 |
| 29* | −32.052 | 11.40 | | |
| 30 | ∞ | 4.00 | 1.51633 | 64.14 |
| 31 | ∞ | 0.80 | | |
| Image plane | ∞ | | | |

| Aspherical surface data |
|---|

6th surface k = 0.000
A4 = −6.23383e−06, A6 = 1.01504e−07, A8 = −3.40772e−10,
A10 = 4.60986e−13

7th surface k = 0.000
A4 = −3.21777e−05, A6 = 3.09142e−08, A8 = −3.76476e−10,
A10 = 1.19180e−11, A12 = −1.04587e−13, A14 = 1.67217e−16

14th surface k = 0.000
A4 = −4.57303e−06, A6 = −4.16211e−09, A8 = −9.99965e−11,
A10 = 5.55856e−13

15th surface k = 0.000
A4 = 1.92873e−05, A6 = −1.72071e−08, A8 = 1.88390e−11

23th surface k = 0.000
A4 = 9.52491e−06, A6 = 8.39073e−10, A8 = 6.01858e−11

29th surface k = 0.000
A4 = 2.86058e−06, A6 = −7.29324e−08, A8 = 2.99285e−10,
A10 = −1.03066e−12

| Zoom data | | | |
|---|---|---|---|
| | WE | ST | TE |
| f | 12.28 | 34.63 | 98.00 |
| FNO. | 4.08 | 4.07 | 4.08 |
| 2ω | 83.48 | 33.75 | 12.10 |
| BF (in air) | 14.85 | 14.83 | 14.87 |
| LTL (in air) | 136.55 | 146.53 | 178.11 |
| d5 | 0.60 | 20.72 | 54.78 |
| d12 | 38.49 | 11.99 | 1.30 |
| d23 | 2.56 | 11.74 | 19.78 |
| d26 | 5.55 | 12.75 | 12.88 |

| Unit focal length | | | | |
|---|---|---|---|---|
| f1 = 112.33 | f2 = −14.27 | f3 = 23.50 | f4 = −25.15 | f5 = 41.37 |

Example 12

| Unit mm | | | | |
|---|---|---|---|---|
| Surface data | | | | |
| Surface no. | r | d | nd | vd |
| Object plane | ∞ | ∞ | | |
| 1 | 93.435 | 2.30 | 1.85478 | 24.80 |
| 2 | 67.476 | 7.36 | 1.49700 | 81.54 |
| 3 | −4070.905 | 0.15 | | |
| 4 | 58.563 | 5.22 | 1.49700 | 81.54 |
| 5 | 169.257 | Variable | | |

-continued

Unit mm

| | | | | |
|---|---|---|---|---|
| 6* | 435.257 | 1.50 | 1.88202 | 37.22 |
| 7* | 14.713 | 7.45 | | |
| 8 | −19.285 | 1.20 | 1.61800 | 63.40 |
| 9 | 38.636 | 4.64 | 2.00069 | 25.46 |
| 10 | −35.100 | 1.62 | | |
| 11 | −18.834 | 1.30 | 1.88300 | 40.76 |
| 12 | −32.239 | Variable | | |
| 13 (Stop) | ∞ | 1.50 | | |
| 14* | 21.901 | 4.33 | 1.58313 | 59.38 |
| 15* | −264.540 | 3.44 | | |
| 16 | 89.201 | 3.34 | 1.53775 | 74.70 |
| 17 | −40.822 | 0.40 | | |
| 18 | 70.377 | 1.00 | 1.91082 | 35.25 |
| 19 | 15.392 | 3.47 | 1.49700 | 81.54 |
| 20 | 40.910 | 1.20 | | |
| 21 | 23.876 | 0.80 | 1.85478 | 24.80 |
| 22 | 17.038 | 5.25 | 1.58313 | 59.38 |
| 23* | −52.928 | Variable | | |
| 24 | 174.914 | 0.90 | 1.83481 | 42.73 |
| 25 | 11.062 | 3.34 | 1.80809 | 22.76 |
| 26 | 18.825 | Variable | | |
| 27 | 30.000 | 1.30 | 2.00100 | 29.13 |
| 28 | 21.715 | 9.68 | 1.49700 | 81.54 |
| 29* | −32.034 | 12.00 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −2.09906e−06, A6 = 1.69300e−07, A8 = −7.61489e−10,
A10 = 1.42413e−12
7th surface k = 0.000
A4 = −2.63401e−05, A6 = 1.05588e−07, A8 = 8.58335e−10,
A10 = −4.56534e−12
14th surface k = 0.000
A4 = −9.76379e−06, A6 = 4.51506e−09, A8 = −2.24038e−10
15th surface k = 0.000
A4 = 2.13406e−05, A6 = −4.11329e−09, A8 = −2.02182e−10
23th surface k = 0.000
A4 = 7.55568e−06, A6 = 1.10690e−08, A8 = 3.53798e−11
29th surface k = 0.000
A4 = 2.96901e−06, A6 = −5.66675e−08, A8 = 2.18503e−10,
A10 = −5.85823e−13

Zoom data

| | WE | ST | TE |
|---|---|---|---|
| f | 12.36 | 34.63 | 98.01 |
| FNO. | 4.08 | 4.08 | 4.07 |
| 2ω | 82.61 | 33.96 | 12.18 |
| BF (in air) | 15.45 | 15.42 | 15.48 |
| LTL (in air) | 131.44 | 144.74 | 173.20 |
| d5 | 0.62 | 21.29 | 52.51 |
| d12 | 35.39 | 11.67 | 1.30 |

-continued

Unit mm

| | | | |
|---|---|---|---|
| d23 | 2.56 | 11.06 | 18.35 |
| d26 | 4.71 | 12.59 | 12.86 |

Unit focal length f1 = 104.96   f2 = −13.85   f3 = 22.93   f4 = −24.83   f5 = 40.37

Example 13

Unit mm

Surface data

| Surface no. | r | d | nd | vd |
|---|---|---|---|---|
| Object plane | ∞ | ∞ | | |
| 1 | 96.654 | 2.50 | 1.85478 | 24.80 |
| 2 | 68.972 | 7.05 | 1.49700 | 81.54 |
| 3 | ∞ | 0.15 | | |
| 4 | 59.662 | 5.16 | 1.49700 | 81.54 |
| 5 | 174.229 | Variable | | |
| 6* | 162.713 | 1.65 | 1.88052 | 37.17 |
| 7* | 13.850 | 7.36 | | |
| 8 | −21.183 | 1.00 | 1.59282 | 68.62 |
| 9 | 31.779 | 4.15 | 2.00069 | 25.46 |
| 10 | −43.296 | 1.35 | | |
| 11 | −21.193 | 1.20 | 1.83481 | 42.73 |
| 12 | −42.594 | Variable | | |
| 13(Stop) | ∞ | 1.50 | | |
| 14* | 23.901 | 4.14 | 1.58253 | 59.32 |
| 15* | −406.739 | 3.84 | | |
| 16 | 48.100 | 3.70 | 1.49700 | 81.54 |
| 17 | −48.100 | 0.50 | | |
| 18 | 66.000 | 1.00 | 1.91082 | 35.25 |
| 19 | 15.507 | 3.71 | 1.49700 | 81.54 |
| 20 | 50.727 | 1.20 | | |
| 21 | 24.523 | 0.80 | 1.85478 | 24.80 |
| 22 | 17.859 | 5.12 | 1.58253 | 59.32 |
| 23* | −52.522 | Variable | | |
| 24 | 134.838 | 0.90 | 1.83481 | 42.73 |
| 25 | 11.000 | 3.47 | 1.80809 | 22.76 |
| 26 | 17.500 | Variable | | |
| 27 | 30.000 | 1.20 | 2.00100 | 29.13 |
| 28 | 19.799 | 10.10 | 1.51593 | 64.25 |
| 29* | −30.584 | 11.14 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −5.77781e−06, A6 = 1.10300e−07, A8 = −3.78631e−10,
A10 = 4.50834e−13, A12 = 1.02073e−15, A14 = −1.91695e−18
7th surface k = 0.000
A4 = −2.82349e−05, A6 = 1.10626e−07, A8 = −3.02561e−09,
A10 = 6.48799e−11, A12 = −6.00343e−13, A14 = 2.12998e−15
14th surface k = 0.000
A4 = −5.77715e−06, A6 = −6.66472e−08, A8 = 2.81951e−10,
A10 = −2.02398e−12
15th surface k = 0.000
A4 = 1.87021e−05, A6 = −7.22335e−08, A8 = 2.50887e−10,
A10 = −1.96088e−12
23th surface k = 0.000
A4 = 9.56313e−06, A6 = 4.31157e−09, A8 = 8.43502e−12

-continued

Unit mm

29th surface k = 0.000
A4 = 3.70582e−06, A6 = −9.46558e−08, A8 = 3.92268e−10,
A10 = −1.24714e−12

Zoom data

|  | WE | ST | TE |
|---|---|---|---|
| f | 12.36 | 34.63 | 98.01 |
| FNO. | 4.08 | 4.07 | 4.08 |
| 2ω | 83.03 | 33.73 | 12.10 |
| BF(in air) | 14.59 | 14.57 | 14.63 |
| LTL(in air) | 132.16 | 145.00 | 174.30 |
| d5 | 0.64 | 22.24 | 53.61 |
| d12 | 36.16 | 12.06 | 1.30 |
| d23 | 2.51 | 10.99 | 19.49 |
| d26 | 5.52 | 12.40 | 12.55 |

Unit focal length f1 = 109.32  f2 = −13.73  f3 = 22.67  f4 = −23.85  f5 = 40.26

Example 14

Unit mm

Surface data

| Surface no. | r | d | nd | vd |
|---|---|---|---|---|
| Object plane | ∞ | ∞ | | |
| 1 | 94.366 | 2.50 | 1.85478 | 24.80 |
| 2 | 68.468 | 7.10 | 1.49700 | 81.54 |
| 3 | ∞ | 0.15 | | |
| 4 | 63.551 | 5.04 | 1.49700 | 81.54 |
| 5 | 181.501 | Variable | | |
| 6* | 3133.633 | 1.65 | 1.88227 | 37.18 |
| 7* | 15.184 | 7.37 | | |
| 8 | −21.101 | 1.00 | 1.59282 | 68.62 |
| 9 | 40.498 | 4.73 | 2.00069 | 25.46 |
| 10 | −36.316 | 1.25 | | |
| 11 | −20.635 | 1.20 | 1.83481 | 42.73 |
| 12 | −40.395 | Variable | | |
| 13(Stop) | ∞ | 1.50 | | |
| 14* | 23.840 | 4.55 | 1.58253 | 59.32 |
| 15* | −426.939 | 4.68 | | |
| 16 | 526.800 | 2.98 | 1.49700 | 81.54 |
| 17 | −39.013 | 0.50 | | |
| 18 | 67.963 | 1.00 | 1.91082 | 35.25 |
| 19 | 17.675 | 5.85 | 1.49700 | 81.54 |
| 20 | −82.478 | 1.20 | | |
| 21 | 32.342 | 0.80 | 1.85478 | 24.80 |
| 22 | 21.913 | 3.70 | 1.58253 | 59.32 |
| 23* | −546.379 | Variable | | |
| 24 | 193.583 | 0.90 | 1.83481 | 42.73 |
| 25 | 12.026 | 3.04 | 1.80809 | 22.76 |
| 26 | 19.719 | Variable | | |
| 27 | 30.000 | 2.10 | 2.00100 | 29.13 |
| 28 | 20.365 | 9.83 | 1.51593 | 64.25 |
| 29* | −31.797 | 13.21 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −6.31402e−06, A6 = 1.94733e−07, A8 = −8.23491e−10,
A10 = 1.31860e−12

-continued

Unit mm

7th surface k = 0.000
A4 = −3.04438e−05, A6 = 1.02028e−07, A8 = 1.01245e−09,
A10 = 2.84462e−13, A12 = −6.29940e−14, A14 = 1.34598e−16
14th surface k = 0.000
A4 = −1.14806e−05, A6 = −4.58752e−08, A8 = 9.39748e−11,
A10 = 5.17355e−13
15th surface k = 0.000
A4 = 1.22534e−05, A6 = −6.09464e−08, A8 = 1.78078e−10,
A10 = 3.23059e−13
23th surface k = 0.000
A4 = −5.23796e−07, A6 = 8.34472e−09, A8 = −5.40068e−11
29th surface k = 0.000
A4 = 5.10991e−06, A6 = −4.20251e−08, A8 = 6.43559e−11,
A10 = −1.58035e−13

Zoom data

|  | WE | ST | TE |
|---|---|---|---|
| f | 12.36 | 34.63 | 98.01 |
| FNO. | 4.08 | 4.08 | 4.09 |
| 2ω | 83.01 | 33.73 | 12.13 |
| BF(in air) | 16.66 | 16.63 | 16.69 |
| LTL(in air) | 137.04 | 155.06 | 181.47 |
| d5 | 0.85 | 26.38 | 54.59 |
| d12 | 38.10 | 14.21 | 1.30 |
| d23 | 2.36 | 10.34 | 20.90 |
| d26 | 4.45 | 12.89 | 13.36 |

Unit focal length f1 = 112.04  f2 = −14.43  f3 = 24.11  f4 = −25.87  f5 = 40.08

Example 15

Unit mm

Surface data

| Surface no. | r | d | nd | vd |
|---|---|---|---|---|
| Object plane | ∞ | ∞ | | |
| 1 | 94.549 | 2.50 | 1.85478 | 24.80 |
| 2 | 68.094 | 7.10 | 1.49700 | 81.54 |
| 3 | −51694.132 | 0.15 | | |
| 4 | 61.764 | 5.04 | 1.49700 | 81.54 |
| 5 | 179.112 | Variable | | |
| 6* | −1061.313 | 1.65 | 1.88227 | 37.18 |
| 7* | 15.238 | 7.37 | | |
| 8 | −21.012 | 1.00 | 1.59282 | 68.62 |
| 9 | 40.169 | 4.69 | 2.00069 | 25.46 |
| 10 | −36.096 | 1.35 | | |
| 11 | −20.354 | 1.20 | 1.83481 | 42.73 |
| 12 | −38.760 | Variable | | |
| 13(Stop) | ∞ | 1.50 | | |
| 14* | 23.691 | 4.57 | 1.58253 | 59.32 |
| 15* | −426.121 | 4.89 | | |
| 16 | 282.161 | 3.09 | 1.49700 | 81.54 |
| 17 | −38.945 | 0.50 | | |
| 18 | 80.781 | 1.00 | 1.91082 | 35.25 |
| 19 | 17.475 | 4.79 | 1.49700 | 81.54 |
| 20 | −108.796 | 1.20 | | |
| 21 | 30.543 | 0.80 | 1.85478 | 24.80 |

-continued

Unit mm

| | | | | |
|---|---|---|---|---|
| 22 | 21.495 | 0.01 | 1.56384 | 60.67 |
| 23 | 21.495 | 3.98 | 1.58253 | 59.32 |
| 24* | −217.658 | Variable | | |
| 25 | 447.009 | 0.90 | 1.83481 | 42.73 |
| 26 | 11.964 | 3.20 | 1.80809 | 22.76 |
| 27 | 20.628 | Variable | | |
| 28 | 30.000 | 1.40 | 2.00100 | 29.13 |
| 29 | 20.227 | 9.98 | 1.51593 | 64.25 |
| 30* | −30.226 | 13.77 | | |
| 31 | ∞ | 4.00 | 1.51633 | 64.14 |
| 32 | ∞ | 0.80 | | |
| Image plane | ∞ | | | |

Aspherical surface data

6th surface k = 0.000
A4 = −3.88820e−06, A6 = 1.87086e−07, A8 = −7.95151e−10,
A10 = 1.25527e−12

7th surface k = 0.000
A4 = −2.77730e−05, A6 = 8.80767e−08, A8 = 1.51145e−09,
A10 = −7.73362e−12, A12 = 1.53630e−14, A14 = −1.43758e−16

14th surface k = 0.000
A4 = −1.05694e−05, A6 = −6.45470e−08, A8 = 1.20208e−10,
A10 = 1.00841e−12

15th surface k = 0.000
A4 = 1.25817e−05, A6 = −8.27502e−08, A8 = 2.56287e−10,
A10 = 6.01735e−13

24th surface k = 0.000
A4 = 5.60083e−07, A6 = 1.19957e−08, A8 = −8.00000e−11

30th surface k = 0.000
A4 = 5.86052e−06, A6 = −3.89769e−08, A8 = 5.06557e−11,
A10 = −1.39335e−13

Zoom data

| | WE | ST | TE |
|---|---|---|---|
| f | 12.36 | 34.63 | 98.01 |
| FNO. | 4.08 | 4.08 | 4.08 |
| 2ω | 82.99 | 33.72 | 12.13 |
| BF(in air) | 17.21 | 17.18 | 17.23 |
| LTL(in air) | 136.88 | 154.11 | 180.42 |
| d5 | 0.90 | 25.97 | 53.97 |
| d12 | 38.09 | 14.02 | 1.30 |
| d24 | 2.84 | 10.91 | 20.96 |
| d27 | 3.99 | 12.18 | 13.11 |

Unit focal length f1 = 110.17   f2 = −14.38   f3 = 24.13   f4 = −25.30   f5 = 39.22

Example 16

Unit mm

Surface data

| Surface no. | r | d | nd | vd |
|---|---|---|---|---|
| Object plane | ∞ | ∞ | | |
| 1 | 95.949 | 2.50 | 1.85478 | 24.80 |
| 2 | 68.626 | 7.09 | 1.49700 | 81.54 |

-continued

Unit mm

| | | | | |
|---|---|---|---|---|
| 3 | −8377.942 | 0.15 | | |
| 4 | 61.585 | 5.04 | 1.49700 | 81.54 |
| 5 | 177.353 | Variable | | |
| 6* | 716.535 | 1.65 | 1.88227 | 37.18 |
| 7* | 15.145 | 7.37 | | |
| 8 | −21.580 | 1.00 | 1.59282 | 68.62 |
| 9 | 36.981 | 4.78 | 2.00069 | 25.46 |
| 10 | −38.844 | 1.28 | | |
| 11 | −22.082 | 1.20 | 1.83481 | 42.73 |
| 12 | −49.197 | Variable | | |
| 13(Stop) | ∞ | 1.50 | | |
| 14* | 23.676 | 4.56 | 1.58253 | 59.32 |
| 15* | −439.208 | 4.90 | | |
| 16 | 172.588 | 3.04 | 1.49700 | 81.54 |
| 17 | −41.929 | 0.50 | | |
| 18 | 81.016 | 1.00 | 1.91082 | 35.25 |
| 19 | 17.182 | 4.64 | 1.49700 | 81.54 |
| 20 | −209.248 | 1.20 | | |
| 21 | 28.562 | 0.80 | 1.85478 | 24.80 |
| 22 | 21.421 | 4.20 | 1.58253 | 59.32 |
| 23* | −116.583 | Variable | | |
| 24 | 287.459 | 0.90 | 1.83481 | 42.73 |
| 25 | 11.939 | 2.98 | 1.80809 | 22.76 |
| 26 | 19.021 | Variable | | |
| 27 | 30.000 | 1.20 | 2.00100 | 29.13 |
| 28 | 20.470 | 9.99 | 1.51593 | 64.25 |
| 29* | −30.111 | 13.36 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = 2.05267e−07, A6 = 1.11693e−07, A8 = −4.56214e−10,
A10 = 7.21619e−13

7th surface k = 0.000
A4 = −1.92544e−05, A6 = 7.37941e−08, A8 = −2.92949e−11,
A10 = 1.49465e−11, A12 = −1.61994e−13, A14 = 5.47982e−16

14th surface k = 0.000
A4 = −1.28520e−05, A6 = −7.10602e−08, A8 = 1.20613e−10,
A10 = −1.29681e−13

15th surface k = 0.000
A4 = 8.98467e−06, A6 = −9.15893e−08, A8 = 2.91742e−10,
A10 = −8.64068e−13

23th surface k = 0.000
A4 = 3.12260e−06, A6 = 1.05725e−08, A8 = −8.00000e−11

29th surface k = 0.000
A4 = 4.74827e−06, A6 = −4.34195e−08, A8 = 6.95050e−11,
A10 = −1.89705e−13

Zoom data

| | WE | ST | TE |
|---|---|---|---|
| f | 12.36 | 34.63 | 98.00 |
| FNO. | 4.08 | 4.08 | 4.08 |
| 2ω | 83.00 | 33.71 | 12.14 |
| BF(in air) | 16.79 | 16.78 | 16.82 |
| LTL(in air) | 135.67 | 153.96 | 179.58 |
| d5 | 0.80 | 26.73 | 54.10 |
| d12 | 37.38 | 14.09 | 1.30 |

-continued

| Unit mm | | | |
|---|---|---|---|
| d23 | 3.28 | 10.98 | 21.27 |
| d26 | 3.97 | 11.93 | 12.63 |

| Unit focal length | | | | |
|---|---|---|---|---|
| f1 = 110.71 | f2 = −14.03 | f3 = 23.69 | f4 = −23.98 | f5 = 38.77 |

Example 17

| Unit mm | | | |
|---|---|---|---|
| Surface data | | | |
| Surface no. | r | d | nd | vd |
| Object plane | ∞ | ∞ | | |
| 1 | 93.583 | 2.50 | 1.85478 | 24.80 |
| 2 | 67.801 | 7.15 | 1.49700 | 81.54 |
| 3 | ∞ | 0.15 | | |
| 4 | 61.858 | 4.97 | 1.49700 | 81.54 |
| 5 | 174.464 | Variable | | |
| 6* | 287.786 | 1.65 | 1.88227 | 37.18 |
| 7* | 14.613 | 7.38 | | |
| 8 | −23.154 | 1.00 | 1.59282 | 68.63 |
| 9 | 31.923 | 4.85 | 2.00069 | 25.46 |
| 10 | −43.491 | 1.35 | | |
| 11 | −22.987 | 1.20 | 1.83481 | 42.71 |
| 12 | −55.345 | Variable | | |
| 13 (Stop) | ∞ | 1.50 | | |
| 14* | 24.239 | 4.37 | 1.58253 | 59.32 |
| 15* | −431.399 | 4.59 | | |
| 16 | 52.169 | 3.55 | 1.43875 | 94.93 |
| 17 | −51.001 | 0.10 | | |
| 18 | 43.970 | 1.00 | 1.91082 | 35.25 |
| 19 | 15.684 | 3.73 | 1.49700 | 81.54 |
| 20 | 46.399 | 1.10 | | |
| 21 | 25.066 | 0.80 | 1.85478 | 24.80 |
| 22 | 17.519 | 4.99 | 1.58253 | 59.32 |
| 23* | −71.142 | Variable | | |
| 24 | 110.789 | 0.90 | 1.83481 | 42.71 |
| 25 | 11.274 | 3.07 | 1.80810 | 22.76 |
| 26 | 17.325 | Variable | | |
| 27 | 30.229 | 1.20 | 2.00100 | 29.13 |
| 28 | 21.475 | 9.15 | 1.51593 | 64.25 |
| 29* | −32.812 | Variable | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = 2.25898e−07, A6 = 4.22819e−08, A8 = −8.98072e−11,
A10 = 1.00869e−13

7th surface k = 0.000
A4 = −1.88770e−05, A6 = −6.85675e−09, A8 = 2.53859e−10,
A10 = −1.95293e−12, A12 = 2.06991e−14

14th surface k = 0.000
A4 = −1.05225e−05, A6 = −1.99885e−08, A8 = −3.857396e−11,
A10 = 3.64450e−13

15th surface k = 0.000
A4 = 1.05698e−05, A6 = −3.47712e−08, A8 = 7.58436e−11

-continued

| Unit mm |
|---|

23th surface k = 0.000
A4 = 7.69926e−06, A6 = 8.54623e−10, A8 = −3.49269e−11

29th surface k = 0.000
A4 = 2.60150e−06, A6 = −5.83870e−08, A8 = 1.49538e−10,
A10 = −3.65912e−13

| Zoom data | | | |
|---|---|---|---|
| | WE | ST | TE |
| f | 12.36 | 34.63 | 97.98 |
| FNO. | 4.07 | 4.08 | 4.08 |
| 2ω | 83.00 | 33.76 | 12.14 |
| BF(in air) | 15.97 | 15.50 | 14.55 |
| LTL(in air) | 132.66 | 148.69 | 175.54 |
| d5 | 0.75 | 24.75 | 53.60 |
| d12 | 36.27 | 13.05 | 1.30 |
| d23 | 2.47 | 10.80 | 21.04 |
| d26 | 4.96 | 12.34 | 12.80 |
| d29 | 12.51 | 12.08 | 11.08 |

| Unit focal length | | | | |
|---|---|---|---|---|
| f1 = 110.44 | f2 = −13.94 | f3 = 23.09 | f4 = −24.46 | f5 = 39.46 |

Example 18

| Unit mm | | | |
|---|---|---|---|
| Surface data | | | |
| Surface no. | r | d | nd | vd |
| Object plane | ∞ | ∞ | | |
| 1 | 95.079 | 2.50 | 1.85478 | 24.80 |
| 2 | 68.232 | 7.15 | 1.49700 | 81.54 |
| 3 | −3617.707 | 0.15 | | |
| 4 | 61.430 | 4.97 | 1.49700 | 81.54 |
| 5 | 170.088 | Variable | | |
| 6* | 258.176 | 1.65 | 1.88227 | 37.18 |
| 7* | 14.511 | 7.55 | | |
| 8 | −21.242 | 1.00 | 1.43875 | 94.93 |
| 9 | 37.222 | 3.80 | 1.92286 | 20.88 |
| 10 | −89.968 | 1.65 | | |
| 11 | −23.138 | 1.20 | 1.88300 | 40.76 |
| 12 | −35.361 | Variable | | |
| 13(Stop) | ∞ | 1.50 | | |
| 14* | 25.480 | 4.11 | 1.58253 | 59.32 |
| 15* | −428.292 | 5.56 | | |
| 16 | 49.370 | 3.66 | 1.43875 | 94.93 |
| 17 | −50.004 | 0.10 | | |
| 18 | 48.458 | 1.00 | 1.91082 | 35.25 |
| 19 | 16.450 | 3.59 | 1.49700 | 81.54 |
| 20 | 50.864 | 1.10 | | |
| 21 | 25.537 | 0.80 | 1.85478 | 24.80 |
| 22 | 17.931 | 4.94 | 1.58253 | 59.32 |
| 23* | −72.348 | Variable | | |
| 24 | 97.559 | 0.90 | 1.83481 | 42.71 |
| 25 | 11.406 | 3.10 | 1.80810 | 22.76 |
| 26 | 17.138 | Variable | | |
| 27 | 30.229 | 1.20 | 2.00100 | 29.13 |
| 28 | 21.727 | 9.00 | 1.51593 | 64.25 |
| 29* | −35.062 | Variable | | |

-continued

Unit mm

| | | | | |
|---|---|---|---|---|
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −1.59702e−06, A6 = 4.07266e−08, A8 = −3.08315e−11,
A10 = −4.51690e−14

7th surface k = 0.000
A4 = −2.16368e−05, A6 = −1.80689e−08, A8 = 2.53431e−10,
A10 = −2.20429e−12, A12 = 3.51364e−14

14th surface k = 0.000
A4 = −7.98350e−06, A6 = −2.95058e−08, A8 = 4.84105e−11,
A10 = −6.17600e−14

15th surface k = 0.000
A4 = 1.15167e−05, A6 = −3.594306e−08, A8 = 5.13666e−11

23th surface k = 0.000
A4 = 7.42561e−06, A6 = 2.63480e−09, A8 = −2.84963e−11

29th surface k = 0.000
A4 = 1.81113e−06, A6 = −6.95321e−08, A8 = 2.31304e−10,
A10 = −5.68376e−13

Zoom data

| | WE | ST | TE |
|---|---|---|---|
| f | 12.36 | 34.63 | 97.97 |
| FNO. | 4.08 | 4.07 | 4.08 |
| 2ω | 82.99 | 33.81 | 12.15 |
| BF(in air) | 16.20 | 15.31 | 14.36 |
| LTL(in air) | 133.38 | 149.38 | 176.01 |
| d5 | 0.76 | 24.64 | 53.60 |
| d12 | 36.87 | 13.35 | 1.30 |
| d23 | 2.80 | 11.28 | 21.67 |
| d26 | 4.57 | 12.63 | 12.90 |
| d29 | 12.74 | 11.88 | 10.90 |

Unit focal length f1 = 110.30  f2 = −14.01  f3 = 23.63  f4 = −24.86  f5 = 40.53

Example 19

Unit mm

Surface data

| Surface no. | r | d | nd | vd |
|---|---|---|---|---|
| Object plane | ∞ | ∞ | | |
| 1 | 94.396 | 2.50 | 1.85478 | 24.80 |
| 2 | 68.283 | 7.10 | 1.49700 | 81.54 |
| 3 | −13762.746 | 0.15 | | |
| 4 | 61.694 | 4.92 | 1.49700 | 81.54 |
| 5 | 169.527 | Variable | | |
| 6* | 255.318 | 1.65 | 1.88227 | 37.18 |
| 7* | 14.243 | 7.50 | | |
| 8 | −21.189 | 1.00 | 1.59282 | 68.63 |
| 9 | 35.053 | 4.47 | 2.05023 | 27.00 |
| 10 | −36.266 | 1.10 | | |
| 11 | −21.767 | 1.20 | 1.83481 | 42.71 |
| 12 | −56.277 | Variable | | |
| 13 (Stop) | ∞ | 1.50 | | |
| 14* | 23.219 | 4.51 | 1.58253 | 59.32 |
| 15* | −660.457 | 4.17 | | |
| 16 | 65.382 | 3.44 | 1.49700 | 81.54 |
| 17 | −53.694 | 0.45 | | |
| 18 | 54.655 | 1.00 | 1.91082 | 35.25 |
| 19 | 15.446 | 3.97 | 1.49700 | 81.54 |
| 20 | 69.236 | 1.20 | | |
| 21 | 25.201 | 0.80 | 1.85478 | 24.80 |
| 22 | 18.092 | 4.84 | 1.58253 | 59.32 |
| 23* | −70.149 | Variable | | |
| 24 | 213.860 | 0.90 | 1.83481 | 42.71 |
| 25 | 11.484 | 3.10 | 1.80810 | 22.76 |
| 26 | 18.898 | Variable | | |
| 27 | 30.229 | 1.20 | 2.00100 | 29.13 |
| 28 | 20.202 | 9.62 | 1.51593 | 64.25 |
| 29* | −30.260 | 12.69 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −1.04869e−05, A6 = 1.54782e−07, A8 = −5.55781e−10,
A10 = 8.46666e−13

7th surface k = 0.000
A4 = −3.52903e−05, A6 = 8.36972e−08, A8 = −3.35235e−10,
A10 = 6.98324e−12, A12 = −4.01323e−14

14th surface k = 0.000
A4 = −1.13226e−05, A6 = −1.21642e−08, A8 = −2.28856e−10,
A10 = 9.52724e−13

15th surface k = 0.000
A4 = 9.93458e−06, A6 = −3.15931e−08, A8 = −6.14539e−12

23th surface k = 0.000
A4 = 8.35105e−06, A6 = −5.28477e−09, A8 = 8.37223e−12

29th surface k = 0.000
A4 = 4.41962e−06, A6 = −6.03687e−08, A8 = 1.88526e−10,
A10 = −6.28225e−13

Zoom data

| | WE | ST | TE |
|---|---|---|---|
| f | 12.36 | 34.63 | 97.99 |
| FNO. | 4.08 | 4.08 | 4.07 |
| 2ω | 83.00 | 33.67 | 12.10 |
| BF (in air) | 16.14 | 16.12 | 16.17 |
| LTL (in air) | 133.74 | 149.74 | 176.36 |
| d5 | 0.78 | 25.00 | 54.27 |
| d12 | 37.63 | 13.67 | 1.30 |

-continued

Unit mm

| | | | |
|---|---|---|---|
| d23 | 2.55 | 10.27 | 19.82 |
| d26 | 4.35 | 12.39 | 12.51 |

Unit focal length f1 = 111.21   f2 = −14.35   f3 = 23.28   f4 = −24.40   f5 = 39.60

Example 20

Unit mm

Surface data

| Surface no. | r | d | nd | vd |
|---|---|---|---|---|
| Object plane | ∞ | ∞ | | |
| 1 | 90.000 | 2.25 | 1.85478 | 24.80 |
| 2 | 65.454 | 7.76 | 1.49700 | 81.54 |
| 3 | 20927.998 | 0.15 | | |
| 4 | 59.213 | 5.26 | 1.49700 | 81.54 |
| 5 | 171.192 | Variable | | |
| 6* | −5028.066 | 1.50 | 1.88202 | 37.22 |
| 7* | 15.068 | 7.45 | | |
| 8 | −20.468 | 1.00 | 1.61800 | 63.40 |
| 9 | 36.320 | 6.00 | 2.00069 | 25.46 |
| 10 | −35.963 | 2.38 | | |
| 11 | −19.044 | 1.00 | 1.88300 | 40.76 |
| 12 | −34.702 | Variable | | |
| 13 (Stop) | ∞ | 1.50 | | |
| 14* | 21.251 | 6.66 | 1.58313 | 59.38 |
| 15* | 11979.842 | 1.33 | | |
| 16 | 39.852 | 3.68 | 1.49700 | 81.54 |
| 17 | −45.826 | 0.40 | | |
| 18 | 60.222 | 1.00 | 1.91082 | 35.25 |
| 19 | 14.439 | 3.01 | 1.49700 | 81.54 |
| 20 | 30.786 | 1.20 | | |
| 21 | 22.835 | 0.80 | 1.85478 | 24.80 |
| 22 | 17.035 | 5.25 | 1.58313 | 59.38 |
| 23* | −46.877 | Variable | | |
| 24 | 204.227 | 0.90 | 1.83481 | 42.73 |
| 25 | 10.978 | 3.15 | 1.80809 | 22.76 |
| 26 | 18.341 | Variable | | |
| 27* | 62.161 | 8.73 | 1.49700 | 81.54 |
| 28 | −16.373 | 1.30 | 2.00100 | 29.13 |
| 29 | −21.214 | 12.74 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −1.27605e−07, A6 = 1.05520e−07, A8 = −3.98597e−10,
A10 = 6.60399e−13
7th surface k = 0.000
A4 = −2.44732e−05, A6 = 4.79428e−08, A8 = 4.13990e−10,
A10 = −1.35460e−12
14th surface k = 0.000
A4 = −9.32034e−06, A6 = −2.28948e−08, A8 = −1.25381e−11
15th surface k = 0.000
A4 = 2.52025e−05, A6 = −3.19289e−08, A8 = 2.30417e−11
23th surface k = 0.000
A4 = 8.61500e−06, A6 = 2.20310e−08

-continued

Unit mm

27th surface k = 0.000
A4 = −5.27238e−06, A6 = 4.45361e−08, A8 = −5.86662e−11

Zoom data

| | WE | ST | TE |
|---|---|---|---|
| f | 12.24 | 34.63 | 97.92 |
| FNO. | 4.06 | 4.03 | 4.05 |
| 2ω | 83.54 | 33.74 | 12.12 |
| BF (in air) | 16.20 | 16.16 | 16.20 |
| LTL (in air) | 131.57 | 147.05 | 173.58 |
| d5 | 0.60 | 23.25 | 53.47 |
| d12 | 34.23 | 11.77 | 1.30 |
| d23 | 2.40 | 9.43 | 16.00 |
| d26 | 4.48 | 12.78 | 12.94 |

Unit focal length f1 = 105.23   f2 = −13.45   f3 = 21.92   f4 = −23.71   f5 = 41.17

Example 21

Unit mm

Surface data

| Surface no. | r | d | nd | vd |
|---|---|---|---|---|
| Object plane | ∞ | ∞ | | |
| 1 | 90.000 | 2.30 | 1.85478 | 24.80 |
| 2 | 65.592 | 7.38 | 1.49700 | 81.54 |
| 3 | ∞ | 0.15 | | |
| 4 | 59.096 | 5.13 | 1.49700 | 81.54 |
| 5 | 173.762 | Variable | | |
| 6* | 464.875 | 1.50 | 1.88202 | 37.22 |
| 7* | 14.784 | 7.45 | | |
| 8 | −20.119 | 1.20 | 1.61800 | 63.40 |
| 9 | 35.728 | 5.00 | 2.00069 | 25.46 |
| 10 | −33.690 | 1.91 | | |
| 11 | −19.739 | 1.30 | 1.88300 | 40.76 |
| 12 | −42.267 | Variable | | |
| 13 (Stop) | ∞ | 1.50 | | |
| 14* | 23.000 | 5.00 | 1.58313 | 59.38 |
| 15* | −262.448 | 3.26 | | |
| 16 | 43.079 | 3.72 | 1.49700 | 81.54 |
| 17 | −41.898 | 0.40 | | |
| 18 | 85.095 | 1.00 | 1.91082 | 35.25 |
| 19 | 15.097 | 3.28 | 1.49700 | 81.54 |
| 20 | 45.596 | 1.20 | | |
| 21 | 23.870 | 0.80 | 1.85478 | 24.80 |
| 22 | 17.905 | 5.08 | 1.58313 | 59.38 |
| 23* | −53.454 | Variable | | |
| 24 | 135.034 | 0.90 | 1.83481 | 42.73 |
| 25 | 10.571 | 3.28 | 1.80809 | 22.76 |
| 26 | 17.967 | Variable | | |
| 27* | 59.278 | 9.08 | 1.49700 | 81.54 |
| 28 | −17.171 | 1.30 | 2.00100 | 29.13 |
| 29 | −22.118 | 12.59 | | |
| 30 | ∞ | 4.00 | 1.51633 | 64.14 |
| 31 | ∞ | 0.80 | | |
| Image plane | ∞ | | | |

Aspherical surface data

6th surface k = 0.000
A4 = −5.56888e−06, A6 = 1.34080e−07, A8 = −4.47331e−10,
A10 = 6.81629e−13

Unit mm

7th surface k = 0.000
A4 = −2.85137e−05, A6 = 6.42427e−08, A8 = 1.98844e−10,
A10 = 2.26086e−12
14th surface k = 0.000
A4 = −5.39823e−06, A6 = −2.50029e−08, A8 = 5.76417e−12
15th surface k = 0.000
A4 = 2.40146e−05, A6 = −2.95811e−08, A8 = 2.30417e−11
23th surface k = 0.000
A4 = 9.69024e−06, A6 = 1.35975e−08, A8 = −1.89268e−12
27th surface k = 0.000
A4 = −3.70004e−06, A6 = 3.88725e−08, A8 = −3.74807e−11

Zoom data

|  | WE | ST | TE |
|---|---|---|---|
| f | 12.24 | 34.63 | 97.92 |
| FNO. | 4.09 | 4.08 | 4.08 |
| 2ω | 83.61 | 33.83 | 12.12 |
| BF (in air) | 16.06 | 16.02 | 16.04 |
| LTL (in air) | 131.59 | 146.40 | 172.58 |
| d5 | 0.60 | 22.30 | 51.61 |
| d12 | 34.93 | 12.19 | 1.32 |
| d23 | 2.39 | 9.88 | 17.87 |
| d26 | 4.49 | 12.90 | 12.62 |

Unit focal length f1 = 104.21  f2 = −13.28  f3 = 22.30  f4 = −23.95  f5 = 41.57

Next, values of conditional expressions in each example are given below.

| Conditional expression | Example 1 | Example 2 | Example 3 | Example 4 |
|---|---|---|---|---|
| (1) D34W/D45W | 0.498 | 0.434 | 0.354 | 0.556 |
| (2) (D34W/D45W)/(D34T/D45T) | 0.309 | 0.273 | 0.296 | 0.375 |
| (3) D34T/D45T | 1.612 | 1.587 | 1.195 | 1.481 |
| (4) (β4T/β4W)/(fT/fW) | 0.140 | 0.139 | 0.144 | 0.139 |
| (5) (β3T/β3W)/(fT/fW) | 0.348 | 0.343 | 0.355 | 0.344 |
| (6) (β2W/β3W)/(β2T/β3T) | 1.064 | 1.031 | 1.162 | 1.054 |
| (7) f3G/fT | 0.238 | 0.231 | 0.229 | 0.243 |
| (8) DG3W/LW | 0.483 | 0.492 | 0.486 | 0.446 |
| (9) fIS/fISG | 1.607 | 1.483 | 1.247 | 1.429 |
| (10) DG3T/LT | 0.512 | 0.510 | 0.533 | 0.520 |
| (11) DG5T/LT | 0.156 | 0.156 | 0.145 | 0.170 |
| (12) (RG41 + RG42)/(RG41 − RG42) | 1.217 | 1.255 | 1.207 | 0.934 |
| (13) (RG51 + RG52)/(RG51 − RG52) | −0.020 | −0.018 | 0.069 | 0.315 |
| (14) fT/ExpT | −0.467 | −0.490 | −0.139 | −0.535 |

| Conditional expression | Example 5 | Example 6 | Example 7 | Example 8 |
|---|---|---|---|---|
| (1) D34W/D45W | 0.568 | 0.499 | 0.414 | 0.452 |
| (2) (D34W/D45W)/(D34T/D45T) | 0.340 | 0.348 | 0.264 | 0.296 |
| (3) D34T/D45T | 1.669 | 1.435 | 1.568 | 1.524 |
| (4) (β4T/β4W)/(fT/fW) | 0.173 | 0.141 | 0.137 | 0.140 |
| (5) (β3T/β3W)/(fT/fW) | 0.445 | 0.329 | 0.335 | 0.338 |
| (6) (β2W/β3W)/(β2T/β3T) | 1.403 | 0.964 | 0.986 | 1.003 |
| (7) f3G/fT | 0.298 | 0.239 | 0.230 | 0.233 |
| (8) DG3W/LW | 0.475 | 0.482 | 0.492 | 0.487 |
| (9) fIS/fISG | 1.426 | 1.405 | 1.511 | 1.451 |
| (10) DG3T/LT | 0.512 | 0.508 | 0.508 | 0.506 |
| (11) DG5T/LT | 0.162 | 0.156 | 0.154 | 0.154 |
| (12) (RG41 + RG42)/(RG41 − RG42) | 1.194 | 1.411 | 1.280 | 1.298 |
| (13) (RG51 + RG52)/(RG51 − RG52) | 0.206 | −0.048 | −0.011 | −0.022 |
| (14) fT/ExpT | −0.435 | −0.571 | −0.490 | −0.489 |

| Conditional expression | Example 9 | Example 10 | Example 11 | Example 12 |
|---|---|---|---|---|
| (1) D34W/D45W | 0.455 | 0.443 | 0.459 | 0.541 |
| (2) (D34W/D45W)/(D34T/D45T) | 0.305 | 0.304 | 0.299 | 0.380 |
| (3) D34T/D45T | 1.493 | 1.454 | 1.534 | 1.424 |
| (4) (β4T/β4W)/(fT/fW) | 0.139 | 0.139 | 0.139 | 0.141 |
| (5) (β3T/β3W)/(fT/fW) | 0.335 | 0.336 | 0.342 | 0.323 |
| (6) (β2W/β3W)/(β2T/β3T) | 0.989 | 1.004 | 1.035 | 0.922 |
| (7) f3G/fT | 0.231 | 0.228 | 0.240 | 0.234 |
| (8) DG3W/LW | 0.489 | 0.488 | 0.474 | 0.482 |
| (9) fIS/fISG | 1.496 | 1.507 | 1.403 | 1.443 |
| (10) DG3T/LT | 0.508 | 0.509 | 0.501 | 0.504 |
| (11) DG5T/LT | 0.160 | 0.157 | 0.153 | 0.159 |
| (12) (RG41 + RG42)/(RG41 − RG42) | 1.345 | 1.309 | 1.250 | 1.241 |
| (13) (RG51 + RG52)/(RG51 − RG52) | −0.004 | 0.007 | −0.033 | −0.033 |
| (14) fT/ExpT | −0.490 | −0.490 | −0.490 | −0.501 |

| Conditional expression | Example 13 | Example 14 | Example 15 | Example 16 |
|---|---|---|---|---|
| (1) D34W/D45W | 0.452 | 0.527 | 0.707 | 0.821 |
| (2) (D34W/D45W)/(D34T/D45T) | 0.291 | 0.337 | 0.443 | 0.488 |
| (3) D34T/D45T | 1.552 | 1.562 | 1.596 | 1.681 |
| (4) (β4T/β4W)/(fT/fW) | 0.140 | 0.141 | 0.141 | 0.141 |
| (5) (β3T/β3W)/(fT/fW) | 0.342 | 0.345 | 0.341 | 0.343 |
| (6) (β2W/β3W)/(β2T/β3T) | 1.028 | 1.054 | 1.028 | 1.039 |
| (7) f3G/fT | 0.231 | 0.246 | 0.246 | 0.242 |
| (8) DG3W/LW | 0.488 | 0.488 | 0.486 | 0.488 |
| (9) fIS/fISG | 1.468 | 2.735 | 2.300 | 1.911 |
| (10) DG3T/LT | 0.508 | 0.519 | 0.520 | 0.517 |
| (11) DG5T/LT | 0.155 | 0.164 | 0.165 | 0.162 |
| (12) (RG41 + RG42)/(RG41 − RG42) | 1.298 | 1.227 | 1.097 | 1.142 |
| (13) (RG51 + RG52)/(RG51 − RG52) | −0.010 | −0.029 | −0.004 | −0.002 |
| (14) fT/ExpT | −0.490 | −0.359 | −0.319 | −0.365 |

| Conditional expression | Example 17 | Example 18 | Example 19 | Example 20 |
|---|---|---|---|---|
| (1) D34W/D45W | 0.495 | 0.612 | 0.582 | 0.535 |
| (2) (D34W/D45W)/(D34T/D45T) | 0.302 | 0.365 | 0.368 | 0.434 |
| (3) D34T/D45T | 1.640 | 1.676 | 1.581 | 1.235 |
| (4) (β4T/β4W)/(fT/fW) | 0.131 | 0.130 | 0.141 | 0.142 |
| (5) (β3T/β3W)/(fT/fW) | 0.346 | 0.344 | 0.343 | 0.309 |
| (6) (β2W/β3W)/(β2T/β3T) | 1.058 | 1.047 | 1.041 | 0.864 |
| (7) f3G/fT | 0.236 | 0.241 | 0.238 | 0.224 |
| (8) DG3W/LW | 0.484 | 0.486 | 0.482 | 0.477 |

-continued

| Conditional expression | | | | |
|---|---|---|---|---|
| (9) fIS/fISG | 1.642 | 1.629 | 1.603 | 1.379 |
| (10) DG3T/LT | 0.508 | 0.512 | 0.509 | 0.488 |
| (11) DG5T/LT | 0.148 | 0.146 | 0.159 | 0.158 |
| (12) (RG41 + RG42)/ (RG41 − RG42) | 1.371 | 1.426 | 1.194 | 1.197 |
| (13) (RG51 + RG52)/ (RG51 − RG52) | −0.041 | −0.074 | −0.001 | 0.491 |
| (14) fT/ExpT | −0.465 | −0.499 | −0.445 | −0.490 |

| Conditional expression | Example 21 |
|---|---|
| (1) D34W/D45W | 0.535 |
| (2) (D34W/D45W)/ (D34T/D45T) | 0.379 |
| (3) D34T/D45T | 1.412 |
| (4) ($\beta$4T/$\beta$4W)/ (fT/fW) | 0.141 |
| (5) ($\beta$3T/$\beta$3W)/ (fT/fW) | 0.325 |
| (6) ($\beta$2W/$\beta$3W)/ ($\beta$2T/$\beta$3T) | 0.954 |
| (7) f3G/fT | 0.228 |
| (8) DG3W/LW | 0.482 |
| (9) fIS/fISG | 1.452 |
| (10) DG3T/LT | 0.504 |
| (11) DG5T/LT | 0.160 |
| (12) (RG41 + RG42)/ (RG41 − RG42) | 1.262 |
| (13) (RG51 + RG52)/ (RG51 − RG52) | 0.457 |
| (14) fT/ExpT | −0.490 |

| Conditional expression | Example 1 | Example 2 | Example 3 | Example 4 |
|---|---|---|---|---|
| (A2) vdG3P | 59.32 | 59.32 | 48.84 | 59.38 |
| (A8) DG3L12/DG3L23 | 8.730 | 8.303 | 6.345 | 24.469 |
| (A9) DG3L1F2R/DG3 | 0.462 | 0.459 | 0.492 | 0.480 |
| (A10) f1G/fT | 1.128 | 1.110 | 1.069 | 0.987 |
| (A11) (RG21 + RG22)/ (RG21 − RG22) | 0.701 | 0.503 | 0.634 | 0.813 |
| (A14) ((1 − $\beta$ISW) × $\beta$RW)/fW | 0.076 | 0.086 | 0.093 | 0.087 |
| (A15) fG3R2/fG3R1 | −1.598 | −1.464 | −0.788 | −1.336 |

| Conditional expression | Example 5 | Example 6 | Example 7 | Example 8 |
|---|---|---|---|---|
| (A2) vdG3P | 59.38 | 59.38 | 59.38 | 59.38 |
| (A8) DG3L12/DG3L23 | 7.993 | 7.793 | 8.041 | 8.190 |
| (A9) DG3L1F2R/DG3 | 0.477 | 0.454 | 0.449 | 0.462 |
| (A10) f1G/fT | 1.621 | 1.083 | 1.082 | 1.109 |
| (A11) (RG21 + RG22)/ (RG21 − RG22) | 0.894 | 0.753 | 0.630 | 0.688 |
| (A14) ((1 − $\beta$ISW) × $\beta$RW)/fW | 0.087 | 0.086 | 0.086 | 0.086 |
| (A15) fG3R2/fG3R1 | −1.174 | −1.080 | −1.535 | −1.289 |

| Conditional expression | Example 9 | Example 10 | Example 11 | Example 12 |
|---|---|---|---|---|
| (A2) vdG3P | 59.38 | 59.38 | 59.38 | 59.38 |
| (A8) DG3L12/DG3L23 | 6.825 | 7.344 | 7.847 | 8.607 |
| (A9) DG3L1F2R/DG3 | 0.449 | 0.446 | 0.467 | 0.449 |
| (A10) f1G/fT | 1.097 | 1.089 | 1.146 | 1.071 |
| (A11) (RG21 + RG22)/ (RG21 − RG22) | 0.748 | 0.680 | 0.762 | 0.862 |
| (A14) ((1 − $\beta$ISW) × $\beta$RW)/fW | 0.086 | 0.086 | 0.086 | 0.086 |
| (A15) fG3R2/fG3R1 | −1.487 | −1.626 | −1.129 | −1.153 |

| Conditional expression | Example 13 | Example 14 | Example 15 | Example 16 |
|---|---|---|---|---|
| (A2) vdG3P | 59.32 | 59.32 | 59.32 | 59.32 |
| (A8) DG3L12/DG3L23 | 7.680 | 9.778 | 9.792 | 45.884 |
| (A9) DG3L1F2R/DG3 | 0.458 | 0.477 | 0.474 | 0.486 |
| (A10) f1G/fT | 1.115 | 1.124 | 1.130 | 1.127 |
| (A11) (RG21 + RG22)/ (RG21 − RG22) | 0.585 | 1.076 | 0.872 | 0.677 |
| (A14) ((1 − $\beta$ISW) × $\beta$RW)/fW | 0.086 | 0.053 | 0.065 | 0.075 |
| (A15) fG3R2/fG3R1 | −1.322 | −2.387 | −2.155 | −1.636 |

| Conditional expression | Example 17 | Example 18 | Example 19 | Example 20 |
|---|---|---|---|---|
| (A2) vdG3P | 59.32 | 59.32 | 59.38 | 59.38 |
| (A8) DG3L12/DG3L23 | 55.574 | 9.259 | 3.316 | 8.147 |
| (A9) DG3L1F2R/DG3 | 0.506 | 0.468 | 0.470 | 0.475 |
| (A10) f1G/fT | 1.126 | 1.135 | 1.075 | 1.064 |
| (A11) (RG21 + RG22)/ (RG21 − RG22) | 0.759 | 0.639 | 1.014 | 0.833 |
| (A14) ((1 − $\beta$ISW) × $\beta$RW)/fW | 0.075 | 0.076 | 0.094 | 0.088 |
| (A15) fG3R2/fG3R1 | −1.631 | −1.558 | −1.112 | −1.111 |

| Conditional expression | Example 1 | Example 2 | Example 3 | Example 4 |
|---|---|---|---|---|
| (B1) ($\beta$4T/$\beta$4W)/ ($\beta$2T/$\beta$2W) | 0.429 | 0.418 | 0.404 | 0.415 |
| (B2) ($\beta$4T/$\beta$4W)/ ($\beta$3T/$\beta$3W) | 0.403 | 0.405 | 0.410 | 0.413 |
| (B3) vdG4P | 22.76 | 22.76 | 22.76 | 22.76 |
| (B4) vdG4N − vdG4P | 19.97 | 19.97 | 19.97 | 19.97 |
| (B5) (RG4PF + RG4PR)/ (RG4PF − RG4PR) | −4.081 | −4.430 | −4.230 | −4.351 |
| (B6) f4G/fW | −1.952 | −1.891 | −1.923 | −1.935 |
| (B7) DG4W/LW | 0.263 | 0.273 | 0.272 | 0.268 |

| Conditional expression | Example 5 | Example 6 | Example 7 | Example 8 |
|---|---|---|---|---|
| (B1) ($\beta$4T/$\beta$4W)/ ($\beta$2T/$\beta$2W) | 0.410 | 0.416 | 0.421 | 0.403 |
| (B2) ($\beta$4T/$\beta$4W)/ ($\beta$3T/$\beta$3W) | 0.414 | 0.414 | 0.406 | 0.437 |
| (B3) vdG4P | 22.76 | 22.76 | 22.76 | 22.76 |
| (B4) vdG4N − vdG4P | 19.97 | 23.81 | 19.97 | 19.97 |
| (B5) (RG4PF + RG4PR)/ (RG4PF − RG4PR) | −4.042 | −4.445 | −3.823 | −3.850 |
| (B6) f4G/fW | −2.020 | −1.925 | −2.049 | −2.009 |
| (B7) DG4W/LW | 0.279 | 0.273 | 0.263 | 0.270 |

| Conditional expression | Example 9 | Example 10 | Example 11 | Example 12 |
|---|---|---|---|---|
| (B1) ($\beta$4T/$\beta$4W)/ ($\beta$2T/$\beta$2W) | 0.420 | 0.400 | 0.395 | 0.427 |
| (B2) ($\beta$4T/$\beta$4W)/ ($\beta$3T/$\beta$3W) | 0.408 | 0.378 | 0.377 | 0.411 |
| (B3) vdG4P | 22.76 | 22.76 | 22.76 | 22.76 |
| (B4) vdG4N − vdG4P | 19.97 | 19.95 | 19.95 | 19.95 |
| (B5) (RG4PF + RG4PR)/ (RG4PF − RG4PR) | −4.385 | −4.726 | −4.980 | −4.098 |
| (B6) f4G/fW | −1.930 | −1.979 | −2.012 | −1.975 |
| (B7) DG4W/LW | 0.271 | 0.266 | 0.263 | 0.265 |

Figure 43:
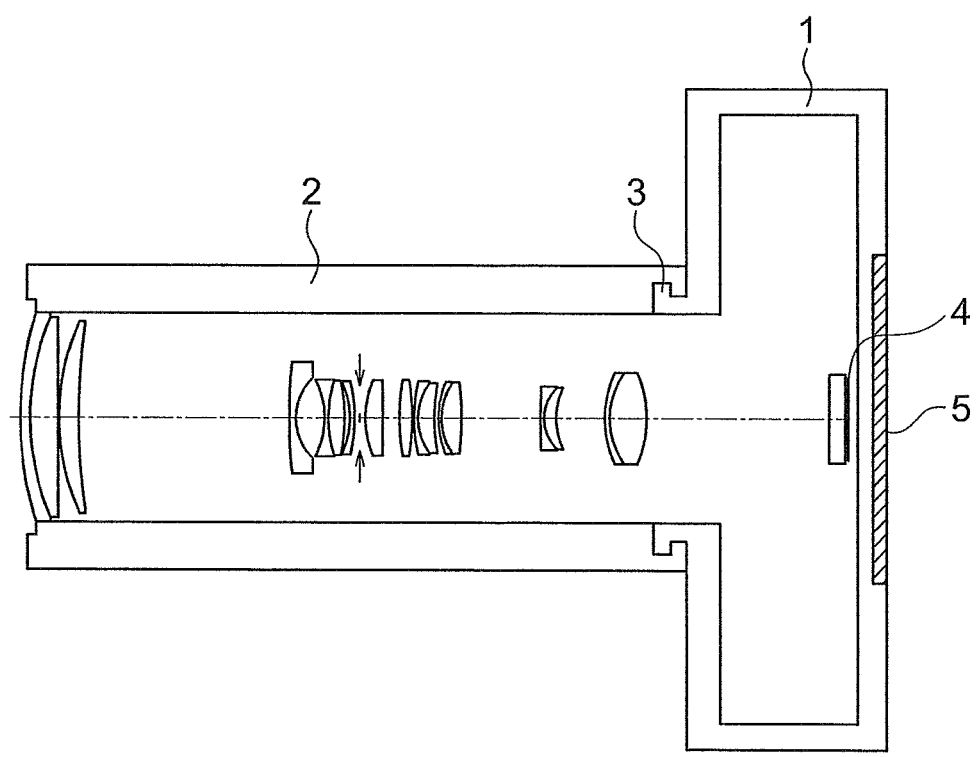
FIG. 43 is a cross-sectional view of an image pickup apparatus.

FIG. 43 is a cross-sectional view of a single-lens mirrorless camera as an electronic image pickup apparatus. In FIG. 43, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens described in any one of the examples from the example 1 to the example 21 is to be used.

Figure 44:
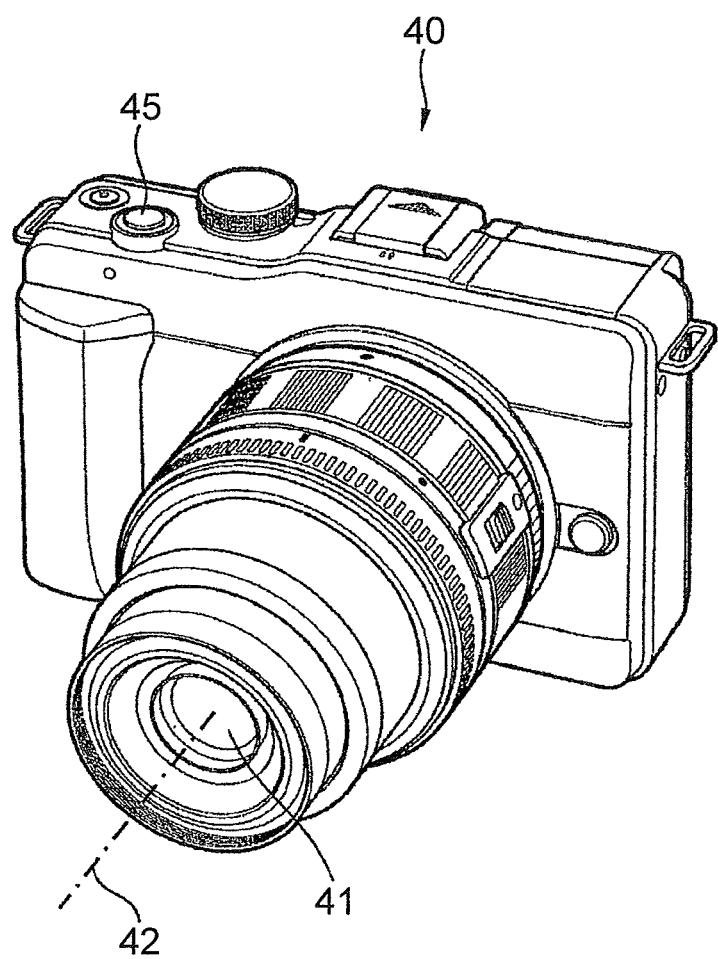
FIG. 44 is a front perspective view of the image pickup apparatus.
Figure 45:
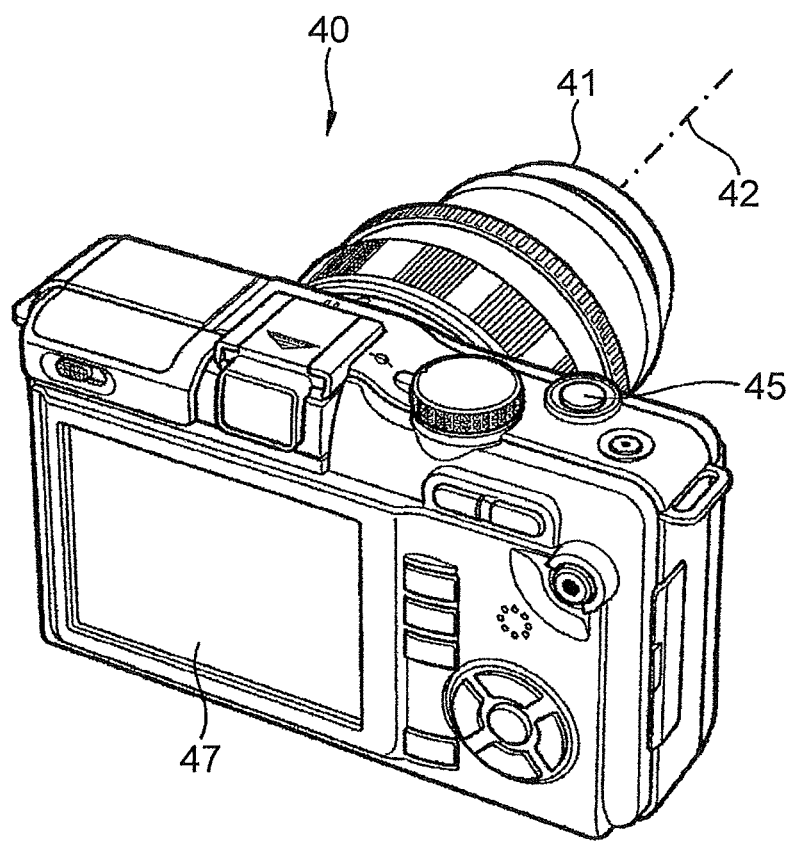
FIG. 45 is a rear perspective view of the image pickup apparatus.

FIG. 44 and FIG. 45 are conceptual diagrams of an arrangement of the image pickup apparatus. FIG. 44 is a front perspective view of a digital camera 40 as the image pickup apparatus, and FIG. 45 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example 1. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

FIG. 46 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 46, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The present invention can have various modified examples without departing from the scope of the invention. Moreover, shapes of lenses and the number of lenses are not necessarily restricted to the shapes and the number of lenses indicated in the examples. In the examples described heretofore, the cover glass may not be disposed necessarily. A lens that is not shown in the diagrams of the examples described above, and that does not have a refractive power practically may be disposed in a lens unit or outside the lens unit.

The present invention provides a zoom lens that is compact yet has a wide angle of view and a large zoom ratio and in which aberration is corrected favorably, and an image pickup apparatus using the same. Also provided are a zoom lens with a small F-number and with less camera shake in taking a photo at the telephoto end, and an image pickup apparatus using the same.

As described above, the zoom lens according to the present invention is suitable for a zoom lens that is compact yet has a wide angle of view and a large zoom ratio and in which aberration is corrected favorably, and for an image pickup apparatus using the same. The zoom lens according to the present invention is also suitable for a zoom lens with a small F-number and with less camera shake in taking a photo at the telephoto end, and for an image pickup apparatus using the same.

What is claimed is:

1. A zoom lens comprising, in order from an object side:
a first lens unit having a positive focal length;
a second lens unit having a negative focal length;
a third lens unit having a positive focal length;

a fourth lens unit having a negative focal length; and
a fifth lens unit having a positive focal length,
wherein
at a time of zooming from a wide angle end to a telephoto end, air spaces between lens units among the first through fifth lens units change, and
following Conditional Expressions (1) and (2) are satisfied:

$$0.3 \leq D34W/D45W \leq 1 \quad (1), \text{ and}$$

$$0.2 \leq (D34W/D45W)/(D34T/D45T) \leq 0.6 \quad (2),$$

where,
D34W is an air space on an optical axis between the third lens unit and the fourth lens unit at the wide angle end;
D45W is an air space on the optical axis between the fourth lens unit and the fifth lens unit at the wide angle end;
D34T is an air space on the optical axis between the third lens unit and the fourth lens unit at the telephoto end; and
D45T is an air space on the optical axis between the fourth lens unit and the fifth lens unit at the telephoto end.

2. The zoom lens according to claim 1, wherein
at the time of zooming from the wide angle end to the telephoto end,
an air space between the first lens unit and the second lens unit widens,
an air space between the second lens unit and the third lens unit narrows,
an air space between the third lens unit and the fourth lens unit widens, and
an air space between the fourth lens unit and the fifth lens unit widens.

3. The zoom lens according to claim 1, wherein
following Conditional Expression (3) is satisfied:

$$0.7 \leq D34T/D45T \leq 2 \quad (3),$$

where,
D34T is the air space on the optical axis between the third lens unit and the fourth lens unit at the telephoto end; and
D45T is the air space on the optical axis between the fourth lens unit and the fifth lens unit at the telephoto end.

4. The zoom lens according to claim 1, wherein
following Conditional Expression (4) is satisfied:

$$0.1 \leq (\beta 4T/\beta 4W)/(fT/fW) \leq 0.2 \quad (4),$$

where,
β4W is a lateral magnification of the fourth lens unit at the wide angle end;
β4T is a lateral magnification of the fourth lens unit at the telephoto end;
fW is a focal length of the entire zoom lens at the wide angle end; and
fT is a focal length of the entire zoom lens at the telephoto end.

5. The zoom lens according to claim 1, wherein
following Conditional Expression (5) is satisfied:

$$0.23 \leq (\beta 3T/\beta 3W)/(fT/fW) \leq 0.55 \quad (5),$$

where,
β3W is a lateral magnification of the third lens unit at the wide angle end;
β3T is a lateral magnification of the third lens unit at the telephoto end;
fW is a focal length of the entire zoom lens at the wide angle end; and
fT is a focal length of the entire zoom lens at the telephoto end.

6. The zoom lens according to claim 1, wherein
following Conditional Expression (6) is satisfied:

$$0.6 \leq (\beta 2W/\beta 3W)/(\beta 2T/\beta 3T) \leq 1.7 \quad (6),$$

where,
β2W is a lateral magnification of the second lens unit at the wide angle end;
β3W is a lateral magnification of the third lens unit at the wide angle end;
β2T is a lateral magnification of the second lens unit at the telephoto end; and
β3T is a lateral magnification of the third lens unit at the telephoto end.

7. The zoom lens according to claim 1, wherein
following Conditional Expression (7) is satisfied:

$$0.2 \leq f3G/fT \leq 0.33 \quad (7),$$

where,
f3G is a focal length of the third lens unit; and
fT is a focal length of the entire zoom lens at the telephoto end.

8. The zoom lens according to claim 1, wherein
following Conditional Expression (8) is satisfied:

$$0.38 \leq DG3W/LW \leq 0.58 \quad (8),$$

where,
DG3W is a distance on the optical axis from a surface closest to an object in the third lens unit to an image plane at the wide angle end; and
LW is a distance on the optical axis from an object-side surface top of a lens element disposed closest to the object in the first lens unit to the image plane at the wide angle end.

9. The zoom lens according to claim 1, wherein
any one lens unit of the first lens unit, the second lens unit, the third lens unit, the fourth lens unit, and the fifth lens unit has a moving lens component which moves in a direction vertical to the optical axis, and
following Conditional Expression (9) is satisfied:

$$1.2 \leq fIS/fISG \leq 3 \quad (9),$$

where,
fIS is a focal length of the moving lens component; and
fISG is a focal length of a lens unit having the moving lens component.

10. The zoom lens according to claim 1, wherein
the third lens unit has a moving lens component which moves in a direction vertical to the optical axis.

11. The zoom lens according to claim 1, wherein
following Conditional Expression (10) is satisfied:

$$0.45 \leq DG3T/LT \leq 0.6 \quad (10),$$

where,
DG3T is a distance on the optical axis from a surface closest to an object in the third lens unit to an image plane at the telephoto end; and
LT is a distance on the optical axis from an object-side surface top of a lens element disposed closest to the object in the first lens unit to the image plane at the telephoto end.

12. The zoom lens according to claim 1, wherein
following Conditional Expression (11) is satisfied:

$$0.1 \leq DG5T/LT \leq 0.25 \quad (11),$$

where,
DGST is a distance on the optical axis from an object-side surface top of a lens element disposed closest to the object in the fifth lens unit to an image plane at the telephoto end; and
LT is a distance on the optical axis from an object-side surface top of a lens element disposed closest to the object in the first lens unit to the image plane at the telephoto end.

13. The zoom lens according to claim 1, wherein following Conditional Expression (12) is satisfied:

$$0.5 \leq (RG41+RG42)/(RG41-RG42) \leq 1.7 \quad (12),$$

where,
RG41 is a radius of curvature of an object-side surface of a lens element positioned closest to the object in the fourth lens unit; and
RG42 is a radius of curvature of an image-side surface of a lens element positioned closest to an image in the fourth lens unit.

14. The zoom lens according to claim 1, wherein following Conditional Expression (13) is satisfied:

$$-0.7 \leq (RG51+RG52)/(RG51-RG52) \leq 0.7 \quad (13),$$

where,
RG51 is a radius of curvature of an object-side surface of a lens element positioned closest to the object in the fifth lens unit; and
RG52 is a radius of curvature of an image-side surface of a lens element positioned closest to an image in the fifth lens unit.

15. The zoom lens according to claim 1, wherein following Conditional Expression (14) is satisfied:

$$-2.5 \leq fT/ExpT \leq 0.3 \quad (14),$$

where,
fT is a focal length of the entire zoom lens at the telephoto end; and
ExpT is an exit pupil position with respect to a paraxial imaging plane at the telephoto end.

16. An image pickup apparatus comprising:
the zoom lens of claim 1; and
an image pickup element which converts an image formed by the zoom lens to an electrical signal.

17. A zoom lens comprising, in order from an object side:
a first lens unit having a positive focal length;
a second lens unit having a negative focal length;
a third lens unit having a positive focal length;
a fourth lens unit having a negative focal length; and
a fifth lens unit having a positive focal length,
wherein
at a time of zooming from a wide angle end to a telephoto end, air spaces between lens units among the first through fifth lens units change, and
the third lens unit includes, in order from the object side:
a first positive lens component,
a second positive lens component which is disposed on an image side of the first positive lens component with an air space,
a first negative lens component which is disposed on an image side of the second positive lens component with an air space, and
a third positive lens component which is disposed on an image side of the first negative lens component with an air space, and
a total number of lens elements included in the third lens unit are five or more.

18. The zoom lens according to claim 17, wherein
at the time of zooming from the wide angle end to the telephoto end,
an air space between the first lens unit and the second lens unit widens,
an air space between the second lens unit and the third lens unit narrows,
an air space between the third lens unit and the fourth lens unit widens, and
an air space between the fourth lens unit and the fifth lens unit widens.

19. The zoom lens according to claim 17, wherein following Conditional Expression (4) is satisfied:

$$0.1 \leq (\beta 4T/\beta 4W)/(fT/fW) \leq 0.2 \quad (4),$$

where,
β4W is a lateral magnification of the fourth lens unit at the wide angle end;
β4T is a lateral magnification of the fourth lens unit at the telephoto end;
fW is a focal length of the entire zoom lens at the wide angle end; and
fT is a focal length of the entire zoom lens at the telephoto end.

20. The zoom lens according to claim 17, wherein following Conditional Expression (A2) is satisfied:

$$45 \leq vdG3P \quad (A2),$$

where,
vdG3P is a smallest Abbe number, of Abbe numbers on d-line of the positive lens elements disposed in the third lens unit.

21. The zoom lens according to claim 17, wherein following Conditional Expression (5) is satisfied:

$$0.23 \leq (\beta 3T/\beta 3W)/(fT/fW) \leq 0.55 \quad (5),$$

where,
β3W is a lateral magnification of the third lens unit at the wide angle end;
β3T is a lateral magnification of the third lens unit at the telephoto end;
fW is a focal length of the entire zoom lens at the wide angle end; and
fT is a focal length of the entire zoom lens at the telephoto end.

22. The zoom lens according to claim 17, wherein following Conditional Expression (6) is satisfied:

$$0.6 \leq (\beta 2W/\beta 3W)/(\beta 2T/\beta 3T) \leq 1.7 \quad (6),$$

where,
β2W is a lateral magnification of the second lens unit at the wide angle end;
β3W is a lateral magnification of the third lens unit at the wide angle end;
β2T is a lateral magnification of the second lens unit at the telephoto end; and
β3T is a lateral magnification of the third lens unit at the telephoto end.

23. The zoom lens according to claim 17, wherein following Conditional Expression (7) is satisfied:

$$0.2 \leq f3G/fT \leq 0.33 \quad (7),$$

where,
f3G is a focal length of the third lens unit; and
fT is a focal length of the entire zoom lens at the telephoto end.

24. The zoom lens according to claim 17, wherein following Conditional Expression (8) is satisfied:

$$0.38 \leq DG3W/LW \leq 0.58 \quad (8),$$

where,
DG3W is a distance on an optical axis from a surface closest to an object in the third lens unit to an image plane at the wide angle end; and
LW is a distance on the optical axis from an object-side surface top of a lens component disposed closest to the object in the first lens unit to the image plane at the wide angle end,
wherein
in a predetermined arrangement, DG3W is a distance on the optical axis from a surface including an aperture of an aperture stop to the image plane at the wide angle end, and
the predetermined arrangement is an arrangement having the aperture stop disposed immediately at front of the object side of the first positive lens component, and moves integrally with the first positive lens component in an optical axis direction.

25. The zoom lens according to claim 17, wherein following Conditional Expression (10) is satisfied:

$$0.45 \leq DG3T/LT \leq 0.6 \quad (10),$$

where,
DG3T is a distance on an optical axis from a surface closest to an object in the third lens unit to an image plane at the telephoto end; and
LT is a distance on the optical axis from an object-side surface top of a lens component disposed closest to the object in the first lens unit to the image plane at the telephoto end,
wherein
in a predetermined arrangement, DG3T is a distance on the optical axis from a surface including an aperture of an aperture stop to the image plane at the telephoto end, and
the predetermined arrangement is an arrangement having the aperture stop disposed immediately at front of the object side of the first positive lens component, and moves integrally with the first positive lens component in an optical axis direction.

26. The zoom lens according to claim 17, wherein following Conditional Expression (A8) is satisfied:

$$1.5 \leq DG3L12/DG3L23 \leq 70 \quad (A8),$$

where,
DG3L12 is a distance on an optical axis of an air space between a lens component disposed first from the object side and a lens component disposed second from the object side in the third lens unit; and
DG3L23 is a distance on the optical axis of an air space between a lens component disposed second from the object side and a lens component disposed third from the object side in the third lens unit.

27. The zoom lens according to claim 17, wherein following Conditional Expression (A9) is satisfied:

$$0.35 \leq DG3L1F2R/DG3 \leq 0.6 \quad (A9),$$

where,
DG3L1F2R is a distance on an optical axis from an object-side surface top of a lens component disposed closest to an object to an image-side surface top of a lens component disposed second from the object side in the third lens unit; and
DG3 is a distance on the optical axis from a surface closest to the object to a surface closest to an image in the third lens unit,
wherein
in a predetermined arrangement, DG3 is a distance on the optical axis from a surface including an aperture of an aperture stop to an image plane, and
the predetermined arrangement is an arrangement having the aperture stop disposed immediately at front of the object side of the first positive lens component, and moves integrally with the first positive lens component in an optical axis direction.

28. The zoom lens according to claim 17, wherein following Conditional Expression (A10) is satisfied:

$$0.85 \leq f1G/fT \leq 1.65 \quad (A10),$$

where,
f1G is a focal length of the first lens unit; and
fT is a focal length of the entire zoom lens at the telephoto end.

29. The zoom lens according to claim 17, wherein following Conditional Expression (A11) is satisfied:

$$0.2 \leq (RG21+RG22)/(RG21-RG22) \leq 1.8 \quad (A11),$$

where,
RG21 is a radius of curvature of an object-side surface of a lens component positioned closest to an object in the second lens unit; and
RG22 is a radius of curvature of an image-side surface of a lens component positioned closest to an image in the second lens unit.

30. The zoom lens according to claim 17, wherein following Conditional Expression (14) is satisfied:

$$-2.5 \leq fT/ExpT \leq 0.3 \quad (14),$$

where,
fT is a focal length of the entire zoom lens at the telephoto end; and
ExpT is an exit pupil position with respect to a paraxial imaging plane at the telephoto end.

31. The zoom lens according to claim 17, further comprising a moving lens component which moves in a direction vertical to the optical axis, and
wherein following Conditional Expression (9) is satisfied:

$$1.2 \leq fIS/fISG \leq 3 \quad (9),$$

where,
fIS is a focal length of the moving lens component; and
fISG is a focal length of a lens unit having the moving lens component.

32. The zoom lens according to claim 17, wherein at least one of lens components disposed in the third lens unit moves in a direction vertical to an optical axis.

33. The zoom lens according to claim 17, wherein
a lens component positioned closest to an image in the third lens unit is a lens component having a positive focal length,
the lens component positioned closest to the image in the third lens unit moves in a direction vertical to an optical axis, and
lens components having a negative focal length are disposed on both the object side and an image side of the lens component positioned closest to the image in the third lens unit.

34. The zoom lens according to claim 17, wherein
a predetermined lens component disposed in the third lens unit moves in a direction vertical to an optical axis, and following Conditional Expression (A14) is satisfied:

$$0.04 \le ((1-\beta ISW) \times \beta RW))/fW \le 0.15 \quad (A14),$$

where,

βISW is a lateral magnification at the wide angle end of the predetermined lens component;

βRW is a lateral magnification at the wide angle end of all of lens units positioned closer to an image than the predetermined lens component; and fW is a focal length of the entire zoom lens at the wide angle end.

35. The zoom lens according to claim 17, wherein a lens component disposed in the third lens unit is moved in a direction vertical to an optical axis, and following Conditional Expression (A15) is satisfied:

$$-3 \le fG3R2/fG3R1 \le -0.5 \quad (A15),$$

where, fG3R1 is a focal length of a lens component disposed closest to an image in the third lens unit; and fG3R2 is a focal length of a lens component disposed second from the image side in the third lens unit.

36. An image pickup apparatus comprising:

the zoom lens of claim 17; and an image pickup element which converts an image formed by the zoom lens to an electrical signal.

37. A zoom lens comprising, in order from an object side, a first lens unit having a positive focal length;

a second lens unit having a negative focal length;

a third lens unit having a positive focal length;

a fourth lens unit having a negative focal length; and a fifth lens unit having a positive focal length, wherein at a time of zooming from a wide angle end to a telephoto end, air spaces between lens units among the first through fifth lens units change, the third lens unit includes a positive lens component, a positive lens component, a negative lens component, and a positive lens component in order from the object side, the negative lens component in the third lens unit is a cemented lens component including a negative lens element and a positive lens element in order from the object side, the cemented lens component is a meniscus-shaped lens component having a convex surface directed toward the object side, a lens unit positioned closest to an image includes an arrangement in which a negative lens element and a positive lens element are disposed in order from the object side, and a lens unit disposed second from the image side with an air space interposed includes an arrangement in which a negative lens element and a positive lens element are disposed in order.

38. The zoom lens according to claim 37, wherein the lens unit positioned closest to the image has a cemented lens component including the negative lens element and the positive lens element cemented together.

39. The zoom lens according to claim 37, wherein the lens unit disposed second from the image side with an air space interposed has a cemented lens component including the negative lens element and the positive lens element cemented together.

40. The zoom lens according to claim 37, wherein the lens unit positioned closest to the image side includes two lens elements in total, and the lens unit disposed second from the image side with an air space interposed includes two lens elements in total.

41. The zoom lens according to claim 37, wherein at the time of zooming from the wide angle end to the telephoto end, an air space between the first lens unit and the second lens unit widens, an air space between the second lens unit and the third lens unit narrows, an air space between the third lens unit and the fourth lens unit widens, and an air space between the fourth lens unit and the fifth lens unit widens.

42. The zoom lens according to claim 37, wherein the third lens unit further includes a predetermined lens component, the predetermined lens component includes a lens element having a negative focal length and a lens element having a positive focal length in order from the object side, and the predetermined lens component or the cemented lens component moves in a direction vertical to an optical axis.

43. The zoom lens according to claim 37, wherein the cemented lens component in the third lens unit moves in a direction vertical to an optical axis.

44. The zoom lens according to claim 37, wherein following Conditional Expression (B1) is satisfied:

$$0.3 \le (\beta 4T/\beta 4W)/(\beta 2T/\beta 2W) \le 0.55 \quad (B1),$$

where,

β2W is a lateral magnification of the second lens unit at the wide angle end;

β2T is a lateral magnification of the second lens unit at the telephoto end;

β4W is a lateral magnification of the fourth lens unit at the wide angle end; and β4T is a lateral magnification of the fourth lens unit at the telephoto end.

45. The zoom lens according to claim 37, wherein following Conditional Expression (B2) is satisfied:

$$0.25 \le (\beta 4T/\beta 4W)/(\beta 3T/\beta 3W) \le 0.5 \quad (B2),$$

where,

β3W is a lateral magnification of the third lens unit at the wide angle end;

β3T is a lateral magnification of the third lens unit at the telephoto end;

β4W is a lateral magnification of the fourth lens unit at the wide angle end; and β4T is a lateral magnification of the fourth lens unit at the telephoto end.

46. The zoom lens according to claim 37, wherein the fourth lens unit is the lens unit disposed second from the image side with an air space interposed, and following Conditional Expressions (B3) and (B4) are satisfied:

$$vdG4P \le 45 \quad (B3), \text{ and}$$

where, vdG4P is Abbe number on d-line of the positive lens element disposed in the fourth lens unit; when the fourth lens unit has a plurality of positive lens elements, vdG4P is a smallest Abbe number of respective Abbe numbers on d-line; and vdG4N is an Abbe number on d-line of the negative lens element disposed in the fourth lens unit; when the fourth lens unit has a plurality of negative lens elements, vdG4N is a smallest Abbe number of respective Abbe numbers on d-line.

47. The zoom lens according to claim 37, wherein the fourth lens unit is the lens unit disposed second from the image side with an air space interposed, and following Conditional Expression (B5) is satisfied:

$$-10 \leq (RG4PF+RG4PR)/(RG4PF-RG4PR) \leq -1 \quad (B5),$$

where,
RG4PF is a radius of curvature of an object-side surface of the positive lens element in the fourth lens unit; and
RG4PR is a radius of curvature of an image-side surface of the positive lens element in the fourth lens unit.

48. The zoom lens according to claim 37, wherein the fourth lens unit is the lens unit disposed second from the image side with an air space interposed, and following Conditional Expression (B6) is satisfied:

$$-2.5 \leq f4G/fW \leq -1.6 \quad (B6),$$

where,
f4G is a focal length of the fourth lens unit; and
fW is a focal length of the entire zoom lens at the wide angle end.

49. The zoom lens according to claim 37, wherein the fourth lens unit is the lens unit disposed second from the image side with an air space interposed,
the negative lens element in the fourth lens unit is disposed closest to an object, and
following Conditional Expression (B7) is satisfied:

$$0.2 \leq DG4W/LW \leq 0.4 \quad (B7),$$

where,
DG4W is a distance on an optical axis from an image-side surface top of the negative lens element disposed closest to the object in the fourth lens unit to an image plane at the wide angle end; and
LW is a distance on the optical axis from an object-side surface top of a lens element disposed closest to the object in the first lens unit to the image plane at the wide angle end.

50. The zoom lens according to claim 37, wherein following Conditional Expression (4) is satisfied:

$$0.1 \leq (\beta 4T/\beta 4W)/(fT/fW) \leq 0.2 \quad (4),$$

where,
β4W is a lateral magnification of the fourth lens unit at the wide angle end;
β4T is a lateral magnification of the fourth lens unit at the telephoto end;
fW is a focal length of the entire zoom lens at the wide angle end; and
fT is a focal length of the entire zoom lens at the telephoto end.

51. The zoom lens according to claim 37, wherein following Conditional Expression (12) is satisfied:

$$0.5 \leq (RG41+RG42)/(RG41-RG42) \leq 1.7 \quad (12),$$

where,
RG41 is a radius of curvature of an object-side surface of a lens element positioned closest to the object in the fourth lens unit; and
RG42 is a radius of curvature of an image-side surface of a lens element positioned closest to an image in the fourth lens unit.

52. The zoom lens according to claim 37, wherein following Conditional Expression (13) is satisfied:

$$-0.7 \leq (RG51+RG52)/(RG51-RG52) \leq 0.7 \quad (13),$$

where,
RG51 is a radius of curvature of an object-side surface of a lens element positioned closest to the object in the fifth lens unit; and
RG52 is a radius of curvature of an image-side surface of a lens element positioned closest to an image in the fifth lens unit.

53. The zoom lens according to claim 37, wherein following Conditional Expression (5) is satisfied:

$$0.23 \leq (\beta 3T/\beta 3W)/(fT/fW) \leq 0.55 \quad (5),$$

where,
β3W is a lateral magnification of the third lens unit at the wide angle end;
β3T is a lateral magnification of the third lens unit at the telephoto end;
fW is a focal length of the entire zoom lens at the wide angle end; and
fT is a focal length of the entire zoom lens at the telephoto end.

54. The zoom lens according to claim 37, wherein following Conditional Expression (7) is satisfied:

$$0.2 \leq f3G/fT \leq 0.33 \quad (7),$$

where,
f3G is a focal length of the third lens unit; and
fT is a focal length of the entire zoom lens at the telephoto end.

55. The zoom lens according to claim 37, wherein following Conditional Expression (6) is satisfied:

$$0.6 \leq (\beta 2W/\beta 3W)/(\beta 2T/\beta 3T) \leq 1.7 \quad (6),$$

where,
β2W is a lateral magnification of the second lens unit at the wide angle end;
β3W is a lateral magnification of the third lens unit at the wide angle end;
β2T is a lateral magnification of the second lens unit at the telephoto end; and
β3T is a lateral magnification of the third lens unit at the telephoto end.

56. The zoom lens according to claim 37, wherein following Conditional Expression (14) is satisfied:

$$-2.5 \leq fT/ExpT \leq 0.3 \quad (14),$$

where,
fT is a focal length of the entire zoom lens at the telephoto end; and
ExpT is an exit pupil position with respect to a paraxial imaging plane at the telephoto end.

57. The zoom lens according to claim 37, wherein any one lens unit of the first lens unit, the second lens unit, the third lens unit, the fourth lens unit, and the fifth lens unit has a moving lens component which moves in a direction vertical to the optical axis, and
following Conditional Expression (9) is satisfied:

$$1.2 \leq fIS/fISG \leq 3 \quad (9),$$

where,
fIS is a focal length of the moving lens component; and
fISG is a focal length of a lens unit having the moving lens component.

58. The zoom lens according to claim 37, wherein any lens component disposed in the third lens unit moves in a direction vertical to an optical axis.

59. An image pickup apparatus comprising:
the zoom lens of claim 37; and
an image pickup element which converts an image formed by the zoom lens to an electrical signal.

60. A zoom lens comprising, in order from an object side:
a first lens unit having a positive focal length;
a second lens unit having a negative focal length;
a third lens unit having a positive focal length;
a fourth lens unit having a negative focal length; and
a fifth lens unit having a positive focal length,
wherein
at a time of zooming from a wide angle end to a telephoto end, air spaces between lens units among the first through fifth lens units change,
the third lens unit includes a first positive lens component, a second positive lens component, a first negative lens component, and a third positive lens component, in order from the object side, and
following Conditional Expression (4) is satisfied:

$$0.1 \leq (\beta 4T/\beta 4W)/(fT/fW) \leq 0.2 \quad (4),$$

where,
$\beta 4W$ is a lateral magnification of the fourth lens unit at the wide angle end;
$\beta 4T$ is a lateral magnification of the fourth lens unit at the telephoto end;
fW is a focal length of the entire zoom lens at the wide angle end; and
fT is a focal length of the entire zoom lens at the telephoto end.

61. A zoom lens comprising, in order from an object side:
a first lens unit having a positive focal length;
a second lens unit having a negative focal length;
a third lens unit having a positive focal length;
a fourth lens unit having a negative focal length; and
a fifth lens unit having a positive focal length,
wherein
at a time of zooming from a wide angle end state to a telephoto end state, air spaces between lens units among the first through fifth lens units change,
the third lens unit includes a first positive lens component, a second positive lens component, a first negative lens component, and a third positive lens component, in order from the object side,
an air space between the first lens unit and the second lens unit is wider in the telephoto end state as compared to the wide angle end state,
an air space between the second lens unit and the third lens unit narrower in the telephoto end state as compared to the wide angle end state,
an air space between the third lens unit and the fourth lens unit is wider in the telephoto end state as compared to the wide angle end state,
an air space between the fourth lens unit and the fifth lens unit is wider in the telephoto end state as compared to the wide angle end state,
the first lens unit is positioned closer to the object side in the telephoto end state than in the wide angle end state,
the third lens unit is positioned closer to the object side in the telephoto end state than in the wide angle end state, and
the fourth lens unit is positioned closer to the object side in the telephoto end than in the wide angle end state.

62. The zoom lens according to claim 17, wherein the third lens unit includes six lens elements.

* * * * *

UNITED STATES PATENT AND TRADEMARK OFFICE
CERTIFICATE OF CORRECTION

PATENT NO. : 10,061,106 B2
APPLICATION NO. : 15/340434
DATED : August 28, 2018
INVENTOR(S) : Tetsuya Yanai et al.

Page 1 of 1

It is certified that error appears in the above-identified patent and that said Letters Patent is hereby corrected as shown below:

In the Specification

Column 3, Line 16, delete "100" and insert --10C--.

Column 21, Line 45, delete "$0.04 \leq ((1-\beta ISW) \times \beta RW))/fW \leq 0.15$" and insert --$0.04 \leq ((1-\beta ISW) \times (\beta RW))/fW \leq 0.15$--.

Column 39, Line 20, delete "180," and insert --18C,--.

In the Claims

Column 95, Line 2, Claim 12, Line 4, delete "DGST" and insert --DG5T--.

Column 99, Line 2, Claim 34, Line 5, delete "$0.04 \leq ((1-\beta ISW) \times \beta RW))/fW \leq 0.15$" and insert --$0.04 \leq ((1-\beta ISW) \times (\beta RW))/fW \leq 0.15$--.

Column 99, Line 27, Claim 37, Line 1, delete "side," and insert --side:--.

Column 100, Line 59, Claim 46, Line 1, after "(B3), and" insert --$0 \leq vdG4N-vdG4P$ (B4),--.

Signed and Sealed this
Twenty-fifth Day of December, 2018

Andrei Iancu
*Director of the United States Patent and Trademark Office*